THERMOPLASTIC FILM DATA STORAGE EQUIPMENT

Original Filed Aug. 25, 1958 32 Sheets-Sheet 1

Inventors
William C. Hughes
John E. Wolfe
William E. Glenn
by Charles W. Helzer
Their Attorney Inventors
William C. Hughes
John E. Wolfe
William E. Glenn
by Charles W. Helzer
Their Attorney Dec. 21, 1965 W. C. HUGHES ET AL 3,225,335

THERMOPLASTIC FILM DATA STORAGE EQUIPMENT

Original Filed Aug. 25, 1958 32 Sheets-Sheet 3

Inventors
William C. Hughes
John E. Wolfe
William E. Glenn
by Charles V. Helzer
Their Attorney

HORIZONTAL DEFLECTION CIRCUIT (WRITING)

Inventors
William C. Hughes
John E. Wolfe
William E. Glenn
by Charles W. Helzer
Their Attorney

VERTICAL DEFLECTION CIRCUITS (WRITING)

Inventors
William C. Hughes
John E. Wolfe
William E. Glenn
by Charles V. Helzer
Their Attorney

THERMOPLASTIC FILM DATA STORAGE EQUIPMENT

Inventors
William C. Hughes
John E. Wolfe
William E. Glenn
by Charles V. Helzer
Their Attorney

THERMOPLASTIC FILM DATA STORAGE EQUIPMENT

Original Filed Aug. 25, 1958 32 Sheets-Sheet 7

Inventors
William C. Hughes
John E. Wolfe
William E. Glenn
by Charles W. Helzer
Their Attorney

THERMOPLASTIC FILM DATA STORAGE EQUIPMENT

Inventors
William C. Hughes
John E. Wolfe
William E. Glenn
by Charles V. Helzer
Their Attorney

HORIZONTAL SWEEP MATCHING CIRCUITS (READING)

Inventors
William C. Hughes
John E. Wolfe
William E. Glenn
by Charles W. Helzer
Their Attorney Inventors
William C. Hughes
John E. Wolfe
William E. Glenn
by Charles V. Hefzer
Their Attorney

THERMOPLASTIC FILM DATA STORAGE EQUIPMENT

AUXILIARY VIDICON CIRCUITS (READING)

Inventors
William C. Hughes
John E. Wolfe
William E. Glenn
by Charles V. Helzer
Their Attorney Inventors
William C. Hughes
John E. Wolfe
William E. Glenn
by Charles W. Helzer
Their Attorney

TRACE REJECTION LOGIC

Inventors
William C. Hughes
John E. Wolfe
William E. Glenn
by Charles W. Helzer
Their Attorney

THERMOPLASTIC FILM DATA STORAGE EQUIPMENT

Dec. 21, 1965 W. C. HUGHES ET AL 3,225,335

THERMOPLASTIC FILM DATA STORAGE EQUIPMENT

Original Filed Aug. 25, 1958 32 Sheets-Sheet 15

Inventors
William C. Hughes
John E. Wolfe
William E. Glenn
by Charles W. Helzer
Their Attorney Inventors
William C. Hughes
John E. Wolfe
William E. Glenn
by Charles W. Helzer
Their Attorney Inventors
William C. Hughes
John E. Wolfe
William E. Glenn
by Charles W. Helzer
Their Attorney

THERMOPLASTIC FILM DATA STORAGE EQUIPMENT

Original Filed Aug. 25, 1958

PLATE EXTRACTION MECHANISM

Inventors
William C. Hughes
John E. Wolfe
William E. Glenn
by Charles V. Helzer
Their Attorney Inventors
William C. Hughes
John E. Wolfe
William E. Glenn
by Charles W. Helzer
Their Attorney Dec. 21, 1965 W. C. HUGHES ET AL 3,225,335

THERMOPLASTIC FILM DATA STORAGE EQUIPMENT

Original Filed Aug. 25, 1958 32 Sheets-Sheet 20

Inventors
William C. Hughes
John E. Wolfe
William E. Glenn
by Charles W. Helzer
Their Attorney Inventors
William C. Hughes
John E. Wolfe
William E. Glenn
by Charles W. Helzer
Their Attorney Inventors
William C. Hughes
John E. Wolfe
William E. Glenn
by Charles V. Helzer
Their Attorney Inventors
William C. Hughes
John E. Wolfe
William E. Glenn
by Charles W. Hofer
Their Attorney Dec. 21, 1965 W. C. HUGHES ET AL 3,225,335

THERMOPLASTIC FILM DATA STORAGE EQUIPMENT

Original Filed Aug. 25, 1958 32 Sheets-Sheet 24

FIG. 29 MAGNETIC MEMORY CORE MATRIX

Inventors
William C. Hughes
John E. Wolfe
William E. Glenn
by Charles V. Helzer
Their Attorney Inventors
William C. Hughes
John E. Wolfe
William E. Glenn
by Charles W. Helzer
Their Attorney Dec. 21, 1965 W. C. HUGHES ET AL 3,225,335

THERMOPLASTIC FILM DATA STORAGE EQUIPMENT

Original Filed Aug. 25, 1958

32 Sheets-Sheet 26

Inventors
William C. Hughes
John E. Wolfe
William E. Glenn
by Charles V. Hezer
Their Attorney Inventors
William C. Hughes
John E. Wolfe
William E. Glenn
by Charles W. Helzer
Their Attorney

SWEEP CIRCUIT READING

Inventors
William C. Hughes
John E. Wolfe
William E. Glenn
by Charles W. Helzer
Their Attorney

LIGHT OPTICS

Inventors
William C. Hughes
John E. Wolfe
William E. Glenn
by Charles W. Helzer
Their Attorney

THERMOPLASTIC FILM DATA STORAGE EQUIPMENT

Inventors
William C. Hughes
John E. Wolfe
William E. Glenn
by Charles V. Hefzer
Their Attorney

LOGIC CIRCUIT (READING)

Inventors
William C. Hughes
John E. Wolfe
William E. Glenn
by Charles W. Helzer
Their Attorney

CONTROLLER SYSTEM

Inventors
William C. Hughes
John E. Wolfe
William E. Glenn
by Charles W. Helzer
Their Attorney United States Patent Office 3,225,335

Patented Dec. 21, 1965

3,225,335

THERMOPLASTIC FILM DATA STORAGE EQUIPMENT

William C. Hughes, Scotia, John E. Wolfe, Schenectady, and William E. Glenn, Scotia, N.Y., assignors to General Electric Company, a corporation of New York Continuation of abandoned application Ser. No. 756,775, Aug. 25, 1958. This application Mar. 7, 1963, Ser. No. 263,442

26 Claims. (Cl. 340—173)

The present invention relates to new and improved data storage equipment, and is a continuation of application Ser. No. 756,775, filed Aug. 25, 1958, entitled Thermoplastic Film Data Storage Equipment, W. C. Hughes, John E. Wolfe and William E. Glenn, inventors, assigned to the General Electric Company and now abandoned.

More particularly, the invention relates to data storage equipment that is capable of storing relatively large quantities of information in a small space.

With the use of electronic and electro-mechanical computers becoming more widespread throughout industry, the need for greatly improved automatically operable data storage equipment has become more pressing. Existing data storage equipment of this type such as the magnetic tape recorder, magnetic memory core matrices, and magnetic memory drums are all quite limited in the amount of data that they are capable of storing relative to their size, for as the quantity of data stored increases, the size of these equipments increases proportionally and becomes unreasonably large.

It is, therefore, a primary object of the invention to provide new and improved data storage equipment that is capable of storing large quantities of data (over a billion bits of information), and that is relatively small in comparison to the quantity of data which it is capable of storing.

In practicing the invention, data storage equipment is provided which utilizes an impressionable plastic medium, and includes an electron beam writing apparatus for impressing electrons on the plastic medium in desired data information bearing patterns. The equipment further includes positioning means for accurately positioning the plastic medium in a desired location with respect to the electron beam writing apparatus, and position control means for accurately controlling the operation of the positioning means. It is also anticipated that the equipment may include heating means for conditioning the plastic medium to accept the electron patterns to be written thereon, and curing the medium after impression of the electron patterns thereon to permanently set the patterns. The equipment may also include read out means for inspecting a plastic medium having data bearing patterns formed thereon for deriving an output electric signal indicative of such data. In one form of the invention herein disclosed the positioning means comprises a rotatable drum having the impressionable plastic medium secured to the surface thereof, and means to translate the drum in either direction parallel to its longitudinal axis. In still another form of the invention disclosed herein, the positioning means comprises a tray of separate plates having the impressionable plastic medium secured thereto that is positionable in two directions. The positioning means of the second form of the invention further includes an extraction mechanism for removing any desired one of the plates and disposing it adjacent either the electron beam writing apparatus or the read out means and thereafter returning the plate to the tray, together with tabulating means for recording the position in the tray of plates having desired information stored thereon.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DRUM DATA STORAGE EQUIPMENT

*General block diagram*

Figure 1:
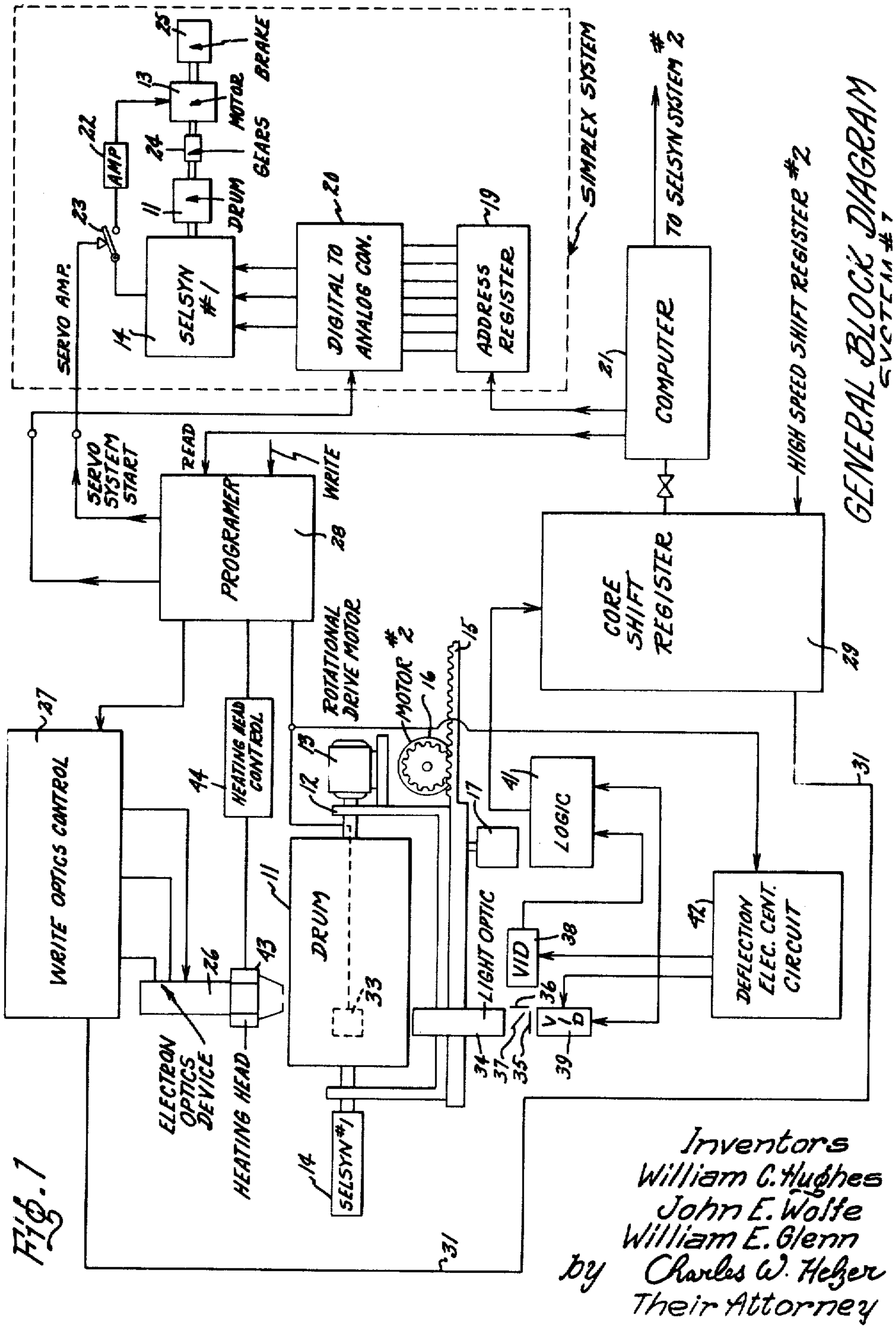
FIG. 1 is a functional block diagram showing the general arrangement of a drum data storage equipment constructed in accordance with the present invention.

The embodiment of the invention illustrated in FIG. 1 of the drawings includes an automatic positioning means for automatically positioning a thermoplastic film recording medium in response to a control signal, and comprises a drum storage unit wherein thermoplastic film is formed over the surface of the drum, and the data to be stored is formed by impressions made on the surface of the thermoplastic film. In this embodiment of the invention a rotatable transparent drum 11 is provided which has a thermoplastic film surface secured thereto. The thermoplastic film may be formed from a blend of polystyrene, m-terephenyl and a copolymer of 95 weight percent of butadiene and 5 weight percent styrene as disclosed in U.S. Patent No. 3,113,179, issued December 3, 1963, William E. Glenn, Jr., inventor, entitled, Method and Apparatus for Recording, assigned to the General Electric Company. The rotatable drum 11 is journaled in a rack 12, and has one end of its shaft secured to a rotational servo drive motor 13, and the remaining end of the shaft secured to selsyn generator 14. The rack 12 has a ratcheted extension 15 on one of the ends thereof which engages and is driven by a second servo motor 16 that serves to drive the rack 12 longitudinally along the axis of the rotatable drum 11 to any desired position. Also coupled to the rack 12 through a suitable gear arrangement, not shown, is a second selsyn generator 17. By this arrangement, the rotational servo motor 13 serves to rotate the drum 11 to any desired position along its periphery and the selsyn generator 14 will generate an electric signal indicative of this position. The longitudinal servo motor 16 serves to position the drum 11 to any desired position along its longitudinal axis, and the second selsyn generator 17 serves to develop an electric signal indicative of the longitudinal position of the drum. Both the rotational drive motor 13 and first selsyn generator 14 are included in a first selsyn system No. 1 for accurately positioning the drum 11 rotationally, and both longitudinal drive motor 16 and second selsyn generator 17 are included in a second selsyn system for accurately positioning the drum 11 longitudinally. Because both of the selsyn systems are identical in construction, only one of the systems has been disclosed at the right hand side of the drawing.

In addition to the motor 13 and selsyn generator 14, the first selsyn system comprises an address register 19 electrically coupled to a digital-analog converter 20 which converts the digital type electric address signal supplied to the address register from a computer with which the equipment is being used, indicated at 21, to an analog type electric signal which in turn is applied to the selsyn generator 14 to accurately position servo motor 13 in response to the address. The selsyn generator 14 is coupled back to the servo motor 13 through a suitable servo amplifier 22 and actuating switch 23 to form a closed loop selsyn system. To further assure accuracy in positioning of the drum 11, it is usually desirable to couple the motor 13 through reduction gears indicated at 24 to the drum, and to provide a braking arrangement indicated at 25 for the motor 13. Because the selsyn system will be described in greater detail subsequently, a further description of its construction and operation is believed unnecessary at this point. It should be indicated, however, that the first selsyn system serves to accurately position drum 11 at a desired point rotationally in response to an address supplied to the address register 19 thereof from computer 21. The second selsyn system, not shown, would include the motor 16 and second selsyn generator 17, and would serve to position the drum 11 longitudinally at a desired position in response to an address supplied thereto from computer 21.

In order to form impressions on the thermoplastic surface of the drum 11, an electron beam writing apparatus is provided which includes an electron optics device 26 which provides a pencil-like writing electron beam that can be scanned across the surface of the thermoplastic film on the drum 11 in the view of the devices, and to impress electron charges upon the surface of the thermoplastic film in desired patterns. The construction and operation of the electron optics device is described more fully in U.S. Patent No. 3,120,991, Thermoplastic Information Storage System, by S. P. Newberry and J. F. Norton, issued February 11, 1964, filed concurrenly herewith, and assigned to the General Electric Company. However, it may be well to point out that the electron optics device 23 does serve to impress upon the thermoplastic film surface of drum 11 small light diffraction gratings of two different grating spacings for diffracting light of two different colors through a selective aperture. These gratings, or bits as referred to hereinafter, are formed by the electron beam from the electron optics and comprise a number of series of parallel lines which are spaced apart a distance determined by the color desired to the refracted or reflected. To provide gratings capable of diffracting light of two different colors, it would be necessary to provide two different grating types characterized by different spacings between the lines making up the gratings. Spacing of the electron beam marks in each grating is controlled by a writing optics control circuit 27 which is electrically connected to the deflection and accelerating electrodes of the electron optics device to control its operation. The write optis control circuit 24 is in turn controlled by control signals supplied thereto from a program controller 28 and from a working core shift register 29. The core shift register 29 is designed to accommodate a block of information in digital form which would represent some 32 by 32 gratings or bits of information, as hereinafter referred to. The digital information is stored in the core shift register for convenience, and is read out serially and supplied to the write optics control 24 through a suitable connection indicated at 31. The information contained in the shift register 29 would be originally supplied thereto from the computer 21.

Also positioned adjacent the rotatable drum 11 is a read out means which in this instance comprises a light source 33 located within transparent drum 11 and positioned to illuminate a particular portion of the surface of the drum 11 so that light is refracted through the gratings thereon such that at a particular diffraction angle two different colored rays emerge from the illuminated portion as determined by the grating spacing. Gratings previously formed on the surface of the drum 11 diffract the light from light source 33 in two different distinctive colors, one of which represents a zero (0) in the binary code, and the other a one (1). The different colored light images are transmitted through a light optic system 34 to a color separating filter arrangement 35 and 36. A half-silvered mirror 37 serves to separate the light rays into two separate images, and direct the two images through the respective color filters 35 and 36 to an associated electron camera tube 38 or 39 which may be of the vidicon type. Electric signals generated by each of the vidicons 38 and 39 are supplied to an output logic circuit 41 which selectively supplies the data read out from drum 11 to the working core shift register 29 in the form of electric pulses representing the information in digital form. It follows, of course, that when the equipment is being used to read out information stored on the drum 11, the working shift register 29 is used to store the information supplied thereto by the output logic circuit. This information may then be used by the computer as required in any computation operation in which the computer may be involved. The operation of the vidicons 38 and 39 in reading out information supplied thereto by the optical assembly 34 is controlled by a deflection circuit 42 which in turn is controlled from the programmer 28 in response to commands received from the computer.

Prior to writing the electron patterns on the thermoplastic film to form the diffraction gratings, it may be necessary to heat the surface of the film to condition it to receive the charge patterns. Also, it may be desired to replace data already recorded on the thermoplastic film of the drum 11 with corrected data supplied to the core shift register 29 from the computer 21. For both of these purposes, and for curing the charge patterns as will be described hereinafter, a heating head 43 is mounted on the end of the electron optics device 26 adjacent the surface of the drum 11 as described in the above referred to patent application of Newberry and Norton. The heating head 43 is connected to a heating control circuit 44 that in turn is controlled from the programmer 28. The heating head 43 serves to apply heat to the thermoplastic film on the surface of drum 11 to condition it to cure it or to erase data already recorded thereon. Because of the nature of the thermoplastic film surface on the drum 11, sufficient heat for a critical period of time will serve to erase the gratings formed on the thermoplastic film. The new information in the core shift register may then be written on the thermoplastic film in the place of the old information that was erased.

As can be readily appreciated the equipment can be used either to write data on the drum 11 to store the same for in indefinite period for usage later, or alternatively to read out information that has been stored on the drum for use in some computational operation by the computer. Assuming it is desired to record some data on the surface of the drum 11, then the computer 32 supplies appropriate command signals to programmer 28 which in turn will initiate operation of the electron writing apparatus 26 through the write optics control circuit 27. Simultaneously, the data to be stored is supplied serially from core sihft register 29 to the write control circuit after having been previously placed in the working core shift register 29 from the computer 21. This data is in digital form, and accordingly may be stored on the surface of the drum 11 by a series of two distinguishable gratings or bits. The nature of these bits will be described more fully hereinafter together with a full description of the manner in which bits are formed on the surface of the drum 11. It is believed adequate at this point in the disclosure to mention that the bits are in the form of a series of several equal length parallel lines, with one set of the lines representing for example zero (0) being spaced apart at a given distance from 0.5 to 5 microns, and the other set of lines representing for example one (1) being spaced apart a different distance within the same range. It can be appreciated, therefore, that a long line of bits of information can be made which would represent binary data in the form of a series of ones and zeros. Having impressed the electron charges on the drum 11 in the desired patterns, with certain types of thermoplastic film it may be desirable to cure the charges by placing them under the heating head 43 for a short period of time in order to facilitate the action of the charge in forming the small marks or lines on the thermoplastic film. In this eventuality, after completion of recording of a block of bits of information contained in the working shift register 29, the programmer 28 may be set to actuate the heating head control circuit 44 thereby supplying heating current to the heating head 43, and effect curing of the block of bits by heating them thereby causing them to become viscose or fluid, at which point the charge will deform the film to produce the desired gratings. The programmer may then rotate the drum 11 under the electron optics device, and if need be advance it longitudinally to position it to accept the next block of bits to be recorded thereon. In order that any particular block of bits may be readily identified for the information contained therein, it is, of course, necessary that the data being recorded be properly coded by the location of the block in which it is written, or the coded identification be placed in an easily accessible position on the block of bits, or by some other means.

In order to utilize the equipment to read out information previously stored on the drum 11, it is merely necessary that the computer 21, or some other similar addressing mechanism, supply the desired address to the address register 19 in each of the selsyn systems driving the rotational servo motor 13, and the longitudinal servo motor 16. The two selsyn systems will then accurately position the drum 11 under the read out optical system 34 in response to the command from the computer 21 to the programmer 28. On being properly located, each of the selsyn systems will supply a signal to the programmer 28 indicating that the drum 11 is properly located whereupon the programmer will actuate the deflection circuits 42 of the read out vidicons 38 and 39, as well as the light source 33. The vidicons 38 and 39 then function to read out the information stored in the block of bits through the output logic circuit 41 to the working core shift register 29. Thereafter the information may be used by the computer 32 in its operations as required.

From a consideration of the above brief description of the new and improved data storage equipment, it can be appreciated that applicants have provided an entirely new data storage device capable of attaining high storage density thereby rendering possible the construction of a very small data storage equipment containing a large amount of stored information. Further, it can be appreciated that the device is highly reliable in operation, and is capable of providing desired information in a minimum access time.

*Position servo mechanism*

Figure 2:
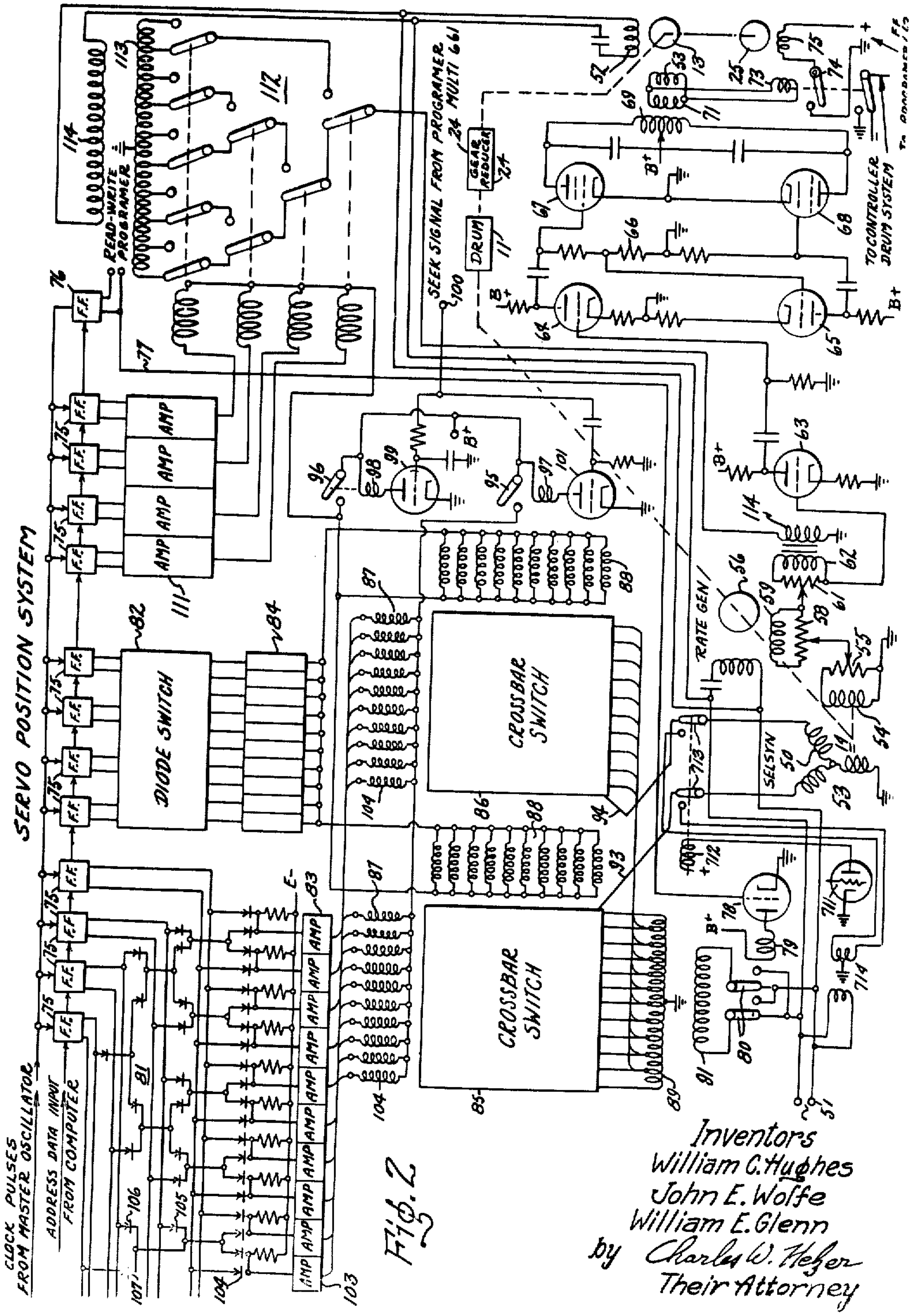
FIG. 2 is a combined functional block diagram and circuit diagram of a servo positioning system used with the drum data storage equipment of FIG. 1.

FIG. 2 of the drawings discloses the details of the construction of the selsyn systems No. 1 and No. 2, and in view of the fact that both systems are identical in construction, although they perform different functions, it is believed necessary to disclose only one of the systems in detail. The selsyn system is designed to drive the drum 11 to a desired position with respect to either the read out means or the electron beam writing apparatus. As was explained in connection with the systems shown in FIG. 1 of the drawings, the drum 11 is geared to servo motor 13 which may comprise any conventional servo motor such as those described in chapter 9 of the textbook entitled, Servo Mechanism Practice, by William R. Ahrendt, published by McGraw-Hill Publishing Company, 1954. Also mechanically connected to drum 11 so as to be rotated with it is the rotor winding 54 of the selsyn generator 14, and the rotor 56 of a rate generator to be described more fully hereinafter. To get the servo motor 13 to position the drum 11 in a desired location with respect to electron beam writing apparatus, or the read out means of the data storage equipment, a source of reference potential, indicated at 51, is connected across the stator field winding 52. Servo motor 13 is of the conventional type wherein torque will be developed depending upon the magnitude and polarity of the energizing signal supplied to the first field winding 52, and a second field winding 53 which is positioned transversely to the first field winding 52 so as to develop a rotating torque. As is well known with motors of this type, if an electromagnetic flux is supplied from only one of the windings, for example field winding 52, the rotor of the motor 13 will not rotate, but will rotate only if there is an angular relationship between the electromagnetic flux supplied from the two field windings 52 and 53. If the field supplied by field winding 52 is held steady, then the direction of rotation as well as the magnitude of rotation will be dependent upon the magnitude and polarity of electric signals supplied across the second field winding 53. This electric signal is developed by the selsyn 14 which has its stator or primary winding 50 connected across a pair of cross bar switches 85 and 86 to be described more fully hereinafter, and has its secondary or rotor winding 54 mechanically shafted to the drum 11. Upon energizing the stator winding 50 with a control potential selected to be proportional to the position to which the drum 11 is to be rotated, the rotor winding will develop an error voltage whose magnitude and polarity is dependent upon the mechanical position of the rotor winding 54 with respect to the electromagnetic flux generated in stator winding 53 by the control potential. This error voltage is then amplified and fed to servo motor 13 and field winding 53 to cause motor 13 to rotate rotor winding 54 to zero out the error voltage.

The error voltage developed across rotor winding 54 is tapped off a load resistor 55 and coupled to a second load resistor 58 which is connected across one of the field windings 59 of rate generator 56. The load resistor 58 is in turn connected to the movable contact of still a third load resistor 61 connected across a secondary winding 62 of a transformer whose primary winding is connected to a relay tree to be described more fully hereinafter. The load resistor 61 is connected directly to the control grid of an electron tube 63 which is a conventional resistance-capacitance coupled power amplifier which amplifies the error signal supplied from resistor 61, and couples the amplified error signal through a resistance-capacitance coupling network to the control grid of an electron tube 64. Electron tube 64, in conjunction with an electron tube 65, and a voltage dividing resistor interconnecting the plates of electron tubes 64 and 65, and having a mid-tap point grounded, comprise a phase splitting network. This phase splitting network serves to develop two opposed in phase electric signals from the single signal supplied thereto from amplifier 63, and to couple the two signals to the control grid of a push-pull power amplifier comprised by electron tubes 67 and 68. The electron tubes 67 and 68 have their anodes connected to opposite ends of a primary winding 69 that is inductively coupled to a secondary winding 71 which in turn is connected across the second field winding 53 of servo motor 13. Also connected across the secondary winding 71 is a solenoid winding 73 of a relay having its movable contacts 74 connected in series circuit relationship with a source of alternating current voltage and the field winding 75 of a normally closed brake 25. By this arrangement, the appearance of a voltage across the secondary winding 71 is applied not only to the second field winding 53 of servo motor 13, but also serves to actuate relay 74, which in turn releases the brake 25 to allow the motor 13 to move to a new position in response to the error voltage applied to its second field winding 53.

The position that the rotor of servo motor 13 takes, and hence the position of the drum 11, is dependent upon the magnitude and polarity of the electric signal supplied across the second field winding 53 of servo motor 13 by the servo amplifier described in the preceding paragraph. It is possible by controlling this electric signal to control the position of the drum 11. This control is achieved by controlling the nature of the exciting voltage supplied across the primary or stator windings 50 of selsyn generator 14. Control of exciting voltage is in turn achieved by the cross bar switches 85 and 86, and the remaining address mechanism for actuating the cross bar switches to be described hereinafter.

The mechanism for actuating cross bar switches 85 and 86 comprises a plurality of bistable multivibrators or flip flop amplifiers 75, which are connected in series circuit relationship, and which have an address data input source connected to the first one thereof. Also, a source of shift signal pulses from the master clock oscillator of the equipment is connected in parallel circuit relationship to the inputs of all of the flip flop amplifiers for effectively shifting data set into the flip flop amplifiers from the address data source to the next succeeding flip flop amplifier in the string until the entire register is filled with the desired address data. The last flip flop amplifier 76 in the address register has its output connected to the programmer, and is designed to receive data indicating whether the equipment is to read or to write. For example, the output of the flip flop amplifier may be represented by a zero (0) voltage or a voltage level representing a one (1) in binary form, and it may be chosen that the read indication from flip flop 76 is a one (1), while the write indication will be represented by a zero (0). Accordingly, flip flop amplifier 76 will provide to the programmer a signal indicating whether the equipment is to read or to write. Simultaneously, this signal is supplied through a conductor 77 to the control grid of an amplifier 78 having a solenoid winding 79 connected in the plate circuit thereof for operating a selector switch 80, the function of which will be described more fully hereinafter.

The first two groups of four flip flop amplifiers 75 are connected through two pyramid arrays of diode rectifiers 81 and 82 which comprise diode switches. Each of the diode switches 81 and 82 comprise conventional pyramid diode matrices of the type described on page 41 of the textbook entitled, Digital Computer Components and Circuits, by R. K. Richards, published by D. Van Nostrand Company, 1957, and function to selectively connect desired ones of the outputs of the group of four flip flop amplifiers 75 to which they are connected, to the input of associated output amplifiers 83 and 84, respectively. Each of the output amplifiers 83 and 84 are connected to respective associated holding magnet solenoid windings 87 and 88, respectively, which serve to actuate holding magnets in the cross bar switches 85 and 86, respectively. Upon being thus actuated, the cross bar switches 85 and 86 function to select out a single point on a multitap transformer secondary winding 89 whose primary winding 91 is connected through selector switch 79 to the source of reference voltage 51.

The cross bar switches 85 and 86 are of conventional construction such as described on page 194 of the textbook entitled, The Design of Switching Circuits, by W. Keister, A. E. Ritchie, and S. W. Washburn of the Bell Telephone Laboratory Technical Staff, published by the D. Van Nostrand Company, 1951. By selective actuation of the holding magnets thereof by proper energization of the solenoid windings 87 and 88, the cross bar switches 85 and 86 will function to connect a selected portion of the secondary winding 89 through the conductors 93 and 94 across the primary of stator winding 53 of selsyn generator 14. To accomplish this, the solenoid windings 87 and 88 must be connected to a source of energizing potential after having been properly lined up by the diode switches 81 and 82. For this purpose, one end of each of the groups of solenoid windings 87 and 88 is connected through relay switches 95 and 96, respectively, to a source of positive potential B+. The source of positive potential B+ is also connected through a pair of solenoid windings 97 and 98, respectively, that actuate switches 95 and 96, respectively, to the anodes of a pair of triode electron discharge tubes 99 and 101. The control grids of triodes 99 and 101 are connected together, and have a control seek signal supplied thereto from the programmer of the equipment. With this arrangement, upon the diode switches 81 and 82 selecting the proper solenoid windings 87 and 88 to be actuated in each of the cross bar switches 85 and 86, the last flip flop amplifier 76 will notify the programmer which will then transmit a control seek signal to triodes 99 and 101 to close the relay contacts 95 and 96, and thereby apply an energizing potential to the selected solenoid windings. Upon this occurrence, the selected contact in the cross bar switch 85 will connect the conductor to a selected tap off point on the multitap secondary winding 89, and the selected contact of cross bar switch 86 will connect conductor 94 to a second tap off point on the multitap secondary winding 89. In this manner, the address supplied to the flip flop amplifiers 75 operates to apply the correct positioning energizing potential to the selsyn generator 14 to cause it to drive servo motor 13 to properly locate drum 11 in response to the address.

The diode switches 81 and 82, and cross bar switches 85 and 86 function to apply the correct energizing potential to the stator winding 53 of selsyn 14 upon the input register comprised by the flip flop amplifiers 75 upon being filled. For purposes of illustration, it will be assumed that the last four flip flop amplifiers 75 in the series have been supplied with the identifying address represented by the binary digits 1001 as indicated on the drawings. Form an examination of the diode switch 81, it will be appreciated that the input of the amplifiers 83 will all be connected to ground potential with the exception of the last amplifier 103 in the row. Amplifier 103 will be connected to the source of negative potential E— by reason of the fact that each of the diode rectifiers 104, 105, 106 and 107 which could conceivably be connected to the input of amplifier 103 are all connected to the one (1) or negative potential side of the output lines from the flip flop amplifiers 75. Accordingly, the source of negative potential E— is effectively connected to the input of the amplifier 103, and its associated solenoid winding 104 in each of the cross bar switches 85 and 86 will be energized upon the source of positive potential B+ being connected to the remaining side thereof by closing the relay switches 95 and 96. The diode switch 82 will operate similarly to select a holding solenoid 88 in each of the cross bar switches to thereby connect the proper portion of the secondary winding 89 through conductors 93 and 94 to the stator winding 50 of selsyn generator 14. There are 10 holding magnets in the vertical and 10 holding magnets in the horizontal plane. Accordingly, the primary winding 89 has 100 tap off points which can be selected by the cross bar switch 85 and by the cross bar switch 86. In this manner, any desired position control potential may be applied across the stator winding which will then function to drive the rotor winding 54 to a position so as to null the output voltage supplied to the second field winding 72 of servo motor 13 in a conventional servo mechanism manner. As described previously, the selected position control voltage supplied to the stator winding 53 will develop in the rotor winding 54 a potential which will be supplied through the load resistors 55, 58 and 61, amplifier 63, phase splitters 64 and 65, and push-pull power amplifiers 67 and 68 to the primary winding 69 of the output transformer. This potential will then develop an electromagnetic flux producing current in the second field winding 53 of motor 13 and will tend to drive motor 13 in a direction to null out the voltage. The direction of rotation will, of course, be determined by the setting of the selector switch 79 and hence will be in accordance with the read-write control signal from the programmer. As the motor 13 tends to rotate, it will drive rate generator 56 which develops a damping potential across the field winding 59 which is in opposition to the voltage developed across rotor winding 54 so as to stabilize the operation of the system. For a more complete description of this phenomena, reference is made to any of the standard textbooks on servo mechanisms.

From a consideration of the cross bar switches 85 and 86 and a multitap primary winding 89 of the transformer, it can be appreciated that the reference potential applied to the stator winding 53 can only position the drum 11 to any one of the 100 positions corresponding to the 100 points on the multitap primary. Because it is desired to have a finer control over the position of the drum 11, a fine positioning control means is provided through the last four flip flops 75 in the register. The output potential from these flip flops is connected through associated amplifiers 111 to respective solenoid windings of a relay tree indicated at 112. The relay tree 112 has its circuit making contacts connected to a multitap secondary winding 113 of a precision transformer whose primary winding 114 is connected across source of reference potential 51. The multitap secondary winding 113 has its center point grounded, and a selection part of its windings may be selectively connected by means of relay tree 112 across the primary winding 114 of a transformer whose secondary winding 62 is connected in the servo amplifier. The signal potential developed across the secondary winding 62 is supplied through load resistor 61 and the remainder of the servo amplifier to the second field winding 53 of servo motor 13. By reason of this arrangement, the last four flip flop amplifiers will connect up the relay tree 112 in a manner so as to select out a desired part of the 10 positions on the multitap secondary winding 113, and apply the potential appearing across the selected part to winding 114, and hence to second field winding 53 of servo motor 13. Because the servo motor 13 will tend to null out the potential supplied across the second field winding 53, this added voltage across winding 114 in effect serves to select any one of 10 positions within any one of the 100 positions selected by the cross bar switches 85 and 86. As a consequence, the servo mechanism can function to select out any one of 1000 positions around the circumference of the drum 11, or in the event the selsyn system is used to longitudinally position the drum, it will function to select out any one of 1000 positions along the longitudinal axis of the drum.

*Writing circuits block diagram*

Figure 3:
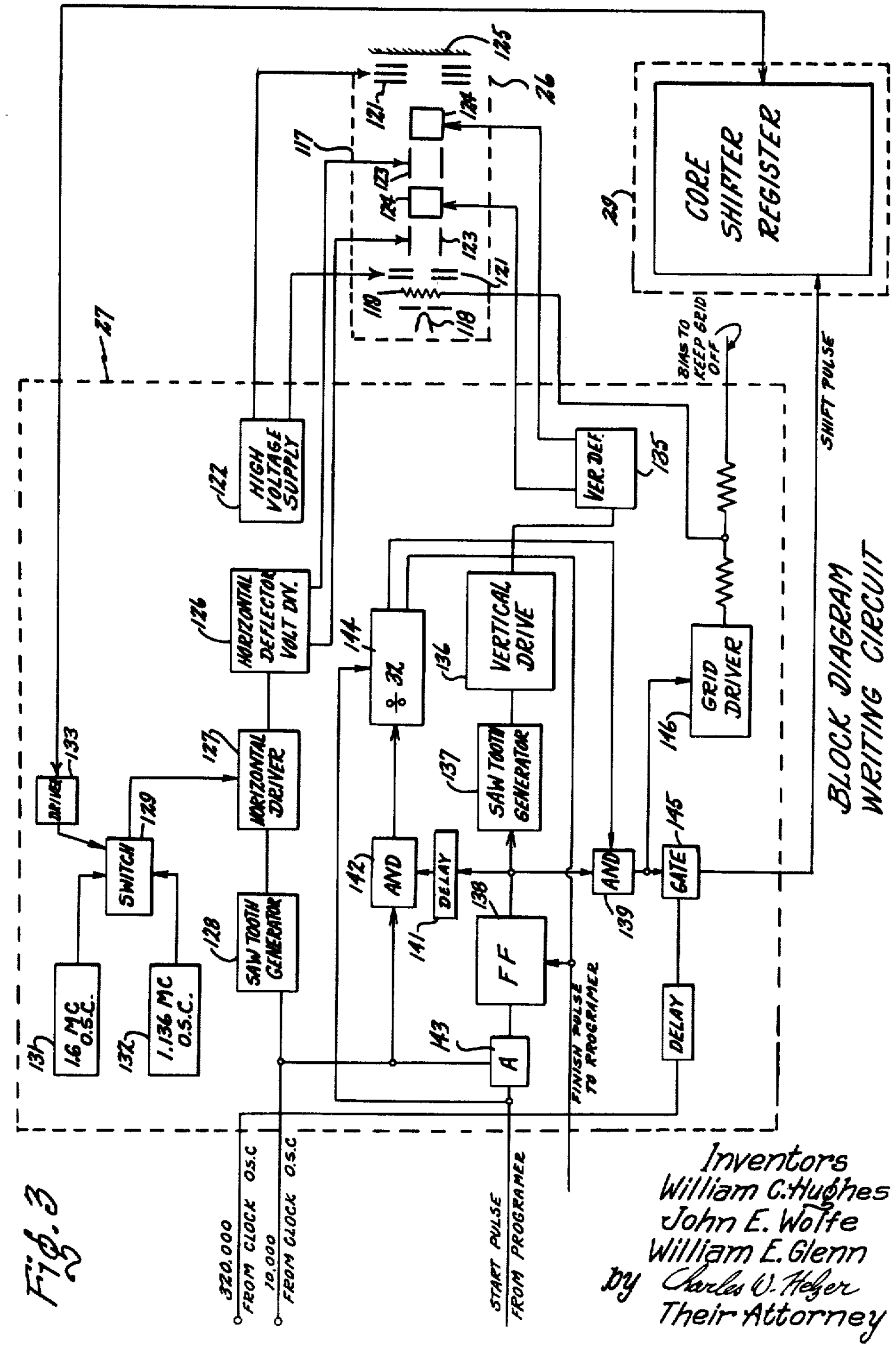
FIG. 3 is a functional block diagram of the writing system used in the drum data storage equipment of FIG. 1.

FIG. 3 of the drawings discloses more of the details of the writing circuits associated with the electron beam writing apparatus 26. The electron beam writing apparatus 26 is illustrated schematically and comprises an evacuated cylinder 117 having an electron emissive cathode 118 for producing an electron beam which is focused to provide a fine line shaped beam in cross section, a control grid 119 for turning the electron beam on and off, and a pair of accelerating electrodes 121 which are electrically connected to a high voltage power supply 122. The electron beam writing apparatus is further comprised by a pair of horizontal deflection electrodes 123 which deflect the electron beam of the apparatus in a horizontal plane, and a pair of vertical deflection electrodes 124 which deflect the electron beam of the apparatus in the vertical plane. By proper combination of the deflection voltages applied to the vertical and horizontal deflection electrodes 123 and 124, the electron beam of the apparatus may be caused to trace out desired patterns containing data to be stored on the surface of the thermoplastic film illustrated at 125. For a more detailed description of the construction and operation of the electron beam writing apparatus, reference is made to the above identified copending patent application of Newberry and Norton (General Electric Patent Docket 14D–1335).

The horizontal deflection electrodes 123 are supplied from a voltage dividing network 126 which in turn derives its potential from a driver circuit 127. The driver circuit 127 has one of its inputs connected to a saw tooth generator 128 that is controlled from a source of 10,000 cycles per second signals supplied by a master clock oscillator associated with the equipment. The driver circuit 127 also has a second input circuit which is connected to the output of a diode switch 129 that in turn has two separate signal sources 131 and 132 connected thereto. Also connected to the diode switch 129 is a switch driver circuit 133 which serves to actuate the switch so as to connect the signal oscillations produced by either the oscillator 131 or the oscillator 132 to the horizontal driver circuit 127. The diode switch actuation is done by the switch driver circuit 133 in response to data information to be written on the thermoplastic applied thereto from the core shift register 29. The crystal oscillators 131 and 132 comprise conventional crystal stabilized oscillators of the type described in chapter 9.9 of the textbook entitled, Active Networks, by Vincent C. Rideout, published by the Prentice-Hall Company, New York, 1954. Each of the crystal oscillators 131 and 132 produces a modulating signal having a frequency of 1.6 megacycles and 1.136 megacycles respectively, so that the two signals are distinctly different, that are selectively applied through the diode switch 129 to the horizontal driver circuit 127. In the horizontal driver circuit 127 either one of the two modulating signals from the diode switch 129 is modulated on the basic saw tooth wave form signal supplied from saw tooth generator 128, and the resultant modulated saw tooth wave form signal is supplied to the horizontal deflection voltage divider 126 and to the horizontal deflection electrodes 123.

The vertical deflection electrodes 124 of electron beam writing apparatus 26 are connected to a vertical deflection voltage divider 135 which in turn is connected to a vertical drive circuit 136 that has a saw tooth wave form potential supplied thereto from a saw tooth generator 137. An operating potential is supplied to saw tooth generator 137 from a flip flop amplifier 138 which also supplies an operating potential to a first and gate 139, and through a delay circuit 141 to a second and gate 142. Flip flop circuit 138 is controlled by the output potential from a third and gate 143 which has initiating signals supplied thereto in the form of a start pulse from the programmer, and from the source of 10,000 cycle oscillations supplied by the master clock oscillator of the equipment. The master clock oscillator also supplies the horizontal saw tooth generator 128 with a synchronizing potential, so that the 10,000 c.p.s. signal is synchronized with the horizontal sweep frequency rate. This 10,000 c.p.s. signal source is also connected to the second and gate 142 which has its output connected to a divider network 144 that is gated by a gating signal supplied thereto from the programmer to initiate its operation. The divider network 144 supplies one output potential to the first and gate 139, and a second output potential back to the programmer to provide a finished signal indication to the programmer upon completion of the writing operation by the writing circuits. First and gate 139, which receives an operating potential from flip flop amplifier 138, upon opening supplies an output potential in parallel to a gating device 145, and to a grid driver circuit 146. The gating device 145 upon opening connects a source of 320,000 cycles per second shift pulses supplied from the master clock oscillator to the core shift register 129 for the purpose of serially shifting out data contained in the core shift register and supplying same to the switch driver circuit 133. The grid driver 146 provides an operating potential to the control grid 119 of electron beam writing apparatus 26 to turn the apparatus on during periods when data contained in the core shift register is to be written, and during other periods to turn the electron beam off.

Upon actuation of the writing apparatus, the master clock oscillator supplies synchronizing pulses to both the horizontal saw tooth generator 128, and to each of the and gates 142 and 143. Simultaneously, shift pulses are supplied to the gating device 145 from the source of 320,000 cycle oscillations. Horizontal saw tooth generator 128 is synchronized with the incoming 10,000 cycle oscillation, and its saw tooth wave form output potential is supplied to the horizontal driver circuit 127 where it is combined with a modulating signal from either the 1.6 megacycle oscillator 131 or the 1.13 megacycle oscillator 132 depending upon the selective operation of the diode switching device 29 in response to actuation from the switch driver circuit 133. Since there is no data supplied to the switch driver 133, only one of the oscillators (normally oscillator 131) will be connected by the diode switch 29 to the horizontal driver circuit 127. Simultaneously with the actuation of the horizontal deflection circuits, the 10,000 cycle clock pulses are supplied to each of the and gates 142 and 143 whereupon the occurrence of a start signal from the programmer, divider circuit 144 is energized, and second and gate 143 is opened. Opening of the and gate 143 supplies an operating potential to flip flop circuit 138 which in turn supplies an output potential to the vertical saw tooth generator 137, and to the first and second and gates 139 and 142, respectively. The potential supplied by the flip flop circuit 138 to the and gate 142 is delayed for a period of time by delay circuit 141 sufficient to coincide with the next incoming clock pulse from the source of 10,000 c.p.s. pulses, and this coincidence opens and gate 142 which starts divider network 144. Upon the divider network 144 being actuated, an energizing potential is supplied to the first and gate 139 which together with the potential from flip flop 138, opens and gate 139, and actuates the grid driver 146 and gating device 145 so that the core shift register is supplied with the 320,000 c.p.s.

clock pulses. Simultaneously with this action, the saw tooth generator 137 has been actuated by flip flop 138 so that a saw tooth wave form potential is supplied to the vertical drive circuit 136, the vertical deflection voltage divider 135, and to the vertical deflection electrodes 124. Accordingly, upon the electron beam being turned on by the grid driver circuit 146, a vertical deflection voltage will be supplied to the vertical deflection electrodes in coincidence with the horizontal deflection voltage supplied to the horizontal deflection electrodes. Simultaneously with this action, the data in the core shift register will be shifted out of the register by the shift pulses supplied from 320,000 cycles source, and will actuate the switch driver circuit 133 so as to open switch 129 in response to the data being supplied thereto. Switch 129 thereafter will shift either the 1.6 megacycle oscillator 131 or the 1.136 megacycle oscillator 132 in circuit relationship with the horizontal driver circuit 127 so as to modulate the basic horizontal sweep voltage with a characteristic modulation signal representing either a zero (0) or one (1) to be recorded on the thermoplastic film 125 by the electron beam as it is scanned across the face of the thermoplastic film. It can be appreciated that the first such lines scanned across the surface of the thermoplastic film will initiate operation of the divider network 144. This network is a divide by 32 network so that it will allow 32 horizontal scans of the electron beam upon the completion of which it will produce an output signal potential which is supplied to the programmer to indicate that 32 horizontal lines of data have been recorded, and also turns off the flip flop 138. Upon flip flop 138 being turned off, the vertical saw tooth generator 137 is inactivated and both the first and second and gates 139 and 142, respectively, are closed. Upon this occurrence, gating device 145 cuts off the shift pulses being supplied to the core shift register, and the grid driver circuit 146 is cut off thereby allowing the control grid 119 to turn off the electron beam of the writing apparatus 26. Thereafter, the electron beam writing apparatus will not record until it receives another start pulse from the programmer whereupon the writing cycle just described will be repeated.

*Horizontal deflection writing circuits*

Figures 4, 5:
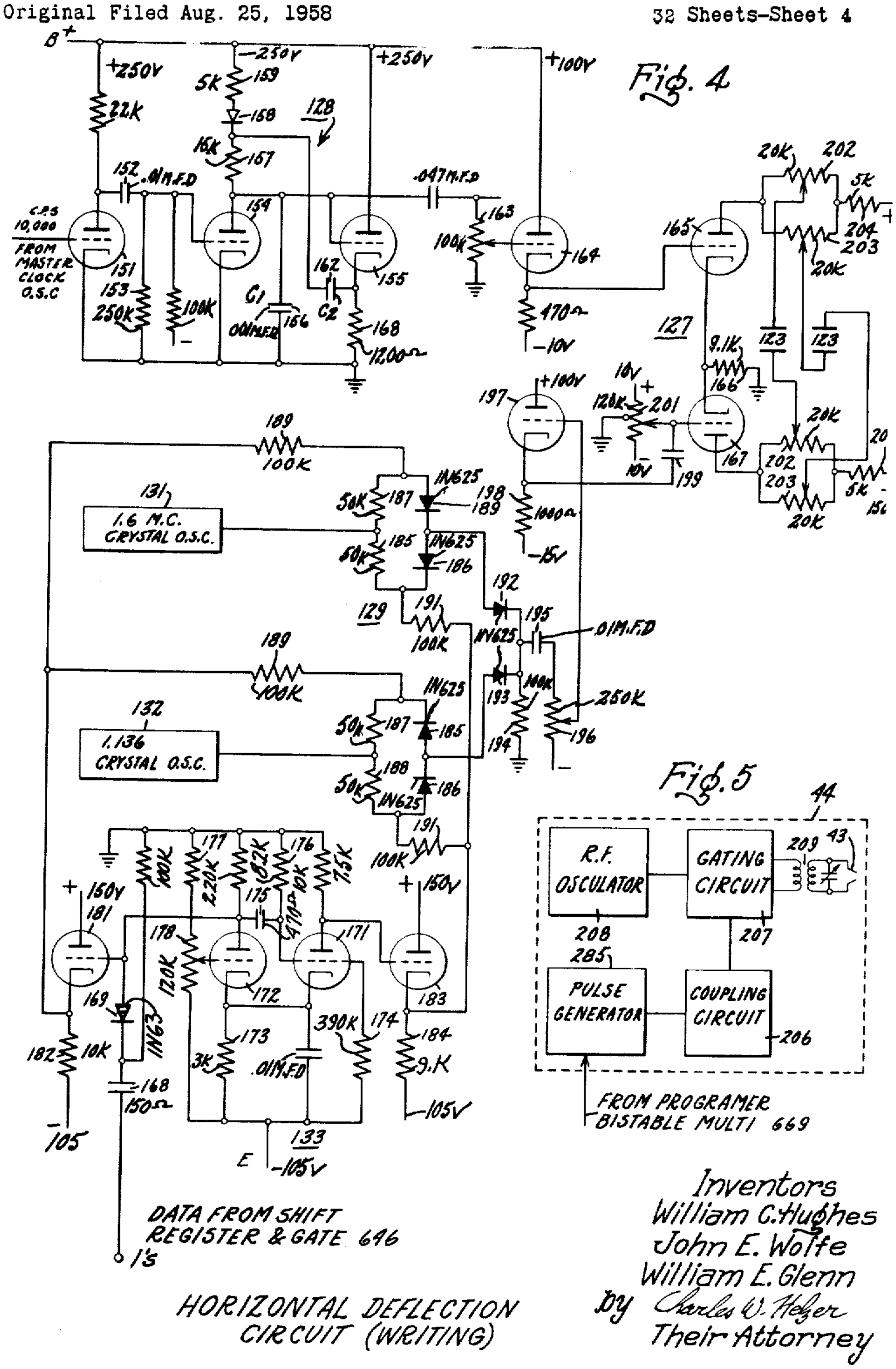
FIG. 4 is a circuit diagram showing the details of construction of the horizontal deflection control circuits used in the writing system of FIG. 3.
FIG. 5 is a functional block diagram showing the construction of the heating head control circuit comprising a part of the drum data storage equipment shown in FIG. 1.

The circuit diagram of the horizontal sweep voltage generating circuit is shown in FIG. 4 of the drawings wherein the horizontal deflection plates of the electron beam writing apparatus are shown at 123, and have a sweep potential applied thereto at a rate which is synchronized with 10,000 c.p.s. oscillations supplied from the master clock oscillator to the control grid of an electron tube 151. Electron tube 151 comprises a conventional R-C coupled amplifier which amplifies and reverses the polarity of the signal pulses received from the master clock oscillator, and supplies them to the control grid of a triode electron tube 154. Electron tube 154 in conjunction with an electron tube 155, and a charging capacitor 156 comprises a boot strap sweep generator for developing the basic saw tooth wave form sweep potential to be applied to the deflection electrodes 123. Electron tube 154 has its anode connected through a first load resistor 157, a diode rectifier 158, and a second load resistor 159 to a source of positive plate potential, and is also connected to the control grid of electron tube 155 across charging capacitor 156. Electron tube 155 has its anode connected directly to the source of positive potential, and has its cathode connected to a cathode load resistor 161 and through a coupling capacitor 162 to the junction intermediate the first load resistor 157 and rectifier 158. The electron tube 155 is normally conductive due to the positive bias on its control grid. Conduction through tube 155 builds up a positive potential across the cathode load resistor 161 which is coupled back regeneratively to build up the charge across charging capacitor 156 in a boot strap fashion. The parameters of this regenerative circuit are such that the charge across the capacitor 156 builds up linearly in a saw tooth fashion until such time that a pulse is supplied to the control grid of the electron tube 154, whereupon the capacitor 156 is discharged rapidly thereby producing a saw tooth wave shape voltage which is supplied across an output load resistor 163. Load resistor 163 has an adjustable contact which is connected to the control grid of a cathode follower amplifier 164 which has its cathode load resistor connected to the control grid of a triode electron tube 165. Triode 165 has its cathode connected through a common cathode load resistor 166 to a second triode 167, which together comprise a driver modulator circuit for effectively modulating the saw tooth wave shape horizontal scan voltage supplied from the sweep generator 128 with the data intelligence to be written by the electron beam of the electron beam writing apparatus. For this purpose, the data from the shift register 29 is supplied in the form of negative signal pulses through a coupling capacitor 168 and diode rectifier 169 to the control grid of a triode electron discharge tube 171 of a monostable multivibrator which further includes an electron tube 172. Triode 171 has its anode connected through a suitable plate load resistor to a source of positive potential, preferably ground, and has its cathode connected through a common cathode resistor 173 to a source of negative potential. The cathode or triode tube 171 is also connected by a grid resistor 174 to the source of negative potential, and through a charging capacitor 175 to the anode of triode 172. A plate load resistor connects the anode of triode 172 to the source of positive potential, and the cathode of triode 172 is connected through common cathode resistor 173 to the negative potential. A biasing resistor 176 is connected to the control grid of the electron tube 171 so that a voltage divider is formed by the series connected resistors 174 and 176 to provide grid bias to electron tube 171. Grid bias is supplied to triode 172 from a pair of resistors 177 and 178 connected in series between the source of positive potential (in this case ground) and the source of negative potential with the control grid of electron tube 172 being connected to a mid-tap point on the resistor 178. By proper selection of the values of the voltage dividing resistors 174, 176, and 177 and 178, the electron tube 171 is maintained in a normally conducting condition. As a consequence, a positive bias is developed across the common cathode resistor 173 which maintains electron tube 172 non-conducting. As a result, a positive potential is supplied to the control grid of a cathode follower amplifier 181 having its cathode load resistor connected to the bidirectional diode switch 129. Conversely, a cathode follower amplifier 183 having its control grid connected to the plate of electron tube 171 will be cut off. Upon the occurrence of a negative signal pulse supplied from the core shift register, the control grids of both cathode follower amplifier 181 and electron tube 171 are driven negative so that they are rendered non-conductive, and electron tube 172 becomes conductive. The anode of the electron tube 171 then becomes sufficiently positive to render cathode follower amplifier 183 conductive, and supply an output signal pulse to the bidirectional diode switch 129. Concurrently with this action, the charging capacitor 175 is being charged until such time that electron tube 171 again becomes conductive with the electron tube 172 being rendered non-conductive, and the circuit returns to its original condition. Accordingly, it can be appreciated that the monostable multivibrator 133 functions to provide positive switching potentials through the cathode follower amplifiers 181 and 183 to the bidirectional diode switch 129. For a more detailed description of the construction and operation of monostable multivibrator circuits, reference is made to the textbook entitled, Pulse and Digital Circuits, by Millman and Taub, published by the McGraw-Hill Book Company. Particular reference is made to page 198 of this text which illustrates and describes a similar circuit.

The output from monostable multivibrator 133 is coupled through cathode follower amplifiers 181 and 183 to the bidirectional diode switch 129. Diode switch 129 actually comprises a pair of bidirectional diode gates. Each of the diode gates is formed by two diode rectifiers 185 and 186 connected serially in bridge circuit relationship with a pair of resistors 187 and 188. The junctions of the resistors 187 and 188 are connected to the output of crystal oscillator 131 or 132. The junctions of the resistors 187 and the cathodes of diode rectifiers 185 are connected through coupling resistors 189 to the cathode load resistor 182 of cathode follower amplifier 181. The junctions of resistors 188 and the anodes of diode rectifiers 186 are connected through coupling resistors 191 to cathode load resistor 184 of cathode follower 183. The junctures of the two diode rectifiers 185 and 186 in both diode gates are connected through half wave rectifiers 192 and 193, to a load resistor 194. The two bidirectional diode gates are constructed similarly with the exception that the diode rectifiers 185 and 186 in the two diode gates have their polarities reversed. For a more detailed description of the construction of and operation of bidirectional diode gates, reference is made to the above identified Millman and Taub text, and in particular to page 438 thereof.

The modulating signals appearing across the load resistor 194 are coupled through a coupling capacitor 195 and amplitude control resistor 196 to the control grid of a cathode follower amplifier 197. The cathode follower 197 has its load resistor 198 coupled through a capacitor 199 to the control grid of electron tube 167 of the driver modulation circuit 127. The control grid of tube 167 is also connected across a potentiometer formed by a resistor 201 to provide grid bias for the control grid of driver modulator tube 167. The anode of electron tube 167 is connected to a voltage dividing network formed by a pair of parallel connected resistors 202 and 203 which have variable tap off points connected to the horizontal deflection electrodes 123, and are connected through a resistor 204 to a source of positive potential. The anode of electron tube 165 of the driver-modulated circuit 127 is also connected through a similar voltage divider network 202, 203 to a source of positive potential, with the voltage divider network 202, 203 being connected to the horizontal deflection electrodes 123 of the electron beam writing apparatus.

Upon placing the horizontal deflection circuit shown in FIG. 4 in operation, the 10,000 c.p.s. signal supplied from the master clock oscillator is connected through polarity reversing amplifier comprised by electron tube 151 and through the R-C coupling circuits 152 and 153 which differentiates the signal, and provides positive triggering pulse of short time duration to the control grid of electron tube 154. Electron tube 154 in conjunction with electron tube 155 and charging capacitor 156 comprises a boot strap sweep generator whose operation is synchronized by the incoming signal pulses supplied to the control grid of electron tube 154. The boot strap sweep generator thus comprised develops a saw tooth wave form voltage which is supplied across volume control resistor 163 and cathode follower amplifier 164 to the control grid of electron tube 165 in the driver modulator circuit 127 further comprised by electron tube 167. The wave shape of this basic saw tooth wave form voltage is shown in FIG. A of sheet 16 of the drawings. The intelligence contained in the data stored in the core shift register is modulated on this basic saw tooth wave form voltage by means of electron tube 167 of the driver modulator arrangement. The modulating signal containing this intelligence is supplied from the core shift register to the control grid of electron tube 171 of monostable multivibrator 133 further comprised by electron tube 172. The monostable multivibrator is in a normal zero (0) producing condition wherein the electron tube 171 is normally conducting, and an output switching potential is developed across the cathode load resistor 182 of cathode follower amplifier 181. Under these conditions, the monostable multivibrator opens the diode gate associated with the 1.6 megacycle crystal oscillator 131 to supply signals from that oscillator through half wave rectifier 192 to load resistor 194, to cathode follower amplifier 198 and thence to the control grid driver-modulator tube 167. Accordingly, when there is no data supplied from the core shift register, or when the numeral in the data being supplied from the core shift register is a zero (0), the 1.6 megacycle crystal oscillator is connected out through the diode switch associated therewith to the control grid of driver-modulator tube 167. Since driver-modulator tubes 165 and 166 have a common cathode load resistor 166, the 1.6 megacycle oscillation is modulated on the wave front of the saw tooth wave form voltage supplied from the saw tooth generator 128. Upon the occurrence of a one (1) in the data supplied from the core shift register, monostable multivibrator 133 is caused to change from its stable state of operation wherein electron tube 171 is conducting, to its unstable operating condition, wherein electron tube 172 is conducting. As a result, the cathode follower amplifier 181 is cut off, and a switching potential is supplied across the load resistor 184 of the cathode follower amplifier 183 connected to electron tube 171. This switching signal is supplied to each of the bidirectional diode gates 129 so that the diode gate associated with the 1.136 megacycle crystal oscillator 132 is opened, and the diode gate associated with the 1.6 megacycle oscillator is closed. The output signal from the 1.136 megacycle crystal oscillator 132 is then coupled through the half wave rectifier 193 and load resistor 194, and across the amplitude control resistor 196 to the cathode follower amplifier 197, and to the driver-modulator tube 167. Accordingly, it can be appreciated that the driver-modulator tube 167 has supplied to it a series of signals which are alternately one or the other of the two frequencies 1.6 megacycles or 1.136 megacycles depending upon the data supplied to the monostable multivibrator 133 from the core shift register. The wave form of such a series of signals is illustrated in graph B, sheet 16 of the drawings. It should be understood that graphs A and B are entirely different time bases as can be appreciated from consideration of the fact that they represent signals having widely different frequencies. Graph C of the drawings portrays a more realistic picture of the relationship of the saw tooth wave form sweep voltage supplied from the boot strap sweep generator 128, and the series of two different frequency modulating signals supplied from the crystal oscillators 131 and 132, for it is anticipated that some 32 different bits of data may be modulated upon one wave front of the saw tooth wave form voltage supplied from the boot strap sweep generator 128. This signal developed in the driver-modulator tubes 165 and 167 is provided to the phase splitting networks 202 and 203 where they are picked off and applied to the deflection electrodes 123. FIGURE C of sheet 5 of the drawings illustrates the wave shape of the resultant sweep voltage supplied by the driver-modulator to the deflection electrodes 123. This resultant wave shape allows the electron beam of writing apparatus, which has a rectangular or square cross section, to be swept across the surface of the thermoplastic film at a continuous rate depending upon the wave shape of the saw tooth wave form voltage supplied from sweep generator 128, and the modulating signals provide small plateaus on this basic saw tooth form potential, the spacing between which is dependent upon whether the 1.6 megacycle oscillator or the 1.136 megacycle oscillator is supplying the modulating signal. These small plateaus cause the writing electron beam to dwell at a particular point on the surface of the thermoplastic film for an instant of time longer than on the cross over points so that a sufficiently great charge of electrons is built up on the surface of the thermoplastic film, which, upon curing, will result in a grating, the spacing between which will be determined by the spacing between the plateaus on the sweep voltage wave front.

*Heating head control circuit*

The heating head control circuit 44 is shown in block diagram form in FIG. 5 of the drawings. Because all of the elements of the heating head control circuit are conventional in construction, and are described in any of the standard radio textbooks (for example, see Reich, Theory and Application of Electron Tubes, published by McGraw-Hill Book Company, 1944, New York, New York), they have been illustrated in only block diagram form. The input trigger potential supplied from programmer 28 of the equipment is supplied to a pulse generator circuit 205 which has its output connected through a coupling circuit 206 to a gating 207. Gating circuit 207 is also connected to the output of a radio frequency oscillator 208, and operates to supply pulses of radio frequency energy of about 400 volts for a time duration of two-one hundredths of a second to the primary winding of an output transformer 209. Transformer 209 in turn has its secondary winding connected across the radio frequency heating electrodes 43 which serve to heat the thermoplastic film to a temperature of 100–150° centigrade.

*Vertical deflection writing circuits*

Figure 6:
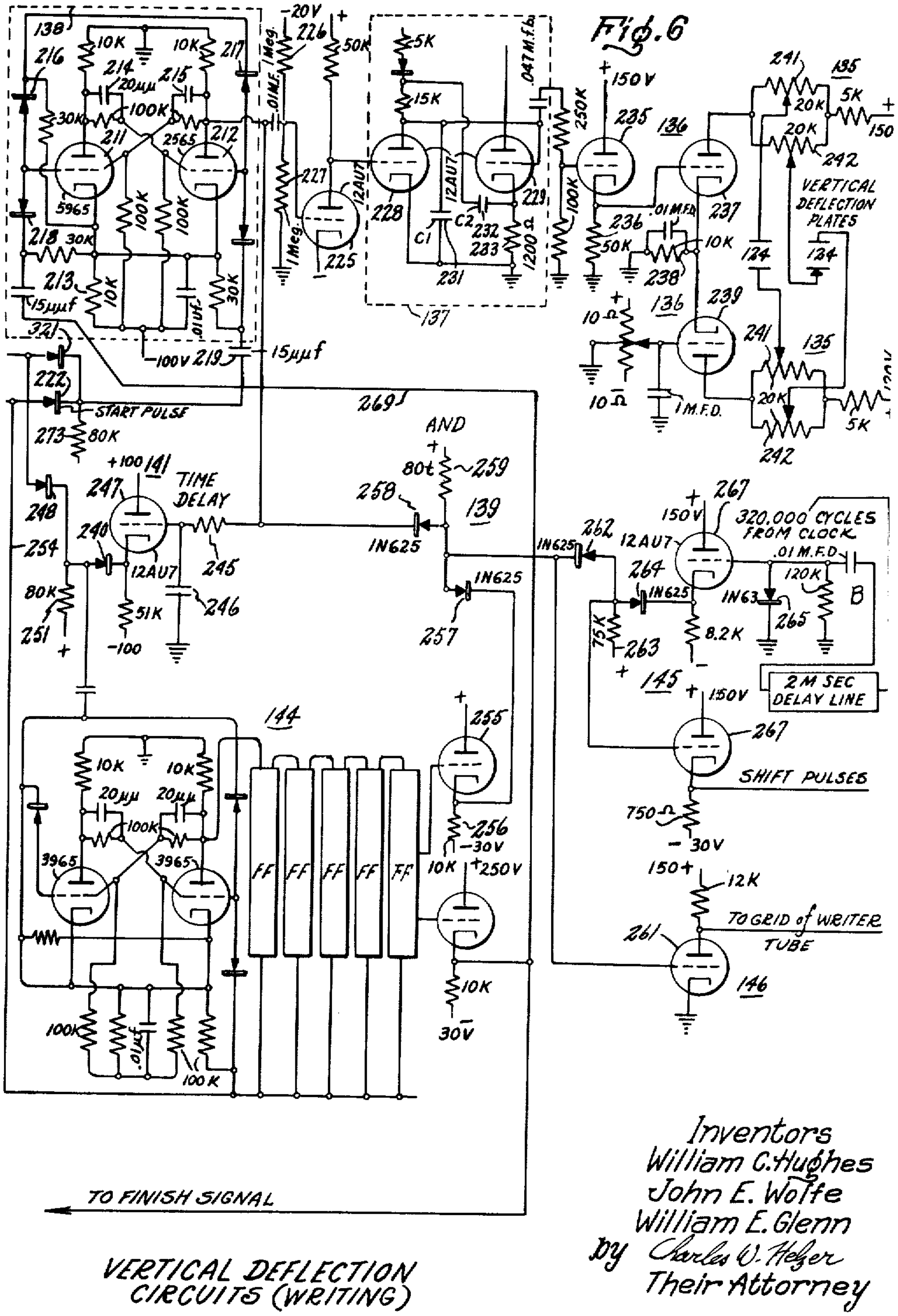
FIG. 6 is a circuit diagram showing the details of construction of the vertical deflection circuits used in the writing system of FIG. 3.

The details of construction of the vertical deflection circuits of the equipment are shown in FIG. 6 of the drawings wherein the vertical deflection plates of the electron beam writing apparatus are shown at 124. Operating potentials are supplied to the vertical deflection plates 124 from a boot strap sweep generator whose operation is controlled by a bistable multivibrator or flip flop amplifier 138 which is turned on by an incoming triggering pulse supplied from the 10,000 c.p.s. signal master clock oscillator not shown. The bistable multivibrator or flip flop amplifier 138 comprises a pair of electron tubes 211 and 212 which have the anode electrodes thereof connected through suitable plate load resistors to a source of positive potential (in this case ground) and the cathodes thereof connected through a common cathode resistor 213 to a source of negative potential. The anodes and control electrodes of each tube 211 and 212 are interconnected through resistance-capacitance charging networks 214 and 215, respectively, and the control electrodes of each of the electron tubes 211 and 212 have suitable biasing resistors connected thereto and to the source of negative potential. In addition, the control grid of each tube is connected to the junctions of a pair of opposed rectifiers 216 and a pair of opposed rectifiers 217, respectively, which form a triggering circuit for the flip flop amplifier. One set of rectifiers 216 is also coupled through a coupling capacitor 218 to the output of a divider network 144 to be described more fully hereinafter, and in addition is connected through a resistor to the cathode of electron tube 211. The remaining set of rectifiers is coupled through a coupling capacitor 219 to an and gate 143, and likewise has a resistor interconnecting one of the rectifiers in the set to the cathode of electron tube 212. The and gate 143 is formed by a pair of rectifiers 221 and 222 connected across a resistor 223 which is biased to a value such that both diode rectifiers 221 and 222 must have gating potentials supplied thereto in order to provide a positive going triggering output signal pulse to the bistable multivibrator 138. For a more detailed description of the construction and operation of diode and gates, reference is made to the above identified Millman and Taub text and in particular to page 397 thereof. Because of and gate 143, a triggering pulse is not supplied to bistable multivibrator 138 until the occurrence of both the start pulse from the programmer, and a clock pulse from the source of 10,000 c.p.s. oscillations supplied by the master clock oscillator. This arrangement assures that initiation of operation of the vertical voltage deflection circuit will be synchronized with the actuation of the horizonal voltage deflection circuits previously described. In its off condition, electron tube 212 of flip flop 138 is normally conducting, and the bias potential built up across the common cathode load resistor 213 is sufficient to maintain electron tube 211 in a nonconducting condition. Upon the occurrence of a positive triggering pulse supplied from the and gate 143 the cathode of electron tube 212 is driven positive thereby cutting the electron tube 212 off. Upon this occurrence, the positive bias supplied to the control electrode of electron tube 211 renders that tube conductive. This in turn builds up a positive bias across the common cathode resistor 213 which maintains electron tube 212 in a non-conducting condition. This results in driving the anode electrode of tube 212 positive and provides a positive going output potential to a resistance coupled amplifier 225 connected to the boot strap sweep generator 137. The anode of electron tube 225 is connected to the control grid of electron tube 228 which in conjunction with electron tube 229 forms a boot strap sweep generator for developing a saw tooth wave form vertical sweep potential. The boot strap sweep generator 137 is free running; however, its operation is initiated or triggered by the negative potential supplied to the control grid of electron tube 228 from flip flop 138 and amplifier 225. The boot strap sweep generator 137 includes a charging capacitor 231 connected between the plate and cathode of electron tube 228, and a feedback connection through a coupling capacitor 232 from a cathode resistor 233 connected in the cathode circuit of electron tube 229. With this arrangement, the electron tube 228 is normally conductive until such time that it is rendered non-conductive by electron tube 225 becoming conductive and dropping its plate potential and hence the control grid voltage of tube 228 below the cut off point of electron tube 228. Upon this occurrence, capacitor 231 starts charging through the feed back path including coupling capacitor 232 and the plate load resistor of electron tube 228 at a linear rate depending upon the time constants of the circuits. This time constant is chosen for a period of time sufficient to allow 32 horizontal scans and results in the production of a saw tooth wave form vertical sweep potential that is applied across a voltage divider resistor 234 to the control grid of a cathode follower amplifier 235. Cathode follower amplifier 235 has its cathode load resistor 236 coupled to the control grid of a driver amplifier tube 237 which has its cathode connected to a resistor 238 connected in common with the cathode of an electron tube 239 so as to form a phase spitting device. The control grid of electron tube 239 is connected to a grid biasing potentiometer, and the plate circuits of each of the electron tubes 237 and 239 have voltage dividing networks formed by two parallel connected resistors 241 and 242 connected thereto and through an additional voltage dropping resistor to a source of positive potential. The saw tooth wave form voltage produced by sweep generator 137 is amplified by tubes 237 and 239 and supplied across each of the resistors 241 and 242 in the voltage dividing network to which the vertical deflection plates of electron beam writing apparatus are connected.

The positive triggering potential produced by the flip flop amplifier 138 is also supplied through a time delay circuit formed by a resistor and capacitance network 245 and 246 and electron tube 247 to an and gate rectifier 249. The time delay circuit is designed to delay the signal pulse for a period of time equal to one cycle of operation of the 10,000 c.p.s. signal source before applying the same to the and gate 142 formed by diode rectifiers 248 and 249 and resistor 251. Opening of the and gate 142 allows subsequent signal pulses from the 10,000 cycle per second master clock oscillator signal source to be applied to the input of the first flip flop amplifier in a divider network 144 formed by six such flip flops and capable of dividing the 10,000 c.p.s. pulses by a factor of thirty-two (32). The flip flop amplifiers in divider network 144 are identical in construction and operation to the flip flop amplifier 138 and, therefore, will not be described in detail. It is believed sufficient to point out that the series of flip flop amplifiers 144 are all placed in the zero condition by the application of a start pulse supplied through conductor 254 from the programmer. The subsequent application of the horizontal sweep frequency counting pulses from the 10,000 c.p.s. signal source to the first one of the series of flip flop amplifiers to trip divider network into the first of its 32 stable conditions of operation.

Upon the divider network 144 being placed in the zero condition by the start pulse from the programmer, a gating potential is provided at the output of the divider which is supplied to a cathode follower amplifier 255 and appears across its cathode load resistor 256. The potential appearing across the cathode load resistor 256 is supplied to an and gate 139 formed by diode rectifiers 257 and 258 and a load resistor 259. The diode rectifier 258 already has a positive potential from flip flop amplifier 138 applied to it so that upon the application of a positive potential to rectifier 257 from cathode load resistor 256, and gate 139 opens. Opening of the and gate 139 produces a positive voltage pulse which is coupled to the control grid driver amplifier tube 261 whose plate load resistor is connected to the grid of the electron beam writing apparatus. The positive potential pulse supplied by and gate 139 is also applied across a rectifier 262 of and gate 145 which further includes a load resistor 263, and a diode rectifier 264. The diode rectifier 264 has supplied thereto positive signal pulses from the 320,000 c.p.s. master clock oscillator through a cathode follower amplifier 266 having a grid coupling circuit comprised by a diode rectifier 265 and resistance-capacitance coupling network. The cathode resistor of cathode follower amplifier 266 is connected to diode rectifier 264 so that upon coincidence of the potentials applied to the two rectifiers 262 and 264, the and gate 145 opens and applies the 320,000 c.p.s. shift pulses to the control grid of a cathode follower amplifier 267. The cathode follower 266 is in turn connected to the core shift register 29, not shown, so that the 320,000 c.p.s. shift pulses from the master clock oscillator can be used to read out data stored in the core shift register. The data thus read out is then supplied to the switch driver circuit of the horizontal deflection circuit previously described to thereby modulate the data as intelligence on the horizontal sweep voltage.

The vertical deflection circuit operates to provide a saw tooth wave form sweep potential to the vertical deflection electrodes 124 of the electron beam writing apparatus. The initiation of this vertical sweep potential is synchronized with the initiation of the horizontal sweep potential by the and gate 143 which triggers bistable multivibrator 138. The triggering of bistable multivibrator 138 supplies an operating potential to the boot strap sweep generator 137 and causes that circuit to initiate the development of the saw tooth wave form sweep potential. This sweep potential is supplied to the driver amplifier tube 239, and to the phase splitting resistor networks 241 and 242 which are connected to the vertical deflection electrodes 124 of the electron beam writing apparatus. Simultaneously, the potential produced by the bistable multivibrator 138 is applied through delay circuit comprised by amplifier tube 247 to the and gate 142. This potential is also supplied to the rectifier 258 of and gate 149. The first and gate 142 also has supplied to it signal pulses from the 10,000 c.p.s. source of oscillation so that and gate 142 opens, and applies the 10,000 c.p.s. signal pulses from the master clock oscillator to the input of the divide by 32 circuit 144. Previously divider 144 had been conditioned for operation by a start pulse from the programmer supplied through conductor 254 so that a positive output potential is produced across the cathode load resistor 256 which together with the potential supplied from bistable multivibrator 138, opens and gate 139 and applies an operating potential to the control grid of amplifier 261 connected to the control grid of the electron beam writing apparatus. Operating potential is also supplied to the and gate 145 so that signal pulses from the 320,000 cycle master clock oscillator source can be applied through cathode follower amplifier 267 to the core shift register. With the deflection circuits thus conditioned, the vertical deflection voltage sweep generator 137 will continue to operate while the horizontal deflection voltage sweep generator runs through 32 cycles of operation. Upon completion of the 32 horizontal scans, the divide by 32 circuit 144 produces an output potential which is supplied to the programmer to indicate that the writing circuit has completed writing a table of data. This output potential is also supplied through the conductor 269 to bistable flip flop 138 to return it to its initial state. The vertical deflection circuit will then have completed one cycle of operation, and the circuit is in condition to receive another start signal from the programmer.

*Reading system block diagram*

Figure 7:
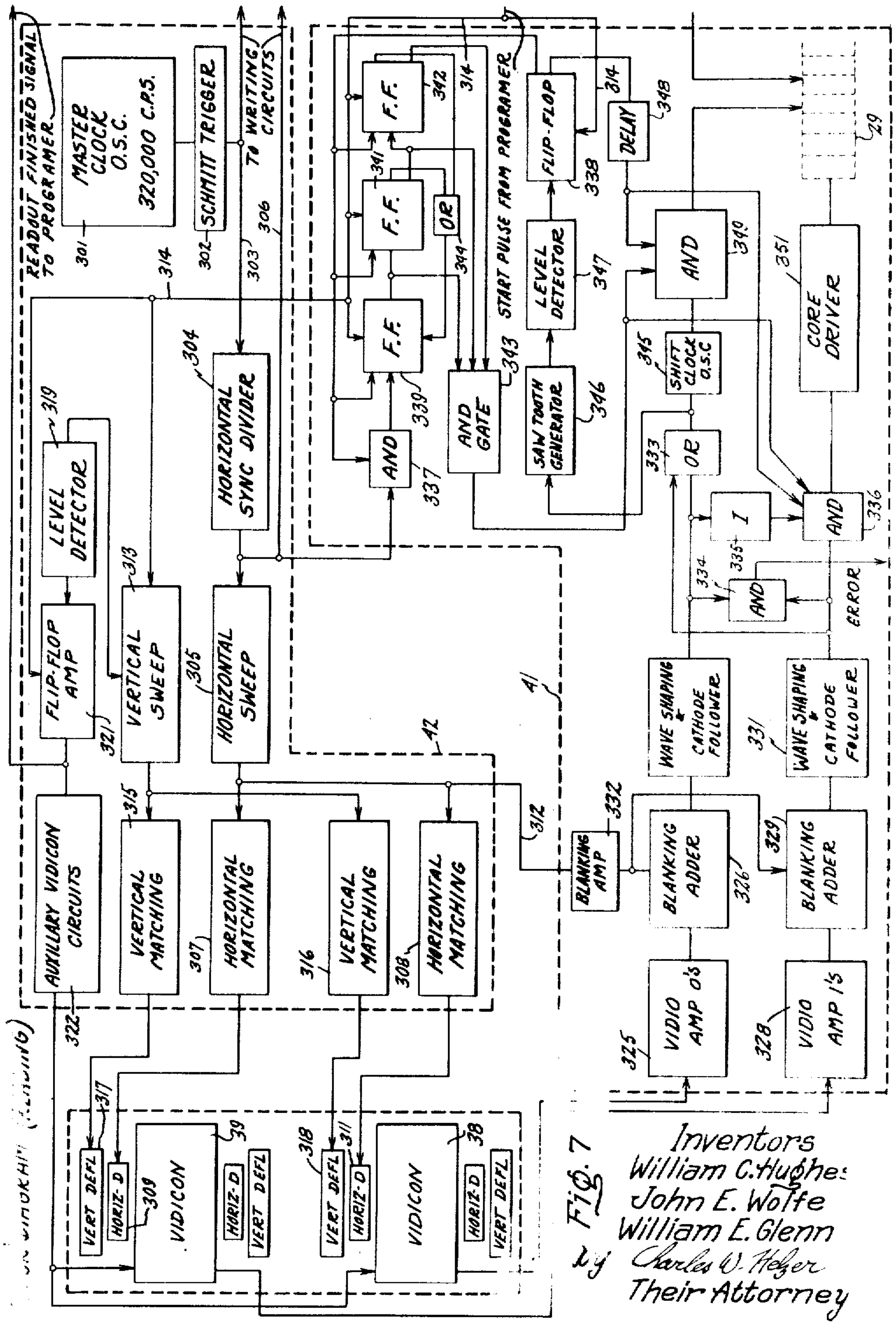
FIG. 7 is a functional block diagram of the reading system comprising a part of the drum data storage equipment shown in FIG. 1.

In order to read out data which has been formed on the thermoplastic film surface of the drum 11 in the previously described manner, a pair of read out vidicons 38 and 39 are provided as shown in the functional block diagram of FIG. 7 of the drawings. Each of the read out vidicons 38 and 39 have sweep potentials supplied thereto which are initiated from a 320,000 c.p.s. master clock oscillator 301. The output of the master clock oscillator 301 is supplied to a wave shaping trigger circuit 302. The output of the wave shaping circuit 302 is connected through a conductor 303 to the writing circuits previously described, and to the input of a horizontal synchronizing voltage divider network 304. The divider network 304 serves to divide the frequency of the signal supplied thereto from the master clock oscillator by a factor of 32, and provides an output signal having a frequency of 10,000 cycles per second which is connected to the input of a horizontal sweep generator 305 for the purpose of synchronizing the operation of the sweep generator 305. The output from divider network 304 is also supplied through conductor 306 to the writing circuits, and to the input of a trace rejection logic circuit to be described more fully hereinafter. A horizontal sweep generator 305 develops a saw tooth wave form output potential which is connected through a pair of matching networks 307 and 308 to the horizontal deflection coils 309 and 311 of vidicons 39 and 38, respectively. The output potential developed by horizontal sweep generator 305 is also connected through a conductor 312 to the output logic circuits for a purpose to be described hereinafter. Vidicons 38 and 39 have a vertical sweep potential supplied to the deflection coils thereof from a vertical sweep generator 313 whose input is connected through a conductor 314 to the programmer of the equipment which provides an energizing start pulse to the vertical sweep generator. Vertical sweep generator 313 develops a saw tooth wave form vertical deflection voltage which it supplies through a pair of vertical matching networks 315 and 316 to the vertical deflection coils 317 and 318 of the vidicon tubes 39 and 38, respectively. The output potential of vertical sweep generator 313 is also supplied through a level detector 319 to a bistable multivibrator 321 which drives the auxiliary vidicon circuits 322 that turn on the read out beams of the tubes and the like for the purpose of energizing such circuits. The auxiliary vidicon circuits 322 are, of course, connected to each of the vidicons 39 and 38 for supplying power to the same.

The output signal pulses produced by the vidicons 38 and 39 are supplied to separate amplifying channels where they are amplified and shaped before being supplied to the core shift register in which the data being read out is temporarily stored for use by the computer of other apparatus with which the data storage is being used. The equipment is designed so that the vidicon 38 supplies output electrical signals having a pulse wave form representing zeros in that data being read out, to a video amplifier 325 whose output is connected through a blanking-adder circuit 326 to a wave shaping circuit and cathode follower amplifier 327. The vidicon 39 supplies a pulsed output signal representative of the ones contained in the binary data stored on the drum being scanned, and this signal is supplied to video amplifier 328, a blanking-adder circuit 329 to a wave shaping and cathode follower amplifier 331. As mentioned in the previous paragraph, the output signal from the horizontal sweep generator 305 is supplied through a conductor 312 and a blanking amplifier 332 which is connected to both of the blanking-adders 326 and 329. By this arrangement, it is possible to selectively gate open both of the channels in which the blanking-adder circuits 326 and 329 are included during the read out portions of the travel of vidicon electron beams. During the re-trace portions of the electron beam travel, the blanking-adder circuits 326 and 329 are cut off thereby assuring that no noise is allowed to be read into the core storage device 29. The output signal from both cathode follower amplifiers 327 and 331 is supplied to an or gate 333, and to an "and" gate 334 for developing an error signal in the event both cathode follower 327 and 331 supply an output signal simultaneously. In addition, the output of cathode follower amplifier 327 is connected through an inverter circuit 335 to an and gate 336, with the output of cathode follower 331 being supplied directly to and gate 336. The and gate 336 also has gating potentials supplied thereto from a trace rejection logic circuit which together with the output logic circuit controls the operation of the deflection circuits 42. This trace rejection logic circuit comprises an and gate 337 to which is supplied the horizontal synchronizing potential developed by a divider circuit 304 as well as a gating potential from a flip flop amplifier 338 that is set to its zero output condition by a start pulse signal supplied from the programmer. The output potential developed across and gate 337 is supplied to the first flip flop amplifier 339 in divide by five counter further comprised by flip flop amplifiers 341 and 342 and or gate 344. Each of the flip flop amplifiers 339, 341 and 342 have reset signal pulses supplied thereto from the programmer through conductor 314, and a start count signal from the flip flop amplifier 338. All of the flip flop amplifiers 339, 341 and 342 have their outputs connected to an and gate 343 and the last two flip flop amplifiers 341 and 342 have their outputs connected to an or gate 344 whose output is connected back to the input of the flip flop amplifier 339. By this arrangement, the three flip flop amplifiers which would normally count up to eight are caused to count only to five before opening the and gate 343. The potential developed across and gate 343 is applied to the and gate 336 connected to the output of cathode follower amplifier 331 in the one's (1's) channel, and also to an and gate 349 which is connected to the output of a shift clock oscillator **345*a* which operation is synchronized by the incoming one's (1's) or zero (0) signal pulses supplied by cathode followers 327 or 331 through or gate 333. The output potential developed across or gate 333 is also supplied to the input of a saw tooth generator 346 having its output coupled to a level detector 347 which in turn is coupled to the input of flip flop amplifier 338, and controls the actuation of the same in conjunction with the start pulse supplied from the programmer. As previously mentioned, the flip flop amplifier 338 supplies an output start count signal to each of the flip flop amplifiers 339, 341, and 342 divide by five circuits. In addition, flip flop amplifier 338 supplies a second output signal through a delay device 348 to and gate 349, and to and gate 336. The output potential from and gate 349 is then supplied to shift register 29. Simultaneously, the and gate 336 is opened so that data may be supplied to the core driver 351 and thence to the core shift register 29 from the cathode follower amplifier 331**.

Figure 19:
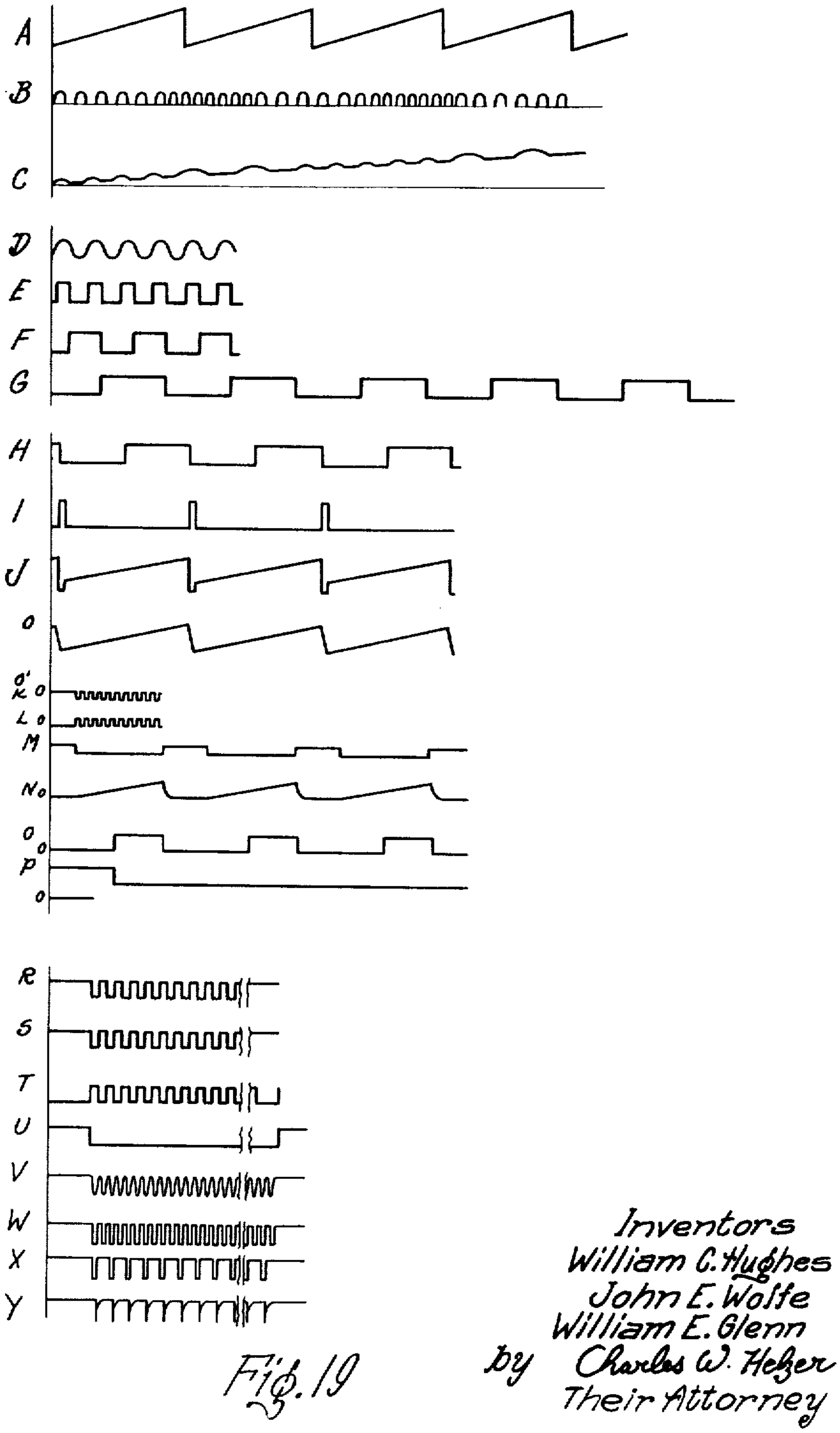
FIG. 19 shows a series of potential waveforms of the characteristics of the signals appearing at various points in the data storage equipment of FIG. 1.

In operation the master clock oscillator 301 supplies a triggering potential having a sinusoidal wave shape as shown at D in sheet 16 of the drawings to the wave shaping circuit 302 which develops a pulsed wave form potential shown at E on FIG. 19. This potential wave form is supplied to the horizontal synchronizing divider 304 which divides its frequency by a factor of thirty-two (32) in the manner illustrated by curves F and G of FIG. 19. The frequency dividing illustrated by curves F and G is performed five times by divider 304 to result in a 10,000 c.p.s. pulse wave form synchronizing potential that is shown at H on FIG. 19, and is supplied to the horizontal sweep generator 305. The potential shown at H on sheet 16 is converted to a short time duration pulse potential shown at I on sheet 16 by a multivibrator comprising a part of sweep generator circuit 305, which serves to trigger saw tooth generator to produce a saw tooth wave form sweep potential shown at J. This sweep potential is supplied through matching circuits 307 and 308 to the horizontal deflection coils 309 and 311 of vidicons 39 and 38, respectively, where it appears as shown at Q on FIG. 19. Simultaneously, the start pulse from the programmer is applied through conductor 314 to the vertical sweep generator 313 and initiates its operation. Concurrently, the flip flop amplifier 321 is actuated so that it supplies operating potential to the auxiliary vidicon circuits 322 thereby turning on the vidicons 39 and 38. The vertical sweep generator then applies its saw tooth wave form sweep potential somewhat similar in wave shape to curve Q in FIG. 19 of the drawings to the vertical matching circuits 315 and 316, and to the vertical deflection coils 317 and 318 of vidicons 39 and 38, respectively.

Figures 8, 9:
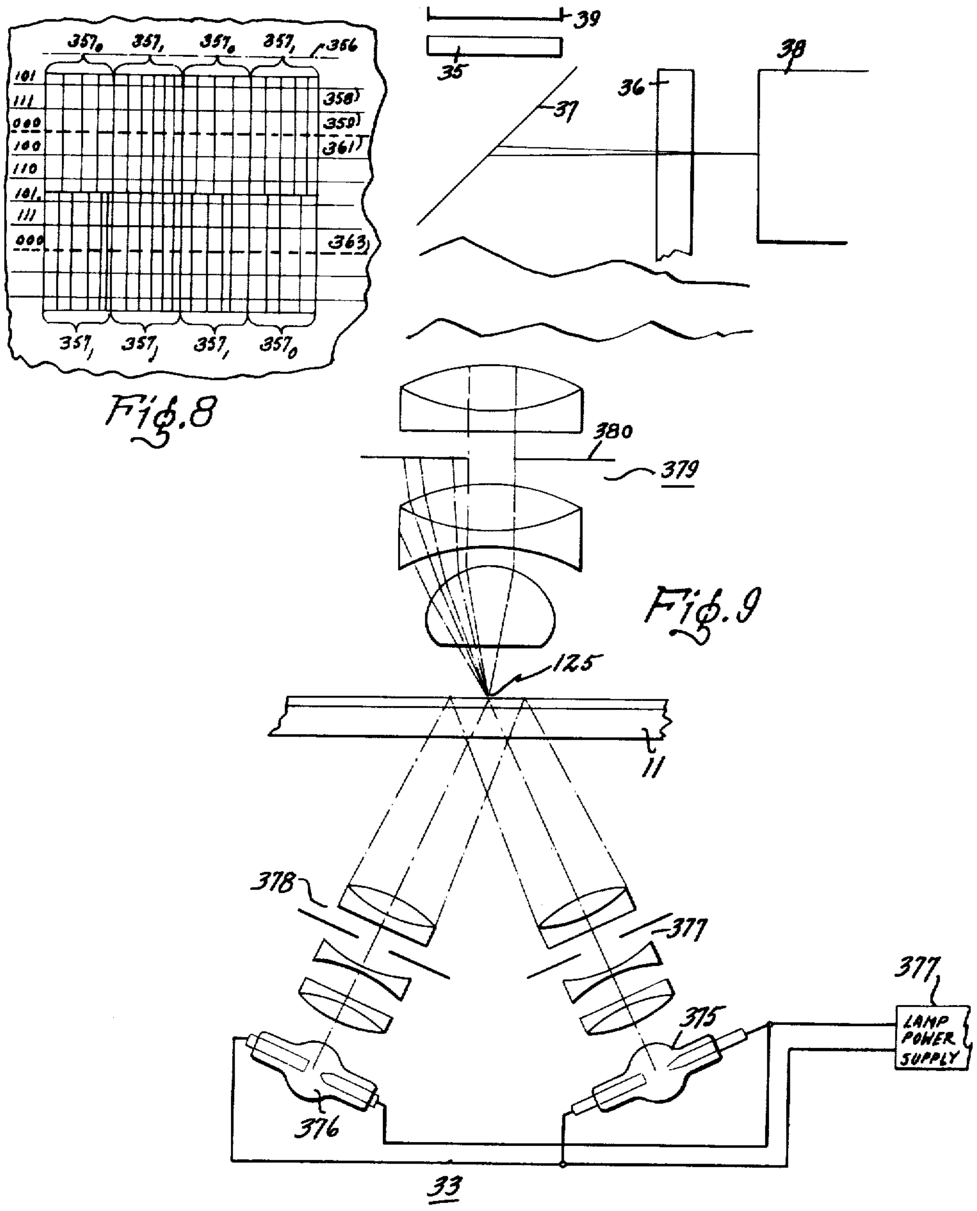
FIG. 8 is a fragmentary view of the thermoplastic film surface of the storage drum comprising a part of the drum data storage equipment shown in FIG. 1, and illustrates the manner in which data is written on the drum surface.
FIG. 9 is a functional block diagram of the parts of a read out system used in the drum data storage equipment of FIG. 1.

FIG. 8 of the drawings discloses a block of data bits as it would appear on a thermoplastic film surface on data storage drum 11. It should be understood that the gratings on surface 355 would not actually appear on the photosensitive cathode surfaces of the vidicon read out tubes 39 and 38 as shown in FIG. 8, but instead would appear to the vidicons as a series of different colored light spots with the light spots representing zeros being imaged on vidicon 38, and the light spots representing ones being imaged on vidicon 39.

For convenience in explaining the read out operation however, it will be assumed that the read out electron beams of the vidicons, which are rectangular in shape with a length sufficient to embrace one light spot produced by a grating or bit and pencil sharp, trace out the scan lines shown. The beginning trace of the scanning electron beam of each of the read out vidicons 39 and 38 is indicated by the dotted line 356. It can be appreciated that at the position 356 the scanning electron beam of the vidicon will not seen any of the data information gratings or bits illustrated at 357. However, upon reaching the position shown by line 358, the read out electron beam will develop pulse wave form output signals which appear as shown at K and L on FIG. 19 of the drawings, and which will be supplied through either the amplifier 325 or 328 depending upon whether the block of data represents a zero (0) or one (1). Assuming the first block of data to represent a zero (0), then the initial signal pulse passes through the blanking adder 326 by reason of the fact that the horizontal sweep potential from the horizontal sweep generator 305 has been applied through the blanking-amplifier 332 and opened the blanking-adder 326. The signal pulse is then applied to wave shaping and cathode follower amplifier 327 and to or gate 333. Opening of the or gate 333 supplies operating potential having the wave from shown at M and U on FIG. 19 to saw tooth generator 346, and supplies a triggering potential to the shift clock oscillator 345 thereby actuating the shift clock oscillator to produce the sinusoidal shift signal shown at V on FIG. 19. Application of an operating potential to the saw tooth generator 346 initiates its period of operation to produce a saw tooth wave form potential shown at N on FIG. 19 so that as the electron beam of the vidicon scans across the data bit as indicated by the line at 358, the potential of the output voltage produced by saw tooth generator 346 reaches a level indicated by the dotted line sufficient to open level detector 347 which provides a square wave triggering potential shown in 0 to flip flop amplifier 338. Flip flop amplifier 338 then supplies an output potential shown at P through delay device 348 to the and gate 345, and to the and gate 336. Flip flop amplifier 338 also supplies a pre-count set signal of two to the divider network formed by the three flip flop amplifiers 339, 341 and 342. This pre-count set signal conditions the divider network so that it will count only to three pulses before opening the and gate 343, and this is achieved by partially setting the flip flop amplifier 342 to provide operating potential to and gate 343. Finally, the flip flop amplifier 338 supplies operating potential to the and gate 337 so as to open that gate and apply the synchronizing pulses from network 304 to the first flip flop amplifier 339 in the divider network. Application of these synchronizing pulses from circuit 304 to flip flop amplifier 339 causes it to change to the second of its two stable states of operation so that it counts one of the total of three stable states of operation of which the divider network is further capable of counting to. Upon starting a new line of scan indicated at 359, flip flop amplifier 341 will be actuated so as to provide an operating potential to and gate 343, and upon reaching the third or middle line of scan 361, flip flop amplifier 339 will supply an operating potential to the and gate 343. And gate 343 then opens and provides an operating potential to and gates 347 and 336. As a result, and gate 345 opens and allows the shift signal shown at V from the shift clock oscillator 344 to be supplied to the shift pulse generator 349 to produce the shift pulses shown at W on sheet 16 which drive the core shift register. Concurrently, the and gate 336 opens so that data appearing in the one (1) channel and having the wave from shown at R on FIG. 19 of the drawings is supplied to the wave shaping circuit 331 where it is squared to appear as shown at S on FIG. 19. The squared pulse potential S is then supplied through and gate 336 where it appears as shown at X on FIG. 19 and is supplied to the core driver 351. Core driver 351 then converts the signal to short duration pulses shown at Y for driving the core shift register. It should be noted that the output potential from the cathode follower 327 in the zero channel shown at T in FIG. 19 of the drawings is supplied through an inverter circuit 335 to operate and gate 336, and that the negative going signal pulses supplied from vidicon 38 to video amplifier 325, blanking-adder 326, and cathode follower 327 of the zero (0) channel are not provided to drive the core driver 351. By this arrangement, the negative going signal pulses representing the zero (0) will be inverted by inverter 335 so that and gate 336 does not open. This feature assures that no data producing potential will be provided to the core driver, and that no signal will be supplied to data read in coils on the core shift register, and, accordingly, the shift pulses supplied from the shift pulse generator 349 will shift through a blank space in the line of digital data which will represent the zero. The negative going signal pulses supplied from vidicon 339 which represents one's (1's) in the data being read out from drum 11 are supplied through and gate 336 to core driver 351. And gate 336 will be opened since there is no potential appearing at the output of cathode follower amplifier 327 in the zero's channel, and inverter 335 will operate to provide a potential to open and gate 336. Accordingly, the negative potential pulses representing the one's (1's) in the data will be supplied to the core driver 351 and will be read into the core shift register resulting in the storage of a series of zeros and ones within the register. In the event of the occurrence of simultaneous negative going potential pulses in the output of both cathode follower amplifier 327 and 331, the and gate 334 will be opened indicating an error, and inverter circuit 335 will function to keep the and gate 336 closed so that no data will be recorded on the shift register. Accordingly, in the case of errors, it is known that the error will appear in the data in the core shift register in the form of a zero. Upon completion of reading out a line of data which will include 32 of the blocks 357 each having the characteristic spacing between its gratings depending upon whether it represents a zero or a one, the scanning electron beam is returned back to its start position by the saw tooth wave form sweep potential supplied from sweep generator 305. Initiating a new line of scan, however, produces a pulse in the output of synchronizing circuit 304 which changes the operating condition of the first flip flop amplifier 339, and results in closing and gate 343 and and gate 349. Consequently, no data will be read into the core shift register on this trace. Since the divider network represented by the flip flop amplifiers 339, 341 and 342 is a divide by five network, it is necessary to pulse the flip flop amplifiers five times before the and gate 343 will again be opened. From FIG. 8 of the drawings it can be seen that the read out electron beam will run through five traces down to line 363 prior to and gate 343 being opened and that this will result in positioning the read out beam in the center of the next line of data 357 to be read out. The read out cycle is repeated and the line will be read out throughout the entire block of data. Upon the vertical position of the read out electron beam reaching a point where 32 lines of data bis have been read out, the saw tooth wave form sweep potential from the vertical sweep generator 313 reaches a magnitude which is sufficient to actuate level detector 319, and turn off flip flop amplifier 321. This action results in supplying a read out finished signal to the programmer, and de-energizing the auxiliary vidicon circuits thereby completing reading out the block of data representing $32\times32$ bits of information. It is, of course, understood that there are some $1{,}000\times1{,}000$ blocks of such data bits on the surface of the drum, hence it is capable of storing $1{,}000\times1{,}000\times32\times32=1{,}024{,}000{,}000$ or over a billion bits of information.

FIG. 9 of the drawings discloses the mechanical arrangement of the vidicon tubes 38 and 39 with respect to the light source 33. Light source 33 comprises a pair of two mercury light sources 375 and 376 which are capable of radiating two distinct color lights simultaneously, and which are connected across a lamp power supply source 377. As illustrated schematically in sheet 1 of the drawings, the mercury lamps 375 and 376 are positioned within the interior of drum 11 at symmetrical angles of about 23.6 degrees with respect to a vertical line passing through a focal point on the surface 125. Light from each of the two color light sources 375 and 376 is collimated by a respective condenser lens assembly 377 and 378 and directed upon the under surface of the drum 11. The drum 11 is constructed of a transparent material, and has a thermoplastic film surface 125 secured thereto. Light from the two color light sources 375 and 376 passes through the drum surface 11 to the thermoplastic film where it is refracted in accordance with the refraction gratings formed thereon by electron beam writing apparatus in the previously described manner. Gratings will be approximately $5\times5$ microns in dimension with grating spacings (i.e., the distance between the lines or bars making up the gratings) of one (1) micron for a one (1) grating and 1.41 microns for a zero (0) grating. For these spacings the one's (1's) gratings or bits will yield a blue light signal, and the zero's (0's) a yellow light signal. The different colored light signals are collected by objective lens assembly 379 which includes a rectangular aperture 380 having a long dimension parallel to the diffraction grating lines or marks. The small dimension of the rectangular aperture limits the resolving power of the assembly, and has been selected to resolve details as fine as five microns. The different color light signals collected by the objective lens assembly 379 is then imaged on half-silvered mirror 37 which selectively passes light through color filter 35 to vidicon 39, or through color filter 36 to vidicon 38.

Figure 10:
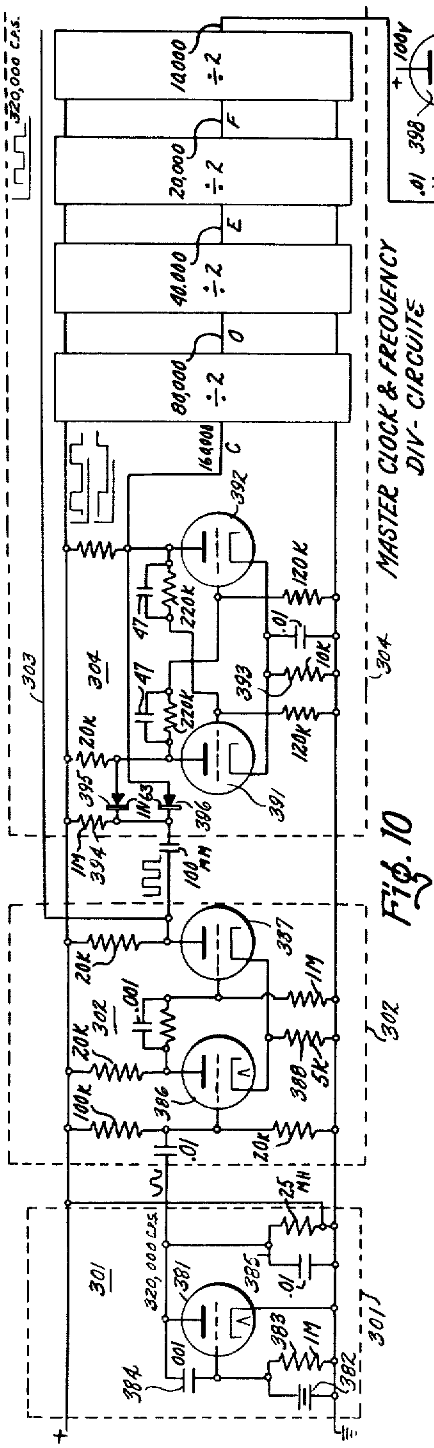
FIG. 10 is a circuit diagram showing the master clock and frequency dividing circuits of the reading system shown in FIG. 7.

The details of construction of part of the read system is shown in FIG. 10 of the drawings. The master clock oscillator 301 of the system comprises a triode electron tube 381 having its control grid connected to a frequency determining circuit comprised by a piezo electric crystal 382 connected across a resistor 383. The anode electrode of electron tube 381 is connected through a suitable plate load resistor to a source of positive plate potential and through feed back capacitor 384 to the control grid. An output load circuit comprised by a resistance-capacitance network 385 serves to couple the output signals generated by the oscillator to the remainder of the system. For a more detailed discussion of the construction and operation of crystal control oscillators, reference is made to any of the standard texts, for example see the textbook entitled, Active Networks, by Vincent C. Rideout, published by Prentice-Hall Company, New York, 1954, page 273. The frequency determining circuit of master clock oscillator 301 is set to provide an output signal of 320,000 c.p.s. which is supplied to the control grid of an electron tube 386 by a suitable coupling capacitor and voltage dividing network comprised by a pair of series connected resistors. Electron tube 386 has its cathode connected to ground through a common cathode resistor 388 with an electron tube 387, with the anodes of both tubes being connected to a source of positive plate potential through suitable plate load resistors. The anode of electron tube 386 is connected through a parallel connected resistor-capacitor charging network to the control electrode of electron tube 387 which is returned to ground through a grid resistor. The circuit thus comprised constitutes a cathode coupled bistable multivibrator, and functions as a wave shaping circuit for converting the sinusoidal wave form potential supplied from the master clock oscillator 301 to a square wave potential having the same frequency as the oscillations produced by master clock oscillator 301. The square wave potential supplied from the bistable multivibrator 302 is coupled to the input frequency divider network 304 which comprises a series of five bistable multivibrators which perform the function of dividing the frequency of the square wave output signal produced by bistable multivibrator 302 by a factor of 32 to result in an output signal having a frequency of 10,000 c.p.s. Each of the bistable multivibrators in the frequency divider network 304 comprises a pair of electron tubes 391 and 392 whose cathodes are connected through a common resistor 393 to ground, and whose anodes are connected through suitable plate load resistors to a source of positive potential. The anodes and control electrodes of each of the electron tubes 391 and 392 are interconnected through parallel resistance-capacitance charging networks, and the control grid of each of the electron tubes is returned to ground through a suitable grid resistor. The square wave potential supplied from the wave shaping circuit 302 is applied across a load resistor 394 which is connected to the anode of electron tube 391 thru diode rectifier 395 and is connected to the anode of electron tube 392 thru a diode rectifier 396. The bistable multivibrator formed by electron tubes 391 and 392 function in a manner similar to bistable multivibrator 302 in that the cathode current drawn across the cathode resistor 392 maintains one of the tubes in a cut off position but differs therefrom in that positive triggering potentials are required on each of the anode electrodes in order to trigger the bistable multivibrator from one of its operating conditions to the other of its operating conditions. It is understood, of course, that by one operating condition is meant one of the electron tubes, for example 391 is conducting and 392 is cut off, while the other of the operating conditions would be represented when electron tube 392 is conducting and electron tube 391 is cut off. As a consequence of this construction, it takes two input pulse supplied from the wave shaping circuit 302 to trigger the first divider in the group and return it to its original condition to complete one cycle of operation. As a consequence, the frequency of the square wave signal supplied from the first of the bistable multivibrators in the divider network 304 will be divided by two. Similarly, the second bistable multivibrator will result in dividing the frequency of the signal supplied from bistable multivibrator 302 by a factor of four, the third by a factor of eight, the fourth by a factor of 16, and the fifth by a factor of 32, resulting in a square wave output potential having a frequency of 10,000 cycles per second. This output potential is supplied to the grid of a cathode follower amplifier 398. The master clock oscillator 301 produces a sine wave form potential illustrated at D on sheet 16 which is applied to the wave shaping bistable multivibrator 302 that converts the sine wave into a square wave output signal shown at E having the same frequency as the master clock oscillator of 320,000 c.p.s. This square wave potential is then applied to the input of the divide by 32 network 304, and graphs F and G depict the resulting potential wave forms produced by the first two bistable multivibrators in the divide by 32 circuit. From a consideration of graphs F and G, it can be appreciated that curve F has one half as many pulses as curve E, and hence is one half the frequency of curve E, and the wave form of curve G is one half the frequency of the wave form of curve F, and is one fourth the frequency of the wave form of curve E. This reduction in frequency is reproduced throughout the divider network resulting in the production of a 10,000 c.p.s. square wave form signal which is depicted by curve H on a greatly reduced time basis from the time basis of the wave forms shown in curves D–G.

*Horizontal sweep reading circuits*

Figure 12:
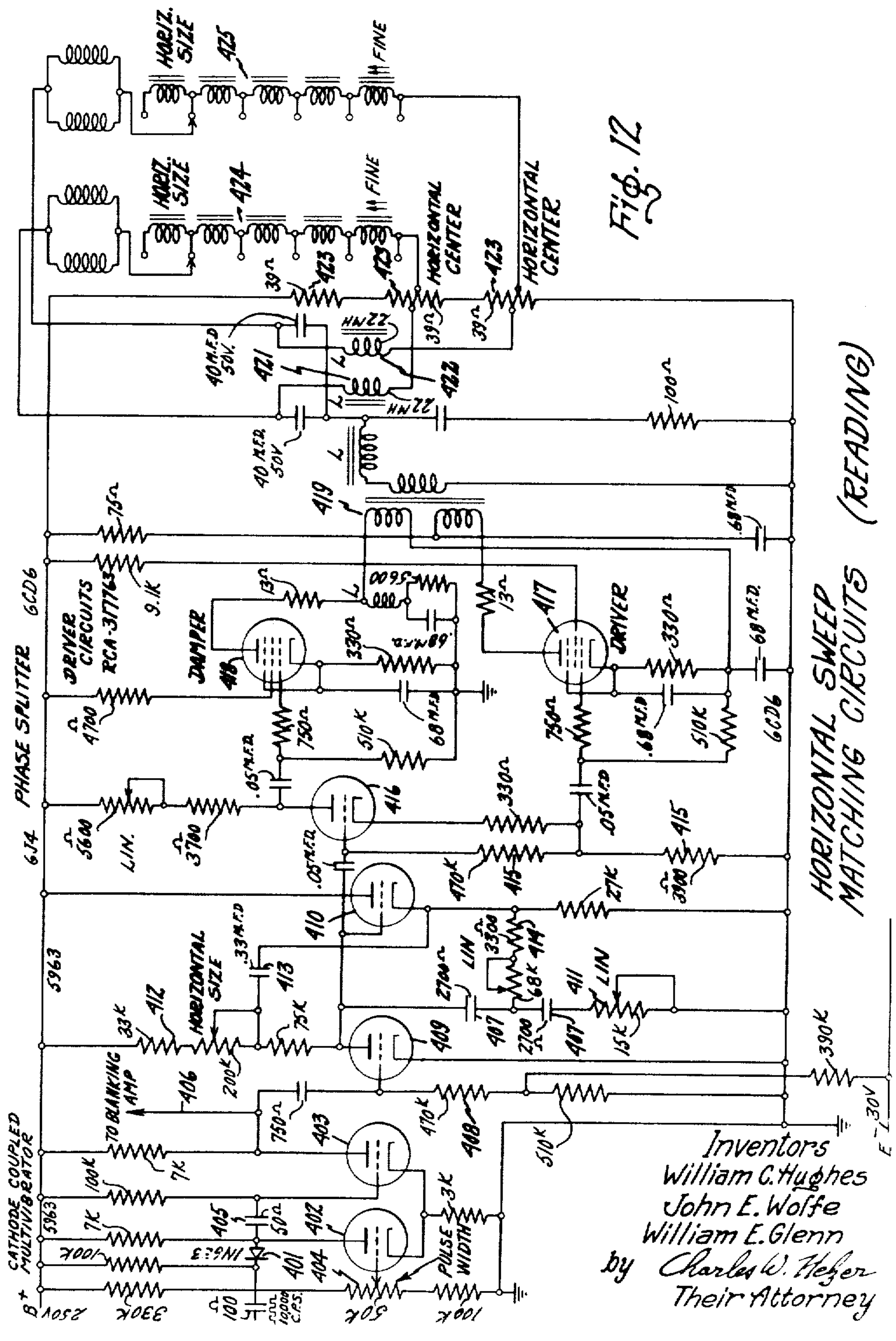
FIG. 12 is a circuit diagram of the horizontal sweep matching circuits comprising a part of the reading system shown in FIG. 7.

In FIG. 12 of the drawings, it can be seen that the 10,000 c.p.s. square wave from potential appearing at the output of the frequency divider network 304 is coupled through a rectifier 401 to the anode electrode of a cathode coupled monostable multivibrator comprised by electron tubes 402 and 403. The control electrode of electron tube 402 is connected to a variable tap point on a voltage dividing resistor 404 connected between ground and a source of positive potential, and the control grid of electron tube 403 is connected through a coupling capacitor 405 to the anode of electron tube 402. The anode of both electron tubes 402 and 403 are connected through suitable plate load resistors to a source of positive plate potential B+, and the circuit is adjusted so that the electron tube 403 is normally conducting. Upon arrival of synchronizing signal pulse from the divider network 304, the pulse is coupled through decoupling rectifier 401, the plate of electron tube 402, and hence control grid of tube 403 which is driven sufficiently negative to drive 403 into cut off. This results in allowing electron tube 402 to be rendered conductive, and produces a positive output trigger pulse which is supplied through a conductor 406 to the blanking amplifier to be described hereinafter, and through a coupling capacitor to the control grid of an electron tube 409. The electron tube 409 has its cathode connected directly to ground and has a negative biasing potential supplied to the control grid thereof through a grid biasing resistor 408, and its anode connected through a variable resistor 412 to a source of positive plate potential. The anode of tube 409 is connected to a charging network comprised by capacitors 407 and a variable resistor 411 connected in series to ground, and a portion of the anode resistor 412 is coupled through a coupling capacitor 413 to the cathode of an electron tube 410. Electron tube 410 has its cathode connected to ground through a cathode resistor that is connected through a variable resistor 414 to the juncture of the capacitors 407.

In operation, short time duration positive going synchronizing pulses are supplied from monostable multivibrator tube 403 and applied to the control grid of electron tube 409, which is normally maintained non-conductive by the negative bias supplied from resistor 408 and renders tube 409 conductive for the duration of the short time trigger pulse whereupon tube 409 again becomes non-conducting. Upon electron tube 409 becoming conductive, its plate potential drops essentially to ground, resulting in discharging capacitors 407 and initiates the start of a saw tooth wave form potential built up across these capacitors. This saw tooth cycle starts initially at a point above ground because of the positive bias potential flowing in the charging circuit through resistors 411 and 412. As the capacitors 407 charge positively, tube 410 is rendered conductive, and as it commences to conduct, feed back coupling occurs through the coupling capacitor 413 to maintain a constant potential across the portion of plate load resistor 412 to which it is connected. This constant potential portion of load resistor 412 maintains a constant charging current to the capacitors 407 whose potential rises linearly in saw tooth wave fashion towards the potential of the B+ supply. This saw tooth wave form potential is then supplied through a coupling capacitor, and across a voltage dividing resistor network 415 to the control grid of an electron tube 416. Electron tube 416 has a cathode load resistor that is connected to the junction of the voltage dividing resistors 415, and a variable plate load resistor, and serves as a phase splitting network. This phase splitting network serves to develop two saw tooth wave form potentials which are applied to the control grids of a pair of pentode amplifier tubes 417 and 418 whose anodes are connected in a damper-driver arrangement to the split primary windings of a power transformer 419. The amplifiers 417 and 418 are conventional power amplifiers which supply the high voltage saw tooth wave form potential through transformer 419 that has one secondary winding 421 connected through a resistor 423 of voltage to the horizontal deflection coils 424 of the vidicon tube 39. The secondary winding 422 likewise is connected through a resistor 423 of a voltage divider to the horizontal deflection coils 425 of vidicon 38. Hence, it can be appreciated that the horizontal sweep and matching circuit derives a high voltage saw tooth wave shape sweep potential, and applies this potential through a resistor matching network to the horizontal deflection coils of each of the vidicon tubes 38 and 39.

*Vertical sweep reading circuits*

Figure 13:
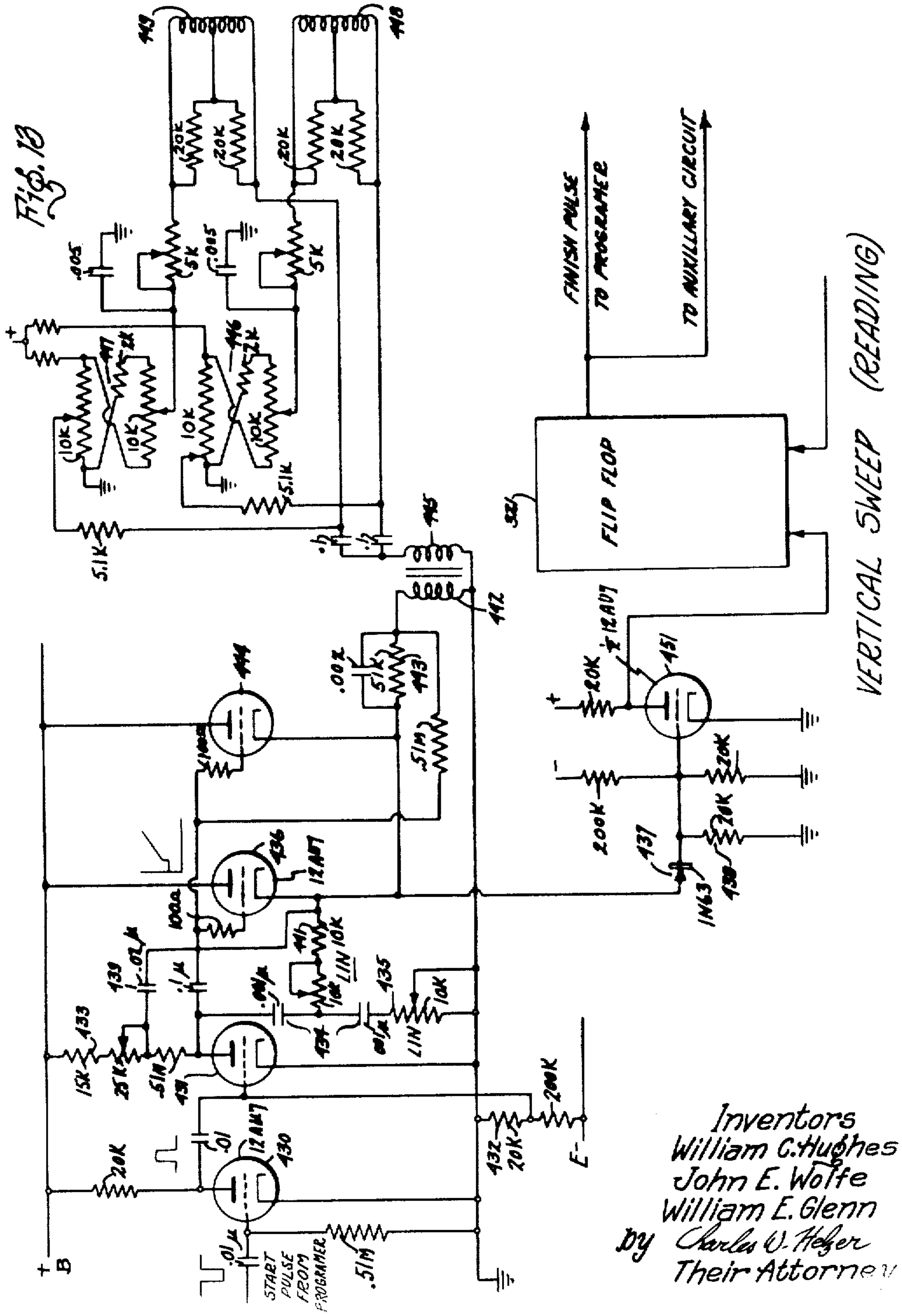
FIG. 13 is a circuit diagram of the vertical sweep matching circuits of the reading system shown in FIG. 7.

The vertical sweep deflection voltage generator circuits are shown in FIG. 13 of the drawings and comprise a conventional resistance-capacitance coupled amplifier tube 430 having its plate coupled through a capacitor to the control grid of a triode electron tube 431. Electron tube 431 together with an electron tube 436 comprises a boot strap sweep generator. A negative bias is supplied to control grid of triode 431 from a potentiometer 432, and its anode is connected through a variable resistor 433 to a source of positive plate potential. The variable plate resistor 433 together with a charging network comprising a capacitor 434 and variable resistor 435, form a grid biasing circuit for electron tube 436. The cathode of electron tube 436 is connected through a zener diode rectifier 437 to a load resistor 438 and through a coupling capacitor 439 back to an intermediate point on the plate load resistor 433 of electron tube 431. Additionally, there is a variable resistor 441 connected from the cathode of tube 436 to a junction point of the charging capacitor 434. The cathode of electron tube 436 is also returned to ground through the primary winding 442 of a precision transformer and through a bypass load resistor 443 in common with the cathode of a triode electron discharge tube 444. The control grid of electron discharge tube 444 is coupled back to the anode of electron tube 431 and through a suitable biasing resistor to a point intermediate the load resistor 443 and the primary winding 442. By this arrangement, the negative potential supplied from the potentiometer 432 to a control grid of electron tube 431 keeps it normally in a non-conducting condition. Upon the occurrence of the start pulse supplied from the programmer, the electron tube 431 is rendered conductive so that its plate potential drops and cuts off the electron tube 436. Subsequently, however, due to the bias potential supplied by the voltage divider formed by the plate load resistor 433 and charging capacitor 434, electron tube 436 commences to conduct, and feeds back a potential through coupling capacitor 439 which charges capacitor 434 linearly. The charge on the capacitor 434 then builds up linearly in a saw tooth wave form fashion, and is applied to the control grid of electron tube 444 which has the primary winding 442 connected in its cathode circuit. Electron tube 444 serves as a cathode follower amplifier to couple the saw tooth wave form potential to the primary winding 442. The secondary winding of the transformer 445 is connected in parallel to two resistor matching networks 446 and 447 which in turn are connected across vertical deflection coils 448 and 449, respectively, of the vidicon tubes 38 and 39. The matching networks 446 and 447 provide an adjustment for controlling the magnitude of the saw tooth wave form sweep voltages applied to the deflection coils 448 and 449 to thereby provide adjustment of the deflection of the read out electron beam of each of the vidicon tubes 38 and 39.

The saw tooth wave form sweep potential supplied to the matching networks 446 and 447 is also applied to zener diode 437. Zener diode 437 has the characteristic of possessing a high forward resistance up to some predesigned breakdown potential which is chosen to be fairly high voltage so that the diode 437 does not become conductive until about the upper 10th of the saw tooth wave form potential developed by the sweep generator 431 and 436 is reached. Accordingly, upon the saw tooth wave form potential reaching this value, the zener diode 437 breaks down and develops a potential across load resistor 438 which is applied to the control grid of a resistance coupled amplifier 451. The resistance coupled amplifier in turn has its output connected to a conventional flip flop or bistable multivibrator 321 of the type described for example in connection with the master clock oscillator and frequency divider network shown on sheet 8 of the drawings. The bistable multivibrator 321 shapes the square wave potential produced by the zener diode to develop a signal pulse that is supplied to the programmer to indicate that the vertical sweep potential has been completed, and is also supplied to the auxiliary vidicon circuits for cutting off the power supply to those circuits.

*Auxiliary vidicon circuits*

Figure 14:
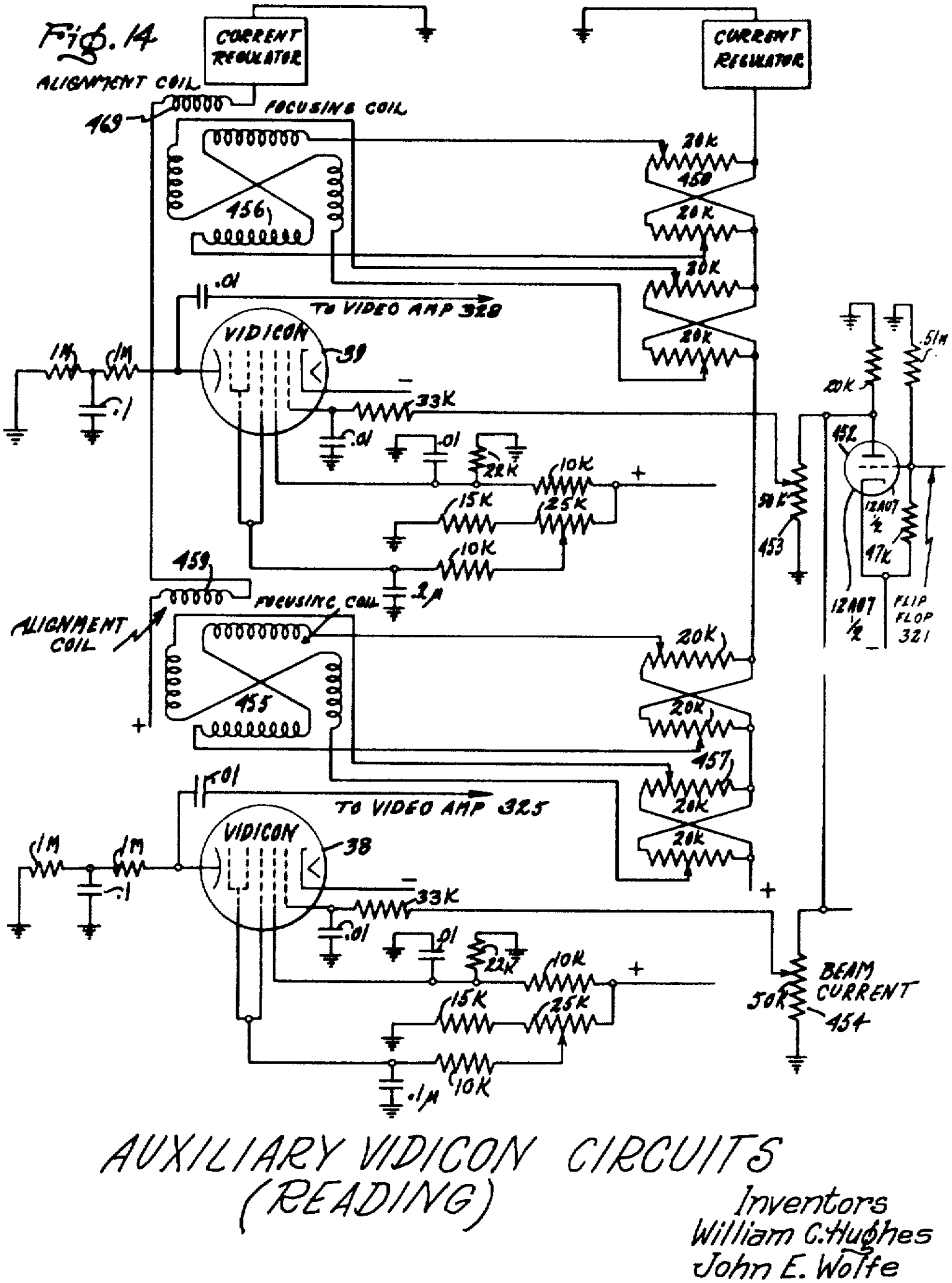
FIG. 14 is a circuit diagram of the auxiliary power supply circuits for the read out vidicons which comprise a part of the reading system shown in FIG. 7.

The auxiliary vidicon circuits are shown in FIG. 14 of the drawings wherein vidicon tubes 38 and 39 are shown schematically. The on-off control signals supplied from the flip flop amplifier 321 in the vertical deflection circuits is supplied across a grid load resistor of a resistance coupled amplifier 452 which has its anode connected to a pair of resistors 453 and 454 in parallel circuit relationship. The movable contact point on the variable resistor 453 is connected to the control grid of the vidicon read out tube 39 through a suitable resistance-capacitance smoothing network, and the variable contact point on the variable resistor 454 is connected to the control grid electrode of vidicon tube 38 through a suitable resistance-capacitance smoothing network. The accelerating electrodes of each of vidicon tubes 38 and 39 have operating potentials supplied thereto from separate sources of positive potential applied across respective voltage dividing networks as shown. The anode electrode of each of the vidicon tubes 38 and 39 is grounded through a load resistor across which the output signal developed by the vidicons appear, and is supplied to the respective video amplifiers 328 and 325 associated with each vidicon 39 and 38, respectively. The read out electron beams of each of the vidicons 38 and 39 are properly focussed by respective focussing coils 455 and 456 which are connected through variable resistance matching networks 457 and 458, respectively, and current regulating device to ground and to a source of positive potential. Also associated with each of the vidicon read out tubes 38 and 39 are alignment coils 459 and 469, respectively, which are connected in series relationship through a current regulating device to ground and to a source of positive potential. The matching networks connected to the focussing coils provide adjustment for the focus of the read out electron beams of the vidicons and the alignment coils provide a means for properly aligning the read out electron beams after focussing to center the beams. By adjustment of the variable resistors in the dividing networks connected to the accelerating electrodes of each of vidicon tubes 38 and 39, the potentials supplied to these electrodes can be adjusted prior to focussing and alignment to provide the desired electron beam current for proper read out. Data bearing signals read out by the vidicons are then supplied to the video amplifiers 325 or 328 of the system.

*Video amplifier*

Figure 11:
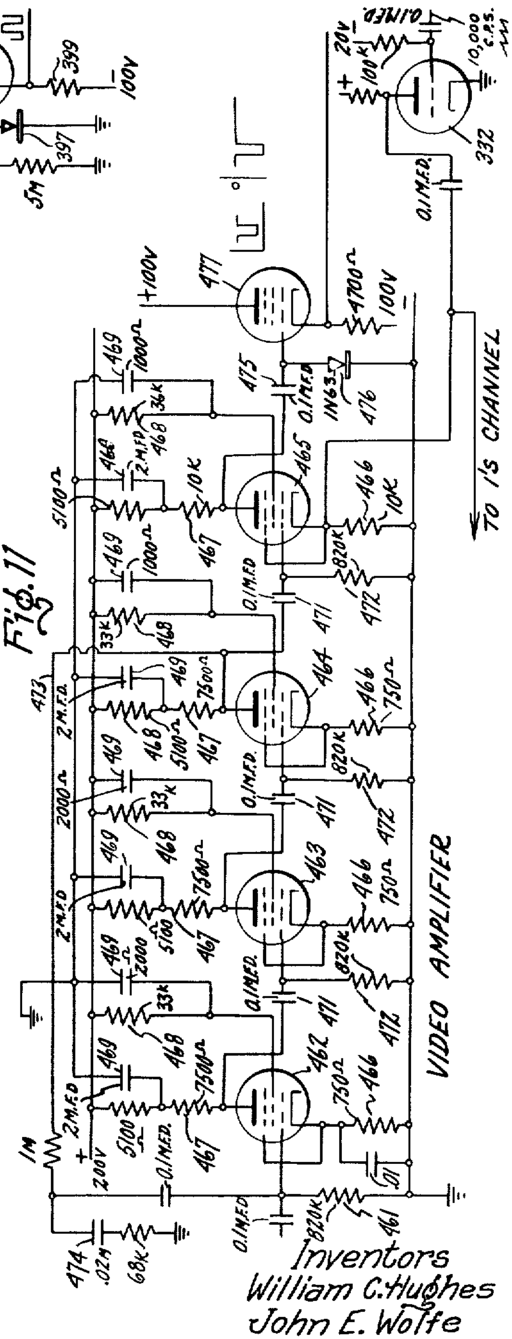
FIG. 11 is a circuit diagram of a video amplifier comprising a part of the reading system shown in FIG. 7.

The pulsed wave form electron signal representative of the zeros and ones in the data being read out by the vidicons 38 and 39 are supplied to video amplifiers 325 and 328 in the form of negative going signal pulses. Video amplifier 325 is shown in FIG. 11 of the drawings and is identical in construction to video amplifier 328. Hence, only video amplifier 325 will be described. The incoming pulsed wave form electric signal representative of the zeros is supplied across a resistance-capacitance coupling network 461, and is applied to the control grid of a pentode electron tube 462. The pentode electron tube 462 in conjunction with three additional pentode electron tubes 463, 464, and 465 comprises a four stage resistance-capacitance coupled video amplifier. Each of the stages of the amplifier includes a grid biasing resistor 466 connected in the cathode circuits of each of the tubes, and plate load resistor 467 connected to a source of positive plate potential. The source of positive plate potential is also connected through screen grid biasing resistors 468 to the screen grids of each of the pentodes, and both the screen grid resistor 468 and a portion of the plate load resistor 467 of each stage are bypassed to ground through suitable bypass capacitors 469. The suppressor electrodes of each of the tubes are connected directly to its cathode. The anode electrode of each of the pentodes is connected to the control electrode of the succeeding tube through a resistance-capacitance coupling network comprised by coupling capacitors 471 and resistors 472. In addition, the anode electrode of the third amplifier stage formed by pentode 464 is connected through a feed back connection 473 including a frequency compensating network 474 to the control electrode of the first stage amplifier pentode 462. This feed back connection provides a degenerative feed back for stabilization purposes. The cathode load resistor 466 in the last stage amplifier 465 has an input connection supplied thereto from the plate electrode of the blanking amplifier 332 which has supplied to the control electrode thereof the 10,000 cycle per second saw tooth wave form potential developed by the horizontal sweep generator 305 of the equipment, and functions to apply a gating pulse to the cathode load resistor 466 to the last stage amplifier 465. This gating pulse cuts off the video amplifier during the re-trace portions of the saw tooth wave form horizontal sweep potential. The output from the video amplifier is obtained from the plate electrode of the last stage pentode 465, and is coupled through a coupling capacitor 475, across a clamping diode 476 to the control grid of a cathode follower amplifier 477. The cathode follower output stage 477 is then connected directly across the input of the wave shaping and cathode follower circuit 327 to be described hereinafter.

*Output logic circuits*

Figure 15:
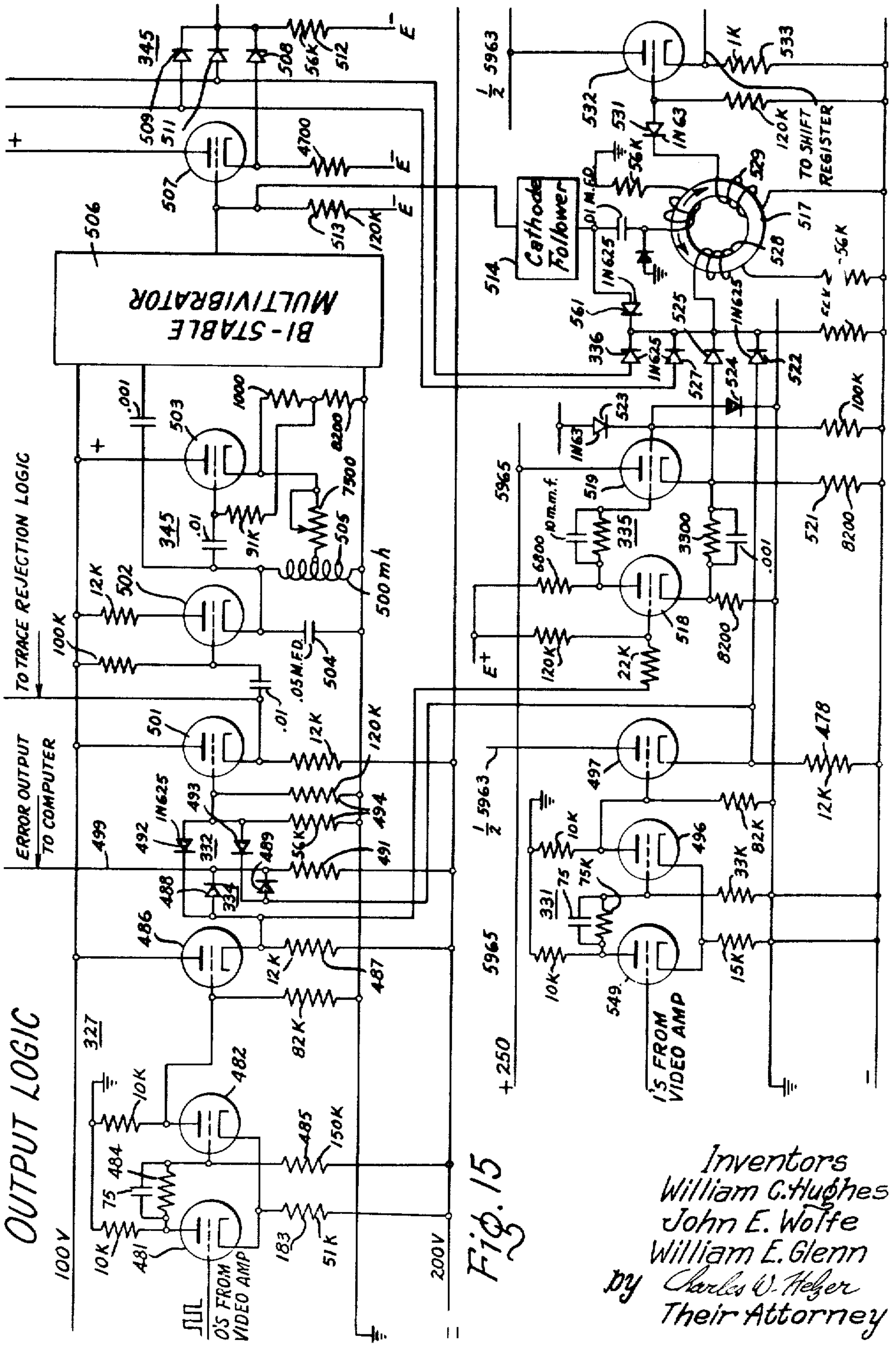
FIG. 15 is a circuit diagram of the output logic circuits comprising a part of the reading system shown in FIG. 7.

FIG. 15 of the drawings illustrates the output logic circuits wherein it can be seen that the amplifier output signal pulses representing the zeros in the data read out and amplified by video amplifier 325 are supplied to the control grid of electron tube 481 which together with an electron tube 482 comprise a cathode coupled Schmitt trigger circuit. Coupling between the two tubes occurs through a resistor 483, connected in common to the cathodes of both tubes and to a source of negative potential, and through a parallel resistance-capacitance coupling network 484 connected between the anode electrode of electron tube 481 and the control electrode of tube 482. The anode electrodes of both electron tubes are connected through suitable plate load resistors to a source of positive potential, in this case ground. In operation, electron tube 481 is normally conducting due to a positive bias applied to the control grid thereof from the cathode load resistor of the preceding cathode follower 477 of the video amplifier 325. When the input signal goes sufficiently negative to cut off electron tube 481, its plate voltage will begin to go more positive and will cause a corresponding rise in the grid voltage on tube 482 through capacitor 484. This increases the current through tube 482 which decreases the cathode voltage on the tube 481 rendering tube 481 less conductive, increasing its plate further, thereby regeneratively driving tube 482 full on for as long as the potential on the control grid of tube 481 maintains it non-conductive. Upon the control grid potential of tube 481 again going positive in response to the signal supplied thereto, tube 481 again becomes conductive and tube 482 non-conductive. This results in the production of a pulsed waveform potential in the anode circuit of tube 482 that follows the wave shape of the signal applied to electron tube 481. This improved wave shape signal is then supplied through cathode follower amplifier 486 to and gate 334 which comprises a pair of diode rectifiers 488 and 489, and a load resistor 491 connected to a source of negative potential. The pulsed output potential appearing across cathode load resistor 487 is also supplied to or gate 333 comprised by diode rectifiers 492, 493 and load resistor 494 which is connected to ground.

A second pulsed wave form data bearing signal is supplied from the video amplifier 328 which is representative of the ones contained in the data being read out by the vidicon tube 39. This pulsed wave form signal is supplied to the control grid of an electron tube 495 which together with a second electron tube 496 comprises a cathode coupled Schmitt trigger 331 which is identical in construction and operation to the bistable multivibrator 327 comprised by electron tubes 481 and 482. Bistable multivibrator 331 develops a square wave potential which follows the pulsed data bearing input signal supplied to it, and applies the improved wave shape signal to the control grid of cathode follower amplifier 497. The cathode load resistor 498 of cathode follower 497 is coupled to the diode rectifier 489 of and gate 334 and to the diode rectifier 493 of or gate 333. Accordingly, in the event that there is coincidence in the signal pulses applied to the and gate 334, an error signal will be supplied through conductor 499 to a suitable error indicating instrument not shown. However, when the equipment is functioning properly there should be no coincidence in the signal pulses applied to the and gate 334 so it should normally remain closed. Signal pulses supplied from either of the cathode followers 486 or 497 to the diode rectifiers 492 or 493, respectively, of or gate 333 are sufficient to open or gate 333. Opening of or gate 333 applies an operating potential to cathode follower amplifier 501 which in turn provides energizing potential to the trace rejection logic circuit to be described hereinafter, and to the shift clock oscillator 345. Shift clock oscillator 345 comprises an electron tube 502 which has its cathode connected to a tank circuit formed by a parallel connected capacitor 504 and inductance 505. The tank circuit 504 and 505 is connected in feed back relationship to an electron tube 503 to form a conventional Hartley oscillator, and is tuned to the bit clock rate of the equipment; namely, 320,000 c.p.s. The tank circuit is normally maintained in clamp by conduction through electron tube 502. However, upon application of a negative potential to the control grid thereof, the cathode load resistor of cathode follower amplifier 501 cuts off tube 502 and leaves the tank circuit free to oscillate. Shift clock oscillator 345 then breaks into oscillation and generates a sine wave potential having a frequency equal to the bit clock rate of 320,000 cycles per second. This sine wave is supplied to a Schmitt trigger 506 which is identical in construction to the Schmitt trigger 327 and functions in precisely the same manner to produce a square wave shift clock pulse output signal having the bit rate. The bit clock pulses produced by bistable multivibrator 506 are then supplied through a cathode follower amplifier 507 to a diode rectifier 508 of and gate 349 which further includes diode rectifiers 509 and 511, and a load resistor 512 connected to a source of negative potential. In addition, the bit clock pulses from bistable multivibrator 506 are supplied across a load resistor 513 to a cathode follower amplifier 514 connected in the one's channel circuitry. Cathode follower amplifier 514 is identical in construction to cathode follower amplifier 507 and has its cathode load resistor connected to a shift pulse read in coil 515 wound on a toroidal magnetizable core member 517 of Permalloy, ferrite or some other suitable magnetic material, and to a rectifier 516 of and gate 336.

And gate 336 further includes a diode rectifier 522 connected directly to the cathode load resistor 498 of cathode follower amplifier 497 in the one's channel. Accordingly, data signal pulses appearing in the one's channel are applied directly to diode 522 of and gate 336.

The cathode follower amplifier 486 in the zero channel also has its cathode load resistor 487 connected to the control grid of an electron tube 518 which has its plate connected to the control grid of an electron tube 519, and forms the inverting circuit 335. Inverter 335 exhibits the characteristic of producing zero output voltage when a negative signal is applied thereto and a negative output voltage when zero potential is applied thereto. Accordingly, if there is a signal pulse applied to the control grid of electron tube 518, an output potential will be produced in the output of cathode of electron tube 519 which is the exact opposite in polarity to polarity of the signal applied to tube 518. The control grid of the electron tube 519 is also connected to a pair of voltage dividing diode rectifiers 523 and 524 which function to clamp the grid voltage to zero if it tends to be positive and to clamp it to the proper negative value if it tends to be negative. The resulting output potential is then applied to diode rectifier 525 of and gate 336. And gate 336 further includes two additional diode rectifiers 526 and 527 which have enabling potentials supplied thereto from a trace rejection circuit to be described hereinafter. These trace rejection enabling potentials are also applied to the diode rectifiers 509 and 511 of and gate 345. Application of these enabling potentials to diode rectifiers 509 and 511 together with the bit clock pulses applied to diode 508, open and gate 345 and supply the bit clock pulses to the core shift register 29 of the equipment.

The output of the and gate 336 is connected to a data read in coil 528 which also surrounds the toroidal magnetizable core member 517. A read out coil 529 is also wound around core 517, and is connected through a decoupling rectifier 531 to the control grid of a cathode follower amplifier 532. Cathode follower 532 has its cathode load resistor 533 connected to the data read-in terminal of the core shift register 29 of the equipment to supply data thereto.

In operation, pulsed waveform potentials supplied to the zero channel and representing zeros in the data are shaped by the bistable multivibrator 327 and applied through cathode follower amplifier 486 to and gate 334. Sequentially, pulsed signals representing ones in the data being read out are shaped by the bistable multivibrator 331 and supplied through cathode follower amplifier 497 to and gate 334. In the case of coincidence, and gate 334 opens and an error output indication is provided. If the equipment is operating properly, the and gate 334 will not normally open and signal pulses from either of the two channels will be supplied through either the diode rectifiers 492 or 493 of or gate 333 and through cathode follower amplifier 501 to shift clock oscillator 345. Shift clock oscillator 345 then develops a sinusoidal signal that is supplied to bistable multivibrator 506 which converts the sinusoidal signal to a square wave at the bit clock rate for application to core shift register to shift the data bits supplied thereto through the register. For this purpose, the bit clock pulses are supplied through cathode follower amplifier 507 to and gate 345. Prior to the and gate 345 opening, enabling potentials must be supplied to the diode rectifiers 509 and 511 thereof from the trace rejection circuit, and upon this occurrence the and gate opens and supplies the bit clock pulses to the core shift register to effect shifting of the data therethrough.

Simultaneously with the above described action, one's (1's) data signal pulses developed across the cathode load resistor 498 are applied to diode rectifier 522 of and gate 336. Concurrently, zero data pulses appearing across cathode load resistor 487 are applied to inverter 335 which functions to invert the zero data pulses and apply the inverted data to diode 525 of and gate 336. Accordingly, if there is a zero present in the data being read out, zero potential will appear in the output of cathode follower 519 of inverter circuit 335, and will prevent and gate 336 from opening. As a result, read-in coil 528 of the memory core 517 will not be energized so that upon application of a bit clock pulse to the bit clock read-in coil 515, the condition of the magnetizable core 517 will not have changed, and, accordingly, no signal will be generated in the read out coil 529 resulting in the registering of a zero in the core shift register. In the event that there is a one in the data being read out, a negative enabling potential will be applied to diode rectifier 522 of and gate 336. Simultaneously, there should be no data signal pulse applied to inverter 335 so that a negative enabling potential will be applied to the diode rectifier 525 of and gate 336. Assuming that the negative enabling potentials have been applied from the trace rejection circuit to diode rectifiers 526 and 527, then and gate 336 will open and apply a read-in signal to the read-in coil 528 of memory core 517. This read-in signal will cause the memory core to reverse its direction of magnetization. At the same time, the output of cathode follower 514 goes negative changing capacitor through diode rectifier. At the end of the clock pulse the capacitor will discharge through coil 515 causing the core 517 to return to its original state of magnetization causing an output signal pulse to be developed in the read-out coil 529 which will be applied through core driver cathode follower amplifier 532 to the core shift register where it will be registered as a one.

*Trace rejection logic circuits*

Figure 16:
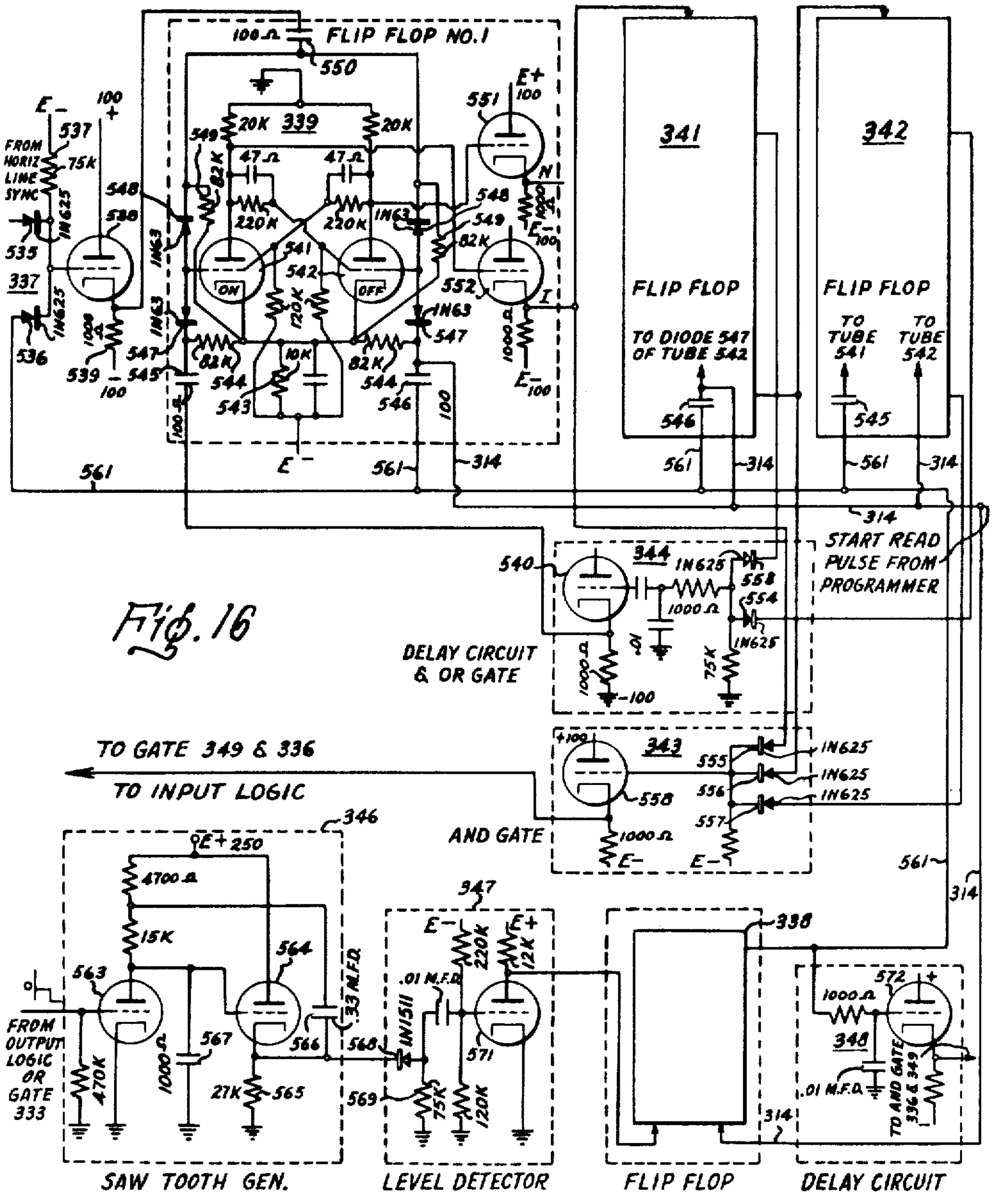
FIG. 16 is a circuit diagram of the trace rejection logic circuits comprising a part of the reading system shown in FIG. 7.

The trace rejection logic circuit of the reading system is shown in FIG. 16 of the drawings. This circuit includes and gate 337 which is formed by a pair of diode rectifiers 535 and 536, and a load resistor 537 connected to a source of negative potential. The output of and gate 337 is connected to the control grid of a cathode follower amplifier 538 having its cathode load resistor 539 coupled through a coupling capacitor to the input of bistable multivibrator or flip flop amplifier 339. Flip flop 339 comprises a part of a divide by five network that further includes flip flop amplifiers 341 and 342 which are identical in construction to flip flop 339, and hence only 339 is shown in detail. Flip flop 339 is the type which must be set in either one of two stable operating conditions by an outside signal. The flip flop is formed by a pair of electron tubes 541 and 542 having their cathodes connected through a common cathode resistor 543 to a source of negative potential, and their anodes connected through respective plate load resistors to a source of positive potential. The anodes and control electrodes of tubes 541 and 542 are interconnected through parallel resistance and capacitance networks, and a respective grid bias resistor is connected between the control grid of each tube and the source of negative biasing potential.

A first triggering network is connected to the control electrodes of tubes 541 and 542, and comprises a diode 547 and resistor 544 connected in series with the free end of the resistor 544 being connected to the cathode of its associated tube and the collector or anode of the diode being connected to the control grid of its associated tube. The junction of the diode 547 and resistor 544 of the first triggering network connected to tube 541 is coupled through coupling capacitor 545 to a cathode follower 540 to be described hereinafter. The junction of the first triggering network connected to tube 542 is coupled through a coupling capacitor 546 to conductor 314 which supplies a preconditioning reset pulse thereto. Flip flop 341 is similarly connected. However, flip flop 342 has the junction of the first triggering network connected to its tube 542 and connected directly to conductor 314. Coupling capacitor 546 of flip flops 339 and 341 are also connected to a conductor 561 which supplies a setting potential thereto from flip flop 338 as will be explained later. However, flip flop 342 has the conductor 561 connected to its coupling capacitor 545. A second triggering network is connected also to the control grids of both electron tubes 541 and 542, respectively, which comprise a diode 548 and resistor 549 connected in series with the free end of resistor 549 being connected to the cathode of its associated tube and the anode of the diode being connected to the control grid of the tube. The juncture of both the second triggering networks 548, 549 are connected together through a coupling capacitor 550 to the cathode load resistor 539 of cathode follower amplifier 538.

The pulsed wave form output signals appearing on the anode of tube 542 are supplied through a cathode follower amplifier 551, hereinafter referred to as the normal output terminal of flip flop 339, and the anode of tube 541 is connected to a cathode follower 552, hereinafter referred to as the inverse output terminal of flip flop 339. The inverse output terminal of flip flop 339 is connected to the capacitor 550 of the next succeeding flip flop 341 in the divider network which has its inverse output connected to the capacitor 550 of flip flop 342. The normal output of flip flop 341 is connected to a diode rectifier 553 of or gate 344. Flip flop 342 has its normal output connected to a diode 554 of or gate 344 with the output of the or gate being connected to cathode follower 540 whose load resistor is connected to capacitor 545 of flip flop 339. The inverse output terminals of each of the flip flops 339, 341 and 342 are connected to diode rectifiers 555, 556 and 557, respectively, of and gate 343 which has its output connected to a cathode follower 558. The output from cathode follower 558 is supplied to and gates 349 and 336 in the output logic circuits.

The flip flop amplifier 338 is controlled by a start pulse supplied from the output logic circuit or gate 333 which initiates operation of the saw tooth generator 346. Saw tooth generator 346 is comprised by an electron tube 563, and an electron tube 564 having a cathode load resistor 565 that is coupled back through a coupling capacitor 566 to the plate load resistor of the electron tube 563. The plate of tube 563 is also connected to a charging capacitor 567 connected across tube 563 so that a saw tooth wave form potential builds up upon a negative gating potential being supplied to the control grid of electron tube 563 from the output logic circuit or gate 333 which maintains tube 563 in the cut off condition. The cathode load resistor 565 is connected through a diode rectifier 568 of the threshold type which conducts only when a threshold value of potential has been applied thereto. The rectifier 568 is coupled across a load resistor 569 that is coupled through a coupling capacitor across a biasing network to the control grid of a conventional resistance coupled amplifier 571. Amplifier tube 571 has its anode connected through a suitable plate load resistor to a source of positive potential, and to the input of flip flop amplifier 338. Flip flop 338 is identical in construction to the flip flop 339 described above, and has its normal output terminal connected through conductor 561 to the inputs of each of the flip flop amplifiers 339, 341 and 342 as described above. Flip flop 338 also has a second input terminal connected to conductor 314 which supplies a start reset triggering potential thereto. The output of flip flop amplifier 338 is also coupled through a resistance-capacitance delay device 348 to the control grid of a cathode follower amplifier 572 whose cathode load resistor is connected to and gates 336 and 349 in the output logic circuits.

In operation, the start, reset triggering potential which initiates operation of the read out system is supplied from the programmer across conductor 314 and initially conditions all of the flip flop amplifiers 339, 341 and 342 to their 000 condition. By this condition is meant that a negative energizing potential is supplied from the output terminals of the flip flops 339, 341 and 342 to the three diode rectifiers 555, 556 and 557 of and gate 343. Diode and gate 343 opens as a consequence, but this has no effect on the setting of the and gates 336 and 349 in the output logic circuits because these and gates have not also been energized from delay circuit 348 simultaneously. The start reset potential is also supplied to the input of flip flop amplifier 338 as described previously so that it is in the reset condition. As the scanning read out electron beam of the vidicons reaches the light produced from the first block of gratings or bit of information in the table of data being read out, a negative polarity triggering potential will be produced by or gate 333 which is applied to the input of saw tooth generator 563. Saw tooth generator 346 in a sense operates as a noise discriminator in that it produces an output saw tooth wave form potential only as long as energizing potential is supplied from or gate 333. So or gate 333 must stay open before saw tooth generator 346 reaches the predetermined voltage amplitude that breaks down the threshold diode 568 and passes a triggering signal to the flip flop amplifier 338. By this arrangement it is assured that the scanning electron beam of the read out vidicons is indeed reading out light produced from data bits, and is not being energized from light produced by a scratch or some other noise producing feature in the thermoplastic film; for in such event insufficient light intensity would be put out to keep the or gate 333 open long enough to drive the saw tooth generator 346 to the predetermined voltage amplitude to break down threshold diode 568 and supply a triggering potential to the flip flop amplifier 338. Upon flip flop amplifier 338 being triggered to its second or set condition of operation, a negative triggering potential appears at its normal output terminal which is supplied through conductor 561 to each of the flip flop amplifiers 339, 341 and 342. This triggering potential will have no effect on flip flops 339 and 341 since it is applied to tubes 542 of these flip flops which have been cut off previously by the start reset pulse supplied from the programmer through conductor 314. The triggering potential will set flip flop 342, however, which sets the divider network comprised by all three flip flops to the three count or 101 condition due to feed back through or gate 344. The triggering potential produced by flip flop 338 is also supplied to diode rectifier 536 of and gate 337. Thereafter, upon the occurrence of a negative going line synchronizing pulse from the horizontal sync multivibrator 304 of the reading system, the and gate 337 opens and applies line gate negative triggering pulse potentials through cathode follower amplifier 538 to coupling capacitor 550 of flip flop 339. The first line gate pulse which appears at the end of trace line 358 in FIG. 8 will then trigger the first flip flop amplifier 339 to its reset or zero condition where a negative enabling potential will be applied to diode rectifier 555 of and gate 343. It should be noted that the flip amplifiers in going from their set or one (1) condition to the reset or zero (0) condition produce a negative polarity carry pulse at their inverse output terminal which is connected to the next succeeding flip flop in the string. Accordingly, the first line gate pulse appearing at the end of scan line 358 temporarily triggers flip flop 339 from the set or one condition to the reset or zero condition resulting in temporarily setting the divider network to the 011 condition.

A feed back trigger pulse will be produced at the normal output of flip flop 341 in going to this condition which is coupled back through or gate 344 to tube 541 of flip flop 339 and results in again setting the flip flop amplifier 339 to its set or one condition so that the divider network comprised by the flip flops 339, 341 and 342 are then in the one-one-one (111) condition and no enabling potentials are applied to diode rectifiers 555, 556 and 557 of and gate 343 so that the and gate 343 stays closed. Upon the next succeeding line synchronizing pulse produced at the end of scan line 359 in FIG. 8 being applied to the and gate 337, this line synchronizing pulse will trigger flip flop 339 from its set or one condition to its reset or zero condition. This produces a carry pulse that triggers 341 to the reset condition which in turn resets flip flop 342 to zero (0) condition. As a result, the flip flop amplifiers 339, 341 and 342 will all be set in the zero-zero-zero (000) condition, and negative enabling potentials will be provided to all three diode rectifiers 555, 556 and 557 of and gate 343 from the inverse output terminals thereof. As a consequence, and gate 343 opens and will provide enabling potentials to and gates 349 and 336 in the output logic circuits, which at this time have enabling potentials applied from flip flop 338 so they open and supply data pulses to the core shift register 29 thereafter.

The purpose of this two count before and gate 343 opens can best be appreciated from an examination of FIG. 8 of the drawings wherein two lines of data gratings or bits are shown representing bits of information to be read out. The dotted lines 356, 358, 359, 360, 361 and 363 represent scan paths of the read out beam of the vidicons which do not see the gratings as shown in FIG. 8 but would only see different colored light spots appearing at $357_1$, $357_0$, etc. whose color would depend upon whether the bit representing the group of grating lines within the parenthetical mark 357 is either a one or a zero. The shape of the read out electron beam must be rectangular so that the beam as it scans across it will cover one entire bit and will encompass all of the light from that bit in the direction of the line. To achieve proper read out, the read out beam should be of pencil sharpness so that it would be capable of a very fine scan spacing as represented by the spacing between the scan lines 356, 358, etc. In tracing out scan line 356, it can be appreciated that the read out beam of the vidicon would not see light, and hence no output would appear from the video amplifiers 325 and 328. Upon reaching scan line 358, however, the read out vidicons would develop data bearing output signal pulses which would open or gate 333, and set the flip flops 339, 341 and 342 at the count three of 101 condition. Thereafter the line synchronizing pulses which in fact represent the beginning of the next scan line to be traced out by the read out beam would be supplied to the counter at the beginning of the scan lines 359 and 361. Scan line 361 occurs after the second line gate pulse has been applied to the counter so that and gate 343 opens and in turn opens the and gates 349 and 336 in the output logic circuits allowing the data signal pulses produced during scan line 361 to be read into the core shift register 29.

Upon reaching the end of the line of data represented by the scan line 361, it can be appreciated that there are a total of five scan lines from the middle of the line of data read out over scan line 361 to the middle of the next line of data to be read out represented by the scan line 363. In order to inactivate the read out logic circuit, and hence decouple the core shift register 29 from the output of the read out video amplifier 328 during the intermediate four scan lines, the line gating pulse produced at the end of the scan line 361, or the beginning of the next scan line, however one wishes to look at it, will reset the flip flop amplifiers 339, 341 and 342 to the one-zero-zero (100) condition. Setting of the flip flop amplifiers 339 and 341 and 342 to the 100 condition removes the enabling potentials from the diode rectifiers 555, 556 and 557 so that and gate 343 closes and removes the enabling potentials supplied to the and gates 349 and 346. Consequently, each of these and gates also close thereby decoupling the core shift register 29 from the output of video amplifier 328. The flip flop amplifier 338 which was set by level detector 347 remains in the set condition until a start reset pulse is again supplied thereto from the programmer. This is appropriate since the edge of the table or block of bits of information to be read out has been identified, and the middle of the first line of bits has been located. Thereafter, the counter formed by flip flops 339, 341 and 342 will count down five lines before opening and gate 343 in the following manner.

After resetting the counter to the 100 condition at the end of line 361, the line gate synchronizing pulse produced at the end of the first line of scan under line 361 of FIG. 8 turns on tube 541 which produces a negative triggering pulse at the inverse output of flip flop 339 that triggers flip flop 341 to the one condition, and which temporarily sets flip flop 339 in the zero condition. However, a negative feed back potential from flip flop 341 supplied through or gate 344 to the control grid of cathode follower amplifier 540 cuts off that tube and results in applying a negative potential trigger pulse to tube 541 of flip flop 339 that again sets flip flop 339 to the one condition. This sequence of operations leaves the counter in the 110 condition so that and gate 343 remains closed. The line gate pulse produced at the end of the second line of scan after line 361 will operate temporarily to reset flip flop 339 in the zero condition, to reset flip flop 341 in the zero condition, and to set flip flop 342 in the one condition. However, feed back from the flip flop 341 inverse output again drives electron tube 541 of flip flop 339 into cut off thereby again setting flip flop 339 and leaving the counter in the 101 condition which still leaves and gate 343 closed. The next line synchronizing pulse to appear at the end of the third line of scan following line 361 serves to reset flip flop 339 to the zero condition, and to set fip flops 341 and 342 to the one condition. This results in setting the counter to 011 condition where a negative potential pulse appearing at the inverse output terminals of flip flop 341 feeds back through or gate 344 to cut off tube 541 and set the counter to the 111 condition. Accordingly, the next line gate pulse produced at the end of the fourth line following line 361 of FIG. 8, and hence at the beginning of the fifth line (line 363) will set all three flip flops to their zero condition. This results in setting the counter to the 000 condition so that and gate 343 opens, and applies enabling potentials to and gates 336 and 349 of the output logic circuit. These last two and gates then open and allow data being read out by the vidicons 38 and 39 as they scan along line 363 of FIG. 8 to be shifted into the core shift register 29. At the completion of line 363, the entire cycle of operations just described is repeated to read the next line of data bits into core shift register 29 until the entire table of 32 lines has been read out and stored in the core shift register. Upon this occurrence, the vertical sweep potential will reach a magnitude sufficient to break down level detector 319 of the reading system, and turn off flip flop 321 thereby providing a read out finished signal to the programmer.

*Core shift register*

Figure 17:
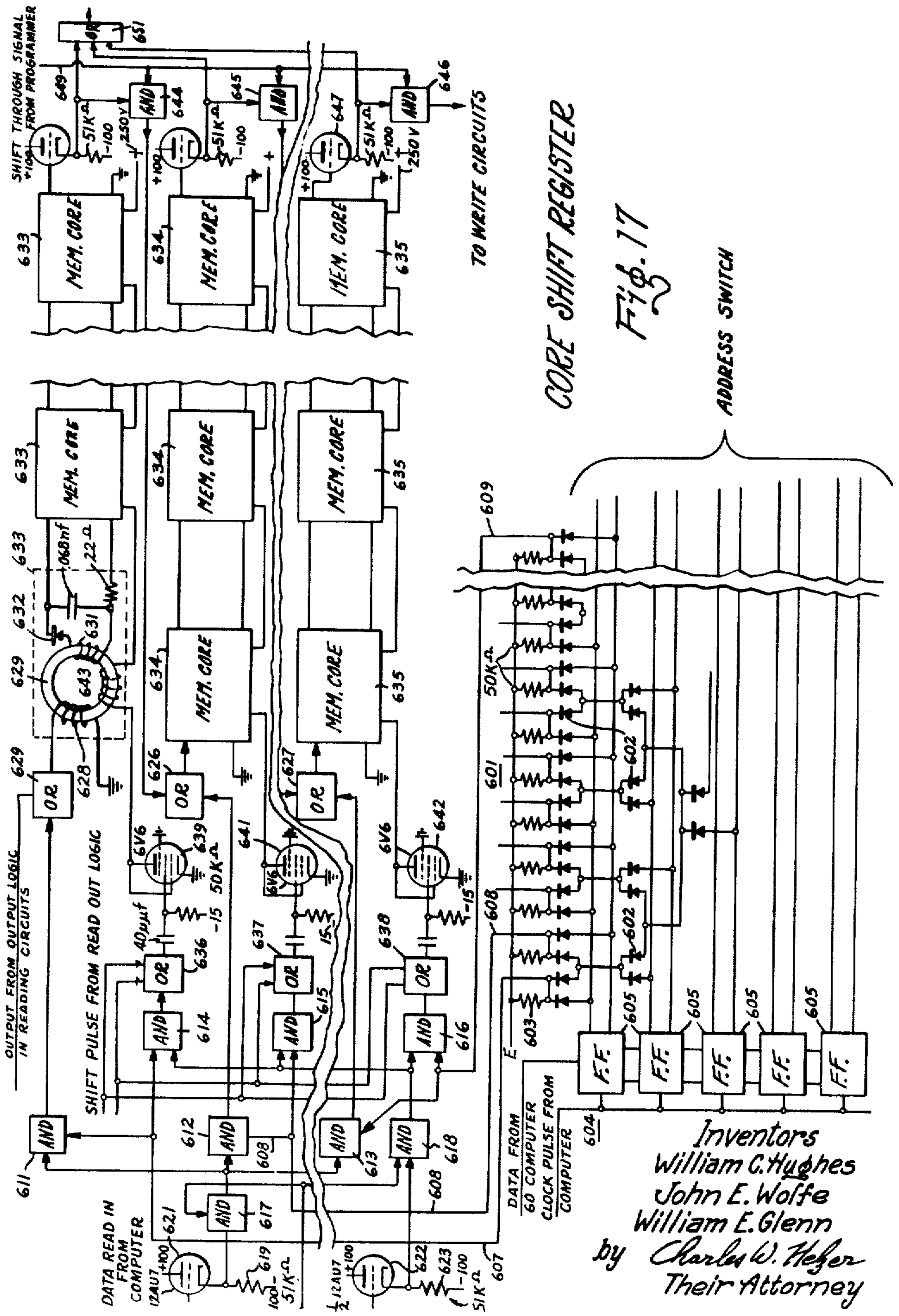
FIG. 17 is a combined functional block diagram and circuit diagram showing the construction of the core shift register unit which comprises a part of the drum data storage equipment of FIG. 1.

The core shift register 29 serves as a working memory for the data storage equipment and is shown in FIG. 17 of the drawings. The core shift register 29 comprises an input address register which is formed from a pyramid diode switch 601 of the type described in the reference textbook, "Digital Computer Components and Circuits," by R. K. Richards, published by D. Van Nostrand Company of Princeton, New Jersey, p. 41. Pyradim switch 601 includes a plurality of pyramided diode rectifiers 602 and associated load resistor 603, which are connected to a source of negative potential. The diode rectifiers are controlled from an address register 604 formed by a set of five serially connected flip flop bistable multivibrator amplifiers 605 which are similar in construction to the bistable flip flop 339 described in connection with the trace rejection circuits and which selectively apply negative polarity enabling potentials to the diodes of diode switch 602. The switch then operates to apply a negative polarity potential across a selected one of the output lines thereof, such as 607, 608 or 609, determined by the setting of the address register. The series of five flip flop amplifiers 605 have a total of 32 different stable states of operation, and the pyramid diode switch 601 likewise has 32 output lines, such as are indicated at 607, 608 or 609, which may be selected by an appropriate address supplied to the address register 604 from the computer to which the register is connected. The computer also supplies a series of clock pulses to each of the flip flop amplifiers 605 in the register 604 for shifting address data supplied thereto through the register. It is, of course, impossible to show all 32 different lines corresponding to the lines 607 and 608 together with their associated diode rectifiers and load resistors. However, it is believed adequate to show the portion thereof which has been illustrated, and to describe its operation. Each of the output lines 607, 608 and 609 are connected to a first set of associated and circuits 611, 612 and 613, respectively, and to a second set of associated and circuits 614, 615 and 616, respectively. The first set of and gates 611, 612 and 613 also have additional input potentials supplied thereto from a data read-in and gate 617, and hence are termed data line and gates. The second set of and gates 614, 615 and 616 also have additional input potentials supplied thereto from a clock pulse read-in and gate 618. The data input and gate 617 and clock pulse and gate 618 have energizing potentials supplied thereto from an interlock signal supplied from the programmer, the purpose of which will be explained more fully hereinafter, and additionally have pulsed input potential supplied thereto from the computer which represents data to be read in to the core shift register and clock pulses for use in shifting the data through the register. For this purpose, the input to the and gate 617 is connected across the cathode load register 619 of a cathode follower amplifier 621 to which data to be stored in the core shift register is supplied. Accordingly, pulsed potentials appearing across the cathode load resistor 619 represent the data to be stored in the core shift register and are supplied through and gate 617 assuming, the interlock to be opened, to all of the data line and gates 611, 612 and 613. Clock line and gates 614, 615 and 616 are all connected to a source of clock shift pulses supplied from the computer through a cathode follower amplifer 622 having its cathode load resistor 623 connected to and gate 618 which is connected to all of the and gates 614, 615 and 616. Each of the data line and gates 611, 612 and 613 have their outputs supplied directly to data line or gates 625, 626 and 627, respectively. The or gate 625 has a second input connection to which the data bearing signals from the output logic circuit shown in FIG. 14 are applied. The output of or gate 625 is connected to the first memory core unit 633 of a line 32, such units each of which comprise a read-in coil 628 that surrounds a toroidal magnetic memory core 629 constructed of ferrite, permallory, or some other suitable magnetizable material. The memory core unit 633 has read-in coil 628 connected directly to the output of or gate 625, and further includes a readout coil 631 connected through a diode rectifier 632 across a resistance-capacitance load circuit to the input of a second memory core unit 633 that is identical in construction. The data line or gates 626 and 627 have only a single input connection from their associated and gates, but the outputs thereof are connected in a fashion similar to or gate 625 to the read-in coils of the first of a line of 32 memory core units 634 and 635, respectively, each of which is identical in construction to the memory core 633.

The clock line and gates 614, 615 and 616 each have their outputs connected to an input connection of clock line or gates 636, 637 and 638, respectively. Each of the clock line or gates 636, 637 and 638 have two additional input connections supplied by shift clock pulses from either the output logic circuit of the reading system, or shift clock pulses from the write circuit. Each of the clock line or gates 636, 637 and 638 has its output connected through a pulse forming network and a conventional amplifier 639, 641 or 642 to the first one of the line of 32 memory core units 633, 634 or 635 associated therewith. For this purpose, amplifier 639 has its plate electrode connected through a clock read-in coil 643 surrounding core 629 of the first memory core unit 633 in the line, and connected serially through corresponding read-in coils in the remaining memory core units 633 in the line a source of positive plate potential. By reason of this construction, all of the read-in coils of the line of memory core units 633 are connected in series electric circuit relationship between the anode of electron tube 639 and the source of positive plate potential. The additional lines of 32 memory core units 634, 635, etc., formed are connected in precisely the same manner as the line of memory cores 633 except for one difference, however. In place of the data signals supplied directly from the output logic circuits of the reading system to or gate 625, the or gates 626, 627, etc. have an input connection back to read-through and gates 644, 645 and 646, respectively. The read-through and gates 644, 645 and 646 have one input terminal connected through cathode follower amplifiers 647 to the output of the last memory core unit in each line of memory cores 633, 634 and 635, respectively, and also have a read-through gating potential supplied thereto from a conductor 649 this is connected to a shift through signal source provided in the programmer unit 28 of the equipment. This shift through signal enables the shift through and gates 644, 645, 646, etc. to couple data signals being shifted out of the last memory core unit in a line such as 633 to be supplied back through the read-through and gate to the data line or gate of the next succeeding line of memory core units 634, and so on down through the entire table of 32 lines of such memory core units. The last read-through and gate 646 has its output connected to the write circuits so that data being shifted out of the table of 32 memory cores by 32 memory cores may be supplied to the writing circuits previously described. In addition to being supplied to the read-through and gates 644, 645, 646, etc., at the end of each line of memory core units, the data signals being shifter out of any one of the lines of memory core units may also be supplied through and or gate 651 which is connected to the output of the last memory core unit in each line, and has its output connected to the computer unit. As will be explained more fully hereinafter, the data contained in any one of the lines of memory core units 633, 634, 635, etc. may be selectively supplied to the computer in response to a request for the same supplied to the address register 604 from the computer.

If it is desired to utilize the core shift register as a working memory in writing data on the thermoplastic film surface of drum 11, it is first necessary to read the data to be written into the core shift register. For this purpose, it is not essential that the drum be properly located with respect to the writing apparatus, and accordingly it is not necessary that the programmer be actuated at this point. This is important due to the nature of construction of the programmer which produces an interlock potential only when the programmer is inactive. Accordingly, potential will be supplied through the interlock connections to the and gates 617 and 618 so that these gates can open and supply data signal pulses through the cathode follower amplifer 621 and and gate 617 to any of the data line and gates 611, 612 and 613 which may have been opened by pyramid switch 601 in response to an address supplied to the address register 604 from the computer. Similarly, opening of the and gate 618 allows shift clock pulses supplied from the computer to be applied through cathode follower 622 and and gate 618 to the selected one of the line clock and gates 614, 615 or 616. Prior to the opening of the and gates 617 and 618, however, the address for the data to be stored in core shift register is furnished to the address register 604 comprised by flip flop amplifiers 605 from the computer, and is shifted through the address register by clock pulses supplied also from the computer. The address signal sets the address register 604 so that pyramid diode switch 601 supplies an enabling potential to the selected one or ones of the data line and gates 611, 612 or 613, as well as to their associated clock and gates 614, 615 and 616. If it is desired to read data into the entire table of 32×32 memory cores of the shift register, then, of course, the address supplied from the computer must be properly coded as as to open first data line and gate 611 as well as its associated line clock and gate 614, and similarly each line of cores thereafter in sequence until the entire table of data is stored. Data supplied from the computer is then fed through the cathode follower amplifiers 621 and and gate 617, and gate 611, and or gate 625 to the data read-in winding 628 of the first memory core unit 633 in the first line of memory cores. Sequentially clock pulses supplied from the computer through the cathode follower 622, and gate 618, and gate 614, or gate 636 and amplifier 639 are applied to the clock read-in winding 643 of the first memory core unit 633 of the first line of cores. The successive data signal pulses set the direction of magnetization of the magnetic memory cores so that the setting of a core represents a bit of information in binary form. This information in then shifted down the entire line of memory core units 633 by the clock pulses. Upon filling the entire line of 32 memory core units 633, the computer must then address the next line of memory core units 634 so as to open the and gate of that line in a similar fashion and fill it with the data to be stored in a similar manner. This operation is then carried throughout the entire 32 lines of memory core units to fill the table.

After the memory core units in the core shift register have been filled with the data to be written, it may then be desired to read the data out to the writing circuits of data storage equipment. For this purpose, the computer must operate through the programmer 28 to properly drive the servo positioning mechanism of the equipment which positions the drum 11 at the desired location where the table of data stored in the core shift register is to be recorded. Actuation of the programmer 28 will then cause the interlock to close and gates 617 and 618 so no further data signals may be supplied to the core shift register. Simultaneously, the programmer 28 supplies an operating potential through conductor 649 to the read-through and gates 644, 645 and 646. At this point, the shift register is then ready to read out the data stored therein to writing circuits, and this is accomplished by supplying clock pulses from the writing circuits through the or gates 636, 637 and 638 to the read-out coils 643 of the magnetic core units 633, 634, 635. The clock pulses will then serially read all of the data stored in the core storage through the read-through and gates 644 and 645, etc. and out through the last read-through and gate 646 to the write circuits. It is not possible to write the data from only a selected line of memory cores since only the last read-through and gate 646 is connected to the write circuits. However, should it be desired to write only a single line of data, it is possible to set the instructions fed from the computer into the address register 604 of the pyramid switch 601 in such a manner that the desired line of data is stored in the desired line of magnetic core units with the remainder of the lines of the cores being set to zero. With the core shift register thus stored, it is then possible to write the data from the single line of the memory cores into a desired location on the thermoplastic film.

It is also possible that once the memory cores 633, etc. in the core shift register 29 have had data stored therein, that the data stored in a single line of memory cores be used in a computer operation. In this eventuality, the address for the desired line of data is supplied to the address register 604 of diode switch 601. The desired line of memory cores 633, etc. then has enabling potentials applied to the data line and gate and clock line and gate thereof. For example, if the data is stored in memory cores 634, then the address register flip flops 605 will provide negative enabling potentials to the diode rectifier 602 of diode switch 601 connected to output line 608. This connects a negative enabling potential to the and gates 612 and 615. If it is desired to apply new data to the line of memory cores 634 simultaneously with the shifting out of the data stored therein, this can be done by applying the new data from the computer to the cathode follower amplifier 621 simultaneously with the application of the clock pulses supplied through cathode follower 622, and gate 618, and gate 615, and amplifier 641 to the clock read-in coils of the cores 634. However, in the event it is desired only to read out the data stored in the cores 634 leaving the line of memory cores in the zero state after reading it out, no data signal pulses need be supplied from the computer, and only the clock pulses are supplied. In either event, data signal pulses representative of the data stored in the cores are coupled through cathode follower amplifier 647 at the end of the selected line of memory cores 634, and through or gate 651 to the computer which can then use the data in its computational operations.

In the event it is desired to read out information previously stored on the thermoplastic film surface of drum 11, all that is required is that the programmer apply an energizing potential to the read-through and gates 644, 645, etc., and the data signals developed by the vidicons 38 and 39 be supplied to or gate 625 of the line of magnetic core units 633. With the core shift register thus actuated, the data signals developed by the vidicons are supplied serially to the memory core units 633, 634, 635 and shifted through each memory core unit in each line until the entire table of cores is filled. The data thus read into the core shift register 29 may then be used in any of the previously described manners by the computer in its operations.

*Programmer unit*

Figure 18:
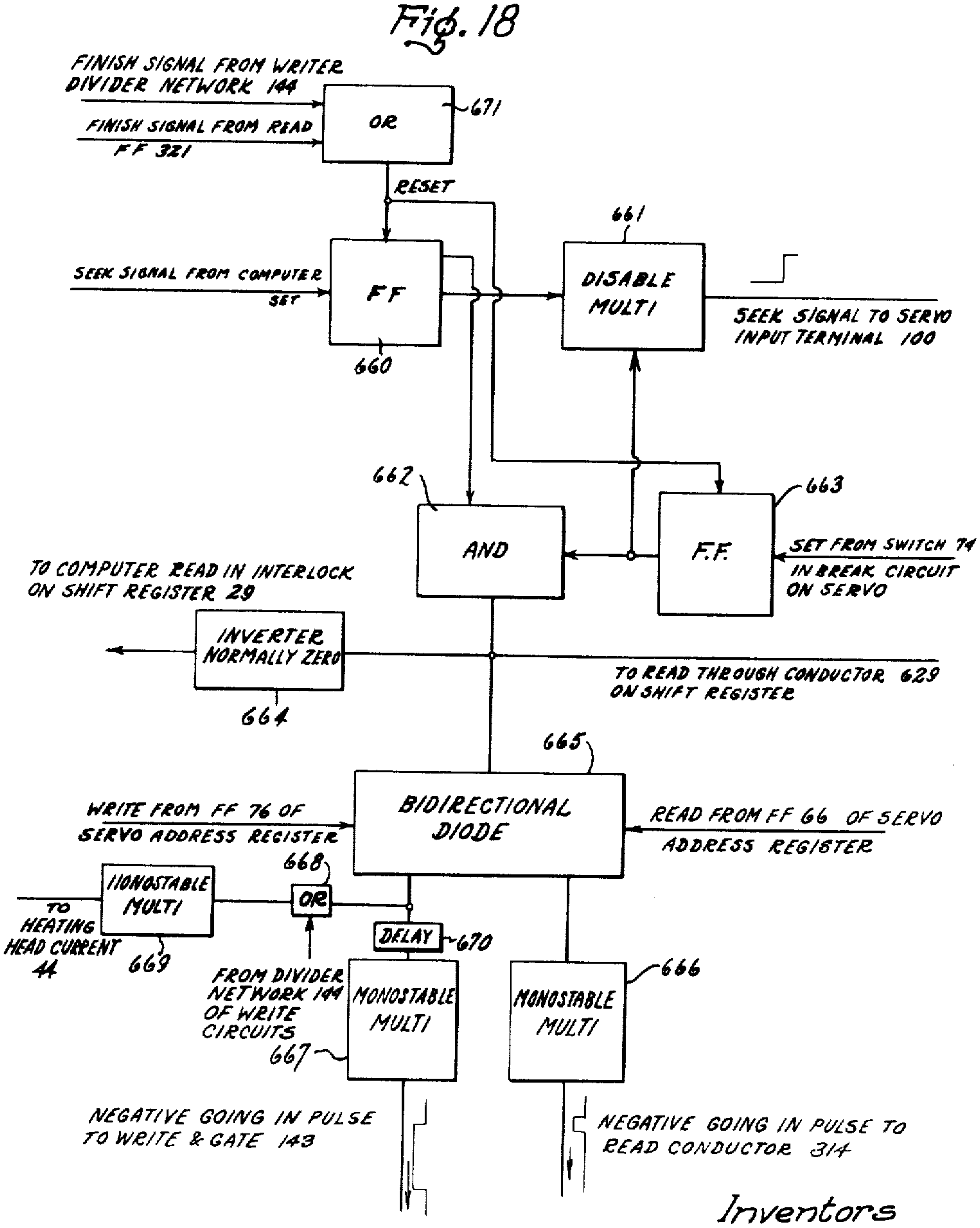
FIG. 18 is a functional block diagram showing the construction of the programmer unit that is used in the drum data storage equipment shown in FIG. 1.

FIG. 18 is a functional block diagram showing the construction of the programmer unit 28 which comprises the heart of the new and improved digital data storage equipment disclosed in FIGS. 1–18 of the drawings. Programmer unit 28 develops and provides the different control signals to the various elements of the equipment and includes bistable flip flop multivibrator 660 to which is supplied a seek signal from the computer when it is desired to actuate the data storage equipment. The flip flop 660 has its output connected to a conventional cathode coupled bistable multivibrator 661 which provides an energizing potential to the servo mechanism shown in FIG. 2 driving the drum 11 to position it at a desired location previously set into the servo mechanism address register. Flip flop amplifier 660 also provides a negative energizing potential to an and gate 662 which receives a second energizing potential from a flip flop amplifier 663 actuated by the control relay switch 74 in the brake circuit of the servo mechanism. The and circuit 662 provides operating potential to the shift through conductor 629 on the core shift register, as well as through an inverter 664 to the computer interlock gates 617 and 618 on the core shift register. The inverter 664 provides a zero output potential to the interlock gates upon and gate 662 opening, and in the event there is no potential supplied from the and gate 662, inverter 664 develops an opening potential that is supplied to the interlock. The output of and gate 662 is also supplied to a bi-directional gate 665 which has two control switching potentials supplied thereto, one from the write signal developed by flip flop 76 of the servo mechanism address register shown in FIG. 2, and the other from the read signal developed by flip flop 76. The bi-directional diode gate 665 will then apply an energizing potential selectively to either a monostable multivibrator 666 or through a delay circuit 670 to a monostable multivibrator 667 in response to the control switching potentials supplied from flip flop 76. Monostable multivibrator 666 if energized develops a pulsed trigger potential that is supplied to read conductor 314 of the read equipment for actuating the read equipment, and monostable multivibrator 667 when energized develops a pulsed potential that is applied to and gate 143 of the writing equipment. Also connected to the output terminal of the bi-directional diode gate 665 to which the bistable multivibrator 667 is connected is an or gate 668 which applies an operating potential to a monostable multivibrator 669 which in turn applies an operating potential to the heating head control circuit 44 of the equipment. Additionally, or gate 668 has an input energizing potential supplied thereto from divider network 144 of the write circuits which will again operate multivibrator 669 at the end of the write cycle. Finished signals from either the write system divider network 144 or the reading system flip flop 321 are supplied to an or gate 371 which resets flip flop 660 and 663 to turn off the equipment. The elements of the block diagram shown in FIG. 18 of the drawing are all conventional in construction, or their details of construction have been described previously in connection with other parts of the equipment. Hence, it is not believed necessary to disclose the circuit details of each of the elemental blocks of the programmer shown in FIG. 18.

In operation, the computer will supply a desired address to the address register of the servo systems which drives the rotatable and translatable drum 11 to condition the servo systems for actuation. An instant later the computer will provide a seek signal to flip flop amplifier 660 which in turn triggers the bistable multivibrator 661. Bistable multivibrator 661 develops a pulsed output potential that energizes the servo mechanisms for driving the drum 11 to its desired position. Simultaneously, flip flop amplifier 660 supplies operating potential to and gate 662 which opens upon receiving an enabling potential from the flip flop amplifier 663 that is activated by the switch 74 on the brake circuit of the servo mechanism. Flip flop 663 also turns off or resets flip flop 661. Coincidence in the operating potentials supplied to the and gate 662 causes it to open and supply operating potentials to the read-through gate conductor 629 on the core shift register, to the inverter 664, and to bi-stable diode gate 665. Operation of the bi-directional gate 665 is controlled from the read or write portion of the address supplied from the computer to the address register flip flop 76 of the servo mechanism which in turn supplies either a write or read switching potential to bi-directional diode gate 665 that triggers read monostable multivibrator 666 or write monostable multivibrator 667 through delay circuit 670. If energized, multivibrator 666 develops a pulsed trigger potential which is supplied to the reading circuits of the equipment to initiate their operation. If a switching signal is provided to multivibrator 667, the heating head control circuit 44 is first actuated by or gate 668 and multivibrator 669 to condition the thermoplastic film to be written on. Multivibrator 667 then develops a pulsed trigger potential that is supplied to the write circuits of the equipment to initiate their operation. Upon the write or read systems completing their cycle of operation, a finished signal is applied back to or gate 671 connected to the input of flip flop 660 which then turns off flip flop 660, and resets the flip flop amplifier 663. Simultaneously, in the event the write circuit was energized, a write finished signal is applied to or gate 668 which then supplies operating potential to monostable multivibrator 669 to actuate the heating head on the write equipment to cure the data just written.

PLATE DATA STORAGE EQUIPMENT

*General block diagram*

Figure 20:
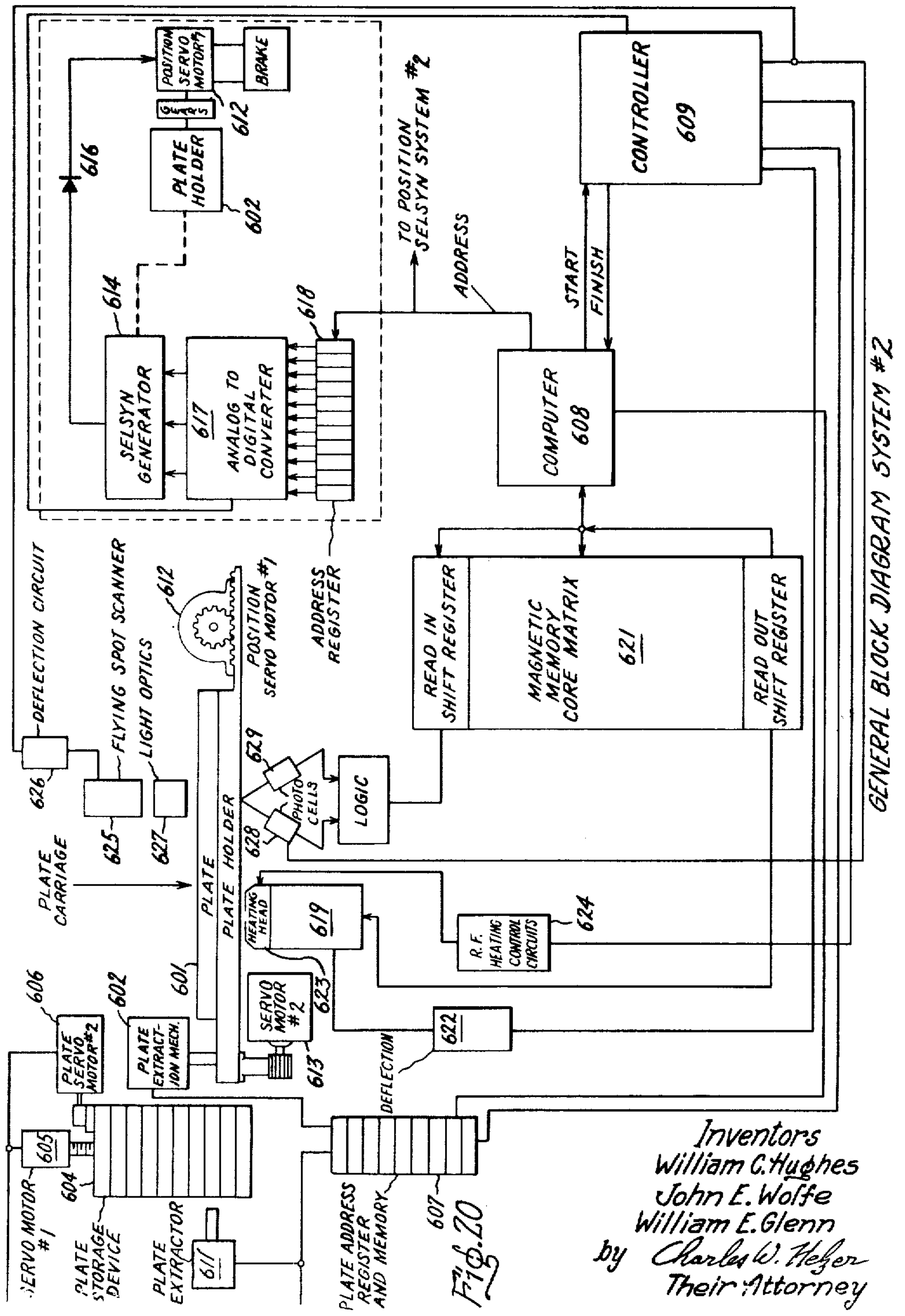
FIG. 20 is a functional block diagram of a new and improved plate storage equipment constructed in accordance with the present invention.

The general block diagram of a second thermoplastic film data recording system is illustrated in FIG. 20 of the drawings. This system is designed for use with 256 plates having a thermoplastic medium on the surface thereof upon which blocks of data are recorded. Each plate, for example, may be approximately one inch by one inch square and is designed to accommodate some 64×64 blocks of bits of information, with each block containing 32×32 bits of information in binary digital data form. The bits of information are, in fact, light optical diffraction gratings formed by a series of parallel lines formed into the thermoplastic film surface, and may be classified into basically two different sets of gratings or bits. The first set of gratings reflects a first characteristic color light, such as blue, and represents a binary zero bit; with the second set of gratings having a different grating spacing from the first set (that is, the spacing between bars or lines making up the second set of gratings is different from the spacing between the bars or lines of the first set of gratings) so as to reflect a characteristic color, such as yellow, representing a binary one bit. One such plate is shown at 601 and is held in position for use by a plate holder that comprises a part of a plate extraction mechanism 602. The plate extraction mechanism 602 operates to extract desired plates from a plate storage device 604 that is designed to accommodate some 4×64 or 256 plates similar to the plate 601. For this purpose, the plate storage device 604 may be positioned in a vertical direction by a plate servo drive motor 605, and is positioned horizontally by a second plate servo drive motor 606. The servo motors 605 and 606 are controlled from a plate address register and memory device 607 which in turn is controlled from a computer 608 and a controller unit 609. The computer 608 supplies to the address register 607 the identification data of a particular plate contained in the plate storage device 604 which it desires to select. The plate address register and memory device 607 then operate servo motors 605 and 606 to position the plate storage device 604 opposite the plate holder of extraction mechanism 602 in a manner such that the desired plate may be picked out by the holder. Upon reaching this position, a plate extractor 611 operates to place the desired plate in the holder (and sequentially to replace the plate 601 that previously had been on the holder into the open spot where the newly requested plate had been located. The plate address register and memory device 607 will then record the location of the replaced plate in the plate storage device 604 so that a running tabulation is maintained at all times of the location of all of the plates in the plate storage device.

The plate 601 after having been received by the holder is properly positioned by a position servo motor 612 in both directions in the plane of the drawings, and by a position servo motor 613 into and out of the plane of the drawings. The position servo motors 612 and 613 each comprise a part of a complete selsyn system, one of which is shown for purpose of illustration in the right hand portion of the drawings. Each of the selsyn systems include a servo motor, such as 612, which mechanically drives the plate holder 602 through a suitable gearing arrangement to position the holder 602 in a desired vertical location. Also mechanically connected to the plate holder of the extraction mechanism 602 is a selsyn generator 614 to which a control energizing potential is supplied from an analog to digital converter 617 which is actuated by an address register 618 to which an address is supplied by the computer 608. Selsyn generator 614 develops a position indicating error signal that is connected back through servo amplifier 616 to the servo motor 612 to accurately position the plate holder.

In order to properly position the servo motor 612, a control voltage is supplied to the selsyn generator 614 from the digital to analog converter 617 that operates to develop an analog control potential in response to a digital data address supplied to the address register 618 from the computer 608. If it is desired to write data on plate 601, then the plate 601 in the plate holder is located by the position servo motors 612 and 613 over electron beam writing apparatus 619, which will be described more fully hereinafter, but which functions to form a series of marks or lines making up diffraction gratings representing bits of information on the thermoplastic film surface of the plate 601. Operation of the electron beam writing apparatus 619 is controlled by a deflection circuit 622 which is actuated by the controller unit 609 of the system, and has the information to be written on the plate 601 supplied thereto from a magnetic memory core matrix 621 which serves as a working memory for the plate storage equipment. The deflection circuit 622 controls the operation of the electron beam writing apparatus to the extent that it causes it to trace out desired repetitive patterns which have the data intelligence supplied from the magnetic memory core matrix 621 modulated thereon. The magnetic memory core matrix 621 is also connected to the computer 608 so that information to be written on plate 601 may be first supplied from the computer and stored in the matrix. The information may then be read out of the memory core matrix 621 and supplied to the electron beam writing apparatus which then modifies the lines or diffraction gratings being formed to incorporate the data supplied from the core shift register into the diffraction gratings or bits being formed on the thermoplastic film surface of the plate 601. After writing the data to be stored on the surface of the thermoplastic medium of plate 601, it may be desirable to cure the medium by supplying heat from a pair of radio frequency heating electrodes 623 energized from a radio frequency heating control circuit 624 that in turn is controlled by the controller unit 609 of the data storage equipment. R.F. heating electrodes 623 also serve to erase previously recorded data on the surface of the thermoplastic film of plate 601 by applying sufficient heat thereto for a period of time long enough to melt the thermoplastic medium to a viscose state to remove the lines formed therein by the electron beam writing apparatus 619.

For best results with known thermoplastic mediums, it is also advisable to heat the surface of the film prior to writing. For this purpose, the R.F. heating electrodes 623 are also used so that in writing on the plate 601, a cycle of operations is followed which consists of heating the thermoplastic medium of plate 601 to a temperature of approximately 100–150° C. for about two one-hundredths of a secoid. The surface is then allowed to cool for about two one-hundredths of a second to a temperature of 50° C. Upon reaching this condition, the electron beam writing apparatus is then actuated, and the block of data desired to be recorded is written on the thermoplastic medium of the plate at a selected location. Subsequent to writing a complete block of 32×32 bits or sets of gratings, the block of data just recorded is then heated for two one-hundredths of a second at a temperature of 100–150° C. to effect curing of the medium. The surface is then allowed to cool down to room temperature and the data is thereby permanently set into and recorded on the thermoplastic surface of the plate. The plate may then be stored in the plate storage device by plate extraction mechanism 602 for storage over an indefinite period.

If it is desired to read out information previously stored on a desired plate stored in the plate storage device 604, the position servo motors 612 and 613 are actuated to place the plate extraction mechanism 602 in the plate loading position, and the plate servo motors 605 and 606 are actuated to locate the desired plate in front of the plate holder. The extractor 611 is then actuated and loads the desired plate in the plate holder which is again moved by position servo motors 612 and 613 to locate the desired block of information on the selected plate 601 under a read out device. The read out device comprises a flying spot scanner 625 actuated by a deflection circuit 626 that is controlled from the controller unit 609. The flying spot scanner 625 produces a scanning spot of light that is focussed by a light optics system 627 on the block of data being read out so that the scanning spot of light traces over the lines of groups of gratings or bits of data in the block. As the scanning spot of light traces over the lines of data bits in the block, colored light characteristic of one's (1's) and zero (0) gratings or bits is transmitted through the plate holder and a selective color filter to either one of a pair of photocell devices 628 and 629. The photocell devices 628 and 629 are also controlled from controller 609 so as to be actuated thereby upon the deflection circuits 626 and flying spot scanner 625 being operated. Pulse wave form output signal potentials developed by the photocell devices 628 and 629 are supplied to an output logic circuit 631 that in turn is connected to the magnetic memory core matrix 621 that serves as a working memory for the equipment. In this manner, the data read out from plate 601 by the photocells 628 and 629 is stored in the memory matrix 621 for use by the computer 608 as required. Having described the basic organization and operation of the plate data storage equipment comprising a part of the present invention, its details of construction and operation thereof will be disclosed more fully in the drawings described hereinafter.

*Plate holder and extraction mechanism*

Figures 21, 22:
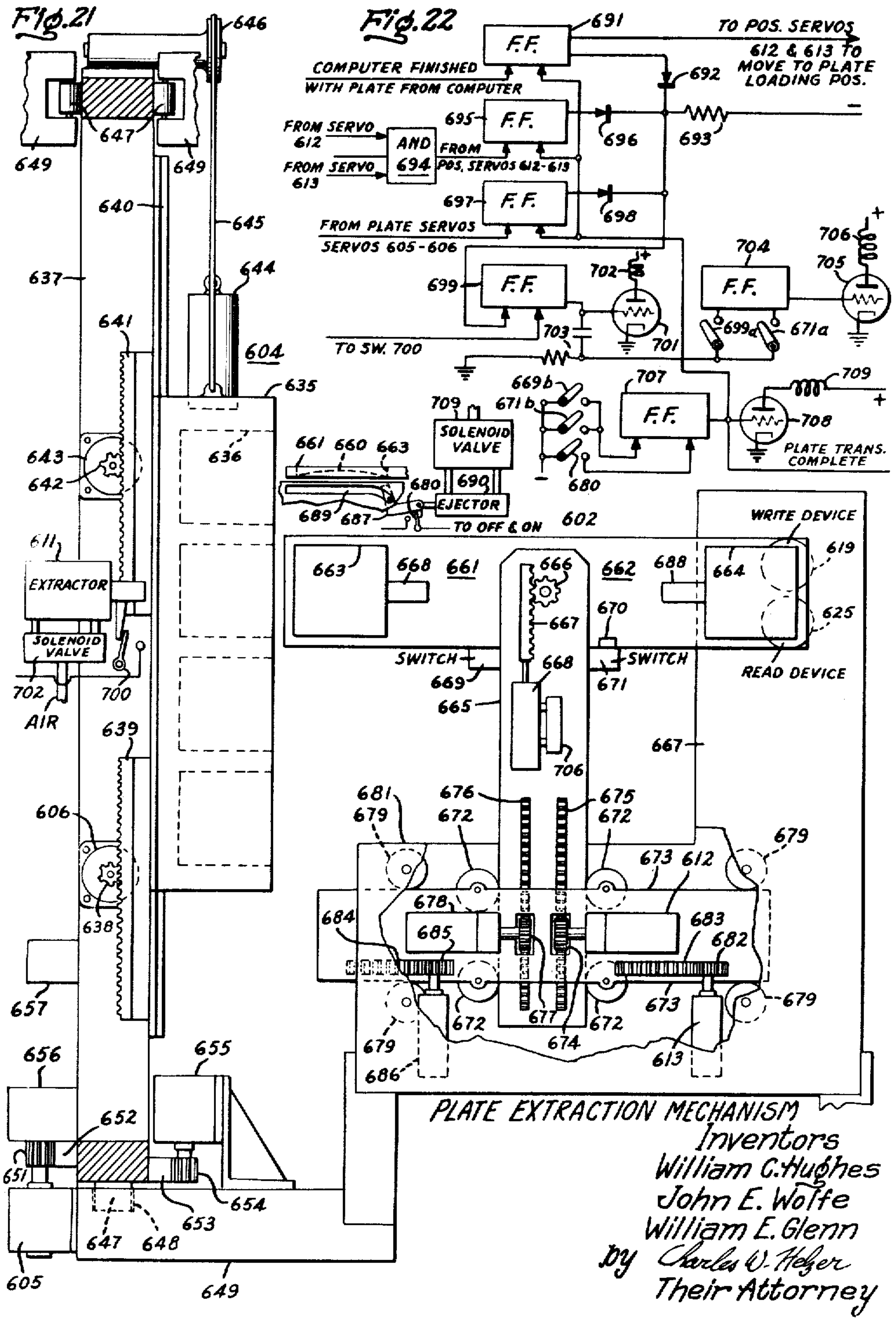
FIG. 21 is a side view of a plate holder and extraction mechanism comprising a part of the plate storage equipment shown in FIG. 20.
FIG. 22 is a functional block diagram of the control circuits used for actuating the plate holder and extraction mechanism shown in FIG. 21.

The details of construction of the plate holder and extraction mechanism are shown in FIG. 21 of the drawings wherein the plate holder device is illustrated at 604, and the extraction mechanism is illustrated at 602. The plate holder 604 comprises a tray 635 having four vertically arranged rows of 64 receptacles 636, each for receiving and storing the 7/10 x 7/10 of an inch plates which have thermoplastic film surfaces with data recorded thereon. The tray 635 may be moved vertically up and down along a track 640 on a vertical stand 637 by the vertical plate servo motor 606. The vertical plate servo motor 606 drives vertically movable tray 635 through a pinion gear 638 keyed to the shaft thereof which meshes with a ratchet or rack 639 secured to the tray 635. The vertically movable tray 635 has a second rack 641 secured thereto which operates through a pinion gear 642 to rotate a plate potentiometer 643 that develops an output electric signal indicative of the vertical position of the tray 635. To facilitate moving the tray 635 up and down, the tray is secured to a counterweight 644 by means of a cable 645 hung over a pulley wheel 646 that is rotatably secured to the top of the vertical stand 637. The vertical stand 637 itself is supported on roller bearings 647 in groove 648 formed in the lower part of a member 649 so that the vertical stand 637 may be moved horizontally in and out of the plane of the drawings as shown. Additional bearings 647 in the upper part of member 649 keep the stand vertical. The vertical stand 637 is driven in either of these two directions by the plate servo motor 605 which operates through a pinion 651 and rack 652 that is secured to vertical stand 637. A second rack 653 secured to the opposite side of stand 637 drives a pinion 654 which in turn drives a potentiometer 655 for developing an electric signal representative of the horizontal of position of vertical stand 637, and hence representative of the horizontal position of plate holder tray 635. The vertical stand 637 is retained in any horizontal position to which it is driven by the plate servo motor 605 by a solenoid operated horizontal detent 656 which releases upon the servo motor 605 being energized, and is retained in any desired vertical position by a solenoid operated vertical detent 657 which releases upon the servo motor 606 being energized. The servo motors 605 and 606 will drive the vertically movable tray 635 and horizontally movable stand 637 to position a desired plate stored in tray 635 opposite an extractor 611, and upon reaching this position will be locked into place by the detents 656 and 657. The desired plate positioned opposite extractor 611 is then pushed out of the plate holder tray 635 and into the extraction mechanism 602.

The extraction mechanism 602 comprises a pair of opposed holding arms 661 and 662 with each of the holding arms having respective holding jaws indicated at 663 and 664, each of which, as shown in the cutaway view immediately over arm 661, includes a bow spring 660 for retaining the plate in the jaw after loading by extractor 611. Assuming the extraction mechanism 602 to have been driven to its plate loading position by the position servos 612 and 613 where holding arm 661 places its holding jaw in the position shown at 663 to receive the plates pushed therein by the extractor 611. The holding jaw 663 will then hold the plate during rotation of the holding jaw 663 to the position now occupied by the holding jaw 664 where data contained on the plate being held can be either read out by the read out device 625 of the equipment, or new data may be written on the plate by writing apparatus 619. For this purpose, the holding arms 661 and 662 are rotatably supported on a shaft journaled in a U-shaped supporting post, one side of which is shown at 665, with the shaft being keyed to a pinion gear 666 that is driven by a rack 667. Rack 667 is connected to a reciprocally movable air driven actuator 668 that is in turn controlled by a solenoid operated air valve 706. By this arrangement, upon the extractor 611 loading a plate in the plate holding jaw 663, the actuator 668 rotates the holding arm 661 counterclockwise from the position shown to place the plate under the read or write devices 625 or 619 in the position where the holding clamp 664 is presently shown. Simultaneously, holding clamp 664 is rotated counterclockwise to the position where holding clamp 663 is presently shown. A switch tab 670 secured to holding arm 662 actuates microswitches 669 and 671 mounted on opposite sides of post 665 to derive an electric signal indicating the position of the arms 661 and 662 and that the holding jaws 663 and 664 are in the plate loading or write-read position. Accordingly, upon the holding arm 662 reaching the plate unloading position, tab 670 actuates microswitch 669, and the plate that had been held by holding jaw 664 is removed by an ejector 687 and placed into the storage tray 635 at the point from which the plate now in the holding jaw 663 was removed. The ejector 687 comprises an L-shaped arm linked to a finger 689 which is driven by a spring and inserts itself in a slot 686 or 688 formed in the respective holding arms 661 and 662 behind the holding jaws 663 and 664, respectively. The finger has a small caming pin that engages a caming surface that guides the finger 689. The L-shaped arm also has a small tab thereon which closes a microswitch 680 upon the ejector being actuated. Actuation of ejector 687 causes the finger to be inserted in slot 686 or 688 behind the plate. The finger then follows down cam surface to push the plate into the empty slot in tray 635. At the end of travel of the finger, switch contact 680 is closed whereupon the bias spring in air cylinder returns the finger to its inactive position and withdraws it from slot 686 or 688. It is understood that the ejector 687 and extractor 611 are mounted on separate supports from arm 661 and stand 637 so that these last two parts are free to move.

Having positioned a plate to be read or written upon under the write or read device 619 or 625, it is then necessary to properly locate a desired block of data on the plate under either one of these two devices. For this purpose, two position selsyn systems are provided which make it possible to move the plates both horizontally and vertically within a restricted area to thereby locate any desired one of the 64×64 blocks of data on the surface of the plate under either the read or write devices. For this purpose, the vertical supporting post 665 is movably supported in bearings 672 that in turn are rotatably supported on a slide carriage 673. The vertical supporting post 665 is moved up and down by the vertical position servo motor 612 which is shafted to a pinion gear 674 that drives a rack 675 secured to the vertical supporting post 665. Also secured to the vertical supporting post 665 is a second rack 676 which operates through a pinion gear 677 to drive a vertical position selsyn 678. The vertical position selsyn generator 678 then develops an electric output signal which provides an indication of the vertical position of the vertical supporting post 665, and hence of the vertical position of the plate held thereon. The slide carriage 673 is also movable horizontally in both directions on the plane of the drawing, and for this purpose is movably supported by a set of roller bearings 679 which are rotatably secured to an extension 681 of the base member 649. In order to move the slide carriage 673, the horizontal position servo motor 613 is provided, and drives the slide carriage through a pinion 682 and rack 683 secured to the slide carriage. Slide carriage 673 also has an additional rack 684 secured thereto which drives a pinion 685 that is shafted to a horizontal selsyn generator 686. The selsyn generator 686 then develops an output electric signal which is indicative of the horizontal position of the slide carriage 673, and hence is indicative of the horizontal position of the plate held in plate holding clamp 664. By this arrangement, the plates held in the plate holding clamps 664 or 663 are moved horizontally and vertically within the view of the writing device 619 or read out means 625.

The control system which controls the operation of the plate holding device and extraction mechanism 601–602 is illustrated in FIG. 22 of the drawings. This control system includes a first flip flop amplifier 691 which is identical in construction and operation to the flip flop amplifier 341 of the block edge recognition circuits to be described hereinafter, and which receives a finished signal from the computer indicating that the computer is finished with a particular plate then being supported in the position shown by the holding arm 662 in FIG. 21. This computer finished signal sets flip flop 691 so that a negative polarity energizing signal is provided at its normal output terminal, and is supplied to a diode rectifier 692 of an and gate 693. The output from the inverted output terminal drops to zero which allows position servos 612 and 613 to move the extraction mechanism 602 to the loading position. After moving the plate extraction mechanism 602 to the plate loading position, both the position servos 612 and 613 provide a servo finished signal to an and gate 694 that opens and provides a trigger pulse to a flip flop amplifier 695. Flip flop 695 is identical to flip flop 691, and supplies a negative polarity energizing signal from its normal output to a diode rectifier 696 of and gate 693. Concurrently with this action, upon being set the computer has supplied an address to the plate servos 605 and 606 which causes these servos to position the desired plate in front of the extractor 11, and upon this operation being complete, a plate servo finished signal will be provided from the plate servos 605 and 606 as a set trigger pulse to a flip flop amplifier 697. Flip flop 697 is similar to flip flop 691, and develops a negative energizing potential at its normal output terminal which is connected to a diode rectifier 698 of and gate 693. The output of and gate 693 is connected to a flip flop amplifier 699 that is similar to 691, and which in turn has its inverse output connected to the control grid of electron tube 701 whose plate is connected to a source of positive plate potential through a sensitive relay winding 702. Relay winding 702 actuates the solenoid controlled air valve 702 that controls air supplied to the extractor 611 to actuate the extractor which in pushing the desired plate into the holding jaw 663 positioned opposite it, closes a switch 700 that resets flip flop 699. The inverse output terminal of flip flop 699 is also connected through a delay circuit 703, and through the switch contacts 699*a* and 671*a* controlled by the holder arms 661 and 662 that are connected to both the set and reset input terminals, respectively, of a flip flop amplifier 704. Flip flop amplifier 704 has its inverted output terminal connected to the control grid of an electron tube 705 that has its anode electrode connected to a source of positive plate potential through a sensitive relay winding 706 of the solenoid air valve 706. Solenoid air valve 706 controls the air supplied to actuator 668 of plate extraction mechanism 602 to control movement of the holder arms 661 and 662. The switch contacts 669*b* and 671*b* of switches 669 and 671 are also connected in parallel to the set input terminal of a flip flop amplifier 707 that has its reset input terminal connected through switch contact 680 to a source of negative potential to which switch contacts 669*b* and 671*b* are also connected. Flip flop 707 is similar to flip flop 691 and has its inverse output connected to the control grid of an electron tube 708 which has its anode connected to a source of positive plate potential through a sensitive relay winding of the solenoid operated air valve 709 which in turn controls the air supplied to air operated ejector 690. The inverse output from flip flop amplifier 707 which develops a negative trigger pulse upon being reset by switch 680 is also connected back to the reset input terminals of each of the flip flops 691, 695, and 697, and is connected back to the computer to indicate that the plate transfer operation has been completed.

In operation, the plate holding device and extraction mechanism function in the following manner. At the end of a reading or writing cycle, the extraction mechanism 602 will be in the position illustrated in FIG. 21 of the drawings where the plate which has just been read out or written upon will be held in the plate holding jaw 664 of the holding arm 662, and the plate holding jaw 663 of the holding arm 661 will be empty. Upon receiving a computer finished signal from the computer 608, flip flop 691 will be set and will actuate the position servos 612 and 613 to cause them to drive the plate extraction mechanism to the plate loading position. For this purpose the servo motor 612 and its associated selsyn generator 678 are included in a selsyn system identical to that shown in FIG. 2 of the drawings with the exception that address register 75 and cross bar switches 85 and 86 thereof are modified to provide only 64×64 distinct settings for the servo motor, thereby obviating the need for fine position control transformer 113 and selector switch 112. The servo motor 613 and its associated selsyn generator 686 are included in a similarly modified servo mechanism positioning system. The positive going output potential from flip flop 691 controls the grid of an electron tube 711 in the servo system shown in the lower left corner of FIG. 2. Tube 711 has its anode connected to a source of positive potential through a sensitive relay winding 712 that actuates a selector switch 713. Switch 713 in its unenergized condition connects conductors 93 and 94 from the crossbar switches 85, 86 to selsyn primary winding 50, and in the energized condition connects selsyn primary winding 50 to the tapped and grounded secondary of a transformer 714 connected across the reference voltage supply. Accordingly, a reference potential is applied through transformer 714 to the primary winding 50 of the selsyn generators 684 and 686 of each servo system upon switch 713 being energized, which causes the selsyn generators to drive their respective servo motors 612 and 613 to locate extraction mechanism 602 in the plate loading position. A seek control signal supplied from the controller of the equipment along with an address from the computer to the two plate servo motors 605 and 606 will then position the tray 635 both vertically and horizontally to any one of its total of 264 positions to locate the desired plate opposite the plate holding jaw 663 of extraction mechanism 602. Prior to movement of the tray 635, and also the vertical stand 637, however, the holding detents 656 and 657 have been released, and upon the tray 635 reaching the desired setting the detents are again actuated so that the tray 635 is firmly held with the desired plate opposite the holding jaw 663. Upon both the position servos 612 and 613 and the plate servos 605 and 606 being set, flip flops 695 and 697 are triggered to their set condition, and result in opening and gate 693 and triggering flip flop 699. This produces a positive pulse on the control grid of tube 701 that actuates the solenoid air valve 702 of extractor 611 to push the desired plate in the holding tray 635 into the holding jaw 663 of extraction mechanism 602. At the end of its travel, extractor 611 closes switch 700 instantaneously to provide a negative reset pulse to flip flop 699 which causes it to reset and produce a negative trigger pulse that is supplied through delay circuit 703 (to allow extractor 611 time to clear) to flop flop 704. This pulse is applied to the reset terminal of flip flop 704 since tab 670 has closed switch contact 671, and this causes flip flop to provide a negative potential from its inverted output terminal to tube 705. This de-energizes relay winding 706 thereby releasing solenoid air valve 706, and allows actuator 668 to be returned by its bias spring to its de-energized condition and rotate the holding arm 661 counterclockwise to place holding jaw 663 and the new plate therein in the position presently occupied by the holding jaw 664. Upon arriving in the new position, tab 670 on holding arm 662 closes micro-switch contacts 669*b*, and provides a negative set pulse to flip flop 707. Flip flop 707 then provides a positive potential to tube 708 which energizes relay winding 709 of the ejector 690 solenoid air valve 709 to cause ejector 690 to push the old used plate held in holding clamp 664 into plate holding tray 635 in the position where the new plate now being held by holding clamp 663 had been. This leaves the holding clamp 664 of holding arm 662 empty so that upon completion of read out or writing of the new plate in the holding clamp 663, 664 will be ready to receive the new plate from the tray 635 in the previously described manner and start a new cycle of operation. At the end of its travel, ejector 690 temporarily closes switch 680 which provides a negative polarity reset pulse to flip flop 707 causing it to reset and provide a negative potential pulse at its inverse output. This negative pulse cuts off tube 708 thereby de-energizing ejector 690 which returns to its inactive position. It resets flip flops 691, 695 and 697 and provides an indication to the controller that the desired plate is properly located for positioning by the position servo systems comprising servo motors 612 and 613. The controller will then provide a seek signal to the position servos, and the computer will supply the plate location address to the servos, so that they are actuated to move vertical supporting post 665 vertically, and slide carriage 673 horizontally to position the desired location on the plate in the holding arm 663 under with the writing device 619, or the read out means 625. The selected area of the plate may then be either read out or written upon in a manner to be described hereinafter to complete a cycle of operation. The plate holding device and extraction mechanism is then conditioned to have the operation just described again repeated. However, in the next cycle of operation, the switch contacts 669*a* and 669*b* will be closed by tab 670, and result in reversing the direction in which actuator 668 rotates holder arms 661 and 662.

*Plate servo system*

Figure 23:
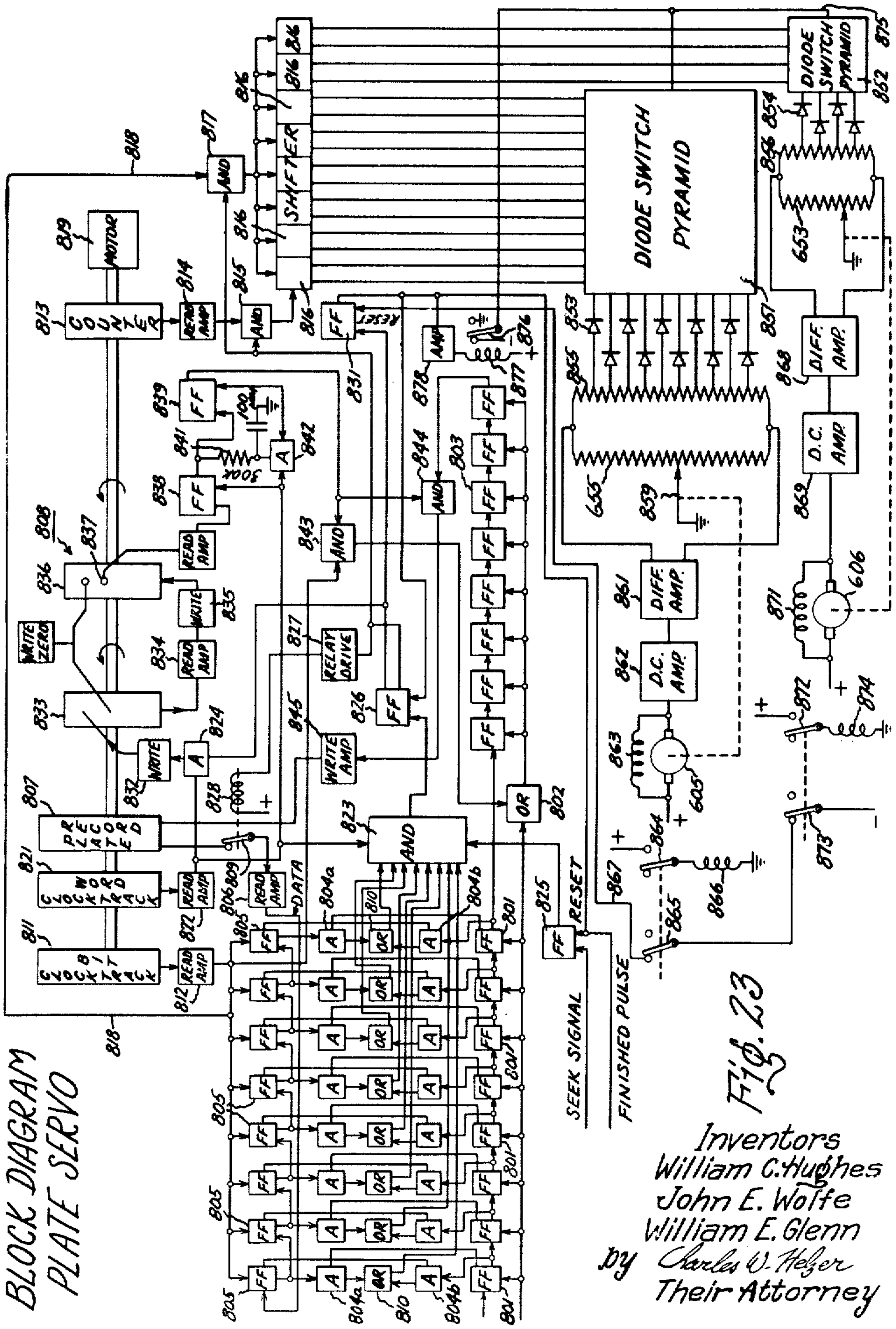
FIG. 23 is a functional block diagram of a plate servo mechanism used in positioning the plate holder of the plate holder and extraction mechanism shown in FIG. 21.

A functional block diagram of the plate servo system is shown in FIG. 23 of the drawings. This servo system comprises an input address register formed by a plurality of flip flop amplifiers 801 which are connected serially, and have address data pulses supplied thereto in binary form from the computer 608 together with shift clock pulses that are supplied sequentially to each of the flip flop amplifiers 801, and precede each data pulse. The shift clock pulses are also supplied to an or gate 802 which has its output connected to eight serially connected flip flop amplifiers 803 which comprise a writing address register. The last flip flop amplifier 801 in the input address register has its data output terminal connected to the first flip flop amplifier 803 in the writing address register so that as a new address is supplied to the input address register 801 from the computer, the address which had been previously used in the last preceding cycle of operation of the plate servo, is shifted over into the writing address register 803. The output potentials from the normal output terminals of flip flops 801 are connected to one input terminal of an associated and gate 804*b*, and the output potentials from the inverse output terminals are connected to one input terminal of an associated and gate 804*a*. The output from and gates 804*b* and 804*a* are connected to the inputs of an associated or gate 810, each of which has its output connected to an input terminal of a coincidence and gate 823. The and gates 804*b* and 804*a* also have input connections supplied from the normal and inverse output terminals, respectively, of an associated flip flop amplifier 805 which comprises a plate record address register. The flip flops 805 are all connected in series electrical circuit relationship to the output of a read out amplifier 806 which receives signals from the read head of a plate record track 807 formed on a magnetic memory drum indicated generally at 808. The plate record track 807 has plate identification data stored thereon which identifies the location of any one of the 264 plates stored in plate storage tray 635. This data is read out through a selector switch 809 to the input of the address register formed by the eight flip flop amplifiers 805. The identifying data supplied from the plate record track 807 is shifted through the address register 805 by bit clock pulses supplied from a bit clock track 811 which provides a magnetic bit mark for each bit in the plate identification data recorded on plate record track 807. These bit marks are read out by a read out head which is connected to a bit clock read out amplifier 812 and supplied in parallel to a second input of all of the flip flop amplifiers 805 in the plate record address register sequentially prior to each plate record data pulse. The particular location on the periphery of the magnetic drum memory 808 of any particular plate identification record read out into the plate record address register 805 is recorded on a counter track 813 formed on the magnetic memory drum. The counter track 813 is read out simultaneously with the plate record track by a read head, and the periphery location counter data thus obtained is supplied through a read amplifier 814 through a normally open and gate 815 to a counter address register made up by eight of series connected flip flop amplifiers 816. Shift pulses are supplied to the counter address register 816 through a second normally open and gate 817 and conductor 818 from the output of the bit clock read amplifier 812. The magnetic memory drum 808 is continuously rotated by a drive motor 819 so that the data recorded thereon is serially passed under the read out heads for each of the bit clock track, the plate record track, and the counter track. As each track passes under its read out head, an output electrical signal will be developed by each read out head, which in the case of the plate record track is supplied serially to the plate record address register formed by the flip flop amplifiers 805, and in the case of the counter track the plate record location identification data is fed into the counter address register formed by the flip flop amplifiers 816. It is understood that simultaneously with this, the bit clock track develops bit clock pulses in the read amplifier 812 which shift the plate record data into the plate record address register 805, and shift the counter data into the counter address register 816. Upon completion of a word or identifying numeral, a work clock pulse is produced by a work clock track 821 in the read out head associated therewith, and supplied through a word clock read amplifier 822 to the input of coincidence and gate 823, and also to a second and gate 824. The word clock track 821 is spaced so that pulses are produced at the end of each complete plate record identification address supplied to the plate record address register 805.

Concurrently with this action, the address read into the flip flop amplifiers of the input address register is coupled to the comparator and gates 804*a* and 804*b* and compared with the plate record address read into the plate record address register 805 from the memory drum 808. The output of each of the comparator and gates 804*a* and 804*b* is connected through a respective or gate 810 to coincidence and gate 823 which will open only if there is an output potential supplied thereto from all of the comparator and gates 804*a* and 804*b*, and from the word clock track read amplifier 822, and from a flip flop amplifier 825 which is set by a seek control signal supplied from the controller unit to initiate operation of the plate servo system.

It can be appreciated that after a seek control signal has been received from the controller unit, flip flop amplifier 825 will provide an enabling potential to the coincidence and gate 823. Thereafter, the motor 819 rotating the magnetic memory drum 808 will bring each plate record identification numeral or word past its read out head so that each of the identification numerals is serially read into the plate record address register 805. Simultaneously, the counter identification numeral identifying the position of any particular plate record numeral on the periphery of the magnetic memory drum 808 is read into the counter address register 816. Upon the completion of a plate record identification word or numeral, the word clock track 821 produces a word clock pulse that is supplied to coincidence and gate 823. If the address read into the plate record address register 805 does not coincide exactly with the address supplied to the input address register 801 from the computer, then enabling potentials will not be supplied from all of the comparator and gates 804*a* or 804*b* and their associated or gates 810 to the coincidence and gate 823, and and gate 823 will not be opened. Upon the desired plate record identification numeral or word being read into the plate record address register 805 however there will be coincidence between the enabling potentials supplied to either the comparator and gates 804*a* or 804*b* by the plate record address register 805 and by the input address register 801 so that the comparator and gates 804*a* or 804*b* all supply operating potentials through their respective or gates 810 to the coincidence and gate 823. Upon this occurrence, the coincidence and gate 823 opens and supplies an operating potential to a flip flop amplifier 826 which goes from its re-set or off position to its set or on position.

Upon the flip flop amplifier 826 being turned on, it supplies a positive polarity operating potential from its inverse output terminal through a relay drive amplifier 827 to a solenoid winding 828 of the selector switch 809 so as to open switch 809, and prevents the plate record read out head from supplying any further plate record identification numerals to the plate record address register 805. Concurrently, the negative operating potential that is normally supplied to the and gates 815 and 817 while flip flop 826 is in the reset or off condition, is removed so that the counter identification numeral or word set into the counter address register 816 is retained in that register. Concurrently with this action, a negative operating potential is supplied from the normal output terminal of flip-flop amplifier 826 to the and gate 824 and to a flip flop 831 to place that flip flop amplifier in the set or on condition. The enabling potential to and gate 824 operates the and gate to couple the next word clock pulse, and hence identifies the end of the desired plate record identification numeral, to a write head 832 of a delay track 833. As a consequence, this word clock pulse will be written on the delay track 833 where subsequent rotation of the magnetic memory drum in the direction indicated by the arrows will bring the mark under a read head 834 which will develop a signal pulse. It should be noted that the delay track 833 rotates the word clock mark through approximately three-quarters of a revolution of the magnetic drum 808, and a second delay track 836 approximately completes the remaining quarter of revolution before bringing the word clock mark under a read head 837. The second delay track 836 serves to advance the word clock pulse so that it passes under read head 837 just prior to the appearance of the word clock pulse at the beginning of the desired data under word read head 812. For this purpose, the word clock mark is read off first delay track 833 by a read head and supplied through a read amplifier 834 and write amplifier 835 to a write head under the second delay track 836. The read head 837 reads out the delayed and advanced mark just prior to the desired data completing a full revolution and again passing under the word clock read out head. This delayed and advanced signal pulse is coupled through a read amplifier to the set input terminal of a flip flop 838. Flip flop amplifier 838 has its normal output connected to the set input terminal of a second flip flop amplifier 839, and through a time delay circuit 841 to an and gate 842. The and gate 842 has its second input connected to the word clock track read amplifier 822 which also supplies word clock pulses to the reset input terminal flip flop amplifier 838. The output of the and gate 842 is connected to reset input terminal of flip flop amplifier 839.

Concurrently with the above identified operation, the count signal contained in the counter address register 816 which identifies the point on the periphery where the desired address read out of the plate record track 807 is located, operates to set a pair of diode pyramid switches 851 and 852. The diode pyramid switches 851 and 852 serve to connect a source of negative potential across portions of a pair of multitap resistors 855 and 856 selected by the counter address register flip flop amplifiers 816 through coupling diode rectifiers 853 and 854, respectively, through conductor 875, and relay operated selector switch 876. Switch 876 is actuated by a relay winding 877 that is energized from amplifier 878 upon servo start flip flop 831 being set. The multitap resistor 855 in conjunction with a second variable type resistor comprised by horizontal position potentiometer 655 forms a conventional Wheatstone bridge, and the multitap resistor 856 in conjunction with a variable resistor comprised by the vertical position potentiometer 643 forms a second Wheatstone bridge. The variable contact arm 859 of horizontal potentiometer 655 is mechanically connected to the rotor of servo motor 605 by the rack and pinion arrangement shown in FIG. 21 so as to be driven by servo motor 605. The field winding of servo motor 605 is connected across the opposite terminals of the Wheatstone bridge formed by the multitap resistor 855 and horizontal position potentiometer 655 through a differential amplifier 861 and direct current amplifier 862. Also connected across the field winding of the servo motor 605 is the solenoid winding 863 of a sensitive relay having movable contacts 864 and 865. The movable contact 864 is connected to a solenoid winding 866 and upon winding 863 being energized, connects winding 866 to a source of positive potential that actuates catch or detent 656 on the plate holder device. The movable switch contacts 865 connects a source of negative potential through a conductor 867 to the reset input terminal of the servo start flip flop amplifier 831 so as to reset that flip flop. This occurs only when the switch 865 is in the position shown, which is the de-energized position, and occurs only when the servo motor 605 has balanced the bridge circuits 855 and 857 in a manner to be described more fully hereinafter. The movable contact of the potentiometer 643 is also mechanically coupled to the shaft of its servo motor 606 by the rack and pinion arrangement shown in FIG. 21. Servo motor 606 has its field winding connected back across the output terminals of the Wheatstone bridge formed by multitap resistor 856 and potentiometer 643 through a differential amplifier 868 and direct current amplifier 869. Connected across the field winding of the servo motor 606 is a solenoid winding 871 of a sensitive relay having movable contacts 872 and 873. Movable contact 872 is connected to the solenoid winding 874 of catch or detent 657 on the plate holder device, and upon being actuated by winding 871 connects detent winding 874 to a source of positive potential which releases the detent 657 upon being energized. The movable contact 873 connects a source of negative potential through the switch contact 865 to the input reset terminal of servo start flip flop amplifier 831 so that in order to re-set that flip flop amplifier, it is necessary that both of the switches 873 and 865 be in the position shown, which is the de-energized position of both detent relays 863 and 871.

Having described the construction of the plate servo system, the system operates briefly as follows. The address of a desired plate stored in the plate storage tray 635 of the plate holder mechanism 604 is supplied from the computer to the input address register 801 of the plate servo system, and in shifting the new address into the input shift register 801 the address of the previously used plate is shifted into the storage address register 803 by clock pulses supplied from the computer through or gate 802. Simultaneously, a seek set signal pulse is supplied from the controller of the equipment which turns on the flip flop amplifier 825, and applies operating potential to the coincidence and gate 823. Concurrently with this action, the drive motor 819 is rotating the magnetic drum 808 so that data stored thereon in the form of magnetic marks is continuously being rotated past read out heads associated with each of the bit clock track 811, the word clock track 821, the plate record track 807, and the counter track 813. Data from the plate record track 807 is supplied through the selector switch 809 and read amplifier 806 to the input of the plate record address register 805, and is shifted through the plate record address register 805 by clock pulses supplied from the bit clock track 811. Upon the plate record address register 805 being filled, the word clock track will produce a word clock pulse in the output of the read amplifier 812 which is supplied to the coincidence and gate 823. The address contained in the plate record address register 805 is then compared to the address supplied to the input address register 801 by the computer through the comparator and gates 804*a* and 804*b*. If the two addresses are not identical, all of the comparator and gates 804*a* or 804*b* will not be opened, and hence all of the required operating potentials will not be supplied through or gates 810 to the coincidence and gate 823, so that and gate 823 will not be opened. A new plate record identification is then sequentially read into the plate record address register 805, and the process repeated until the plate record address contained in the plate record address register 805 is identical to the address supplied to the input address register 801 by the computer. Upon this occurrence, either of the comparator and gates 804*a* or 804*b* will supply operating potentials through all the or gates 810 to the coincidence and gate 823, and and gate 823 will open.

Opening of the coincidence and gate 823 supplies a set trigger pulse to the flip flop amplifier 826 which in turn opens the selector switch 809, and closes the and gates 815 and 817 of the counter address register 816. Concurrently with the above described operation, the counter track 813 is supplying identifying counter data pulses through a read amplifier and normally opened and gate 815 to the counter address register 816. These counter identifying numerals identify the particular point on the periphery of the magnetic drum 808 where an address then contained in the plate record address register 805 is located. As a consequence of the and gates 815 and 817 being closed, the counter identifying numerals the contained in the counter address register 816 are captured.

Upon the flip flop amplifier 826 being triggered to its set or on condition by the coincidence and gate 823, operating potential is also supplied to the servo start flip flop amplifier 831 to trigger that flip flop to its set condition. Flip flop 831 then supplies a positive operating potential to the amplifier 878 which energizes relay winding 877, and moves selector switch 876 from its grounded position to the position shown. This results in applying negative operating potential to the diode pyramid switch 851 which, by means of the first six flip flops in counter address register 816, connects the source of negative potential through de-coupling diodes 853 across a selected portion of the multitap resistor 855. This selected portion of the resistor 855 corresponds to the horizontal position of the desired plate identified by the address read into the input address register 801 from the computer. The last two flip flop amplifiers in the counter address register 816 operate through diode pyramid switch 852 to connect this negative operating potential across a selected portion of the multitap resistor 856 which corresponds to the vertical position of the desired plate. The servo motor 605 will then drive the variable tap 859 of potentiometer 655 to a position which will null out the unbalance across the Wheatstone bridge formed by resistors 655 and 855, and in doing so will drive the vertical stand 637 of the plate holding device 604 to a position corresponding to the horizontal position of the desired plate identified in the register supplied to address register 801. Servo motor 606 will likewise drive the movable tap of potentiometer 643 in the Wheatstone bridge formed by resistor 643 and 856 to a position to null out the unbalance in the voltage appearing across this Wheatstone bridge. In doing this, the servo motor 606 will position the plate holding tray 635 in a proper vertical position with respect to the plate extraction mechanism 602 in response to the address supplied from the computer to address register 801.

It should be noted that while the servo motors 605 and 606 receive an actuating potential due to the unbalance of the Wheatstone bridge associated therewith, sensitive relays 863 and 871 are actuated so that operating potentials are supplied to the detent solenoid windings 866 and 874. The solenoid windings 866 and 874 when energized release the detents which normally hold the plate holding device in a set position. Upon reaching a null position, the sensitive relay windings 863 and 871 are de-energized so that the switch contacts 872 and 864 are returned to their de-energized position de-energizing the solenoid windings 866 and 874 thereby setting the detents 656 and 657 which hold the plate holding device 604 in a set position. Simultaneously, the switch contacts 865 and 873 associated with the sensitive relays 863 and 871 are released to the position shown where they serve to apply a negative re-set pulse potential to the flip flop amplifier 831, and cause the flip flop amplifier 831 to be re-set. Upon flip flop amplifier 831 being re-set, amplifier 878 and holding relay 877 are released or de-energized thereby allowing the selector switch 876 to return to its grounded position. Also, resetting of flip flop amplifier 831 provides an output finished pulse which is supplied to the computer to indicate that the servo has completed its operation, and also to turn off the flip flop amplifier 825.

Concurrently with the setting of the plate servo motors 605 and 606, and hence the desired plate in the plate holding tray 635 in the plate loading position selected by the address supplied to input address register 801, the address contained in the storage address register 803 is written on the space on the plate record track 807 that was occupied by the desired plate whose identification address is now temporarily at least stored in input address register 801. This is accomplished by means of the delay tracks 833 and 836 and flip flop amplifiers 838 and 839 which operate to connect the storage address register 803 through and gate 844 to the write amplifier 845 at the precise point on the periphery on the plate record track 807 where the address supplied to the address register 801 had been located. The address contained in the address storage register 803 is then written into this space so as to make a permanent record of the location of the plate corresponding to the address contained in the storage address register 803 in the plate storage tray 635. The circuitry by which this is accomplished utilizes the delay tracks 833 and 836 which record the first word clock pulse occurring after the word clock pulse occurring at the end of the identification data of the desired plate, and through the medium of both delay tracks delays the development of a delayed and advanced trigger pulse to be applied to the flip flop amplifier 838 by not quite one complete revolution. This delay is adjusted so that the trigger pulse is applied to the flip flop amplifier 838 at a time when the plate record identification data space immediately preceding the space of identification data now stored in the address register 801 is passing under the plate record read out head. This delayed and advanced trigger pulse will then set the flip flop amplifier 838. It is understood that flip flop amplifier in going from the re-set to the set condition produces no negative polarity trigger pulse at its inverted output terminal so that the condition of flip flop amplifier 839 remains unaltered. Upon the occurrence of the next word clock pulse produced at the output of read amplifier 822, the flip flop amplifier 838 is triggered from its set to its re-set condition. This results in the production of a negative trigger output pulse at its inverted output terminal which is supplied to flip flop amplifier 839, and triggers it from its re-set to its set condition. This negative trigger pulse is also supplied through delay circuit 841 to and gate 842. It should be noted that this next word clock pulse is the one that immediately precedes the space in which desired data was located. Hence, the space that immediately follows this word clock pulse on the plate record track 807 is the space where the identification data contained in the storage address register 803 is to be written. For this purpose, the flip flop amplifier 839 in going to its set condition supplies a negative operating potential to and gates 843 and and gate 844 from its normal output terminal. The and gate 843 also has bit clock pulses supplied thereto from the bit clock track read out amplifier 812 which are then coupled down through or gate 802 to the storage address register 803 and shift out the address stored therein through the and gate 844 to write amplifier 845. The write amplifier 845 then supplies the stored address to the write head of the plate record track 807, and writes in the stored address in the space where the address now stored in the input address register 801 was located. After completion of writing in the stored address, and upon the occurrence of next word clock pulse, this word clock pulse passes through and gate 842 which now is enabled from delay circuit 841. The flip flop amplifier 839 is returned to its reset or off condition, thereby closing and gates 843 and 844.

When the horizontal and vertical servo systems reach the proper position and re-set flip flop amplifier 831, this flip flop amplifier provides a re-set pulse to flip flop 826 thereby de-energizing the hold off solenoid 828 and allowing the selector switch 809 to again connect the read out head of the plate record track 807 to read amplifier 806. This action also results in opening the and gates 815 and 817 of the counter address register 816. As a consequence of this operation, the address data of the plate which had been used in a prior operation and had been shifted into the storage address register 803 upon a new address being supplied to the input address register 801 by the computer, is recorded in the place on the plate record track 807 where the newly desired address data had been read out. This coincides with the operation of the plate storage and extraction mechanism 602–604 of removing a desired new plate, flipping the holder arms 661 and 662 over, and placing a previously used plate in the spot in the storage tray 635 of the plate holder where the desired new plate had been removed. It can, therefore, be appreciated that the plate record track 807 comprises a tabulating means for recording the location of each of the plates in the plate storage tray of the plate holding device 604.

*Plate servo comparison circuits*

Figure 24:
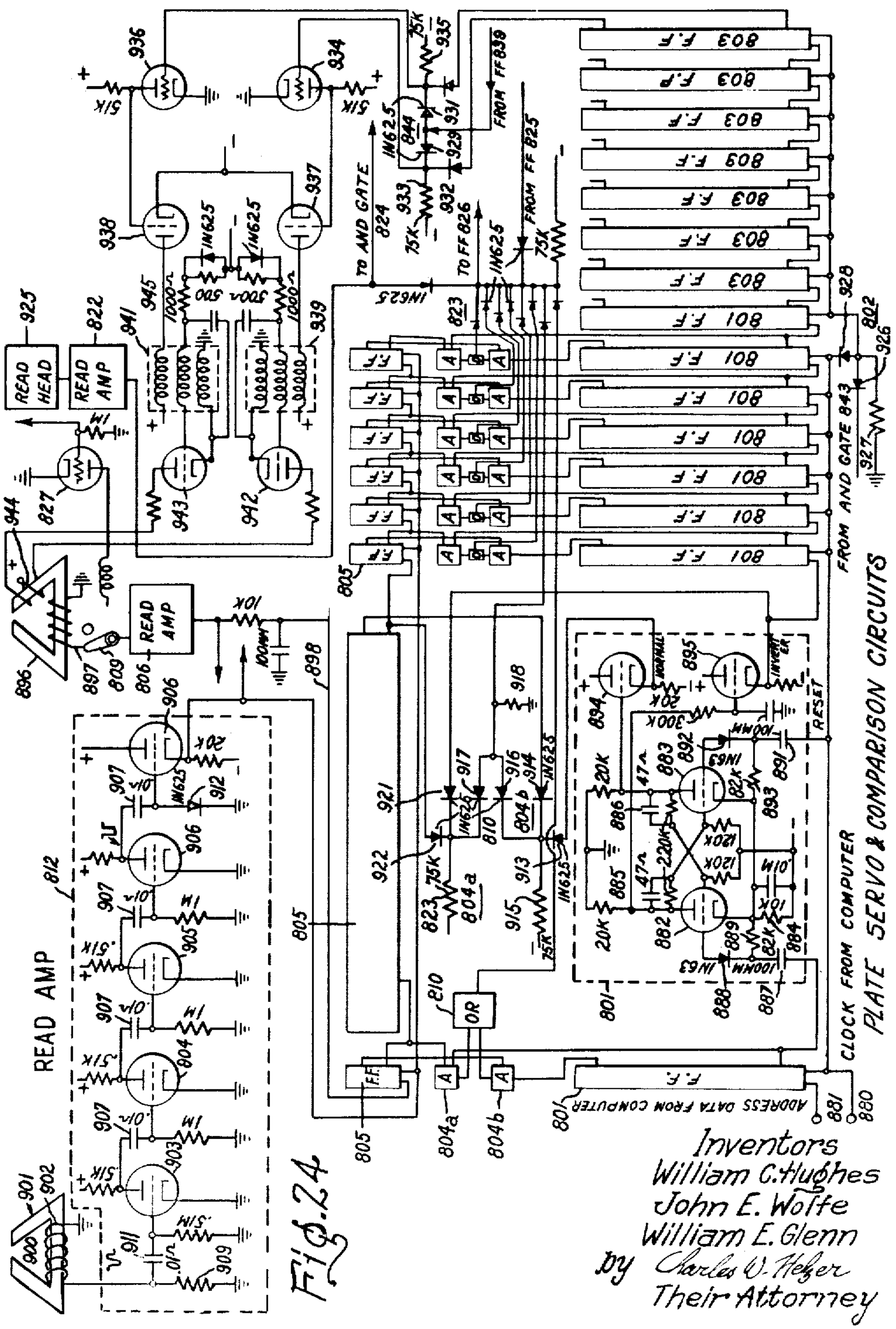
FIG. 24 is a circuit diagram of the comparision circuits comprising a part of the plate servo mechanism shown in FIG. 23.

The manner in which the flip flop amplifiers 801, 803 and 805 used in each of the address registers of the servo system are constructed, is shown in FIG. 24 of the drawings. For purpose of illustration, the second flip flop 801 of the input address register is shown and comprises a pair of triodes 882 and 883 having their cathodes connected to a source of negative potential through a common cathode resistor 884. The anodes of tubes 882 and 883 are connected through respective plate load resistors to ground, and the anodes and control grids of the two tubes are interconnected through parallel resistance-capacitance networks 885 and 886. The control electrodes of each of the triode electron tubes 882 and 883 are also connected through grid biasing resistors to the source of negative potential. Negative pulses representing the data to be stored in the input address register comprised by flip flop amplifiers 801 are supplied to set input of the flip flop which is formed by a triggering network comprised by a coupling capacitor 887 connected to the control grid of tube 882, and a resistor 889 connected between the juncture formed by the cathode or emitter of the diode rectifier 888 and capacitor 887 and the cathode of electron tube 882. Shift clock pulses for shifting data in one of the flip flop amplifiers to the next flip flop amplifier in the register are supplied through the conductor 880 from the computer to the reset input terminal of the flip flop which is formed by similar triggering network comprised by a coupling capacitor 891 connected to the control grid of tube 883 through a diode rectifier 892, and a resistor 893 connected between the cathode of the electron tube 883 and the juncture formed by the diode rectifier 892 and capacitor 891. Output potentials are derived from the flip flop amplifiers 801 by a cathode follower amplifier 894 which comprises the normal output of flip flop 801, and has its control grid connected directly to the plate of electron tupbe 883. Output potentials are also derived from a cathode follower amplifier 895 which forms the inverse output of flip flop 801, and has it control grid connected through a time delay network to the anode of electron tube 882. In its set or on condition, the flip flop amplifier 801 provides a negative enabling potential to the and gate 804*b* connected to its normal output, and to do this the electron tube 883 must be conducting. Accordingly, in the re-set or off condition of the flip flop amplifier 801, the electron tube 882 is conducting, and provides a negative enabling potential from its inverse output to the and gate 804*a* connected thereto.

Assuming flip flop 801 to be in the reset or zero condition by reason of a shift clock pulse, upon a negative polarity data pulse representing a one being supplied to the flip flop amplifier 801 from the previous flip flop diode rectifier 888 becomes conductive and applies a negative pulse potential to the control grid of electron tube 882. This results in driving electron tube 882 towards its cut off condition so that the positive potential applied to the control grid of electron tube 883 takes over and renders electron tube 883 conductive. As electron tube 883 swings towards its fully conductive condition, a positive bias built up across the common cathode resistor drives electron tube 882 into its cut off condition, and results in the production of a pulsed negative potential in the plate circuit of tube 883 that is supplied to the and gate 804*b*. Upon the next shift clock pulse being supplied to the flip flop amplifier 801 from the source of clock pulses in the computer, the reverse procedure takes place with the control grid of the electron tube 883 having a negative trigger pulse applied thereto. This results in driving the electron tube 883 towards cut off, and allowing electron tube 882 to again become conductive, and return the flip flop to its reset or zero condition. This results in applying a negative potential to the and gate 804*a*. Also, in going from its set to its reset condition, the flip flop will produce a negative trigger pulse at its inverse output terminal which is applied as a carry trigger potential to the control grid of the electron tube 882 in the next succeeding flip flop 801 in the address register. As a result, the data pulse which represents a one (1) in the binary address being shifted into the register, after a slight delay in the cathode follower to allow the shift clock pulse time to return to zero, is applied to the next flip flop in the line to set it to the set or one condition. It can be appreciated that if the particular data bit had been a zero, represented by the flip flops 801 when in their reset condition, then the shift clock pulse would have had no effect on the condition of flip flop 801, and accordingly no negative carry pulse would have been supplied to the next flip flop in the register to trigger it to its set or (1) condition upon the application of the negative shift clock pulse. As a result, the next flip flop in the register would be left in its reset condition, thereby representing the binary zero.

This setting and re-setting process just described is repeated throughout the entire line or string of flip flop amplifiers 801 comprising the input address register until all of the flip flops have been conditioned in accordance with the input address data supplied from the computer. Since there are eight flip flop amplifiers in the address register, and each flip flop is capable of two stable states of operation, it is possible to achieve a total of 256 different output operating conditions of the register. Since there are 256 plates stored in the plate storage device, each plate then can be represented by an operating condition of the address register. Concurrently wtih the shifting in of the address data of a newly desired plate into the input address register, the address data of a previously used plate is shifted into the storage address register 803 in a similar fashion.

As set forth in the description of the block diagram of the plate selection servo system, the magnetic memory drum 808 which comprises a part of the plate servo system, includes a plate record track on which there are 256 different eight digit plate record identifying numerals in binary form. The plate record identifying numerals on the plate record track of the drum are continuously read out by a magnetic pick up head which is comprised by a magnetizable core member 896 having a read out coil 897 wound therearound, and connected through a selector switch 898 to the input of read amplifier 806. The output of the read amplifier 806 is then supplied through conductor 899 to the data or set input terminal of flip flop amplifier 805 comprising part of a plate record address register. There are a total of eight flip flop amplifiers 805 in the plate record address register, which are identical in construction and operation to the flip flop amplifier 801 comprised by electron tubes 882 and 883, so that the plate record address register is capable of 256 different operating conditions similar to the input address register made up by the flip flop amplifiers 801. Shift clock pulses are supplied to the plate record address register 805 from a read out coil 902 wound around a core 901 of a read head which develops an output clock pulse from the bit clock track formed on the magnetic memory drum 808. The read out coil 902 is connected to the input of a read amplifier 812 which is identical in construction to the read amplifiers 806 and 822.

Bit clock pulse signals that are obtained from the read out coil 902 are supplied to the input of the read amplifier 812 across a load resistor 909 which is coupled to the control grid of the first stage electron tube 903 of the amplifier through a coupling capacitor 911. Output signals from the amplifier 812 are obtained from the plate load resistor of the last triode electron tube 906 which is biased beyond cut off to act as a threshold device. These pulsed wave form output signals are applied across coupling capacitor 907 to a clamping diode 912 which in turn is connected to the control grid of a cathode follower amplifier tube 908. The cathode follower amplifier 908 has its cathode load resistor connected to the reset input terminal of the first flip-flop 805 in the plate record address register. The read amplifier 812 thus comprised then operates as a conventional resistance-capacitance coupled video amplifier for amplifying and shaping somewhat the pulsed electric signals produced by the read out coil 902, and to couple the shaped and amplified signal pulses through the cathode follower output stage 908 to the reset input terminals of all of the flip flop amplifiers 805. These pulsed wave form signals then serve as shift clock pulses to shift the data read into the set input terminals of the first flip flop amplifier 805 in the register through all of the flip flop amplifiers 805, thereby serving to read into the plate record address register the plate record identification numerals being serially read out from the plate record track by read out head 896 and read amplifier 806.

Each of the flip flop amplifiers 805 is triggered to either its set or reset condition, depending upon the data read from the plate record track of the magnetic memory drum. To use this data, each of the flip flops 805 has its normal output terminal connected to an input terminal of and gate 804*a*, and the inverse output terminal thereof connected to an input terminal of and gate 804*b*. The inverse output terminal of the flip flops 805 are also connected to the set input terminals of the next flip flop in the register to provide carry trigger pulses thereto. Each of and gate 804*a*, and thei nverse output terminal thereof of the and gates 804*b* comprises a rectifier 913 having its collector or plate electrode connected to the normal output terminal of the flip flop amplifier 801 formed to the cathode load resistor of the cathode follower amplifier 894. And gate 804*b* further includes a second diode rectifier 914 also having its collector or anode electrode connected to the normal output of a respective associated flip flop amplifier 801. The emitter or cathode electrodes of the diode rectifiers 913 and 914 are connected to a load resistor 915 which in turn is connected to a source of negative potential. They are also connected to the collector anode electrode of a diode rectifier 916 of an associated or gate 810. For a more detailed description of the construction and operation of the and gates 804*b*, reference is made to page 397 of the textbook by Millman and Taub entitled, Pulse and Digital Circuits, published by McGraw-Hill Book Company, New York, N.Y., 1956. It is believed sufficient, however, to point out that upon a negative potential being applied to both of the diode rectifiers 913 and 914 by their associated flip flop amplifiers 801 and 805 when they are both set to the one (1) condition, the end of the load resistor 915 to which the diode rectifiers are connected have negative blocking potentials applied thereto so that the negative potential applied to load resistor 915 is then applied to or gate diode rectifier 916 to cause the or gate to open and apply an enabling potential to diode rectifier 919 of coincidence and gate 823.

As previously mentioned, each of the comparator and gates 804*b* functions in this manner.

In the preceding description it was assumed that each of the flip flop amplifiers 801 in the computer address register and the flip flop amplifier 805 in the plate record address register were in the set or one condition where the electron tube 883 is conducting, and a negative potential is supplied through the cathode resistor of the cathode follower amplifier 894 in each flip flop to the diode rectifiers 914 and 913, respectively. It can be appreciated that if the two flip flop amplifiers associated with any particular and gate are in the zero condition, then coincidence negative potentials would not be supplied to the diode rectifiers 913 and 914 and the and gate 804*b* would not open. Accordingly, to show coincidence where the two flip flop amplifiers 801 and 805 associated with a particular comparator and gate circuit are both in the reset or zero condition, the inverse output terminal of each associated flip flop amplifier 801 and 805 is concted through a respective diode rectifier 921 and 922 of an and gate 804*a* further comprised by a load resistor 923 connected to a source of negative potential. The and gate 804*a* is in turn connected to a diode rectifier 917 of the or gate 810. By this arrangement, if both of the flip flop amplifiers 801 and 805 associated with the comparator and circuit 804*b* are in the reset or zero condition, negative potentials will be supplied from the inverse output terminals of each flip flop 801 and 805 to the diode rectifiers 921 and 922, respectively of their associated and gate 804*b*. Coincidence between these two negative potentials will open the and gate 804*b*, which will then be coupled through the or gate rectifier 917 of or gate 810 to the and gate rectifier 919 of coincidence and gate 823. It can be appreciated that if one of the flip flop amplifiers, for example flip flop amplifier 801, is in the set of one condition, and the other of the flip flop amplifiers 805 is in the zero of reset condition, that neither of the associated comparator and gates 804*a* and 804*b* will be opened since the two flip flops will not be in coincidence, and accordingly an output potential will not be supplied to the coincidence and gate rectifier connected to the particular comparator and gate. As a result, operating potentials will not be supplied to all of the diode rectifiers in the coincidence and gate 823 until there is coincidence in the binary identification address contained in the plate record address register 805, and the input address register 801. Upon coincidence occurring between these two addresses, the coincidence and gate 823 will be opened and output operating potential will be supplied to the logic circuits as will be described hereinafter. It should be noted coincidence and gate 823 also has enabling potentials supplied thereto from the on-off flip flop 825 and from the word clock track read amplifier 822. Amplifier 822 supplies word clock pulses at the end of each word or identification numeral recorded on the plate record track to coincidence and gate 823 which in a sense checks the coincidence and gate 823 at the end of each word to determine whether there is coincidence in the address data contained in the two address registers 805 and 801. If there is coincidence, then of course the and gate 823 opens, and supplies operating potential to the logic circuits connected thereto.

Subsequent to the positioning of the plate storage tray in the manner described in connection with the block diagram of FIG. 20 of the drawings, the old address of a previously used plate which will be inserted in the place in the storage tray where the newly requested plate is located, is shifted out of the storage address register comprised by the flip flop amplifiers 803, and is written on the plate record track of the magnetic memory drum. To accomplish this, bit clock pulses are supplied through a diode rectifier 926 to or gate 802 which further includes a load resistor 927, and a diode rectifier 928. Or gate 802 supplies the bit clock shift pulses to the storage register comprised by flip flop amplifiers 803 which are identical in construction to flip flop amplifier 801 and function in precisely the same manner to supply a series of pulsed output potentials representing the address data to and gate 844. And gate 844 comprises a pair of back-to-back diode rectifiers 929 and 931 whose common junction has an operating potential supplied thereto from the flip flop amplifier 839 of the logic circuits of the equipment. The diode rectifier 929 has its emitter or cathode element connected with the emitter or cathode element of a second diode rectifier 932 through a load resistor 933 to a source negative potential. The load resistor 933 is connected to the control grid of a triode electron tube 934. The cathode or emitter element of the diode rectifier 932 is connected directly to the inverse output terminal of the last flip flop amplifier 803 in the storage register, across which the data signals to be written will appear. The cathode or emitter element diode 931 is also connected through a load resistor 935 to a source of negative potential and to the control grid of a triode electron tube 936. Upon receiving an enabling potential from the flip flop amplifier 839 of the logic circuits, the and gate 844 connects the data signals from the last flip flop amplifier 803 in the storage register to the control grids of electron tubes 934 and 936 of writing amplifier 845.

Each of the electron tubes 934 and 936 have their cathode electrodes grounded and the plates thereof connected through suitable load resistors to a source of positive plate potential, and to the control grids of electron tubes 937 and 938, respectively. Electron tubes 937 and 938 have their cathodes connected in common to a source of negative potential, and the anodes thereof connected through the primary windings of associated coupling transformers 939 and 941, respectively, to a source of positive potential. Each of the coupling transformers 939 and 941 have two primary windings, the other of which is connected to the cathode electrode of a respective associated electron tube 942 or 943 with secondary winding being connected to the control electrode of the associated tube 943 or 942. Operating bias is supplied to the control grid of each of the electron tubes 942 and 943 from a source of negative potential coupled to a resistance voltage dividing network. The anode electrodes of the electron tubes 942 and 943 are connected through resistors to opposite ends of a read-in coil 944 wound around the core member 896 of the read-in head associated with the plate record track of the magnetic memory drum. The read-in coil 944 has a center tap which is connected to a source of positive potential. The construction and operation of writing amplifier 845 is described in greater detail in an article entitled, Combined Reading and Writing on a Magnetic Drum, by J. H. McGuigan, appearing in the Proceedings of the I.R.E. on page 1438 of the October 1953, volume 41 issue. The writing amplifier operates as a pair of blocking oscillators to develop two pulsed wave form signals of opposite polarity representing the ones (1's) and the zeros (0's) in the binary address data being read out of the storage register comprised by flip flop amplifiers 803, and to apply these opposite polarity pulsed wave form signals to the read-in coil 944 to appropriately magnetize the plate record track of the magnetic memory drum in accordance with these signals.

Figures 25, 26:
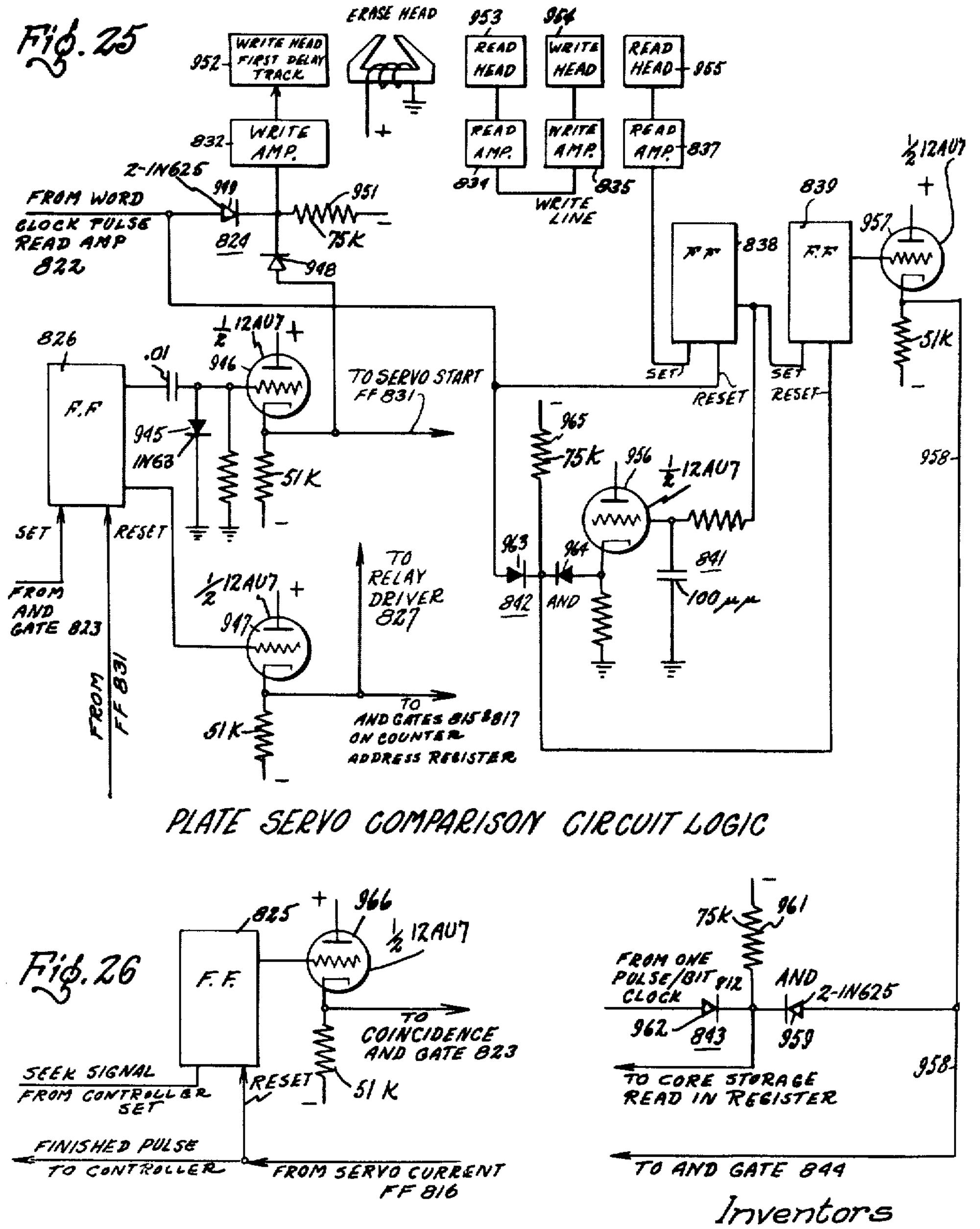
FIG. 25 is a circuit diagram of the delay and re-write logic circuits comprising a part of the servo mechanism shown in FIG. 23.
FIG. 26 is a functional block diagram showing the start circuit connections of the plate servo mechanism illustrated in FIG. 23 of the drawings.

The details of construction of the plate servo comparison circuit logic are illustrated in FIG. 25 of the drawings. The pulsed enabling potential supplied from the coincidence and gate 823 is applied to the set input terminal of a flip flop amplifier 826 which is identical in construction to the flip flop amplifier 801, shown in FIG. 24 of the drawings. This pulsed potential sets flip flop 826, thereby placing it in its one condition wherein a negative output potential is produced at its normal output terminal, and coupled through a coupling capacitor across a clamping diode 945 to the control grid of a cathode follower amplifier 946. The inverse output of flip flop amplifier 826 provides a positive going potential pulse which is applied to the control grid of a cathode follower amplifier 947 whose load resistor is connected to the relay driver 827 that operates the selector switch 809 on the plate record read out amplifier. This positive potential is also supplied to and gates 815 and 817 of the counter address register. The negative going potential pulse applied to the control grid of cathode follower amplifier 946 cuts that amplifier tube off so that a negative triggering potential is applied to the servo start flip flop amplifier 831, and to a rectifier 948 of and gate 824. And gate 824 further includes a rectifier 949 connected to the output of word clock pulse amplifier 822, and a load resistor 951 connected to a negative potential source. Upon the simultaneous occurrence of a negative potential triggering pulse from the cathode load resistor of cathode follower 946, and the next negative going word clock pulse occurring after the word clock pulse which occurred at the end of the data which opened coincidence and gate 823, and gate 824 opens and applies a triggering potential through white amplifier 832 to write head 952 to mark the delay clock track 833 of the magnetic memory drum 808. The write amplifier 832 is similar in construction to the write amplifier 845, shown in FIG. 24 of the drawings, and the write head 952 is similar in construction to the write heads 896 and 944 thereof. The magnetic mark placed on the delay track of the magnetic memory drum 808 by write head 952 is read out by a read head 953 and supplied through read amplifier 834, and write amplifier 835 to a second write head 954 to place a delayed and advance magnetic mark on the second delay track 836. The read and write heads 955 and 954, and the two read amplifiers 834 and write amplifier 835, are identical in construction to previously described circuits which perform the same function and hence, have been shown in block diagram form. The magnetic word mark placed on the delay track 836 by write head 9545, is read off by read head 955 and supplied through read amplifier 837 to the set input terminal of flip flop amplifier 838. Flip flop 838 is identical in construction to the flip flop amplifier 801, shown in detail in FIG. 24 of the drawings. Flip flop 838 has its inverse output circuit coupled to a flip flop amplifier 839, and through a time delay circuit 841 to a cathode follower amplifier 956. The flip flop amplifier 839 also is identical to the flip flop amplifier 801 shown in detail in FIG. 24 of the drawings so that in its set or one condition, it produces a negative output potential at its normal output terminal that is applied to the control grid of a cathode follower amplifier 957. It should be noted that the word clock pulse that serves to re-set flip flop amplifier 838, and therefore set flip flop amplifier 839, was the word pulse which marks the beginning of the space on the plate record track where it is desired to write the address stored in the address storage register 803. Flip flop amplifier 839 in going to its set condition develops a negative potential which cuts off cathode follower amplifier 957 and applies a negative enabling potential through the conductor 958 to a diode rectifier 959 of and gate 843. And gate 843 further includes a load resistor 961 which is connected to a source of negative potential, and a diode rectifier 962 which has bit pulses supplied thereto from the bit clock pulse read out head and amplifier 812. This serves to open the and gate 843, and apply the bit clock pulses to the storage register 803 to shift out the identification data stored therein, and apply it through and gate 844 which is simultaneously opened by the application of the negative potential from flip flop 839 through conductor 958. As shown in FIG. 24 of the drawings, data read out from the register is supplied through the and gate 844 to write amplifier comprised by electron tubes 942 and 943 to the read in coils 944 on the write head 896 of the plate record track of the magnetic memory drum. In this fashion the address data stored in storage resistor 803 is written back on the plate record track of the magnetic memory drum 808 at the point where the plate now in use by the plate servo system had been recorded. This corresponds with the practice of the plate extraction mechanism replacing the previously used plate in the position in the plate holding tray 635 where a desired plate had been removed. Upon completing reading out of the storage register 803, a word clock pulse will occur which will mark the end of the identification data read out of the storage register 803, and this word clock pulse will be applied to a diode rectifier 963 of and gate 842. And gate 842 further includes a diode rectifier 964, and load resistor 965 connected to a source of negative potential. The diode rectifier 964 is connected across the cathode load resistor of cathode follower amplifier 956 so that it has the negative potential appearing at the output of flip flop amplifier 838 applied thereto, through the delay circuit 841. Upon the appearance of the word clock pulse at the end of the data, the and gate 842 opens, and supplies a re-seting pulse to the flip flop amplifier 839. Flip flop amplifier 839 is then re-set from its one to its zero condition, resulting in closing and gates 843 and 844.

The flip flop amplifier 825 which turns on the plate servo system is shown in FIG. 26 of the drawings, and is identical in construction to the flip flop 801, shown in detail in FIG. 24 of the drawings. A seek signal command is supplied to the flip flop amplifier 825 which sets it to the one condition. In the set or one condition flip flop amplifier 825 provides a negative potential at its normal output terminal that is applied to the control grid of a cathode follower amplifier 966, and turns that amplifier off. As a result, the source of negative potential coupled to the cathode lead resistor of cathode follower amplifier 963 is connected to coincidence and gate 823, and remains connected to this and gate throughout the entire cycle of operation heretofore described. Upon completion of selection of a new plate by the servo system, a finished signal will be supplied from the servo circuit that is supplied to the computer, and also serves to re-set flip flop amplifier 825 to its re-set or zero cndition.

Figure 27:
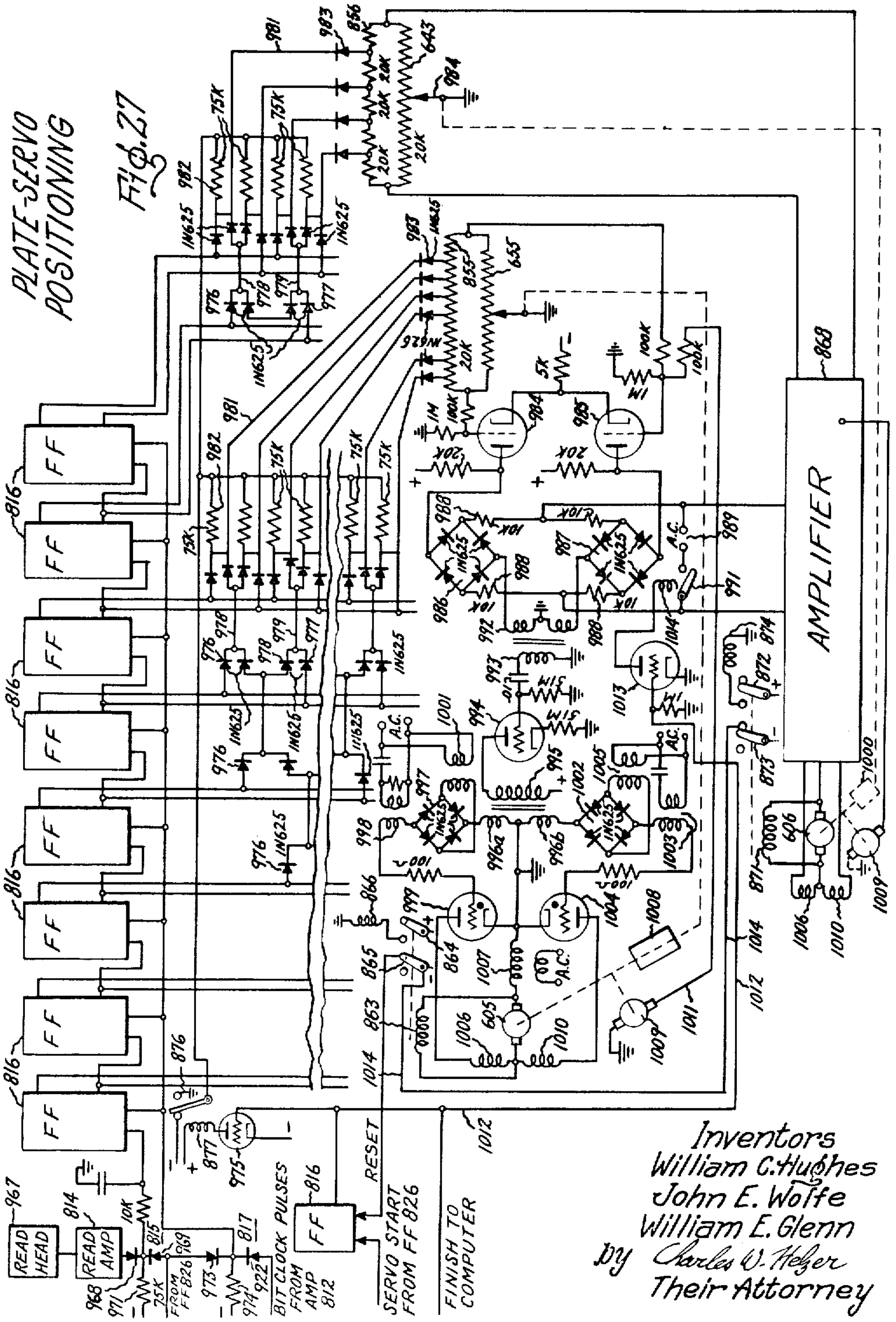
FIG. 27 is a combined block diagram and circuit diagram showing the details of construction of the servo motor addressing and driving circuits that are used in the plate servo mechanism shown in FIG. 23.

The details of construction of the plate servo positioning circuitry are shown in FIGURE 27 of the drawings. Simultaneously with the address comparison operation being carried out by the circuit shown in FIGURE 24, the read head 967 under the counter track 813 of the magnetic memory drum 808 is serially reading out each of the 256 binary identification numerals recording thereon, and supplying this data through the read amplifier 814, and normally opened and gate 815 to the counter shift register comprised by the flip flop amplifiers 816. The and gate 815 is formed by a pair of diode rectifiers 968 and 969 having a load resistor 971 connected to a source of negative potential.

Data being read out through the and gate 815 is supplied across a resistance-capacitance delay network to the set input terminal of the first of the flip flop amplifiers 816 in the counter shift register. The counter data pulses supplied to the shift register comprised by the flip flop amplifier 816 is shifted through the register by shift clock pulses supplied from the bit clock track of the magnetic storage drum through and gate 817 which is formed by a rectifier 972 connected to read amplifier 812 of the bit clock track read head. And gate 817 further includes a diode rectifier 973, and load resistor 974 connected to a source of negative potential. A negative gating potential is normally supplied to the diode rectifier 969 of and gate 815, and diode rectifier 973 of and gate 817 from the flip flop amplifier 826. As was previously explained this gating potential is removed upon the coincidence and gate 823 opening which occurs only when there is coincidence between the address supplied from the computer, and the address of a plate recorded on the plate record track. Upon this gating potential being removed from the diode rectifiers 969 and 973, the and gates 815 and 817 are closed and capture the counter identification numeral then stored in the counter shift register. Simultaneous with the closing of the and gates 815 and 817, a servo start pulse is received from the comparison circuits, and is applied to the flip flop amplifier 816 to set that flip flop to its one condition. Setting of the flip flop amplifier 816 applies a positive biasing potential to the control grid of an amplifier 975 to render it conductive. Amplifier 975 has relay coil 877 connected to the plate thereof which is energized and draws the movable contact 876 associated therewith to the position shown where a negative operating potential is supplied to the selector pyramid diode switches to be described hereinafter.

The first six flip flop amplifiers 816 in the counter shift register have both of their outputs connected through a pyramid diode switch made up of individual rectifiers such as those indicated at 976, and a series of load resistors 982. The design and construction of the pyramid diode switches is disclosed more fully in the textbook by Richards entitled, Digital Computer Components and Circuits, published by D. Van Nostrand Company; see for example pages 40–42 thereof. For the purpose of illustration, the diode rectifiers in the pyramid switch are connected in sets of four each with each set of four rectifiers having two terminals connected across each of the output lines from a flip flop amplifier 816 as shown by the diode rectifiers 976 and 977. The set of four rectifiers thus comprised will then have two output lines 978 and 979 which will be connected to two sets of such diode rectifiers so that the sets of diode rectifiers will increase progressively as one moves from the first of the flip flop amplifiers 816 to the sixth or last of the flip flop amplifiers in the set where there will be a total of 64 output lines as indicated at 981. Each output line 981 has an associated load resistor 982 by means of which it can be connected through selector switch 876 to the source of negative potential, and is connected through a diode rectifier such as 983 to a tap off point on multitap resistor 855. Since there are a total of 64 such tap off points, it is not considered feasible or necessary to show all 64 tap off points. The last two flip flop amplifiers in the counter shift register are connected through a similar diode pyramid switch arrangement to provide four tap off connections 981 from multitap resistor 856. Upon reading a particular address into the counter shift register comprised by the flip flop amplifiers 816, and actuating the selector switch 876 to provide a negative operating potential to the load resistors 982, only one tap off connection 981 determined by the address in the counter register will effectively couple the source of negative potential through the selector switch 876 to a point on the multitap resistor 855, and similarly to a point on multitap resistor 856. Accordingly, this arrangement will provide 64 different characteristic settings for the multitap resistor 855, and four characteristic settings for the multitap resistor 856. The 64 characteristic settings of the multitap resistor 855 corresponds to the 64 horizontal positions in which the plate storage tray 635 of the plate holding mechanism 604 can be positioned, and the four characteristic settings of the variable tap resistor 856 correspond to the four vertical positions in which the plate holding tray 635 can be positioned. It should be noted that in reaching any of these characteristic settings, energizing potential is supplied to the multitap resistors 855 and 856. The multitap resistor 855 has the potentiometer resistor 655 connected in parallel therewith which has a grounded tap off point 859. Similarly, the multitap resistor 856 has the potentiometer resistor 643 connected in parallel therewith which has a grounded tap off point 983. The two sets parallel connected resistors 855 and 655 and 856 and 643 thus comprise Wheatstone bridges which derive unbalance output potentials indicative of the positions to which the plate holding tray of the plate holder mechanism should be driven.

The unbalanced potential appearing across the Wheatstone bridge comprised by resistors 855 and 655 is supplied to the control grids of a pair of triode electron discharge tubes 984 and 985 with the control grid of electron tubes 984 being connected to one end of the Wheatstone bridge and the control grid of electron tube 985 is being connected to the remaining end of the bridge. The control grids of each of the electron tubes are also connected through grid biasing resistors to ground, and the cathodes of the tube are connected through a common cathode resistor to a source of negative potential. The anode of electron tube 984 is connected to a source of positive potential through a suitable plate load resistor, and also is connected to a diode rectifier bridge 986. The anode of electron tube 985 is connected to a source of positive plate potential through a suitable plate load resistor, and is also connected to a seocnd diode rectifier bridge 987. Corresponding ends of the two diode rectifier bridges 986 and 987 are inter-connected by a matching resistor 988, and a source of A.C. switching potential 989 is connected thereacross by means of a selector switch 991. The remaining terminal of each diode rectifier bridge 986 and 987 is connected to one end of a split primary winding 992 of a coupling transformer which has the midtap point of the primary grounded. The secondary winding 993 of the coupling transformer is connected through an R.C. coupling network to the control grid of a triode electron tube 994, which has its anode electrode connected through a primary winding 995 of a second coupling transformer to a source of positive potential. The second coupling transformer has its secondary winding 996 connected to ground at a midtap point so as to form two windings **996*a* and 996*b*. Secondary winding 996*a* is connected in series circuit relationship with a second diode rectifier bridge 997 and a secondary winding 998 of a coupling transformer through a resistor to the control grid of a thyratron gas discharge tube 999. The rectifier bridge 997 is excited from the secondary winding of a coupling transformer 1001 having its primary winding connected to a source of A.C. energy together with the primary winding of a coupling transformer further comprised by the secondray winding 998. The secondary winding 996*b* is connected in series circuit relationship with a diode rectifier bridge 1002, and the secondary winding 1003 of a coupling transformer through a resistor to the control grid of a thyratron gas discharge tube 1004. The diode rectifier bridge 1002 is excited by the secondary winding of a coupling transformer 1005 which has its primary winding connected together with the primary winding of the coupling transformer further comprised by secondary winding 1003 to a source of A.C. energy. The anode of gas discharge tube 999 is connected to the field winding 1006 of alternating current servo motor 605, and the anode of gas discharge tube 1004 is connected to the field winding 1006 of servo motor 605. The rotor winding of servo motor 605 is indicated at 1007 and is excited from a source of A.C. energy. As described in connection with FIGURE 21, the rotor of servo motor 605 is mechanically connected through a rack and pinion gear to the movable contact 859 of potentiometer resistor 655. Servo motor 605 is also mechanically coupled to a rate generator 1009 whose output is coupled back through a conductor 1011 to the control grid of the triode electron discharge tube 985**.

Upon the occurrence of an unbalance signal across the Wheatstone bridge comprised by the multitap resistor 855 and resistor 655, the unbalanced potential will be applied to the control grids of the differential amplifier formed by electron tubes 984 and 985 where it will be amplified and applied to the opposite terminals of the diode rectifier bridges 986 and 987. The diode rectifier bridges 986 and 987 will have the source of A.C. signals 989 coupled thereacross by the selector 991 upon actuation of the servo mechanism by flip flop amplifier 816 which supplies a positive potential from its inverse output terminal through a conductor 1012 to the control grid of an electron tube 1013 that has its anode connected to a source of positive potential through a relay winding 1014 that actuates the selector switch 991. Diode rectifier bridges 986 and 987 operate as an alternating current switch for connecting the source of A.C. across the primary winding 992, in response to the unbalance potential supplied from difference amplifiers 984, 985. As a result an alternating current error signal is induced in the secondary winding 993 whose phase and amplitude is dependent upon the polarity and amplitude of the unbalance potential appearing across the Wheatstone bridge. This A.C. error signal is then amplified by the electron tube 994 and supplied through coupling 995 to the secondary windings **996*a* and 996*b*. At this point, D.C. bias potentials are supplied to the gas discharge electron tubes 999 and 1004 by the A.C. bias windings 998 and 1003, and by the rectifier bridges 997 and 1002. The control signal induced in windings 996*a* and 996*b* is added to the A.C. voltage induced in windings 998 and 1003, the voltage induced in windings 998 and 1003 being of the same frequency as the control voltage induced in windings 996*a* and 996*b*. The addition of these two voltages forms a composite control voltage which has a phase shift which is dependent upon the magnitude of the voltage induced in coils 996*a* and 996*b*. The composite control signal is supplied to the control grids of gas discharge tubes 999 and 1004 thereby achieving phase shift control of their firing point. Tubes 994 and 1004 are connected in push-pull fashion to the field windings 1006 and 1010. In response to this composite control signal, the rotor of the servo motor 605 will be rotated in a direction to null out the unbalance voltage appearing across the Wheatstone bridge. During rotation of servo motor 605, rate generator 1009 will develop an error signal which is proportional to the rate of change of movements of the servo motor 605, and this rate signal is fed back to the amplifier 995 to stabilize the system to prevent oscillation about the null point. In arriving at the null point, servo motor 605 will drive the plate holding tray 635** of the plate holding mechanism to a correct horizontal position in response to the address from the computer, and then come to a stop.

The amplifying circuit 868 connected across the Wheatstone bridge formed by the multitap resistor 856 and potentiometer resistor 643 is constructed similar to the amplifying circuit just described, and functions in the same manner to drive the servo motor 606 to null the unbalance potential appearing across the output terminals of its associated Wheatstone bridge. In doing this, servo motor 606 will drive the plate holding tray of the plate holding mechanism to its proper vertical position, and then come to a stop.

The serve motor 605 has a sensitive relay winding 863 connected across its field winding 1006 so that upon an amplified unbalance signal being applied to the field winding, the sensitive relay winding 863 is energized. The sensitive relay winding 863 actuates the movable contacts 864 and 865 of a selector switch which functions to connect a source of positive potential to a solenoid winding 866, and to connect a conductor 1014 to a second selector switch 873. The selector switch 873 is connected to a source of negative potential, and is actuated together with a second selector switch 874 by a sensitive relay winding 871 connected across the field winding of the servo motor 606. The selector switch 874 is similarly connected to a source of positive potential, and serves to connect a solenoid winding 874 thereto. The solenoid windings 866 and 874 actuate the detent holding mechanisms on the plate holding tray, and the vertical stand upon which the tray moves vertically, allowing these two elements of the plate holding device to be moved by the servo motors 605 and 606. Upon each of the servo motors 605 and 606 driving their associated variable tap connections 859 and 983 to a null position so that no unbalance voltage is applied to the field windings of either motor, the sensitive relays 863 and 871 are de-energized, and the switch contacts 864, and 872 are disconnected from the relay solenoid windings 866 and 874, respectively, allowing these solenoids to be released thereby again setting the detents. Conversely, the selector switches 873 and 865 are returned to the position shown so that the negative potential is supplied through the conductor 1014 and selector switches 873 and 865 to the flip flop amplifier 816 to re-set the flip flop 816. Upon the flip flop 816 being re-set, the positive potential applied to amplifier 975 is removed allowing relay 877 to drop out which causes contact 876 to disconnect the source of negative potential from the diode pyramid switches. This results in de-energizing the servo systems. Simultaneously, a negative going finish pulse is supplied to the servo seek flip flop amplifier 825, and provides a finish indication to the computer.

*Writing system*

Figure 28:
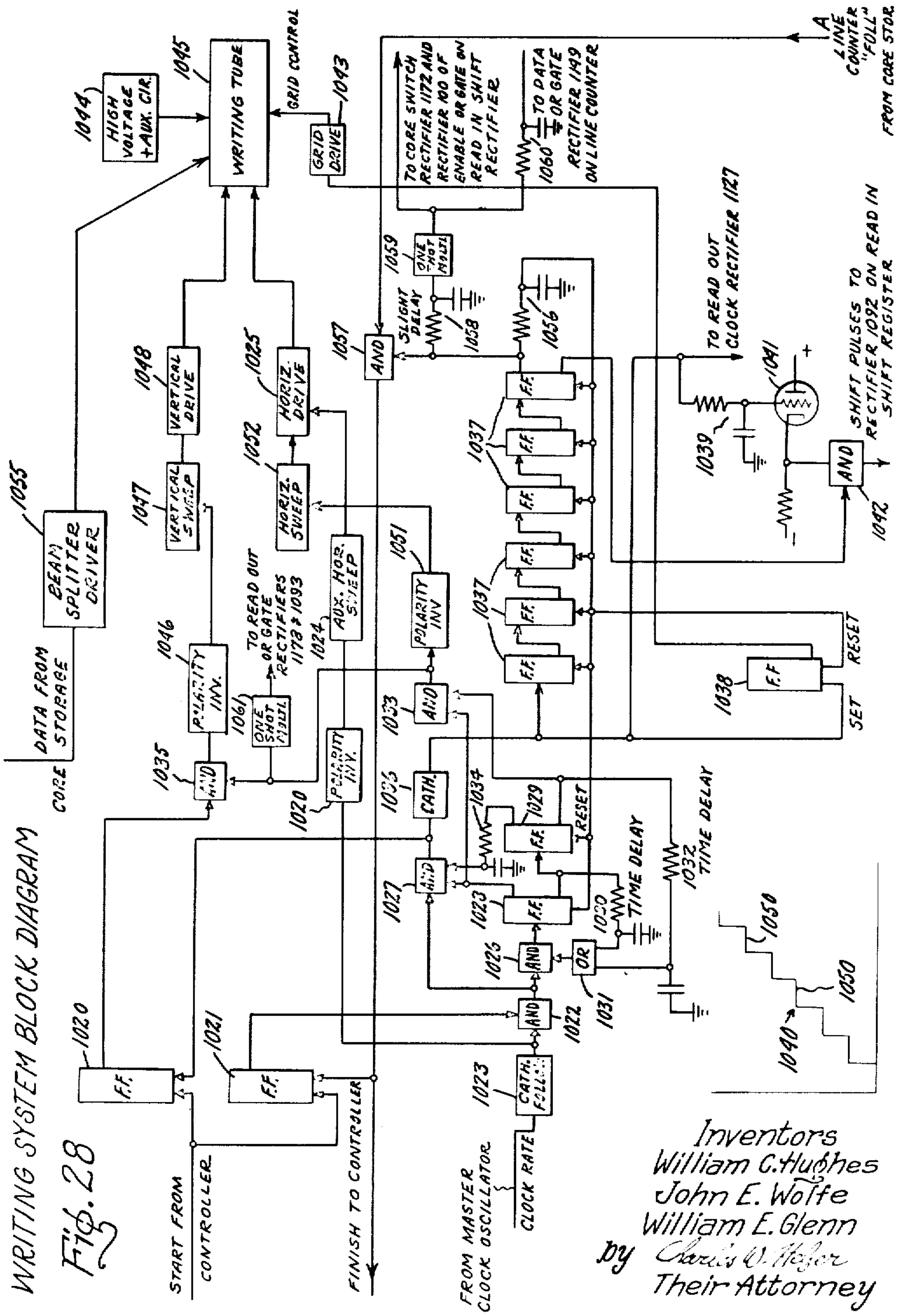
FIG. 28 is a functional block diagram of the writing system comprising a part of the plate storage equipment shown in FIG. 20.

The functional block diagram of the writing system of the plate data storage equipment is illustrated in FIG. 28 of the drawings. A start signal supplied from the controller of the equipment is applied to a flip flop amplifier 1020 which sets this flip flop to the set or one condition, and is also supplied to a second flip flop amplifier 1021 and sets this flip flop amplifier to the set or one condition. In the set or one condition, the normal output terminal of flip flop amplifier 1021 provides a negative potential to one input of an and gate 1022. And gate 1022 has a second input connected to a cathode follower 1023, to which shift clock pulses at the bit rate (320,000 c.p.s.) are supplied from a master clock oscillator of the equipment. The output of cathode follower amplifier 1023 is also supplied through a polarity inverter circuit 1020 to an auxiliary sweep circuit 1024 that develops a bit frequency saw tooth wave from potential which is synchronized with the bit clock rate and which is supplied to a horizontal drive circuit 1025. And gate 1022 upon opening applies bit clock pulses supplied from the cathode follower 1023 to a second and gate 1026, and to a third and gate 1027. The output of and gate 1026 is connected to the set input terminal of a flip flop amplifier 1028 which has its inverse output terminal connected to the set input terminals of a second flip flop amplifier 1029, and through a time delay circuit 1030 to an or gate 1031 that has its output connected back to an input of and gate 1026. The normal output terminal of flip flop amplifier 1028 is connected to an input of and gate 1027, which also has the normal output terminal of the flip flop amplifier 1029 connected to an input thereof through a time delay circuit 1034. The inverse output terminal of flip flop 1029 is also connected back through a time delay circuit 1032 to or gate 1031, and to an and gate 1033 which also has the normal output terminal of the flip flop amplifier 1028 connected directly to a second input thereof.

By this arrangement, the two flip flop amplifiers 1028 and 1029 comprise a divide by four circuit which functions to open the and gates 1033 and 1027 in sequence. And gate 1027 upon opening will supply a resetting trigger pulse to the reset input terminal of flip flop amplifier 1020 which has its normal output terminal connected to an and gate 1035. Opening of the and gate 1027 also results in supplying bit clock pulses through a cathode follower amplifier 1036 to the trigger input terminal of the first one of a string of six flip flop amplifiers 1037 that form a divide by 32 circuit. Opening of the and gate 1027 also provides a set triggering pulse to the set input terminal of a flip flop amplifier 1038, and provides bit rate shift clock pulses to the read out to clock rectifier 1127 of the magnetic memory core matrix shown in FIG. 29. The bit clock pulses are also supplied through a time delay circuit 1039 to the control grid of a cathode follower amplifier 1041 whose cathode load resistor is connected to one input of and gate 1042 that has a second input terminal connected to the inverse output terminal of the last flip flop 1037 in the divide by 32 circuit. Upon the flip flop amplifier 1038 being set to its one or set condition by the set trigger pulse supplied thereto from and gate 1027, it applies a start signal from its inverse output terminal to a grid drive circuit 1043 that supplies operating potential to the control grid of the electron beam writing apparatus indicated at 1045. For a more detailed disclosure of the construction and operation of the electron beam writing apparatus, reference is made to the above identified Newberry and Norton application filed concurrently herewith.

Upon opening and gate 1033 applies an operating trigger potential to the and gate 1035 which then opens and supplies an operating potential through a polarity inverter 1046 to the vertical sweep generator of the system 1047. The vertical sweep generator 1047 is returned to ground by the operating potential supplied thereto from and gate 1035, but upon being released by the and gate 1035 closing, develops a saw tooth wave form vertical sweep potential that is applied through the vertical drive networks 1048 to the vertical deflection electrodes of electron beam writing apparatus 1045. A high voltage auxiliary circuit 1049 that supplies power to electron beam writing apparatus 1045 is turned on manually at the start of a write operation, and is left on throughout the operation. The operating potential supplied from and gate 1033 upon that and gate opening is also coupled through a polarity inverter 1051 to a horizontal sweep generator 1052 that develops a line frequency saw tooth wave form horizontal sweep potential having the line scan frequency of 10,000 c.p.s. that is applied to the horizontal drive circuit 1025. In drive circuit 1025 the line frequency saw tooth wave form sweep potential is modulated with the bit clock rate (320,000 c.p.s.) auxiliary horizontal sweep potential generated by circuit 1024, and the modulated saw tooth wave form sweep potential is then applied to the horizontal deflection electrodes of electron beam writing apparatus 1045. This modulated sweep potential is illustrated at 1040 in the lower left side of FIG. 28 whereby it can be seen that dwell plateaus are provided at 1050 to allow time for the beam splitter used in the electron beam writing apparatus 1045 time to operate.

Before it is possible to describe fully the operation of the electron beam writing system shown in FIG. 28, it is first necessary to explain the construction and operation of the magnetic memory core matrix 621 that serves as a working memory for the plate data storage equipment. At this point it is desirable to point out that the writing system provides a number of switching and operating potentials to the magnetic memory core matrix 621, and in turn receives data signals from the register which are supplied to the beam splitter driver 1055. The beam splitter driver then supplied a modulating potential to the beam splitter grid of the electron beam writing apparatus 1045 to thereby modulate intelligence upon the electron beam with which data is being written on the impressionable medium comprised by the thermoplastic film surface on the plates 601. For example, shift clock pulses are supplied from and gate 1042 and from cathode follower 1036 to the memory 621. A triggering potential is developed at the normal output terminal of the last flip flop 1037 in the divide by 32 network which is coupled back through a relay circuit comprising a resistor and capacitor 1056 to the reset input terminals of all of the flip flops 1037 in the divide by 32 network, and to the reset input terminals of flip flops 1028 and 1029. This triggering potential is also supplied to an and gate 1057 and through a delay circuit comprised by resistor and capacitor 1058 to a one shot multivibrator 1059 that produces an output trigger pulse which is coupled to the magnetic memory matrix 621 directly and through a delay circuit 1060. Still another output trigger pulse is supplied to the memory from a second one shot multivibrator 1061 that has its input connected to the output of and gate 1033, and which is actuated upon and gate 1033 opening.

*Magnetic memory core matrix*

Figure 29:
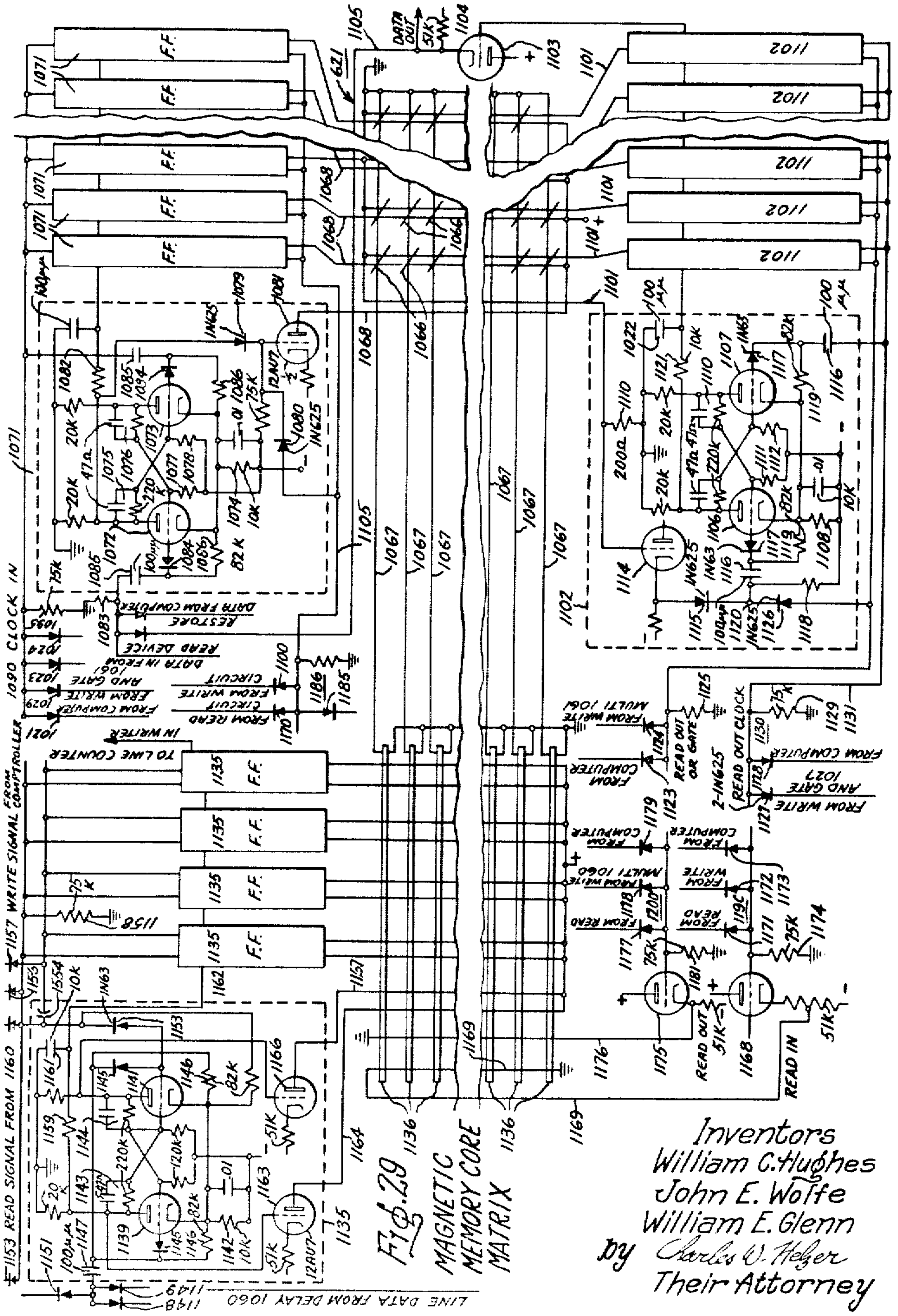
FIG. 29 is a combined block diagram and circuit diagram showing the details of construction of a magnetic core storage device comprising a part of the plate storage equipment shown in FIG. 20.

The magnetic memory matrix 621 used with the plate data storage equipment is illustrated in FIG. 29 of the drawings, and comprises a matrix of 32 by 32 toroidal magnetic memory core units 1066 are set in either one of two states of magnetization by energization or read-in signals supplied thereto by read-in line conductors 1067 and 1068. The magnetic memory core units 1066 are of the coincidence type, and are set by coincidence in half magnetization currents flowing in the horizontal read-in line conductor 1067 and half magnetization current flowing in a vertical read-in line conductor 1068. For a more detailed description of the construction and operation of coincidence current magnetic core storage devices, reference is made to the textbook by R. K. Richards entitled, Digital Computer Components and Circuits, published by the D. Van Nostrand Company, and to the description beginning an page 354 thereof. The particular magnetic memory core matrix shown is designed to include some 32×32 toroidal memory core units 1066 so that there are 32 of the horizontal line conductors 1067 and 32 vertical line conductors 1068. The toroidal memory core units operate briefly as follows.

A horizontal line conductor 1067 is selectively energized in accordance with an address supplied to a line counter formed by flip flops 1135, and provides a half magnetization current flowing through the toroidal magnetic memory core units 1066 of the selected line. A vertical line conductor 1068 selected by a word supplied to the read-in shift register comprised by flip flops 1071 has a half magnetization current flowing therein. Where there is coincidence in the half magnetization currents flowing in a horizontal line conductor 1067 and a vertical line conductor 1068, the two half magnetization currents add up to full magnetization current which is adequate to shift the condition of magnetization of the toroidal magnetic memory core unit 1066 surrounding the point or points of coincidence. If the two states of magnetization of the magnetic memory core units are then defined as zero or one, the state of magnetization of the magnetic memory core unit then serves to store information in binary digital form.

The half energization currents are supplied to the vertical line conductors 1068 from a vertical line shift register comprised by the thirty-two (32) flip flop amplifiers 1071. Each of the flip flop amplifiers 1071 comprises a pair of triode electron discharge tubes 1072 and 1073 which have the cathode electrodes thereof connected through a common cathode resistor 1074 to a suorce of negative bias potential. The anode electrodes of the electron tubes 1072 and 1073 are connected through suitable plate load resistors to ground, and the anodes and control electrodes thereof are interconnected through parallel connected resistors and capacitor networks 1075 and 1076. Operating bias is supplied to tubes 1072 and 1073 through a pair of grid biasing resistors 1077 and 1078 connected to the control electrodes of electron tubes 1072 and 1073, respectively, and to the source of negative potential. The flip flop amplifier circuit thus constructed is capable of two stable operating conditions, one operating condition being with the electron tube 1072 conducting in which event the *positive bias* built up across common cathode resistor 1074 keeps electron tube 1073 in a non-conducting condition, and the second operating condition is with electron tube 1073 conducting in which event the positive bias across common cathode resistor 1074 keeps electron tube 1072 in a non-conducting condition. The flip flop amplifier circuit is defined to be in a set or one condition when the electron tube 1073 is conducting and a positive operating potential is supplied from the anode of electron tube 1072 through de-coupling diode rectifier 1079 to the control grid of a current feedback amplifier 1081. The feedback amplifier has its anode connected directly through a vertical line conductor 1068 to a source of positive plate potential. It can be appreciated that when the current feedback amplifier 1081 is conducting, half magnetization current will be flowing in the vertical selector line 1068 connected thereto.

The flip flop amplifiers 1071 are triggered to the set or one condition by negative switching pulses applied to the data input network thereof from the delay circuits 1082 of the preceding flip flop amplifier, or from the read-in or gate 1083. The delay circuit 1082 is connected to the anode of electron tube 1072, and couples a negative polarity carry trigger pulse to the next succeeding flip flop in the register upon flip flop 1071 being triggered from the set or one (1) condition to the reset or zero (0) condition by a negative polarity reset clock pulse. The data input network of flip flop amplifier 1071 comprises a diode rectifier 1084 which has its anode or collector electrode connected to the control grid of electron tube 1072, and the cathode or emitter electrode thereof is connected to a coupling capacitor 1085 to which negative data input pulses are supplied from either the data read-in or gate 1083 or a preceding flip flop 1071. These pulses appear across a resistor 1086 connected between the cathode of electron tube 1072 and the juncture of the coupling capacitor 1085 and diode 1084. Input negative switching pulses applied to the coupling capacitor 1085 are applied through de-coupling diode 1084 to the control grid of electron tube 1072. The negative potential data pulses applied to the coupling capacitor 1085 will be coupled through diode rectifier 1084 and drive the control grid of electron tube 1072 negative to cut off, and allow tube 1072 to become conductive, thereby triggering the flip flop amplifier 1071 to its on or set condition. The electron tube 1073 has a similar reset triggering network connected to the control grid thereof which functions in precisely the same manner to couple negative polarity reset clock pulses from the clock read-in or gate 1090 to the control grid of electron tube 1073, thereby resetting the flip flop amplifier 1071 to its zero (0) or off condition. Data to be stored in the read-in register comprised by flip flop amplifiers 1071 is supplied to data read-in or gate 1083 comprised by diode rectifiers 1087 and 1088, and a load resistor 1089 connected to ground. Diode rectifier 1088 is connected to the data output terminal of the reading system, diode rectifier 1087 is connected back to the cathode load resistor 1104 of output cathode follower amplifier 1103 for a purpose which will be explained more fully hereinafter, and a third diode rectifier 1088 is connected to the computer so that data from the computer may be supplied to the read-in register. In order to read information stored in the read-in register comprised by flip flop amplifiers 1071 out of the register or to set the register to its zero condition, clock shift pulses are supplied to the switching network associated with the electron tube 1073 in each of the flip flop amplifiers from a clock input or gate 1090 comprised by diode rectifiers 1091, 1092, 1093, and 1094, and a load resistor 1095 connected to ground. The diode rectifier 1091 is connected to the output from the computer, the diode rectifier 1092 is connected to the write and gate 1042 of the writing system, the diode rectifier 1093 is connected to the write circuit one shot multivibrator 1061, and the diode rectifier 1094 is connected to the reading system. Accordingly, each of these parts of the data storage equipment is capable of providing shift clock pulses through the clock input or gate 1090 to the address register comprised by the flip flop amplifiers 1071.

Data stored in the magnetic memory matrix 621 may be read out by means of a plurality of vertical read out line conductors 1101, each of which threads each memory core unit 1066 in a vertical line 1068, and is connected to the input switching circuit of a respective read out flip flop 1102 of a read out register formed by the 32 read out flip flop amplifiers 1102. Data read out of the magnetic memory matrix 621 and into the read out register formed by flips flops 1102 is shifted out of the register through an output cathode follower amplifier 1103 having a cathode load resistor 1104 connected to a source of negative potential. The desired data pulses appear across the cathode load resistor 1104 and can be supplied to the writing system, the reading or the computer used with the equipment. Cathode load resistor 1104 is also connected back through a conductor 1105 to the diode rectifier 1087 of the data input or gate 1083 so that data being read out of the magnetic memory matrix may be re-inserted in the matrix for preservation.

Each of the flip flop amplifiers 1102 comprise a pair of triode electron discharge tubes 1106 and 1107 which have the cathodes thereof connected through a common cathode resistor 1108 to a source of negative potential. The anodes of the electron tubes 1106 and 1107 are connected through respective plate load resistors to ground, and the anodes and control electrodes of each of these electron tubes are interconnected through parallel resistance-capacitance networks 1109 and 1110. Control grid bias is supplied to the control grid of each of the tubes through respective grid biasing resistors 1111 and 1112 which are connected to the source of negative potential. By this construction, the two electron tubes 1106 and 1107 will operate as a cathode coupled bistable multivibrator and will have two stable operating conditions as did the flip flop amplifiers 1071. Flip flop amplifier 1102 is triggered to one of its stable states of operation by the read out current supplied through its associated read out line 1101 from the toroidal memory core units being read out. The read out vertical line conductor 1101 is connected across a load resistor 1100 to the control grid of a cathode follower amplifier 1114, whose load resistor is coupled through a diode rectifier 1115, coupling capacitor 1116, and a second diode rectifier 1117 to the control grid of electron tube 1106. The juncture of the diode rectifier 1115, of a diode rectifier 1126 and coupling capacitor 1116 are connected through a load resistor 1118 to the source of negative potential so that diodes 1115 and 1126 and resistor 1118 form an and gate 1120. And gate 1120 has a gating enabling potential supplied thereto from a read out or gate 1133. Read or gate 1133 is formed by a pair of diode rectifiers 1123 and 1124 and a load resistor 1125 connected to ground. The diode rectifier 1123 is connected to the computer and supplies enabling gating potential from the computer through diode rectifier 1126 to and gate 1120, thereby allowing read out pulses from the memory cores to be applied to the control grid of triode electron discharge tube 1106. This gating potential is also coupled to the diode rectifiers 1126 of the and gates 1120 all of the flip flop amplifiers 1102 in read out register. The diode rectifier 1124 is connected to output of multivibrator 1061 in the writing circuits, and functions in a similar fashion to apply enabling potentials to the and gates 1120.

The juncture of the coupling capacitor 1116 and diode rectifier 1117 are connected through resistor 1119 to the cathode of electron tube 1106 to form a conventional triggering network. The flip flop 1102 is in the reset or zero condition when the electron tube 1107 is cut off and electron tube 1106 is conducting. The application of a read out current from the conductor 1101 will develop potential across load resistor 1110 which drives the control grid of cathode follower amplifier 1114 negative and produces a negative trigger pulse that is applied to the control grid of electron tube 1107 driving it into cut-off. The pulsed potential appearing on the anode electrode of electron tube 1106 is coupled through a delay network formed by resistor 1121 and capacitor 1122 to the input coupling capacitor 1116 of the next succeeding flip flop amplifier 1102 in the read out register. The flip flop amplifier 1102 is triggered from its set or one condition to the reset or zero condition by shift pulses supplied from a clock read out or gate 1130 formed by diode rectifiers 1127 and 1128, and a load resistor 1129 connected to ground. The clock read out or gate 1130 is connected through a conductor 1131 to the control grids of the electron tubes 1107 in all of the flip flop amplifiers 1102 of the read out register. The diode rectifier 1127 of the or gate 1130 is connected to an output from the and gate 1027 in the writing system, and connects read out clock pulses supplied from the writing to the read out register 1102 during a writing operation to shift data stored in the read out register out through the cathode follower amplifier 1103 to the beam splitter driver of electron beam writing apparatus. The diode rectifier 1128 is connected to the computer, and functions in a similar manner to connect shift pulses supplied from the computer to shift information stored in the read out register out for use by the computer in its operation. The shift clock pulses are supplied from read out or gate 1130 through conductor 1131 to the triggering network of electron tube 1107 in each flip flop comprised by coupling capacitor 1116, resistor 1119 and diode 1117. These elements function in a manner similar to their counterparts connected to electron tube 1106 to cut off electron tube 1107 upon application of a reset clock shift pulse thereto. In order to read out data stored in the read in register 1071 into the magnetic memory core matrix 621, and also to read information out of the matrix into the read out register 1102, it is necessary to supply enabling read in and read out current gating pulses to the horizontal line conductors 1067. To do this, a line counter shift register is provided which comprises five flip flop amplifiers 1135 having their outputs connected across a series of magnetic switching cores 1136 that develop the half magnetization current read in gating pulses in the horizontal line conductors 1067 as well as a read out gating pulse. The flip flop amplifiers 1135 each comprise a pair of electron tubes 1139 and 1141 which have their cathodes connected through a common cathode resistor 1142 to a source of negative potential, and their anodes connected through respective plate load resistors to ground. The anodes and control electrodes of the electron tubes 1139 and 1141 are interconnected through parallel resistance-capacitance networks 1143 and 1144 respectively, and grid biasing potential is supplied to the control grids of each of the electron tubes from respective grid biasing resistors connected to the source of negative biasing potential. The circuit thus comprised functions as a bi-stable cathode coupled multivibrator having two stable operating conditions similar to the previously described flip flop amplifiers 1071 and 1102. Triggering potentials for triggering the bi-stable multivibrator 1135 from one of its operating conditions to the other are supplied to the control grids of both electron tubes 1139 through respective triggering networks comprising a diode rectifier 1145 and a resistor 1146 which are interconnected to coupling capacitor 1147. The coupling capacitor 1147 is connected to the output of a line data or gate 1150 comprised by three diode rectifiers 1148, 1149, and 1151, and a load resistor 1152 connected to ground. The diode rectifier 1148 is connected to the output cathode follower 1351 of the read system and the diode rectifier 1149 is connected to the plate delay circuit 1060 in the writing circuits. Diode rectifier 1151 is connected to the computer so that line data signals supplied to any one of these diode rectifiers will open the or gate 1150 and be applied to coupling capacitor 1147. These pulsed line data signals will be negative polarity pulses so that the control grid of electron tube 1139 is driven negative and tube 1139 cut off. The control grid of the electron tube 1141 is connected to a similar triggering network comprising the diode rectifier 1145 and resistor 1146 back to the coupling capacitor 1147 so that input line data gating pulse supplied to any one of the or gate rectifiers 1148, 1149, 1151 will operate to trigger flip flop amplifier 1135 from one of its operating conditions to the other since such a gating pulse will be applied to the control grids of both electron tubes 1139 and 1141 irrespective of the source of the line data gating pulse. As a consequence of this arrangement, line data pulses supplied to coupling capacitor 1147 can either set or re-set flip flop 1135 depending upon which condition it had been in, and the register comprised by flip flops 1135 can operate as a line counter.

The control electrodes of the electron tube 1141 in each flip flop 1135 is also connected through a diode rectifier 1153 to an or gate 1160 comprised by diode rectifiers 1155, diode rectifier 1156, and load resistor 1158 connected to ground. Diode rectifiers 1155 and 1156 are connected to the controller unit of the plate data storage equipment and supply the start read and start write pulses to flip flops 1135 to re-set them all to zero before reading or writing. Diode rectifier 1153 is also coupled through a coupling capacitor 1154 and diode rectifier 1157 to the computer so that shift clock pulses may be supplied from the computer to the flip flops 1135 to operate them as a shift register in shifting data in and out of the memory core matrix 621.

Output carry pulses are supplied from the plate circuit of electron tube 1139 through a delay network formed by a resistor 1159 and capacitor 1161 through a conductor 1162 to the input coupling capacitor 1147 of next succeeding flip flop amplifier 1135 in the counter register. The anode of electron tube 1139 is also coupled to the control electrode of a current feedback amplifier 1163 which has its anode connected to a source of positive plate potential through a vertical read in line 1164 that provides bias current to the magnetic switching cores 1136. The anode of electron tube 1141 is also connected to the control grid of a current feedback amplifier 1166 which has its anode connected directly to a source of positive plate potential through a vertical read in line 1167 that provides bias current to the magnetic switching cores 1136. While the magnetic cores 1136 have been illustrated as being linear in form, it should be understood that they are in fact toroidal with the read in line 1164 being wound around selected ones, and the read in line 1167 being wound around selected others of the cores. The horizontal line conductors 1067 are wound around the switching cores 1136 and serve as read out coils. For a more complete description of the construction and operation of the magnetic switching core construction, reference is made to the description on page 381 of the above identified reference textbook by Richards. It is believed sufficient to point out that the vertical read in conductors 1164 and 1167 from each flip flop amplifier 1135 are not wound around all of the magnetic switching cores 1136 but only selected ones of them so that for each of the 32 possible combinations of output potentials across line counter register vertical read in lines 1164 and 1167, there will be one switching core 1136 which will receive no biasing current from the flip flop amplifiers 1135.

The switching cores 1136 are driven by a core driver 1168 to read data into the magnetic memory matrix cores 1066 and by a core driver 1175 to read data stored in the memory cores 1066 out into the read out register 1102. The read in core driver 1168 comprises a cathode follower amplifier having a cathode load resistor which is connected to a source of negative potential, and which has an adjustable tap off point connected to a conductor 1169 that is threaded through all of the switching cores 1136. The control grid of core driver cathode follower amplifier 1168 is connected to an or gate 1180 that comprises diode rectifiers 1171, 1172 and 1173 and a load resistor 1174 connected to ground. The diode rectifier 1171 is connected to the reading system cathode follower 1348 (see below and FIGURE 34) the diode rectifier 1172 is connected to the multivibrator 1059 in the writing circuits, and the diode rectifier 1173 is connected to the computer. Upon any one of the diode rectifiers 1171, 1172, or 1173 receiving a read in gating pulse from its respective associated equipment, the gating pulse is supplied through cathode follower amplifier 1168 to all of the magnetic switching cores 1136 so as to pulse these cores. As stated previously, the cores 1136 are wound in such a manner that only one of the cores will not have a biasing current applied thereto from the vertical core selector output lines 1164 and 1167 of the flip flop amplifiers 1135 in the line counter register. This selected magnetic switching core 1136 will therefore have its direction of magnetization changed by the read in gating pulse supplied from cathode follower amplifier 1168. The amplitude of this read in gating pulse is adjusted by adjusting the tap on the variable cathode load resistor of cathode follower amplifier 1168, and results in producing a half magnetization current flow in the horizontal line conductor 1067 wound around the selected (unbiased) magnetic switching core. This half magnetization current, together with the half magnetization current supplied by the vertical read in line conductors 1068 selected by the address data supplied to read in register flip flops 1071, will set the state of magnetization of the memory core units 1066 at the points of coincidence to read into the magnetic core memory matrix 621 the data stored in the read in and line counter registers.

In order to read out information stored in the magnetic memory matrix 621 into the read out register 1102, a similar read out gating pulse must be applied to the magnetic switching cores 1136. This read out gating pulse is supplied from core driver cathode follower amplifier 1175 which has its cathode load resistor connected to a conductor 1176 that is threaded through all of the magnetic switching cores 1136 in a reverse direction from the core driver conductor 1169. The control grid of cathode follower amplifier 1175 is connected to an or gate 1200 comprised by diode rectifiers 1177, 1178, and 1179, and a load resistor 1181 connected to ground. The diode rectifier 1177 is connected to the one shot multivibrator 1347 in the reading system, diode rectifier 1178 is connected to the multivibrator 1061 in the writing system, and the diode rectifier 1179 is connected to the computer. Accordingly, line gating pulses supplied to any one of these diode rectifiers will provide a gating pulse across the cathode load resistor of cathode follower amplifier 1175 which will change the direction of magnetization of the selected switching core 1136 that has no biasing current supplied thereto from the line counter register flip flop 1135. This change of magnetization of the selected switching core produces a full magnetization output current in its read out coil connected to the current carrying horizontal line condutcor 1067. It should be noted that the read out conductor 1176 is wound in the reverse direction on the switching cores 1136 from the read in conductor 1169 so that the full magnetization current produced in the selected horizontal line conductor 1067 is the reverse of the current produced by the read in pulse supplied from cathode follower amplifier 1168 and conductor 1169. This current, because it is a full magnetization current, will suffice to reverse the direction of magnetization of any oppositely set magnetic memory core units 1066 in the selected horizontal line conductor 1067, and results in the production of an output current pulse in the vertical read out lines 1101 associated with any such oppositely set memory core units 1066. It is understood that a read out pulse supplied to a horizontal line conductor 1067 will leave all of the memory core units 1066 on that line in what is defined to be the zero state of magnetization. Output current pulses appearing in any of the vertical read out lines 1101 are applied to the associated flip flop amplifier 1102 to set it to the one operating condition. The data thus set into the read out register 1102 may then be read out serially to the output cathode follower amplifier 1103 by applying shift clock pulses though clock read out or gate 1130 from the writing system or from the computer, which ever requires the data.

Having described the construction of the magnetic memory matrix, its operation in conjunction with the writing system of the plate data storage equipment can now be described.

In order to utilize the magnetic memory matrix 621 shown in FIGURE 29 of the drawings with the writing system shown in FIGURE 28, the data to be written must first be read into the magnetic memory matrix 621. It is assumed that one wishes to write an entire table of 32 lines of data with each line containing 32 bits of information. In this eventuality the data to be written is supplied serially to rectifier 1080 of data read in or gate 1083 on the read in shift register 1071 together with shift clock pulses supplied to diode rectifier 1185 of clock read in or gate 1186, and line gating pulses supplied to rectifiers 1151 and 1157 of line counter 1135 to operate it as a shift register, and to read in driver diode 1179 in proper sequence. The data is thus stored in magnetic memory matrix 621. The correct address of the first line of data to be written is then supplied to the line counter register 1135. With the magnetic memory matrix thus conditioned, the equipment is then ready to write assuming that the operation of the plate and position servos is completed.

Referring again to the writing system functional block diagram shown in FIGURE 28 of the drawings, when it is desired to write a block of data that is stored in the magnetic memory matrix on the impressionable medium comprised by the thermoplastic film on the surface of the plates 601 with electron beam writing tube 1045, the following sequence of operations occurs. The controller of the equipment supplies a start set pulse to flip flop amplifiers 1020 and 1021. Flip flop amplifier 1020 in going to its set or one condition produces a negative polarity enabling potential at its normal output terminal that is supplied to the and gate 1035. The flip flop amplifier 1021 in going to its set or one condition, produces a negative polarity enabling potential at its normal output terminal that is supplied to the and gate 1022. And gate 1022 has bit clock pulses supplied thereto from output of a cathode follower amplifier 1023, which upon opening are supplied through the normally open and gate 1026 to flip flop 1028. The and gate 1026 is normally open due to the application of a negative enabling potential thereto through or gate 1031 and delay circuits 1030 and 1032 from flip flops 1028 and 1029 which are in the re-set condition and provide negative enabling potentials at the inverse output terminals connected to delay circuits 1030 and 1032. The bit clock pulses are also supplied through polarity inverter 1020 to auxiliary sweep circuit 1024 to synchronize its operation with the bit clock rate of the equipment. Auxiliary sweep 1024 develops a bit clock rate sawtooth wave form auxiliary sweep potential that is supplied to the horizontal drive circuit 1025. The first bit clock pulse that passes through and gate 1026 triggers flip flop amplifier 1028 to its set condition. With flip flop 1028 amplifier in its set condition, a negative polarity enabling potential appears at its normal output terminal which is supplied to and gate 1033 together with a negative enabling potential supplied from inverse output terminal of flip flop amplifier 1029 which is in the re-set condition. As a consequence and gate 1033 opens and provides energizing potential through polarity inverter 1051 to the horizontal sweep generator 1052, to the one shot multivibator 1061 which provides a short time duration trigger to read out or gate 1200 diode rectifier on the magnetic memory matrix to read the data in the first line of cores into read out register 1102, and to and gate 1035. And gate 1035 then opens and applies operating potential through polarity inverter 1046 to the vertical sweep generator 1047. The operating potentials supplied through the inverters to each of the sweep generators 1052 and 1047 effectively grounds the charging capacitors in each of the circuits to thereby bring the sweep potential at the output of each of these circuits to the initial or start position, and clamp them there. The next bit clock pulse supplied to flip flop 1028 resets it to zero, and provides a carry pulse that triggers flip flop 1029 to the set condition. This results in removing the enabling potentials to and gate 1033, allowing and gate 1033 to close and remove the clamping potentials from horizontal sweep generator 1052 and vertical sweep generator 1047. This causes the two sweep generators to start building up their sweep scanning potentials in synchronism. Sweep generator 1052 then supplies a basic saw tooth wave form sweep potential to the horizontal drive circuit 1025 where the high frequency or modulation sweep potential supplied from auxiliary sweep generator 1024 is modulated thereon, and the resulting modulated horizontal sweep potential shown at 1040 is coupled to the electron beam writing tube 1045. Simultaneously, the and gate 1035 initiates operation of the vertical sweep generator 1047 by releasing the clamping potential supplied from polarity inverter circuit 1046 so that the vertical sweep generator 1047 then develops a saw tooth wave form vertical sweep potential that is applied through the vertical drive circuit 1048 to the vertical deflection electrodes of writing tube 1045 in synchronism with the horizontal sweep potential applied to the horizontal deflection of the writing tube 1045. The next bit clock pulse supplied from and gate 1026 which is the third so far, will again set flip flop amplifier 1028 so that both flip flop amplifiers 1028 and 1029 are in the set condition, and provide enabling negative polarity enabling potentials to the and gate 1027. Accordingly, and gate 1027 will open and allow the fourth bit clock pulse and those occurring thereafter supplied from the master clock oscillator to pass therethrough to the cathode follower 1036. This removes the negative enabling potentials supplied back through or gate 1031 so that it closes, and closes and gate 1026 thereby decoupling flip flops 1028 and 1034 from the bit clock pulses until they are again reset at the end of a line of data. Cathode follower 1036 supplies the bit clock pulses to the first flip flop amplifier 1037 in the divide by 32 circuit so that succeeding bit clock pulses will be shifted through the divide by 32 circuit until 32 bit clock pulses later, 32 bits of data have been written. The first bit clock pulse supplied to the divide by 32 circuit is supplied through the diode rectifier 1127 of the clock read out or gate 1130 to the control electrodes of the electron tubes 1107 in the flip flops 1102 to shift the data stored in the read out register comprised by flip flop amplifiers 1102 of the memory matrix 621 out through cathode follower amplifier 1103 to the beam splitter driver 1055. The beam splitter driver will then modulate the writing electron beam to incorporate the data into the electron patterns being written on the impressionable medium comprised by the thermoplastic film surface on the plates 601 in the manner described in the above identified copending Newberry and Norton application. It can be appreciated that the data pulses being supplied to the beam splitter driver 1055 will be synchronized with the plateaus 1050 in the modulated horizontal sweep potential supplied by horizontal drive circuit 1025 to facilitate the data writing operation. The bit clock pulses coupled through and gate 1027 are also supplied through a delay circuit 1039 to an and gate 1042 which is connected to the diode rectifier 1092 on the read in shift register comprised by flip flop amplifiers 1071 of the magnetic memory matrix 621. These bit clock pulses supplied through and gate 1042 will then serve to shift data pulses being read out across cathode load resistor 1104 and connected back into the read in register through the diode rectifier 1087, and assures that the shifting in of the data bits back into the read in register is synchronized with the writing of the data on the impressionable medium formed by the thermoplastic film surface of the plate by the electron beam writing tube 1045. After writing a line of 31 bits of data, the last flip flop in the divide by 32 network will be triggered to its set condition and a negative polarity line gate pulse at its normal output terminal which is supplied to and gate 1057, through delay circuit 1058 to one shot multivibrator 1059, and through delay circuit 1056 back to the reset input terminals of each of the flip flips 1037 in the divide by 32 network and flip flops 1028 and 1029. Concurrently, the negative enabling potential normally applied to and gate 1042 is removed so that the last or 32nd shift clock pulse traveling through delay circuit 1039 is not applied to the clock read in or gate 1090 on the read in shift register. The last or 32nd bit clock pulse is supplied to the clock read out or gate 1130, however, to shift out the last data bit in the read out register 1102. This last data pulse will be connected back through load resistor 1104 and conductor 1105 and fill the read in register 1071. The gate pulse produced by one shot multivibrator 1059 is delayed by circuit 1058 long enough to fill the read in register 1071, and is then applied through diode rectifier 1172 to switch core driver cathode follower 1168, and through diode rectifier 1100 of the enabling read in or gate 1186 to open the and gate comprised by rectifiers 1079 and 1080. This results in supplying half magnetization current flow through the selected first horizontal line conductor 1067, and through the vertical line conductors 1068 selected in accordance with the data shifted back into read in register to thereby read the data just written back into the coincidence magnetic memory matrix 621. Subsequent to this, the gating pulse produced by one shot multivibrator 1059 passes through the delay circuit 1060 and is applied to the line counter diode rectifier 1149 to cause the line counter register 1135 to select the next switching core 1136 in sequence so that it will be ready to read out the data contained therein upon the next cycle of operation. Subsequently, the negative potential pulse delayed by the delay circuit 1056 is fed back to reset all of the flip flop amplifiers 1037 in the divide by 32 network as well as the flip flop amplifiers 1028 and 1029. This results in closing and gate 1027 and accordingly, shuts off the bit clock pulses supplied to the magnetic memory matrix 621. The divide by four network comprised by flip flop amplifiers 1028 and 1029 must then be re-cycled through its operation to again open the and gate 1027, and start the divide by 32 network 1037 through a new cycle of operation. These cycles are repeated throughout the entire 32 lines until the entire table of data has been written whereupon the line counter will produce a line counter full signal which will pass through and gate 1057 upon completion of the last line, and turn off flip flop amplifier 1021, and provide a finish signal to the controller. It should be noted that upon and gate 1027 first opening, a reset trigger pulse is supplied to flip flop 1020 which removes the enabling potential from and gate 1035, and allows the vertical sweep generator 1047 to operate independently of the logic circuits throughout the remainder of the table of data being written. The controller can then command the computer to insert new data into the magnetic memory matrix 621, and the entire cycle of operations just described may be repeated to write as many tables of data as desired.

*Writing circuits logic*

Figure 30:
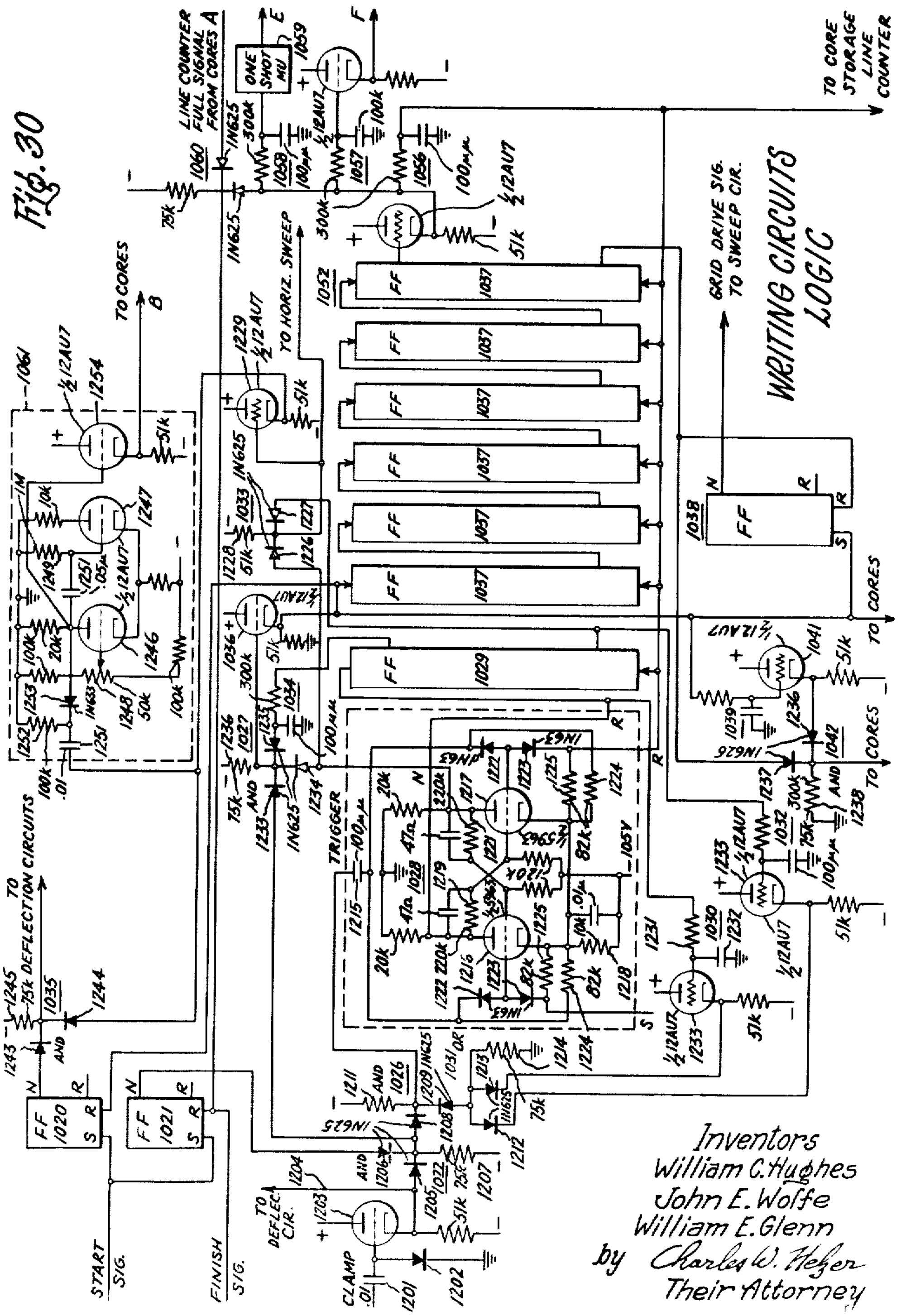
FIG. 30 is a circuit diagram of the output control logic circuits used in the writing system shown in FIG. 28 of the drawings.

The details of construction of the writing circuits logic is shown in FIGURE 30 of the drawings. These circuits comprise a coupling capacitor 1201 for coupling negative polarity bit clock pulses supplied from the master clock oscillator of the equipment across a clamping diode 1202 to the control grid of a cathode follower amplifier 1203. The cathode load resistor of cathode follower amplifier 1203 is connected through a conductor 1204 to the deflection circuits shown in FIGURE 31 of the drawings, and to a diode rectifier 1205 of and gate 1022. And gate 1022 further includes a diode rectifier 1206, and a load resistor 1207 connected to a source of negative potential. Diode rectifier 1206 has a negative enabling potential supplied thereto from the start flip flop amplifier 1021, and upon opening couples the bit clock pulses to a diode rectifier 1208 of and gate 1026. And gate 1026 further includes a diode rectifier 1209 and a load resistor 1211 connected to a source of negative potential. Diode rectifier 1209 is connected to an or gate 1031 which includes a pair of diode rectifiers 1212 and 1213, and a load resistor 1214 that is connected to ground. The or gate 1031 serves to provide a negative enabling potential to the diode rectifier 1209 so that and gate 1026 opens, and supplies the bit clock pulses to a coupling capacitor 1215 of flip flop amplifier 1028.

Flip flop amplifier 1028 comprises a pair of triode electron discharge tubes 1216 and 1217 which have the cathodes thereof connected through a common cathode resistor 1218 to a source of negative potential, and have the anodes thereof connected through respective anode load resistors to ground. The anodes and control electrodes of electron tubes 1216 and 1217 are interconnected through parallel resistance-capacitance networks 1219 and 1221 respectively, and the control electrodes of both electron tubes 1216 and 1217 are connected through suitable grid biasing resistors to the source of negative potential. The circuit thus comprised is capable of two stable operating conditions where either electron tube 1216 is conducting in which case tube 1217 is cut off, or vice versa. The triode tubes 1216 and 1217 are triggered into one or the other of their stable operating conditions by the bit clock pulses supplied thereto from coupling capacitor 1215. For this purpose a trigger circuit is connected to the control electrodes of each of the tubes which comprises a pair of back to back diode rectifiers 1222 and 1223 which have the common junction of their collector or anode electrodes connected to the control electrode of the respective associated tube 1216 or 1217. The cathode or emitter electrodes of diode rectifiers 1222 in the triggering circuit associated with each tube are inter-connected to the coupling capacitor 1215, and through respective load resistors 1224 to the cathode of the respective associated electron tube 1216 or 1217. The emitter electrodes of the diode rectifiers 1223 are connected through respective load resistors 1225 to the cathode of the associated electron tube 1216 or 1217. The application of a negative bit clock signal pulse to the coupling capacitor 1215 will produce a negative potential across load resistors 1224 which will be coupled through the diode rectifier 1222 and turn off whichever of the electron tubes 1216 or 1217 is conducting. In the re-set or zero condition of the flip flop 1028, the electron tube 1216 will be conducting, and electron tube 1217 will be turned off so that a negative potential will appear in the anode circuit of electron tube 1216 that comprises the inverse output terminal of the flip flop, and is coupled out to the coupling capacitor 1215 next succeeding flip flop amplifier 1029. Conversely, in the re-set condition, a positive polarity potential will be applied from the anode circuit of the electron tube 1217 which comprises the normal output terminal of the flip flop to the and gate 1027. Upon the first bit clock triggering pulse being supplied from the and gate 1026 through coupling capacitor 1215, the flip flop amplifier 1028 is triggered from its re-set to its set condition where electron tube 1217 will be conducting, and a negative potential will be supplied from its anode circuit to the and gate 1027, and to the and gate 1033. Flip flop amplifier 1029 of the divide by four circuit remains in the re-set condition so that its inverse output terminal has a negative enabling potential thereon that is supplied also to the and gate 1033. And gate 1033 comprises a pair of diode rectifiers 1226 and 1227 connected to a load resistor 1228 that in turn is connected to a source of negative potential. Application of the two negative polarity enabling potentials to the diode rectifiers 1226 and 1227 open and gate 103 so that an enabling potential of negative polarity is applied to a cathode follower amplifier comprised by an electron tube 1229, and to the horizontal sweep generator, not shown.

The anode electrode of electron tube 1216 in each of the flip flop amplifiers 1028 and 1029 is also coupled back through the time delay networks 1030 and 1032 to the diode rectifiers 1213 and 1212 respectively of or gate 1031. Each of the delay circuits 1030 and 1032 comprises a resistance-capacitance coupling network formed by resistor 1231 and capacitor 1232 connected to the control grid of a cathode follower amplifiers 1233. The cathode load resistors of the cathode follower amplifier 1233 is then connected to a respective diode rectifier 1212 or 1213. These feed back delay circuits provide a negative polarity enabling potential through or gate 1031 to and gate 1026 to maintain that gate open for negative going bit clock pulses supplied from the master clock oscillator until the flip flops 1028 and 1029 are both in the set condition.

The bit clock pulses are also supplied to the and gate 1027 which comprises three diode rectifiers 1233, 1234, and 1235 and a load resistor 1236 connected to a source of negative potential. The diode rectifier 1234 is connected to the anode circuit of electron tube 1217 of flip flop amplifier 1028, and the diode rectifier 1235 is connected through a delay circuit 1034 comprised by a resistance-capacitance coupling network to the inverse output terminal or anode of electron tube 1217 of flip flop amplifier 1029. Upon the occurrence of the third bit clock pulse, negative polarity potentials appearing across the anode circuits of each of the electron tubes 1217 in flip flop amplifiers 1028 and 1029 so that and gate 1027 will open and apply the negative going bit clock pulses to the control electrode of the cathode follower amplifier 1036. Cathode follower amplifier 1036 has its cathode load resistor connected to the input of the first flip flop amplifier 1037 in the divide by 32 circuit comprising six such flip flop amplifiers 1037 that are identical in construction to the flip flop amplifier 1028. The bit clock pulses appearing across the cathode load resistor of cathode follower amplifier 1036 are also supplied through a delay circuit 1039 comprising a resistor and capacitance coupling network to the control electrode of a cathode follower amplifier 1041. The cathode resistor of cathode follower amplifier 1041 is connected to a diode rectifier 1236 of and gate 1042 that further includes a diode rectifier 1237, and a load resistor 1238 connected to ground. The diode rectifier 1237 is connected back to the inverse output terminal of the last flip flop amplifier 1037 in the divide by 32 circuit, and normally receives a negative polarity enabling potential therefrom as long as the flip flop is in the re-set or zero condition. The bit clock pulses from cathode follower amplifier 1036 are also supplied directly to the magnetic memory core matrix 621, and to the flip flop amplifier 1038 that is identical in construction to the flip flop amplifier 1028 which is set thereby. Upon being set flip flop amplifier 1038 supplies a positive polarity enabling potential to the grid drive circuits of the electron beam writing apparatus so as to turn on the beam current of that apparatus. Cathode follower amplifier 1036 is also connected back to the re-set input terminal of flip flop amplifier 1020 and operates to apply the first bit clock pulse to pass and gate 1027 to flip flop amplifier 1020 to re-set it.

Flip flop amplifier 1020 and flip flop 1021 initiate operation of the writing system upon a start set pulse being supplied to the set input terminals thereof from the controller. Flip flop 1020 has its inverse output terminal connected to a diode rectifier 1243 of and gate 1035 that further includes a diode rectifier 1244, and a load resistor 1245 that is connected to a source of negative potential. Upon opening, an output clamping potential is supplied by the and gate 1035 to the vertical deflection circuits of the writing system to be described in detail hereinafter. The diode rectifier 1244 of and gate 1035 is connected back to cathode load resistor of cathode follower amplifier 1229 so that an enabling potential is provided to the and gate 1035 prior to flip flop amplifier 1020 being reset by one of the bit clock pulses. This occurs because and gate 1033 opens and provides an enabling potential to and gate 1035 through cathode follower amplifier 1229 prior to the opening of and gate 1027 which supplies a bit clock re-set pulse to flip flop 1020 to remove the enabling potential applied to diode rectifier 1243. The early enabling potential from and gate 1033 is also supplied to the one shot multivibrator 1061 to initiate its operation prior to opening of the and gate 1027.

The one shot multivibrator 1061 comprises a pair of triode electron discharge tubes 1246 and 1247 which have their cathodes connected through a common cathode resistor to a source of negative potential, and have the anodes thereof connected through respective plate load resistors to ground. Grid bias potential is supplied to the control grid of the electron tube 1246 from a voltage dividing resistor 1248 connected between ground and the source of negative potential, and grid bias potential is supplied to the control grid of electron discharge tube 1247 through a grid biasing resistor 1249. A coupling capacitor 1251 is connected between the anode of electron tube 1246 and the control electrode of electron tube 1247. The circuit thus comprised is arranged so that the operating bias applied to the control electrode of electron discharge tube 1247 maintains that tube normally conductive and a positive bias built up across the common cathode resistor keeps electron tube 1246 cut off. Upon occurrence of a negative triggering pulse applied through a trigger network comprising a coupling capacitor 1251, and resistor 1252, and a de-coupling diode rectifier 1253, the plate of triode 1246 and hence the control electrode of tube 1247 (due to coupling capacitor 1251) is driven sufficiently negative to cut off tube 1247 and to allow electron tube 1246 to become conductive. As electron tube 1246 becomes conductive the positive bias built up across the common cathode resistor drives electron tube 1246 into cut off. Upon the charge on coupling capacitor 1251 leaking off through grid biasing resistor 1249 sufficiently to again allow the positive bias supplied to control electrode of electron tube 1246 to take over, electron tube 1247 again becomes conductive and cuts off electron tube 1246 thereby completing a one shot cycle. This results in the production of a negative pulse output potential that is coupled through the cathode coupling amplifier 1254 and supplied to the read out driver of the switching cores 1036 of the magnetic memory matrix 621.

*Writing system deflection circuits*

Figure 31:
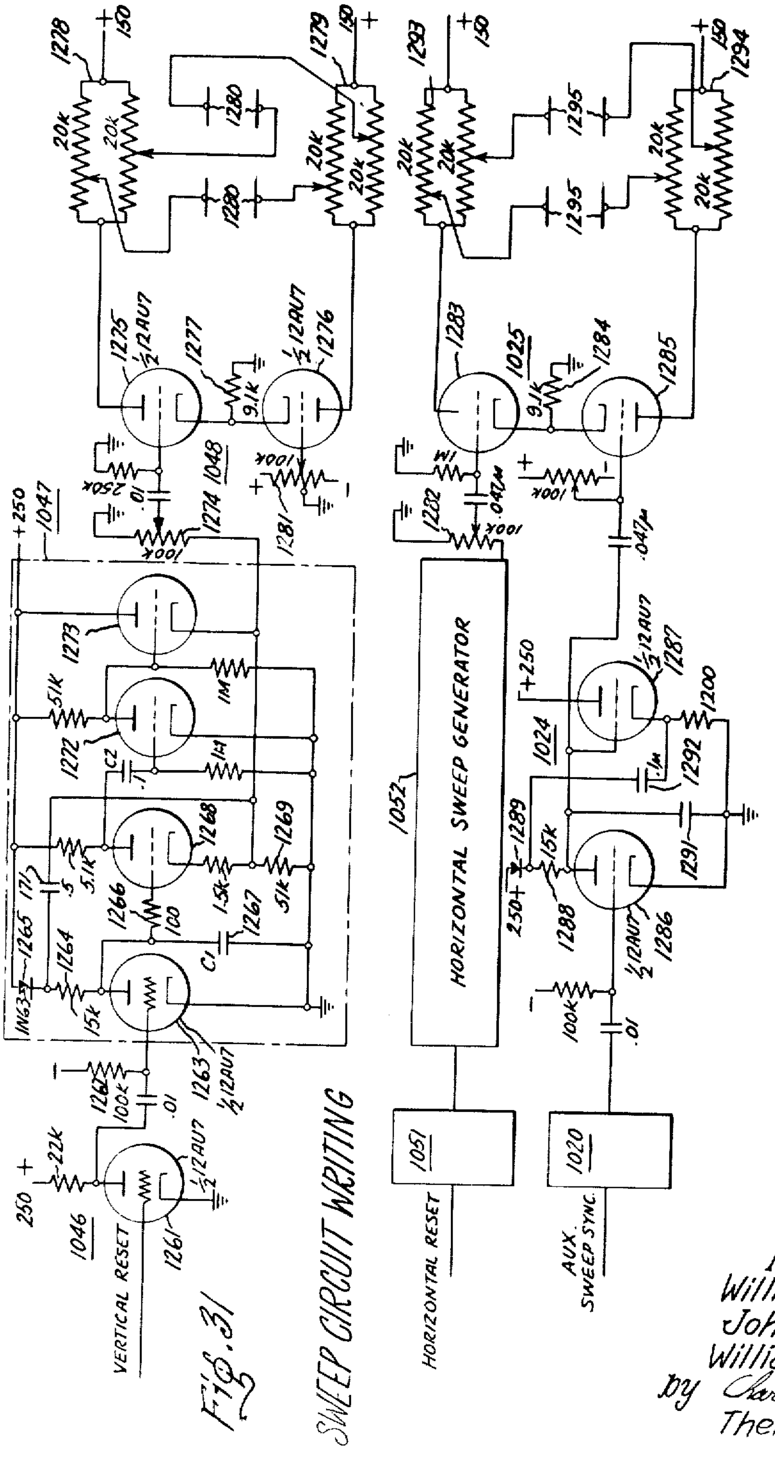
FIG. 31 is a circuit diagram showing the details of construction of the deflection circuits comprising a part of the writing system shown in FIG. 28 of the drawings.

The details of construction of the deflection circuitry used in the writing system are shown in FIGURE 31 of the drawings and comprises a conventional resistance-capacitance coupled amplifier tube 1261 having its cathode connected to ground, and its anode connected through a suitable plate load resistor to a source of positive potential. The amplifier 1261 functions as a polarity inverter so that a positive going signal pulse is supplied through a resistance-capacitance coupling network 1262 to the control grid of triode electron discharge tube 1263 comprising a part of the vertical sweep generator 1047. The cathode of electron tube 1263 is connected directly to ground, and the anode thereof is connected through a plate load resistor 1264 and diode rectifier 1265 to a source of positive plate potential. The anode of electron tube 1263 is coupled through a coupling resistor 1266 to the control grid of a triode electron discharge tube 1268, and to a charging capacitor 1267. The anode of triode 1268 is connected through a plate load resistor to the source of positive plate potential, and the cathode of triode 1268 is connected to ground through a cathode resistor 1269. A tap off point of the cathode resistor 1269 is connected back through a coupling capacitor 1271 to the juncture of the diode rectifier 1265 and place load resistor 1264 on the plate circuit of electron discharge tube 1263. The circuit thus comprised constitutes a boot strap sweep generator whose cycle of operation effectively starts upon the application of the positive gating pulse to the control grid of the electron tube 1263 supplied thru inverter 1046 from and gate 1035 in the logic circuit. This positive gating pulse renders electron tube 1263 conductive and effectively clamps the charging capacitor 1267 to ground. Thereafter upon removal of the clamping potential from amplifier 1261, electron tube 1263 is cut off, and the charge on the capacitor 1267 commences to rise towards the value of the positive plate potential source. The rising potential on the capacitor 1267 is coupled through the triode electron discharge tube 1268 so that the potential across its cathode resistor 1269 also rises. This rising potential is coupled back through the coupling capacitor 1271, and produces a constant charging current to the charging capacitor 1267 in a manner such as to improve the linearity of the saw tooth wave form sweep potential developed by the circuit. This saw tooth wave form sweep potential is coupled to the control of an electron discharge tube 1272 that comprises a conventional resistance-capacitance coupled amplifying stage and that has its anode connected to the control grid of a cathode follower amplifier stage comprised by electron tube 1273 and cathode load resistor 1274. The cathode load resistor 1274 is connected back to the tap off point on cathode load resistor 1269 so that the potential appearing across it is effectively coupled back through coupling capacitor 171 to the plate of tube 1263. The additional potential across the plate load resistor of tube 1263 obtained by reason of this connection, further improves the linearity of the sawtooth wave form output sweep potential in that it has received additional amplification in the stage 1272 which makes up any losses in the cathode follower 1268. Cathode load resistor 1274 has a variable tap off point to provide amplitude control of the vertical sweep potential which is coupled through a resistance-capacitance coupling circuit to the control grid of an electron discharge tube 1275. Tube 1275 in conjunction with a second triode tube 1276 has its cathode connected to ground through a common cathode resistor 1277, and comprises a driver amplifier stage for amplifying the sweep potential generated by sweep generator 1047, and applying the amplified sweep potential to a pair of voltage dividing variable resistor matching networks 1278 and 1279, connected to the vertical sweep deflection electrodes 1280 of the electron beam writing apparatus. The triode electron discharge tube 1276 has operating grid bias potential applied thereto from a horizontal centering potentiometer 1281, and has the saw tooth wave form vertical sweep potential coupled thereto to the common cathode resistor 1277.

The polarity inverting circuit 1051, and horizontal sweep generator circuit 1052, are similar in construction to the polarity inverter 1036 and vertical sweep generator 1047, and hence are shown only in block diagram form. The saw tooth waveform horizontal sweep potential developed by the horizontal sweep generator 1052 is coupled across a cathode follower amplifier load resistor 1282, and R.C. coupling network to the control grid of a driver amplifier tube 1283. Driver amplifier tube 1283 has its cathode connected to a common cathode resistor 1284 which is also connected to the cathode of a triode electron discharge tube 1285. The control electrode of electron tube 1285 has a high frequency saw tooth wave form modulating potential supplied thereto from auxiliary sweep generator circuit 1024 which in turn is synchronized with the master clock oscillator of the equipment which supplies synchronizing bit clock rate pulses thereto through a polarity inverting circuit 1020. The polarity inverting circuit 1020 is identical to the polarity inverting circuit 1046 connected to the vertical sweep generating circuit 1047. The polarity inverter 1020 is coupled through an R.C. coupling network to the control grid of an electron tube 1286 which together with electron tube 1287 comprises a boot strap sweep generator, that is similar in construction and operation to the boot strap sweep generator 1047 without the additional stages of amplification. Triode 1286 has its anode connected through a plate load resistor 1288 and diode rectifier 1289 to a source of positive plate potential, and connected to a charging capacitor 1291. The anode of electron tube 1286 is also connected to the control grid of electron tube 1287 which has a cathode resistor connected to the cathode thereof that is coupled back through a coupling capacitor 1292 to the juncture of the plate load resistor 1288 and diode rectifier 1289. By this arrangement, the capacitor 1291 is charged from the source of positive plate potential, and as its potential rises, the potential coupled back through coupling capacitor 1292 from the cathode load resistor of tube 1287 also rises so that capacitor 1291 is charged with a constant charging current. This operates to improve the linearity of the saw tooth wave form potential produced at the plate of electron tube 1286. The charging capacitor 1291 is effectively grounded by triode 1286 upon each bit clock pulse supplied from the master clock oscillator being applied through polarity inverter 1020 to the control grid thereof. The resulting bit frequency saw tooth wave form sweep potential is supplied to the control grid of electron tube 1285 where it is modulated upon the line frequency saw tooth wave form sweep potential supplied to electron tube 1283. Modulation occurs by reason of the common coupling provided from the common cathode resistor 1284. The resulting stepped saw tooth wave form horizontal sweep potential is shown at 1040 in FIGURE 28, and is supplied to a voltage dividing network 1293 connected to the anode electrode of electron tube 1283, and to a voltage dividing network 1294 connected to the anode electrode of electron tube 1285. The voltage dividing networks 1293 and 1294 are then connected to the horizontal deflection electrodes 1295 of the electron beam writing apparatus and provide the horizontal sweep potential thereto for sweeping the electron beam horizontally across the surface of the impressionable medium formed by thermoplastic film surface of plate 601.

Figure 32:
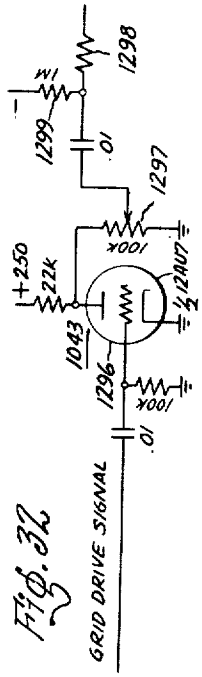
FIG. 32 is a circuit diagram of the control grid driving circuit comprising a part of the writing system shown in FIG. 28 of the drawings.

The grid driver amplifier circuit 1043 is shown in FIGURE 32 of the drawings, and comprises a conventional resistance-capacitance coupled amplifier formed by a triode electron discharge tube 1296 having its output connected across a voltage dividing resistor 1297 to the control grid indicated at 1298 of the electron beam writing apparatus. Operating bias is supplied to the control grid 1298 from a source of negative potential connected through a biasing resistor 1299.

Figure 33:
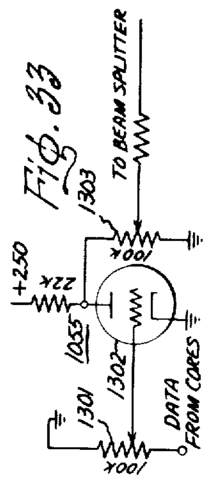
FIG. 33 is a circuit diagram of the beam splitter exciting circuit comprising a part of the writing system shown in FIG. 28 of the drawings.

The beam splitter driver circuit is shown in FIGURE 33 of the drawings. The data to be written by the electron beam writing apparatus is supplied across a voltage dividing resistor 1301 which has a variable tap off point connected to the control grid of electron tube 1302. Electron tube 1302 has its cathode grounded, and its anode connected through a plate load resistor to a source of positive potential, and to a voltage dividing resistor 1303.

The triode electron tube 1302 comprises a conventional resistance coupled amplifier which amplifies the data signal pulses and supplies them across voltage dividing resistor 1303 to the beam splitter electrode of electron beam writing apparatus. For a more complete description of the construction and operation of the electron beam writing apparatus which uses this beam splitter signal, reference is made to the above identified copending application of James F. Norton and Sterling P. Newberry with which the described circuitry will be used.

*Reading system*

Figure 34:
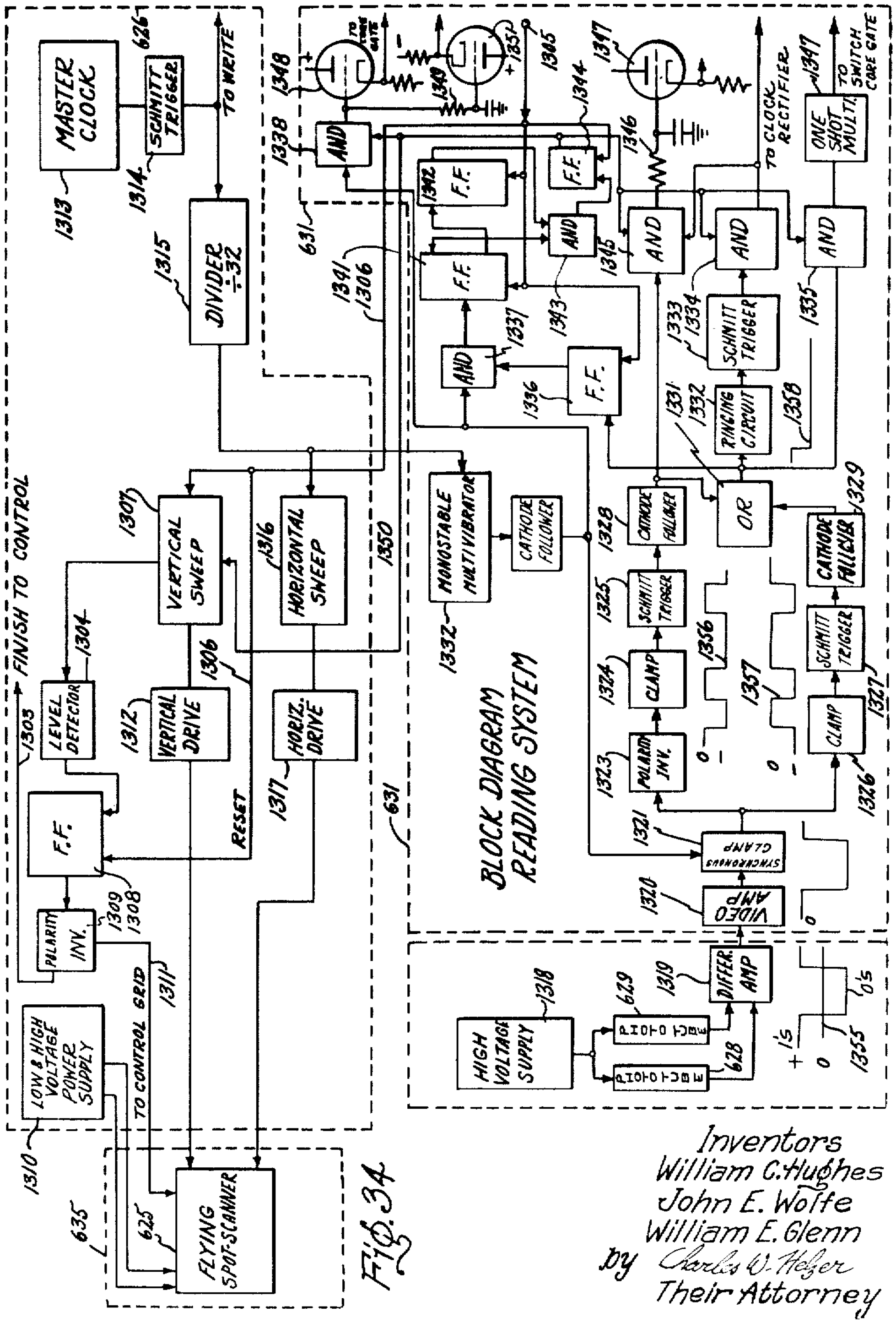
FIG. 34 is a functional block diagram of the reading system used in the plate storage equipment shown in FIG. 20 of the drawings.

The functional block diagram of the reading system of the digital data storage equipment is shown in FIGURE 34 of the drawings. The read out system utilizes a flying spot scanner 625 which causes a trace of light to be swept across a line of data bits or gratings formed on the surface of the thermoplastic film on one of the data storage plate elements. The gratings or bits of data information will refract different colored light depending upon whether the grating represents a zero or a one, and the two different colored refracted light beams are filtered and supplied to two phototubes 628 and 629. For convenience in the following discussion it will be assumed that the phototube 629 picks up the blue light which represents a one and the phototube 628 picks up the yellow light which represents a zero. In order to actuate the flying spot scanner 625 a read command signal is provided from the controller of the equipment to the terminal 1305 thereby supplying a negative voltage pulse through conductor 1306 to a vertical sweep generator 1307 and to a flip flop amplifier 1308. This read command signal serves to re-set the flip flop amplifier 1308 so that a negative going output potential is supplied from its output terminal through a polarity inverting circuit 1309 to the control grid of the flying spot scanner through a conductor 1311 to turn on flying spot scanner electron beam. Simultaneously, the vertical sweep generator 1307 provides a saw tooth wave form vertical sweep potential through a vertical drive circuit 1312 to the vertical deflection electrodes of the flying spot scanner 625. Concurrently with the above described action, bit clock frequency signals developed by the master clock oscillator 1313 of the equipment are supplied through a pulse shaping Schmidt trigger circuit 1314 to a divide by 32 circuit 1315. The shaped bit clock pulses from the output of the Schmidt trigger circuit 1314 are also supplied to the writing system of the equipment as indicated. The divide by 32 network 1315 operates to divide the frequency of the square wave bit clock pulses supplied from Schmidt trigger 1314 by a factor of 32 and results in an output of a 10,000 c.p.s. square wave signal which is the desired line scan frequency. This 10,000 c.p.s. square wave signal is then applied to the input of a horizontal sweep generator 1316 and to the input of a monostable multivibrator circuit 1332 in the output logic network 631. The horizontal sweep generator 1316 serves to develop a saw tooth wave form horizontal sweep potential having the desired 10,000 c.p.s. line scan frequency which is applied through the drive network 1317 to the horizontal deflection electrodes of the flying spot scanner tube 625.

The two different colored light signals produced by the flying spot scanner 625 as it traces across a line of bits of data are picked up by the phototubes 628 and 629 respectively which are energized from a high voltage power supply 1318 connected to each of the phototubes. The pulsed wave form output signals developed by each of the phototubes 628 and 629 are applied to the input of a differential amplifier 1319 that has its output connected to a video amplifier 1320 in the logic circuit 631. The output of video amplifier 1320 is supplied to a synchronous clamp circuit 1321 which synchronously clamps the direct current signal level of the combined pulse wave form signals obtained from differential amplifier 1319 to ground. This composite signal is then coupled through a polarity inverting circuit 1323 and clamping circuit 1324 to a Schmidt trigger pulse generating circuit 1325. The composite output signal from the synchronous clamp circuit 1322 is also supplied through a second clamping circuit 1326 to a second Schmidt trigger pulse generating circiut 1327. The pulsed output potentials produced by the two Schmidt trigger pulse generator circuits 1325 and 1327 are coupled through cathode follower amplifiers 1328 and 1329 respectively to an or gate 1331. The or gate 1331 has its output potential supplied to the ringing circuit 1332 which has a tank circuit that is tuned to the same frequency as the bit clock master oscillator 1313, and functions to develop a sinusoidal wave form bit clock potential that is applied to a wave shaping Schmidt trigger circuit 1333. The triggering circuit 1333 then squares the bit clock rate signal supplied from 1332 to develop bit clock rate pulses that are applied to an and gate 1334.

Simultaneously, the output potential produced by the or gate 1331 is applied to an and gate 1335 and to the input of a flip flop amplifier 1336. Application of the or gate 1331 output potential to the flip flop amplifier 1336 sets flip flop amplifier 1336 so that it provides negative polarity operating potential to an and gate 1337. The and gate 1337 also has negative polarity enabling pulse potentials applied thereto from the monostable multivibrator 1322 whose operation is synchronized with the line sweep frequency rate synchronizing pulses supplied from the divider network 1315. The pulses produced by the monostable multivibrator 1332 are identified as line gate pulses, and as illustrated they are applied to the input of the synchronous clamp 1321, to and gate 1337, and to an and gate 1338 comprising a part of the logic circuits of the system. Upon the or gate 1331 gating flip flop amplifier 1336, an enabling potential is applied to the and gate 1337 which allows the and gate 1337 to provide the next line pulse supplied from the monstable multivibrator 1322 to a flip flop multivibrator 1341.

Flip flop multivibrator 1341 has its inverse output terminal connected to the input of a second flip flop multivibrator 1342, and both flip flop multivibrators 1341 and 1342 have their normal outputs connected to an and gate 1343. The two flip flop amplifiers 1341 and 1342 comprise a divide by three counter network which counts a total of three line pulses from the monostable multivibrator 1322 prior to opening and gate 1343. And gate 1343 upon opening supplies an operating potential to the flip flop amplifier 1344 that serves to set the flip flop amplifier 1344. Upon being set the flip flop amplifier 1344 provides an enabling potential to the and gate 1338, the and gates 1334 and 1335, and to an and gate 1345 which has a second input connected directly to the output of cathode follower 1328 in the ones channel. And gate 1334 has its output connected to the clock rectifier 1094 of the core storage read in register, and also supplies an enabling potential to the and gate 1345. The and gate 1345 has its output potential supplied through a delay circuit 1346 comprised by a resistance and capacitor coupling network which delays the signal potential from and gate 1345 to cathode follower 1347 that is connected to the data rectifier 1088 of the read in register on the magnetic memory matrix. The cathode follower 1347 also supplies a pulsed potential of short time duration to the switch core gate rectifier 1177 of the magnetic switching cores in the magnetic memory units. The output potential from and gate 1338 is applied to the control grid of a first cathode follower amplifier 1348 whose cathode load resistor is connected to the switch core gate diode 1171 of the enabling or gate 1170 on the core storage read in register of the magnetic memory matrix 631. The output potential supplied from and gate 1338 is also supplied through a delay line 1349 comprising a resistor and a capacitor to the control grid of a cathode follower amplifier 1351 which has its anode circuit connected to the line counter input or gate diode 1148.

Having briefly outlined the construction of the reading system of the plate data storage equipment, the system operates briefly as follows. The start read control signal is supplied to the input terminal 1305 which is applied to each of the flip flop amplifiers 1336, 1341, 1342 and 1344 to return these flip flops in the re-set condition. The start pulse is also applied through conductor 1306 to the vertical sweep generator 1307 and initiates operation of the vertical sweep generator. In addition the start pulse is applied to the input of flip flop amplifier 1308 which then applies an operating bias potential to the control grid of the flying spot scanner 625 to turn on the scanning electron beam. Concurrently, the master clock oscillator 1313 has supplied triggering pulses through the Schmidt trigger wave shaping circuit 1314 to divider network 1315. Divider network 1315 converts the shift clock pulse rate signals supplied from the Schmidt trigger wave shaping circuit 1314 to 10,000 c.p.s. line scan frequency rate square wave signals which are applied to the horizontal sweep generator 1316 to synchronize its operation, and to the monostable multivibrator 1322. The horizontal sweep generator 1316 then develops a saw tooth wave form sweep potential of the 10,000 c.p.s. line scanning rate which is applied to the horizontal sweep potential of horizontal sweep electrodes of the flying spot scanner together with the saw tooth wave form vertical sweep potential applied to the vertical electrodes of the flying spot scanner, thereby causing the scanning spot of the flying spot scanner tube 625 to be traced across its face resulting in the production of a read out scanning spot of light. The manner in which the phototubes 628 and 629 develop output signals depending upon the nature of the binary data recorded on the thermoplastic film is best shown in FIGURE 8 of the drawings. A line of data blocks is shown at 357, and a semi-broken line 356 indicates the trace path of the read out electron light beam put out by the flying spot scanner 625. It is anticipated that the light beam will be pencil sharp but will be somewhat rectangular in configuration and sufficiently long to reach across an entire width of one of the data bits 357 so all of the gratings contained in that data bit can be encompassed by the read out beam. Such a read out beam can be developed on the face of the flying spot scanner by proper configuration of the electron emissive cathode of the flying spot scanner. This pencil sharp read out beam is then caused to trace at a fine trace rate along the path 356 and upon reaching the path 358 will be illuminated by the first grating 357 resulting in the production of an output signal pulse in one of the phototubes 628 and 629. Thereafter as the light beam scans across path 358 it will produce a square wave output potential from the serially arranged zero and one gratings or bits which will appear as shown at 1355. From a consideration of the wave pattern shown at 1355 it can be appreciated that the phototube 629 which reads the ones produces the positive going square wave pulses, and the phototube 628 which reads the zero produces the negative going square wave pulses. The resulting output signal supplied from the difference amplifier 1319 appears as shown at 1355. This resulting signal is then applied to the video amplifier 320 and synchronous clamp 321. Synchronous clamp 321 serves to return the output level of video amplifier 1320 to ground potential during the flyback time of the horizontal sweep, thereby restoring the D.C. level of the output of the video amplifier 1320 to zero and at the same time blanking the output of video amplifier 1320 to avoid stray voltage pulses that might be picked up during the retrace. The restored signal is then supplied through polarity inverter 1323 to clamp 1324 and Schmidt trigger 1325 where it is applied to the cathode follower amplifier 1328. The signal potential appearing at the output of cathode follower amplifier 1328 is shown in the wave form diagram 1356 where it can be seen that by reason of the polarity inverter 1323 negative going signal pulses have been produced. The output potential for the synchronous clamp circuit 1321 has also been applied directly to clamping circuit 1326 and Schmidt trigger 1327 which is coupled to the cathode follower amplifier 1329. The square wave output potential appearing on the cathode load resistor of cathode follower amplifier 1329 is shown at 1357 and both of these potentials are applied to or gate 1331. The output potential appearing on the or gate 1331 is then shown at 1358 where it can be appreciated that a steady negative energizing potential is applied to the ringing circuit 1332 as long as the flying spot of light is traversing the data block and results in actuating this circuit. The steady negative output potential from or gate 1331 is also supplied to the and gate 1335 and to the flip flop 1336, and results in setting flip flop 1336 to its set or one condition. Setting of flip flop 1336 provides a negative going potential at its normal output terminal which is supplied to the and gate 1337. As a consequence, and gate 1337 is opened upon the ocurrence of the next line gate pulse produced by multivibrator 1332 which will appear at the beginning of the scan line indicated by line 358 shown on FIGURE 8. This line gate pulse will then be applied to the flip flop amplifier 341 so as to set flip flop amplifier 341 in its one condition. The next line gate pulse which will be produced at the beginning of the next line 359 shown on FIGURE 8 will be supplied through and gate 337 to flip flop amplifier 1341 and change it from its set to its re-set condition resulting in setting flip flop amplifier 1342. Upon the beginning of the third line after the opening of or gate 1331 which is shown at 361 in FIGURE 8, a third line gate pulse will be supplied through and gate 1337 to flip flop amplifier 1341 and change it to its one or set condition. This leaves both flip flop amplifiers 1341 and 1342 in their set condition so that negative enabling potentials are applied from the normal terminals thereof to the and gate 1343, and opens and gate 1343 providing an enabling potential to flip flop amplifier 1344 which sets flip flop amplifier 1344 in its one condition. Setting the flip flop amplifier 1344 provides enabling potentials to the and gates 1338, 1345, 1334, and 1335. Application of an enabling potential to the and gate 1345 opens this and gate, and allows the square wave form signal indicated at 1356 to be supplied from cathode follower 1328 through a delay circuit 1346 and cathode follower 1347, to the data rectifier 1086 of the core read in shift register on the magnetic memory. Simultaneously, the and gate 1334 opens and applies pulses produced by the ringing circuit 1332 and Schmidt trigger wave shaping circuit 1333 to and gate 1334 and to the clock rectifier 1094 of the magnetic memory matrix. The clock pulses supplied from and gate 1334 to and gate 1345 operate to gate open or brake up the square wave form signal potential applied from cathode follower amplifier 1328 into its binary digital data form so that the signal supplied by cathode follower amplifier 1350 to the read in shift register on the memory matrix is broken up into individual bits. Accordingly, it can be appreciated that the opening of the and gates 1334 and 1345 allows data to be read into the shift register comprised by the flip flop amplifier 1071 of the magnetic memory matrix shown in FIGURE 29 of the drawings. Concurrently the enabling potential applied to the and gate 1335 applies operating potential to the one shot multivibrator 1350 resulting in the production of a short time duration gating pulse that is applied to the core gate rectifier 1177 of the magnetic switching cores 1136. This serves to erase any data that might be stored in the line into which the information will be read in the magnetic memory matrix. It should be noted that the data bits supplied to the core storage shift register through cathode follower amplifier 1347 are delayed somewhat by delay circuit 1346 so as not to coincide with the line clearing operation achieved by the one shot multivibrator 1350. Upon completion of reading in of a line of bits of data into the read in shift register of the magnetic memory, a line gating pulse will be produced by the monostable multivibrator 1332, which will open and gate 1338 that now has an enabling potential applied thereto from the flip flop amplifier 1344. Opening of and gate 1338 provides a gating pulse to the switch core gate diode 1171 of the magnetic memory, and also to the enabling gate diode 1170 of the memory read in shift register. Referring to FIGURE 29 of the drawings, it can be appreciated that application of the gating pulse to the diode rectifier 1172 provides a read in gating pulse to the appropriate switching cores 1136 so that a half magnetization read in current is supplied through the selected line conductor 1067 to the magnetic memory core units in the magnetic memory matrix surrounding the particular selected line. Application of an enabling potential to the gate 1170 provides operating potentials to the read out amplifiers 1081 in each of the flip flop amplifiers 1071 of the read in shift register so that data stored in the shift register is then read out down into the selected line of magnetic memory core units in the magnetic memory matrix. Subsequent to reading the information from the read in shift register 1071 into the magnetic memory cores, the enabling potential from and gate 1338 and delayed in delay circuit 1349 is applied to electron tube 1351 resulting in the production of a line gating pulse that is supplied to the line counter gate diode 1148. This results in shifting the line counter shift register comprised by flip flop amplifiers 1135 to select the next magnetic switching core 1136 in the table. This results in selecting the next line of cores in the memory core matrix into which data is to be stored by the reading circuits, and in the situation where an entire table of 32 by 32 bits of data is being read out, this next line selected will be the second line of cores. The gating pulse produced at the end of line 361 which opened and gate 1338 is applied to the synchronous clamp 1321 and serves to blank or cut off the signal potential at the end of the line so that no noise is produced in the data channel during the retrace portion of the read out beam across the data. As a result, during retrace the or gate 1331 is de-energized so that the entire logic circuit is conditioned for the next line of data to be read out by the flying spot scanner 625. It should be noted however that the output of flip flop amplifier 1344 which opened most of the and gates in the logic circuit is connected across conductor 1350 to the vertical sweep generator 1307 and provides a sweep rate change to the vertical sweep generator so that after the center of the first line of bits has been located on the thermoplastic film surface or other impressionable medium being read out, the vertical sweep rate is changed so that the next line to be traced across by the read out light beam in the next line of data corresponds to the line 361, and is identified as line 363 in the next line of data shown on FIGURE 8 of the drawings. Accordingly, the next line of data to be read out by the read out beam produced by the flying spot scanner 625 will be across the line 363, and the data read out will be supplied from the phototubes 628 and 629 through the logic circuits to the core storage memory device in the previously described manner except that flip flop 1344 is already set, and therefore and gates 1345, 1334, 1335 and 1338 are open. Upon reaching a point somewhat after the end or completion of the last line of data to be read out, vertical sweep potential 1307 reaches a magnitude sufficient to operate a level detector 1304 which then sets the flip flop amplifier 1308, and turns off the beam of the flying spot scanner 625. Setting the flip flop amplifier 1308 also provides a finish output signal that can be supplied across the conductor 1303 to the controller of the equipment thereby indicating that the read out of a complete table of 32 rows of 32 bits of information has been completed by the read out system.

*Reading system deflection circuits*

Figure 35:
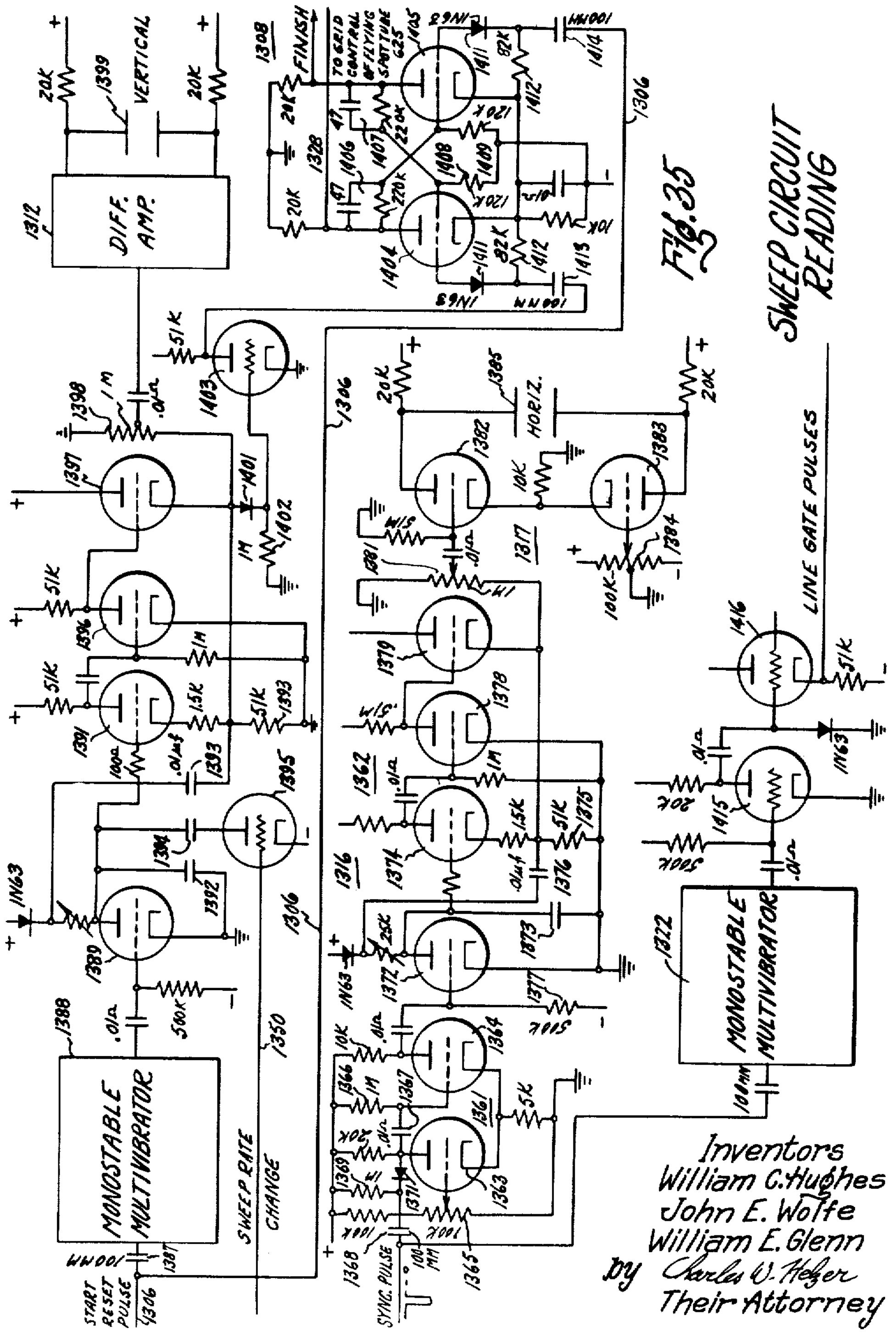
FIG. 35 is a circuit diagram showing the construction of the deflection circuits comprising a part of the reading system illustrated in FIG. 34.

The master clock oscillator 1313 and Schmidt trigger 1314, and the divide by 32 circuit 1315 are all constructed in the manner shown by the circuit diagram of FIG. 10 of the drawings described in connection with the first digital data storage equipment. Since these circuits are identical in the subject plate data storage equipment, their construction and operation will not again be described in detail. It is believed sufficient to point out that the divider network 1315 provides a square wave output potential having the frequency of 10,000 c.p.s. for use as a line scanning sweep rate. This square wave 10,000 c.p.s. signal is applied to the horizontal sweep generator 1316 shown in detail in FIG. 35 of the drawings.

The horizontal sweep generator 1316 comprises a monostable multivibrator 1361 having its output connected to a boot strap sweep generator 1362. The monostable multivibrator 1361 comprises a pair of electron discharge tubes 1363 and 1364 which have the cathodes thereof connected to ground through a common cathode resistor and have their anode electrodes connected through suitable plate load resistors to a source of positive potential. The grid biasing potential is supplied to the control grid of electron tube 1363 from a voltage dividing resistor 1365 connected between a source of positive potential and ground and grid biasing potential supplied to electron tube 1364 from a grid biasing resistor 1366 connected to the control grid of electron tube 1364 and the source of positive potential. The anode of electron tube 1363 is connected to the control grid of electron tube 1364 through a coupling capacitor 1367. Synchronizing pulses supplied from the divide by 32 network 1315 are applied to the monostable multivibrator 1361 through a coupling capacitor 1368 and triggering network comprising a resistor 1369 and diode rectifier 1371. In operation, the synchronizing pulses supplied from the divide by 32 network are applied across coupling capacitor 1368 and through rectifier 1371 which is rendered conductive by reason of the negative going synchronizing pulses and results in applying a negative potential to the control grid of the electron tube 1364. In its normally on condition, the monostable multivibrator 1361 has electron tube 1364 conducting and the positive bias built up across the common cathode resistor, keeps electron tube 1363 cut off. The application of the negative triggering pulse to diode rectifier 1371 drives the control grid of electron tube 1364 towards cut off so that electron tube 1363 is rendered conductive and produces a positive bias across the common cathode resistor which drives electron tube 1364 further into cut off condition. The length of time that the electron tube 1364 remains cut off is determined primarily by the bias supplied to the control grid of electron tube 1363 from the voltage divider 1365, and in the present instance is adjusted so that the short time duration triggering pulse is produced by the monostable multivibrator. Subsequent to electron tube 1364 being driven into cut off capacitor 1367 which was charged negatively by the negative triggering pulse charges towards the potential of the positive source of plate potential and eventually drives the control grid of electron 1364 sufficiently positive for that tube to again be rendered conductive and to drive electron tube 1363 into cut off by reason of the positive bias built up across the common cathode resistor. A short time duration positive going signal pulse produced by the monostable multivibrator 1361 as a result of this operation is then coupled through a resistance-capacitance coupling network to the control grid of an electron tube 1372 which comprised a part of the boot strap sweep generator circuit 1362.

In addition to the electron tube 1372 the boot strap sweep generator 1316 includes a charging capacitor 1373 and a second electron discharge tube 1374 having its cathode connected through a voltage dividing resistor 1375 to ground, and having its control electrode connected through a resistor to the anode of electron tube 1372. The anodes of both electron tubes 1372 and 1374 are connected to a source of positive plate potential through suitable plate load resistors with electron tube 1372 having a diode rectifier inserted between its plate load resistor and the source of positive potential. The voltage dividing resistor 1375 has a tap connected back through a coupling capacitor 1376 to the juncture between the diode rectifier and the plate load resistor of electron tube 1372. The electron tube 1372 is maintained normally cut off by a negative bias supplied from a source of negative potential through a grid biasing resistor 1377 so that the charging capacitor 1373 is allowed to charge towards the potential of the positive plate potential. Upon the occurrence of a positive gating potential appearing in the output of the monostable multivibrator 1361, electron tube 1372 is rendered conductive and connects the charging capacitor 1373 to ground so as to initiate this charge cycle. Capacitor 1373 then charges towards the potential of the plate source. As the charge on capacitor 1373 increases, electron tube 1374 amplifies the potential and this amplified potential is applied to electron tube 1378 through a resistor capacitor coupling network. Tube 1378 further amplifies the potential which is directly applied to electron tube 1379 which, along with resistor 1375 is a conventional cathode follower amplifier. As a result of the fact that amplifiers 1374 and 1379 share a common cathode resistor there is, for all practical purposes, 100% voltage feedback around amplifiers 1374, 1378 and 1379. Because of the relatively high gain of the circuit, the voltage that appears at the juncture of the connections from capacitor 1376 and resistor 1375 is very accurately proportional to the voltage across capacitor 1373. There is, therefore, a constant voltage across resistor 1372 thereby resulting in a constant current flow into capacitor 1373. This results in a linear build up in the voltage across capacitor 1373 with time. The sawtooth wave form appearing across resistor 1375 is applied across horizontal size adjustment resistor 1381 and connected through a resistance-capacitance coupling network to the control grid of an electron tube 1382. Electron tube 1382 has its cathode connected to a common cathode resistor with the cathode of a second electron tube 1383 which has an operating bias supplied to the control grid thereof from a horizontal centering potentiometer 1384. The anodes of each of the electron tubes 1382 are connected through plate load resistors to sources of positive potential as well as to the horizontal deflection electrodes 1385 of the flying spot scanner. By this arrangement, the electron tubes 1382 and 1383 serve to develop two saw tooth wave form sweep potential across their plate load resistors which are coupled to the horizontal deflection electrodes of the flying spot scanner tube 625.

The start command signal supplied from the controller is fed through a coupling capacitor 1387 to a monostable multivibrator 1388 which is identical in construction to the monostable multivibrator comprised by electron tubes 1363 and 1364. A monostable multivibrator 1388 has its output connected through a resistance-capacitance coupling network to the control grid of electron tube 1389 The electron tube 1389 together with electron tubes 1391, 1396 and 1397 and a charging capacitor 1392 comprises a boot strap sweep generator which is similar in many respects to the boot strap sweep generator 1362 comprised in a part of the horizontal sweep generator. For this purpose, electron tube 1389 has its cathode directed directly to ground and its anode connected through a plate load resistor and diode rectifier to a source of positive plate potential. The anode of electron tube 1389 is also connected through a resistor to the control grid of electron tube 1391 which together with electron tubes 1396 and 1397 and their related circuitry, serve to maintain the voltage at the juncture of the connections from capacitor 1392 and resistor 1393 at a potential very nearly proportional to the voltage across capacitor 1392, as was described in connection with sawtooth generator 1316. The charging capacitor 1392 is connected between the anode and cathode of electron tube 1389 and accordingly, is connected to the control grid of electron tube 1391. Connected in parallel to charging capacitor 1392 is an additional charging capacitor 1394 which is connected to anode electrode of an electron tube 1395. The control grid of electron tube 1395 is connected to a conductor 1350 which receives operating potential from the flip flop amplifier 1344 in the logic circuits and operates through electron tube 1395 and capacitance 1394 to change the total capacitance applied between the control grid of cathode and anode electrodes of electron tube 1389 thereby changing the charging rate of capacitor 1392 and as a result, the rate of rise of the voltage across capacitor 1392. In operation, electron tube 1389 is maintained normally cut off by negative bias supplied to the control grid thereof of the grid biasing resistor in a source of negative biasing potential. Upon the occurrence of the positive triggering pulse supplied from the monostable multivibrator 1388, electron tube 1389 is rendered conductive, thereby discharging capacitors 1392 and 1394 to ground. Thereafter the potential or charge on capacitor 1392 rises towards the value of the positive plate potential in a linear sawtooth wave form fashion similar to that of the boot strap sweep generator 1362, described in connection with the horizontal deflection circuits. The rate of charge and hence the wave form of the sawtooth sweep potential developed by the sweep generator thus comprised, is dependent upon the capacitance of the circuit as determined by charging capacitor 1392 and the circuit arrangement comprised in electron tube 1395 and capacitor 1394. Upon application of the negative potential to the control grid of the reactance tube 1395. This total capacitance value is altered so as to increase the rate of rise of the sawtooth wave form sweep potential developed by the circuit. Accordingly, prior to the introduction of a negative sweep rate change signal to the control grid of electron tube 1395 the sawtooth wave form potential developed by the circuit will provide fine scanning of the read out light beam of the flying spot scanner, and upon application of the change signal to electron tube 1395, the rate of change of the vertical sweep potential will be increased so that the horizontal scans of the light beam of the flying spot scanner will be coarser or further apart, corresponding to the spacing between the read out lines 361 and 363 of the bits picture, shown in FIG. 8 of the drawings. The sawtooth wave form potential appearing on the anode of electron tube 1391 is amplified in amplifier circuits comprising electron tubes 1396 and 1397 and fed back in a negative sense to the cathode circuit of electron tube 1391, thereby forming an amplifier with a gain of very nearly 1, resulting in an accurately linear sawtooth wave form potential across resistor 1398. The voltage appearing across vertical size adjustment resistor 1398 is coupled through a coupling capacitor to differential amplifier 1312, which is very nearly identical in construction to the differential amplifiers comprised by electron tubes 1382 and 1383 in the horizontal drive arrangement. The differential amplifier 1312 has its two electron tubes connected through separate plate load resistors which in turn are connected to the vertical deflection electrode 1399 of the flying spot scanner tube. The cathode load resistor 1398 is also connected to a Zener diode 1401 having a load resistor 1402 connected thereto. The Zener diode 1401 exhibits the characteristic of not becoming conductive until some predetermined potential amplitude applied across it is reached, whereupon it breaks down and conducts, thereby developing an output potential across the load resistor 1402. This predetermined potential is set to be at the end of the vertical scan at a point which will assure that all 32 lines of data have been read out. Upon reaching this value of potential the Zener diode will produce an output pulse across the load resistor 1402 which is coupled through a conventional resistance coupled amplifier comprised by electron tube 1403 to the trigger circuit of a bi-stable flip-flop amplifier 1308. The bi-stable multivibrator or flip flop amplifier 1308 also has resetting pulses supplied thereto from the conductor 1306 which are also applied to the vertical sweep generator monostable multivibrator 1388. Accordingly, the bi-stable multivibrator 1308 will be reset simultaneously with the triggering of the monostable multivibrator 1388 by the start command signal supplied through the conductor 1306.

The bi-stable multivibrator 1308 comprises a pair of triode electron discharge tubes 1404 and 1405 which have their cathodes connected through a common cathode resistor to a source of negative potential. The anodes of each of the electron tubes 1404 and 1405 are connected through respective plate load resistors to ground, and the anodes and control electrodes thereof are interconnected parallel resistance-capacitance coupling networks 1406 and 1407. Grid bias is supplied to the control grids of each of the electron tubes through grid biasing resistors 1408 and 1409 which are connected to the source of negative potential. By this arrangement, upon one of the electron tubes 1404 or 1405 being rendered conductive, the positive bias built up across the common cathode resistor will maintain the circuit in this condition until it is triggered from some outside source to a new condition. Triggering of the bi-stable multivibrator from one to another of its operating conditions is achieved by triggering circuits which comprises diode rectifier 1411 having the anode or selector element connected to the control grid and the emitter or cathode element thereof, connected to a charging resistor 1412 which has its opposite end connected to the cathode of respective associated electron tubes 1404 or 1405. Triggering signals are applied to the triggering circuits through coupling capacitor 1413 and 1414 respectively. In both cases, negative triggering potentials are applied to either the coupling capacitor 1413 or 1414 to produce a negative potential across the associated charging resistor 1412 which renders diode rectifier conductive, therefore biasing the control grid of the associated electron tubes 1404 or 1405 negatively, thereby driving it towards cut off whereupon the positive bias built up by the opposite tube becoming conductive across the common cathode resistor drives it further into cut off, thereby switching it from one operating condition to the other. Output potentials from the bi-stable multivibrator 1308 are obtained from the anode circuits of each of the electron tubes 1404 or 1405 and applied to the control grid of the flying spot scanner 625 and to the controller as a finish signal. It should be noted that upon a negative going triggering pulse being applied to the coupling capacitor 1413 of the triggering circuit associated with electron tube 1404 at the end of the vertical scan cycle when the zener diode 1401 breaks down and conducts, electron tube 1404 is cut off and a negative going signal pulse indicating the finish of the readout of the table of data is applied from the plate circuit of electron tube 1405 back to the controller to indicate the end of the reading out cycle.

In addition to synchronizing the operation of the horizontal sweep generator 1362, the pulsed wave form synchronizing pulses supplied from the output of the divide by 32 network 1315 are applied to a monostable multivibrator 1322 to synchronize its operation. The monostable multivibrator 1322 is identical in construction to the monostable multivibrator comprised by electron tubes 1363 and 1364, and operates in the same manner to develop a short time duration pulsed wave form signal which is applied through a conventional resistance-capacitance coupling amplifier formed by electron tube 1415 to a cathode follower amplifier 1416. The cathode follower amplifier 1416 then serves to couple short time duration pulses to the synchronous clamp of the logic circuit for D.C. restoration purposes.

*Light optics assembly*

Figure 36:
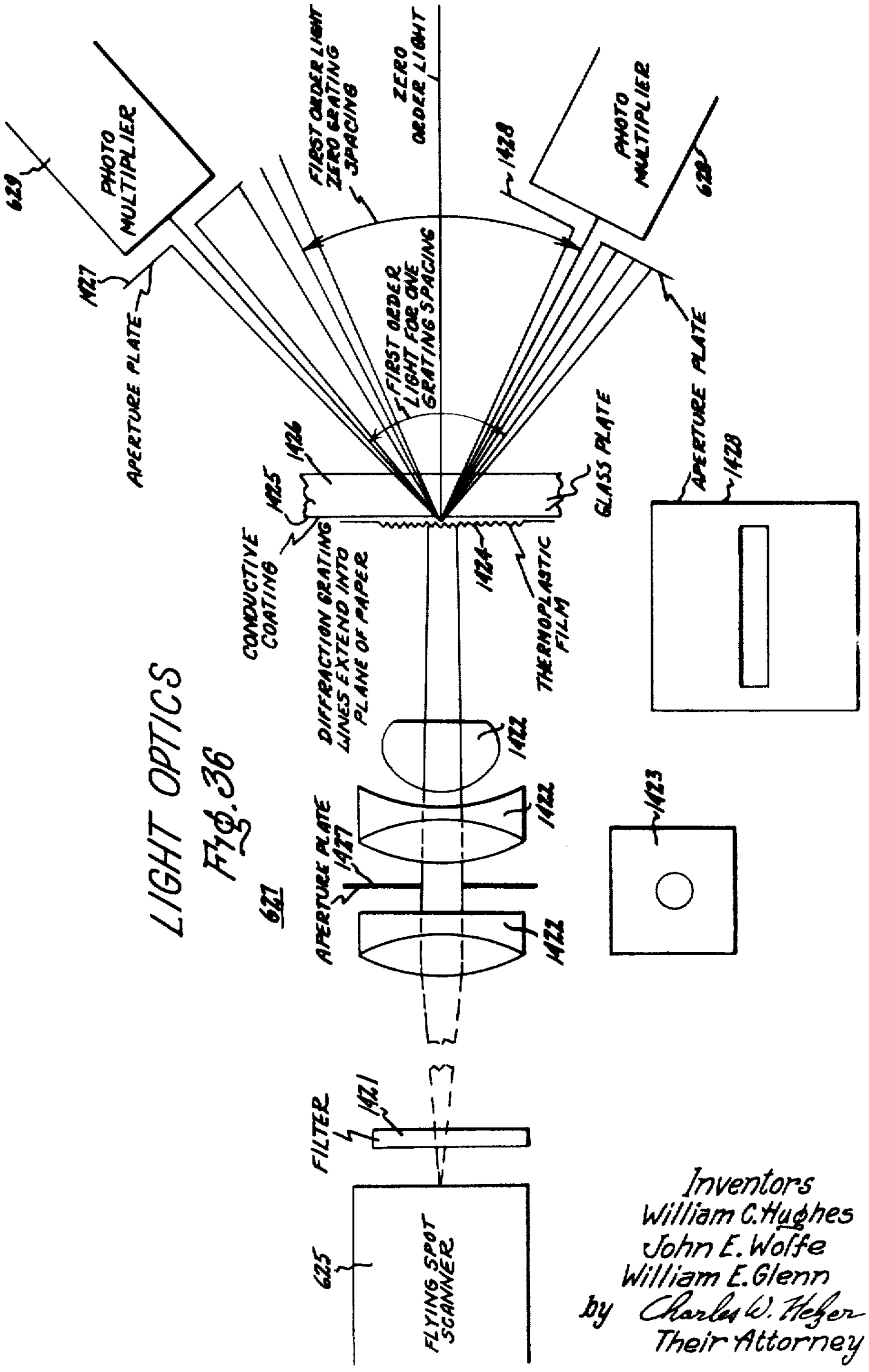
FIG. 36 is a functional block diagram showing the arrangement of the read out optics structure used in the reading system of FIG. 34 of the drawings.

The details of the readout light optics arrangement for directing the flying spot scanner light beam through the data carrying diffraction gratings and into the photomultiplier 628 and 629 is illustrated on FIG. 36 of the drawings. The readout arrangement alone, without other cooperating elements of the present recorder system, does not comprise a part of the present invention, but is the prior invention of William E. Glenn, and is described and claimed in copending application Ser. No. 783,558, referred to below. The flying spot scanner 625 is shown at the lefthand side of the drawing and will produce a pencil-like beam of light having a circular cross section which is made more monochromatic by a filter 1421 disposed between the face of the flying spot scanner tube 625 and an objective lens assembly shown at 1422. The objective lens assembly 1422 includes an apertured plate 1423 which has a circular aperture therein for confining the light from the flying spot scanner 625 and filter 1421 to an area on the thermoplastic film which approximates that of one data bit. The objective lens assembly 1422 will focus the light beam shaped by aperture plate 1423, so as to illuminate one entire data bit comprised of several diffraction gratings at a time as the flying spot scanner causes it to trace across an entire line of bits, thereby causing each data bit to be illuminated in sequence. Light diffracted by the diffraction gratings formed in the thermoplastic film surface 1424 passes through a transparent conductive coating 1425 upon which the thermoplastic film is deposited and through to the transparent base member 1426 at an angle with the normal to the plane of the thermoplastic film which is determined by the spacing of the grating lines. The photomultiplier tube 629 will be positioned at an angle with respect to the normal to the surface of the thermoplastic film 1422 which will be determined by the angle of the first order rays monochromatic light will make after passing through a diffraction grating of one of the two spacings to be used. Assuming the monochromatic light focussed on the thermoplastic film to be a frequency of about 546 millimicrons then this angle will be approximately 25.9 degrees for photomultiplier 629 and will be filtered through an elongated aperture formed in an amplitude plate 1427 disposed in front of the emissive cathode circuit of the photomultiplier tube 629. As a consequence of this arrangement, when a diffraction grating representing "one" is being passed over by the pencilled light from flying spot scanner tube 625 the first order rays diffracted by the grating will pass through the aperture plate 1427, and impinge upon the photo-emissive cathode surface of photomultiplier tube 629. Photomultiplier tube 628 is likewise positioned at an angle with respect to the normal tube of thermoplastic film surface which is determined by the first order light grating spacing for the zero gratings formed on the thermoplastic film surface and for a monochromatic light beam of approximately 546 millimicrons wave length, this angle will be in the neighborhood of 18.1 degrees. Photomultiplier 628 also has an apertured plate 1428 positioned in front of it which has an elongated aperture shown in the front view below the readout optical arrangement and is identical in construction to the aperture plate 1427. Aperture plate 1428 serves to block all but the first order light rays diffracted from the zero gratings or bits thereby allowing only the first order or yellow light rays to impinge upon the photo-emissive cathode surface of photomultiplier tube 628. For a more detailed description of the operation of the readout light optics arrangement, reference is made to copending U.S. application Ser. No. 783,558, filed Dec. 29, 1958, William E. Glenn, inventor, entitled, Information Storage.

*Photomultiplier and video amplifier circuits*

Figure 37:
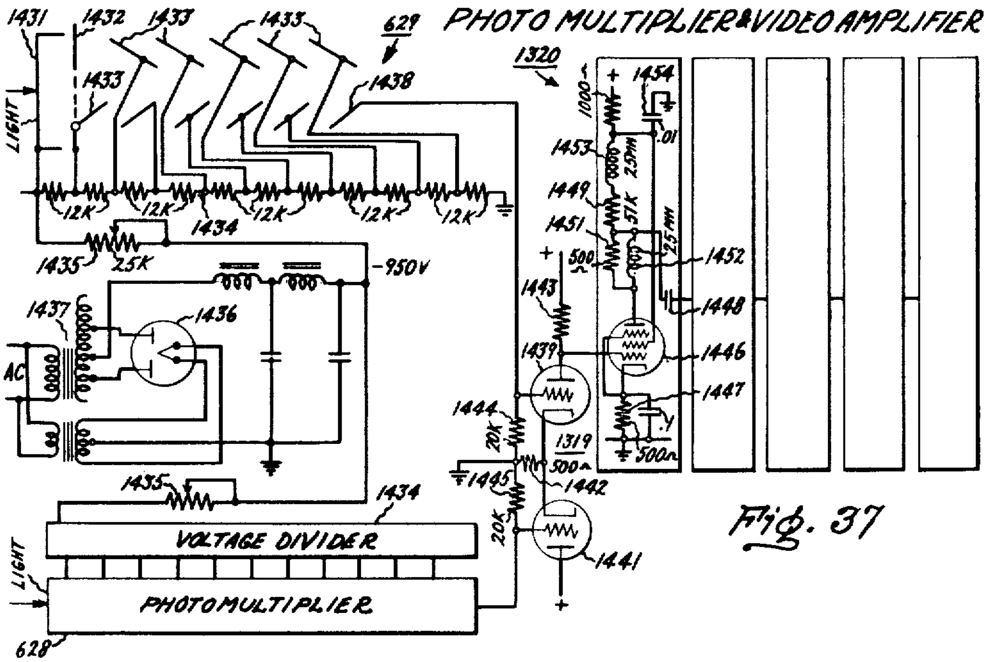
FIG. 37 is a circuit diagram showing the construction of the photomultiplier and video amplifier circuits used in the reading system shown in FIG. 34 of the drawings.

The photomultiplier exciting circuits are shown in FIG. 37 of the drawings, wherein the photomultiplier 628 is shown as a block since it is identical in construction to the photomultipliers 629. Photomultiplier 629 comprises a photo-emissive cathode surface 1431 which emits electrons upon light impinging thereupon. The electrons emitted by the photo-emissive cathode surface 1431 pass through a control grid 1432 and impinge upon the first plate of a plurality of secondary electron emissive plates 1433.

The secondary emissive plates 1433 are each connected to progressively higher potential points on a voltage dividing resistor 1434 as the electrons proceed away from the photoemissive surface 1431. The voltage dividing resistor 1434 is connected through variable resistor 1435 to a power supply rectifier 1436 as excited from a source of A.-C. supply through a transformer 1437. The power supply rectifier 1436 operated to develop a high negative potential which is applied to the photoemissive surface 1431 to which the voltage dividing resistor 1434 is connected with its remaining end grounded. The variable resistor 1435 provides an adjustment for the potential applied to the photoemissive cathode surface 1431 to compensate for tube variations. The last plate 1438 of the photomultiplier tube 629 is connected to the control grid of a differential amplifier tube 1439. The power supply rectifier 1436 is also coupled through a similar variable resistor 1435 and voltage divider 1434 for exciting the photomultiplier tube 628. The last secondary emissive plate photomultiplier tube 628 is also coupled to a triode electron discharge tube 1441 of a differential amplifier 1319. The electron tubes 1439 and 1441 each have their cathodes connected through a common cathode resistor 1442 with the anode of electron tube 1441 being connected directly to a source of positive plate potential and the anodes of electron tube 1439 being connected to a plate load resistor 1443 to a source of positive potential. Control electrode of electron tube 1439 and hence the last plate 1438 in the photomultiplier are connected to ground through a load resistor 1444 and the control electrode of electron tube 1441 is connected to ground to a load resistor 1445. By reason of the arrangement, a signal potential appearing on the last plate 1438 in each of the photomultiplier tubes will appear across the control grid load resistors 1444 or 1445. Because of the sequential nature in which the photomultipliers 628 and 629 are operated since only one will be receiving light at a time, either electron tube 1441 or 1439 will be cut off and as a consequence, the potential across the plate load resistor 1443 will rise and fall depending upon whether zero or one is being read out by the photomultiplier tube at any particular time.

The pulsating output signal developed in the anode circuit of electron tube 1439 of difference amplifier 1319 is coupled through the video amplifier 1320. Each of the amplification stages of the five stage video amplifier 1320 comprises an electron discharge tube 1446 having its cathode connected through a grid biasing network comprising parallel resistor and capacitor 1447 to ground. The suppressor electrode of tube 1446 is connected directly to the cathode and the input from difference amplifier plate load resistor 1443 is connected directly to the control electrode of the first electron discharge tube 1446 although thereafter, interstage coupling is achieved through a coupling capacitor 1448. The anode electrode of tube 1446 is connected through a voltage dividing plate load resistor 1449 to a source of positive potential. A portion 1451 of the plate load resistors is bypassed by an inductor 1452 connected in parallel therewith, which serves to improve the high frequency response of the electrode tube 1446. The interstage coupling capacitor 1448 is connected to the function of the resistors 1449 and 1451 of the plate load resistor. A second choke coil 1453 is inserted in series with the load resistor 1449 with its high potential and being connected back to the screen grid electrode which is also returned to ground through a bypass capacitor 1454. The inductances 1453 and 1452 are included in the plate load circuit of the pentode electron tube 1446 for high frequency compensation purposes to improve the response of the amplifier to higher frequency components contained in the pulsed wave form signals supplied thereto from photomultipliers 628 and 629 through difference amplifier 1319.

*Reading system logic circuits*

The pulsed wave form data signals developed by the photo tube multipliers 628 and 629 and video amplifier 1320 are supplied through coupling capacitor 1461 to the control grid of cathode follower amplifier 1462 across a synchronous clamping circuit 1321. The synchronous clamping circuit 1321 comprises a pair of diode rectifiers 1463 and 1464 which have the anode of diode 1463 connected directly to the cathode of diode 1464 and through a resistor 1465 of the input conductor connected to the control grid of cathode follower amplifier 1462. The cathode of diode 1463 is connected to the anode of diode 1464 through a voltage dividing register 1466 which has its approximate mid-point connected directly to ground. Synchronizing pulse potentials are applied to diodes 1463 and 1464, respectively, through coupling capacitors 1467 which serve to couple the cathode of diode 1463 to a cathode resistor 1468 and amplifying tube 1469 which has its anode connected to a source of positive potential through a plate load resistor 1471 that is coupled back through the coupling capacitor 1467 to the anode of diode 1464. A positive operating bias is applied to the control grid of triode 1469 from a grid biasing resistor 1472. Line gate pulses supplied from the multivibrator 1322 are applied also to the control grid of electron tube 1469 which are negative in polarity and function to cut off electron tube 1469.

During this period, a positive synchronizing pulse is coupled through the anode of diode 1464 and a negative drawing synchronizing pulse is applied to the cathode of diode 1463 rendering these two diodes conductive and clamping the control grid of cathode follower amplifier 1462 to ground potential thru the resistor 1465. The result of this action is to restore the pulsating wave form signal supplied to cathode follower amplifier 1462 to ground potential reference. The restored square wave signal potential appearing at the output of cathode follower amplifier 1362 is supplied through a coupling diode 1473 to an inverter circuit which comprises a conventional resistance-capacitance coupled amplifier 1474 having its anode connected across a clamping diode 1324 to the control grid of an electron tube 1475 of the wave shaping bistable multivibrator 1325. The bistable multivibrator 1325 further includes a triode electron discharge tube 1476 which has its cathode connected in common with the cathode of electron tube 1475 through a cathode resistor 1477 to a source of negative potential. The anode of each of the electron tubes 1475 and 1476 are connected to suitable plate load resistors to ground and the control electrode of electron tube 1476 is connected through a parallel resistance and capacitance network 1478 to the anode of electron tube 1475 and through a biasing resistor 1479 to the source of negative potential. The circuit thus comprised is adjusted so that the electron tube 1475 is normally conducting, and the positive bias across the common cathode resistor 1477 keeps electron tube 1476 nonconducting. The negative polarity signal pulses supplied to the control grid of electron tube 1475 drive that into cut off and allow electron tube 1476 to become conductive as long as the negative polarity signal pulses are applied to the control grid of the electron tube 1475. As a consequence, the anode potential of electron tube 1476 follows precisely the wave form of the input signal potential applied to the control grid of electron tube 1475. However, it does serve to square or shape the potential. The shaped signal pulses are then coupled to the control grid of cathode follower amplifier 1328, whose cathode load resistor is connected to a diode rectifier 1481 of or gate 1331 and to a diode rectifier 1482 of an and gate 1345.

The restored pulsating data signals appearing across the cathode load resistors of cathode follower amplifier 1462 are also coupled through a coupling diode 1483 and clamp diode 1326 to the control grid of an electron tube 1475 in a cathode coupled multivibrator 1327. The cathode coupled multivibrator 1327 is identical in construction and operation to the cathode coupled multivibrator 1325. However, should one desire a more detailed description of the construction and operation of this circuit, reference is made to page 164 of the above identified reference textbook by Millman and Taub. The cathode coupled multivibrator 1327 serves to further shape the square wave signal potentials supplied thereto and apply them through cathode follower amplifier 1329 to a diode rectifier 1484 of or gate 1331 which further includes the load resistor 1485.

The wave form of the potential appearing across the or gate load resistor 1485 is shown at 1358 in FIG. 34 of the drawings, and is applied to the control grid of an electron tube 1486 of ringing circuit 1332.

Ringing circuit 1332 includes a tank circuit formed by an inductor 1487 and parallel connected capacitor 1488, which are connected to the cathode of electron tube 1486 which has its anode connected through a plate load resistor to a source of positive potential. Tank circuit formed by capacitor 1488 and inductor 1487 is also coupled to the control electrode of an electron tube 1489, which has its cathode bias resistor connected back through a variable resistor 1491 to a midtap point on the inductor 1487. The triode tube 1489 and tank circuit formed by inductor 1487 and capacitor 1488 comprises a conventional Hartley oscillator circuit having an amplitude control provided by the variable resistor 1491. The tank circuit comprised by capacitor 1488 and inductor 1487 is prevented from oscillating, however, by the electron tube 1486 which is normally conductive and holds it in clamp.

Upon the application of a negative potential to the control grid of electron tube 1486, however, from the or gate 1331, electron tube 1486 is cut off leaving the tank circuits 1487 and 1488 free to oscillate. The circuit will then oscillate for as long as the negative potential is applied to control grid of electron tube 1486, and the oscillators will be at the frequency at which the tank circuit is tuned. The tank circuits 1488 and 1487 are tuned to the clock bit rate so that oscillation produced by the ringing circuit after proper shaping may be used as clock pulses. For this purpose, the clock rate signal generated by the ringing circuit 1332 is coupled to conventional resistance-capacitance coupled amplifier 1492, which has its anode connected to the control electrode of an electron tube 1475 of cathode coupled multivibrator 1333, which is identical in construction to the cathode coupled multivibrator 1325 and operates in a similar fashion. The cathode coupled multivibrator 1333 serves to shape the clock rate sinusoidal wave shape signal supplied thereto from the ringing circuit 1332, and provides the square wave pulses at the clock rate through a cathode follower amplifier 1493 to a diode rectifier 1497 of and gate 1334. And gate 1334 further includes a load resistor 1495 that is connected to a source of negative potential and a diode rectifier 1496 which has a negative enabling potential supplied thereto from the flip flop amplifier 1344 in the edge detection circuit.

Upon application of this enabling potential, and gate 1334 opens and supplies the bit clock pulses generated by the cathode coupled multivibrator 1333 and ringing circuit 1332 to the clock rectifier 1094 of the core storage read-in register. Concurrently with this action, the data containing pulsed wave form signals appearing across the cathode circuit of cathode follower 1328 is applied through rectifier 1482 to and gate 1345. And gate 1345 further includes a load resistor 1497, a diode rectifier 1498, and a diode rectifier 1492. The diode rectifier 1498 has an enabling potential supplied thereto from the flip flop amplifier 1344 in edge detection circuit, and the diode rectifier 1492 has an enabling potential applied thereto from the and gate 1334 upon that and gate opening. As a consequence, upon bit clock pulses being supplied to the clock rectifier 1094 of the core storage read-in register, the and gate 1345 opens, providing all of the other enabling potentials are present, and provides data containing pulse potentials through the delay circuit comprising resistor and capacitor 1346 to the control electrode of cathode follower amplifier 1347. The cathode load resistor of cathode follower amplifier 1347 is then connected to the data rectifier 1086 of the core storage read-in register and operates to supply the data to the data rectifier 1086 of the core storage read-in register so that it can be stored in the magnetic core storage.

Prior to reading data into core storage read-in register, and hence prior to the opening of the and gate 1334 and 1345, or gate 1331 provides an enabling potential to a diode rectifier 1501 of and gate 1335. And gate 1335 further includes a load resistor 1502, which has a source of negative potential connected thereto, and a diode rectifier 1503. The diode rectifier 1503 has enabling potential applied thereto from the flip flop amplifier 1344 in the edge detection circuits so upon the setting of the flip flop amplifier 1344, and gate 1335 opens. The signal supplied from the output of and gate 1335 is supplied through a coupling capacitor 1504, diode rectifier 1505, to the anode electrode of electron discharge tube 1506, and through a coupling capacitor 1507 to the control grid of a triode electron discharge tube 1508. The two triode electron discharge tubes 1506 and 1508 are connected to comprise a cathode coupled one shot monostable multivibrator 1350, and for this purpose have their cathodes connected through a common cathode resistor 1509 to a source of negative potential. The anodes of electron tubes 1506 and 1508 are connected through respective plate load resistors to ground and operating bias is provided to the control electrode of electron tube 1508 by the grid biasing resistor 1511 connected thereto and to ground. Operating bias is applied to the control electrode of electron tube 1506 from a voltage divider 1512 and a variable contact point connected to the control electrode of electron tube 1506. The coupling capacitor 1504 and diode rectifier 1505, together with a resistor 1513 connected to the junction thereof and to ground, comprise a trigger circuit for triggering the monostable multivibrator 1350 from its stable to its unstable condition. With this arrangement, the electron tube 1508 normally has a bias supplied to its control electrode which keeps this tube conducting, and the positive bias built up across the common cathode resistor 1309 maintains electron tube 1506 non-conductive.

Upon the application of a negative triggering potential from the and gate 1335 through coupling diode 1505 to the anode of electron tube 1506 and hence to the control electron of electron tube 1508, electron tube 1508 is driven to cut off and allows electron tube 1506 to become conductive. Immediately after this transaction, coupling rectifier 1505 is closed so that the coupling capacitor 1507 can start charging towards ground potential through the grid biasing resistor 1511. In a short time thereafter, the control electrode of electron tube 1508 is then sufficiently positive to again take over and return the monostable multivibrator 1327 to its normal operating condition. This cycle of operation results in an output signal pulse of short duration depending upon the setting of the variable resistor 1512. The anode of electron tube 1506 is coupled to the control electrode of the cathode follower amplifier 1514. The cathode load resistor of cathode follower amplifier 1514 is connected to the switching core gating diode 1177 of the magnetic core storage unit and will apply a read out pulse to the selected line core to assure that that line of magnetic memory core units has been cleared prior to entering new data being read out into the selected line from the cathode follower amplifier 1347.

*Block edge recognition circuits*

Figure 38:
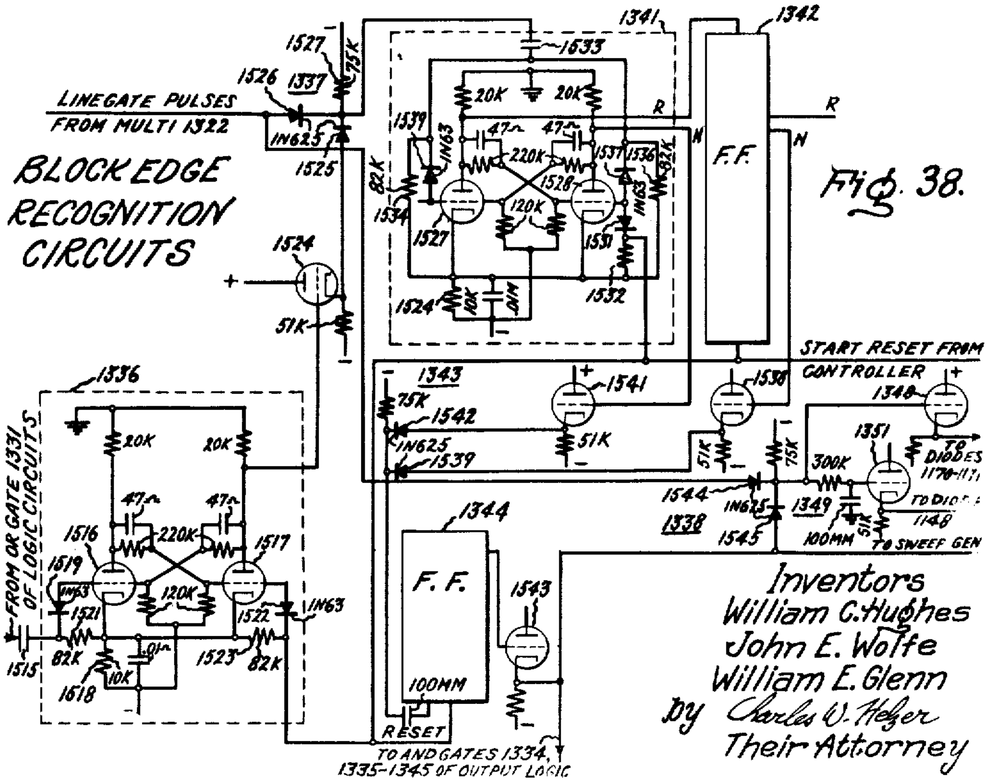
FIG. 38 is a circuit diagram of the block edge recognition circuits comprising a part of the reading system shown in FIG. 34.
Figure 39:
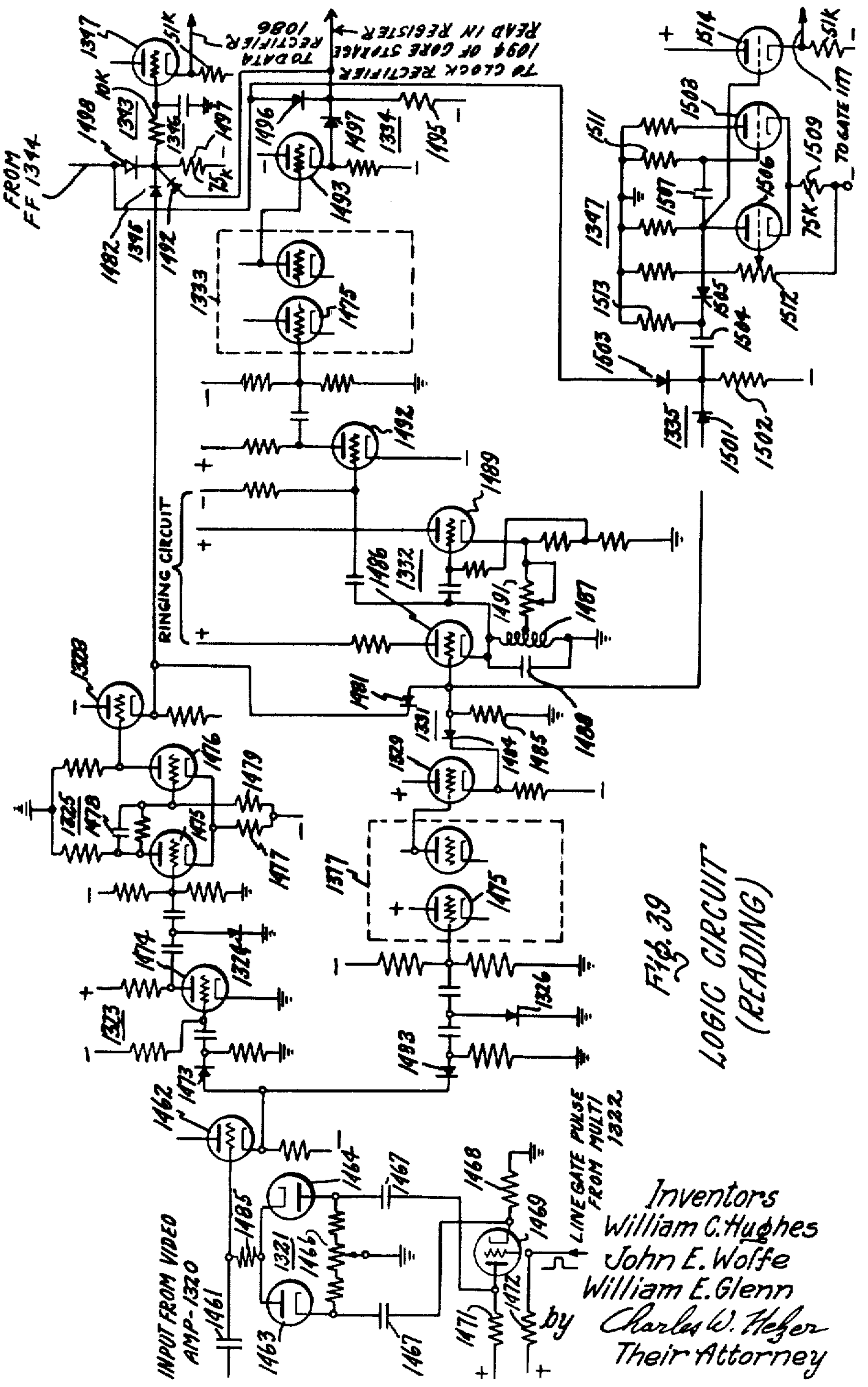
FIG. 39 is a circuit diagram of the readout logic circuits comprising a part of the reading system shown in FIG. 34.

The details of construction of the block edge recognition circuits are shown in FIG. 38 of the drawings on the lower half of the page. The negative polarity enabling potential supplied from the output of the or gate 1331 is coupled through a coupling capacitor 1515 to the bistable flip flop multivibrator 1336. Bistable multivibrator 1336 comprises a pair of electron discharge tubes 1516 and 1517 which have their cathodes connected through a common cathode resistor 1518 to a source of negative potential, and the anodes thereof connected through respective plate load resistors to ground. The anodes and control electrodes of electron tubes 1516 and 1517 are interconnected through parallel resistance-capacitance network, and grid biasing potentials are applied to the control electrode through the resistors of the parallel resistance-capacitance network and through grid biasing resistors that are connected between the control electrodes of each of the electron tubes and the source of negative potential. The negative polarity triggering enabling potential is applied to diode rectifier 1325 of and gate 1337. The bistable multivibrator 1336 will remain in the set condition then until it is reset by a triggering pulse applied from the controller of the unit after a complete table of data has been read out and a new table of data is to be inspected.

The and gate 1337 further includes a diode rectifier 1526 which has negative polarity line gate pulses supplied thereby from the multivibrator 1322 of the output logic circuit, and a load resistor 1527 which is connected to a source of negative potential. After application of an enabling potential to the diode rectifier 1525, the next line gate pulse will open and gate 1337 and apply a triggering potential to a flip flop amplifier 1341. The bistable multivibrator 1341 comprises a pair of triode electron discharge tubes 1527 and 1528 which have their cathodes connected through a common cathode resistor 1529 to a source of negative potential. The anodes of each of the electron tubes 1527 and 1528 are connected through respective plate load resistors to ground, and the anode and control electrodes of each of the tubes are interconnected to parallel resistance and capacitance networks. Grid biasing potentials are supplied to each of the tubes through the plate load resistors and the resistor in the parallel resistance-capacitance network together with grid biasing resistors that are connected to their respective control electrodes of each of the tubes and to the source of negative potential. The circuit thus comprised will remain in either one of two operating states wherein electron tube 1527 is conducting or vice versa unless flipped to its other operating state potential supplied to the bistable multivibrator 1336 is coupled to the control grid of electron tube 1516 through a triggering circuit comprised by diode rectifier 1519 and load resistor 1521. Reset triggering potentials are applied to the control grid of triode 1517 from a similar triggering network comprising diode rectifier 1522 and load resistor 1523. Application of a reset potential to the triggering network 1522 and 1523 at the beginning of a cycle of operation supplied from the controller drives the control electrode of electron tube 1517 negatively cutting that tube off and allowing electron tube 1516 to be rendered conductive. The positive bias built up across the common cathode resistor 1518 then maintains the bistable multivibrator 1336 in the reset condition until it is again triggered to the set condition. In the reset condition, a positive blocking potential is applied from the anode of electron tube 1517 to the cathode follower amplifier 1524 to diode rectifier 1525 of and gate 1337 and keeps this and gate closed.

Upon the application of the negative polarity set signal supplied from the or gate 1331 of the logic circuit through coupling capacitor 1515, diode rectifier 1519 conducts and applies a negative polarity potential to the control grid of electron tube 1516. Electron tube 1516 is thereby rendered conductive and drives electron tube 1517 into cut off where it is maintained there by the positive bias applied from the common cathode resistor 1518. Upon electron tube 1517 being rendered conductive, a negative polarity enabling potential is applied to a control grid of cathode follower amplifier 1524 which cuts that amplifier off so that a negative by a triggering potential. A reset triggering potential is supplied to the electron tube 1528 through a triggering network comprised by diode rectifier 1531 and load resistor 1532, which are connected to the conductor over which the start reset signal pulse is supplied from the controller of the equipment. This start reset pulse is negative polarity so upon being applied to the control grid of electron tube 1528 drives that control grid negative and allows the electron tube 1527 to be conductive, whereupon the positive potential built up across the common cathode resistor 1529 drives electron tube 1528 into cut off and maintains it there until an outside triggering potential changes the condition of the flip flop amplifier. Negative polarity line gating pulses supplied from the and gate 1337 are coupled through a coupling capacitor 1533 and applied to the control grid of electron tube 1527 through a triggering network comprising a resistor 1534 and diode rectifier 1535, and simultaneously are applied to the control grid of electron tube 1528 through a triggering network comprising a resistor 1536 and a diode rectifier 1537. By this arrangement, whichever of the electron tubes 1527 or 1528 is conducting will be cut off by the negative polarity pulse applied by the control grid thereof, and by reason of the charge built up on the parallel resistance-capacitance networks connected to the anode thereof, will be maintained cut off for sufficiently long time to allow the opposite tube to be rendered conductive, whereupon the positive bias built up by the common cathode resistor 1529 will keep it in this state. This results in changing the flip flop amplifier from its set to its reset condition where a negative polarity enabling potential is applied from the cathode of electron tube 1527 to the next succeeding flip flop amplifier 1342. In operation, the start reset signal from the controller cuts off electron tube 1528 and allows electron tube 1527 to become conductive. Simultaneously, the flip flop amplifier 1342 is reset so the negative polarity pulse produced across the anode circuit of electron tube 1527 has no effect on the setting of the flip flop amplifier 1342. Accordingly, both flip flop amplifiers will be in the reset condition. Upon the first line gate pulse being supplied from and gate 1337, flip flop amplifier 1341 is triggered from its reset to its set condition so that electron tube 1528 becomes conductive, and this has no effect on the setting of flip flop amplifier 1342. The next line gate pulse will then trigger flip flop amplifier 1341 back to its reset condition and result in the production of a negative polarity signal pulse that is applied to flip flop amplifier 1342 and converts it from its reset to its set condition. The flip flop amplifier 1341 has its output terminal from anode of electron tube 1528 coupled to the control grid of the cathode follower amplifier 1538, which has its cathode load resistor connected to a diode rectifier 1539 of and gate 1343. Upon being flipped to its set condition, flip flop amplifier 1342 applies a negative enabling potential through cathode follower amplifier 1538 cutting that amplifier off and applying a negative enabling potential to the and gate rectifier 1539. Upon the occurrence of the third line gate pulse supplied from and gate 1337, flip flop amplifier 1341 is returned to its set condition where a negative polarity pulse is supplied from the anode of electron tube 1528 to cathode follower amplifier 1541 to a diode rectifier 1542 of and gate 1343. And gate 1343 then opens and applies a triggering pulse through flip flop amplifier 1336, and once having been triggered from its reset to its set condition remains in the set condition until a reset pulse is applied thereto from the controller of the equipment. In the set condition, flip flop amplifier 1344 provides a negative polarity enabling potential to cathode follower amplifier 1543 connected to the anode of electron tube 1517 comprising a part thereof and results in cutting off cathode follower amplifier 1543. Upon cathode follower amplifier 1543 being cut off, a negative polarity enabling potential is supplied to the and gates 1334, 1335 and 1345 of the output logic which have the diode rectifier.

The line gate pulses supplied from multivibrator 1322 and applied to and gate 1337 are also applied to the diode rectifier 1544 of and gate 1338. And gate 1338 further includes a load resistor which is connected to a source of negative potential and a diode rectifier 1545 which has its collector or anode element connected to a cathode load resistor of cathode follower amplifier 1543, and accordingly has an enabling potential supplied thereto upon flip flop amplifier 1344 being triggered to the set condition. Opening of and gate 1338 provides a negative enabling potential to cathode follower 1348, which has its cathode load resistor connected to the switch core gate diode 1171 and the enable gate diode 1170 of the core storage read-in shift register. This negative enabling potential provided by the opening of and gate 1338 is also supplied through a delay circuit 1349 to the control grid of cathode follower amplifier 1351 which has its cathode load resistor connected to the line counter diode 1148 and functions to shift the line counter to the next line to be selected by the magnetic switching cores of the magnetic core storage unit shown on sheet 18 of the drawings.

Figures 40, 41:
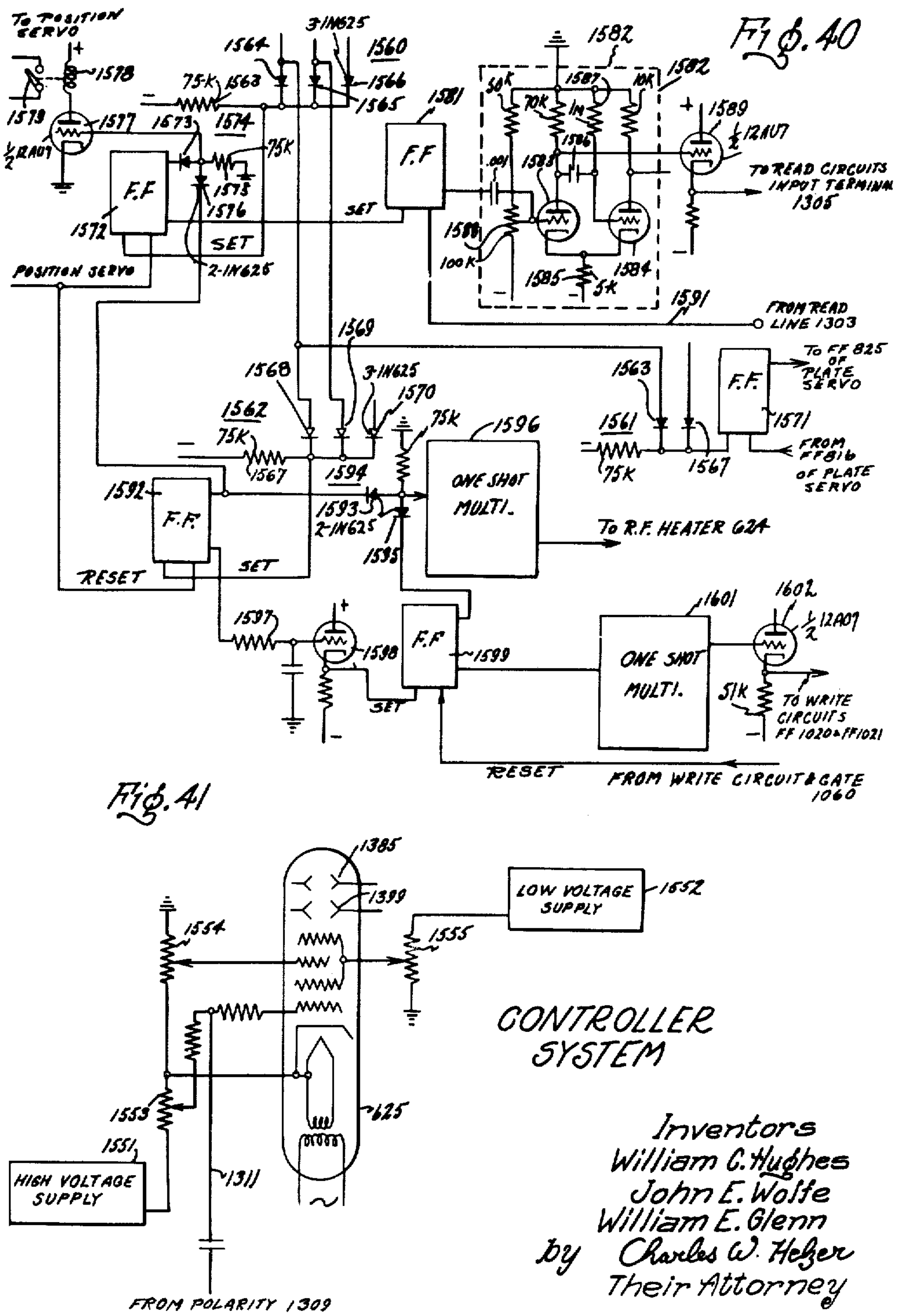
FIG. 40 is a functional block diagram of the controller unit which comprises a part of the plate storage equipment shown in FIG. 20.
FIG. 41 is a combined functional block diagram and circuit diagram showing the excitation circuits for the flying spot scanner tube used in the reading system of FIG. 34 of the drawings.

Circuits for applying energizing potential to the flying spot scanner tube 625 are shown in FIG. 41 of the drawings. These circuits include a conventional high voltage power supply 1551 and a low voltage power supply 1552. The low and high voltage power supplies 1551 and 1552 may comprise any conventional power supply units such as described, for example, in chapter 14 of the textbook entitled, Theory and Application of Electron Tubes, by Herbert J. Reich, published by the McGraw-Hill Book Company, 1944. The high voltage power supply 1551 supplies a high voltage potential across the voltage dividing resistors 1553 and 1554. The voltage dividing resistor 1553 is connected through a coupling voltage dropping resistor to the control grid of the flying spot scanner tube 625. The control grid of flying spot scanner tube 625 is also coupled back to conductor 1311 to the output of the polarity inverter 1309 to be actuated by the flip flop amplifier 1308 by the reset start pulse supplied from the controller of the equipment. The potential applied by the conductor 1311 serves to maintain the flying spot scanning tube 625 cut on during active periods of the read out equipment. Voltage dividing resistor portion 1554 is connected to the focus anode arrangement of the flying spot scanner tube and a pair of astigmatism correction networks are interconnected together, and are connected to a voltage dividing resistor 1555 which is connected to the low voltage power supply 1552. The deflection electrodes of the flying spot scanner tube are shown at 1385 and 1399, and have sweep deflection potential supplied thereto from the circuits shown on sheet 15 of the drawings.

*Controller unit*

The details of construction of the controller system are shown in FIG. 40 of the drawings wherein are disclosed a pair of and gates 1560 and 1562. The and gate 1560 includes a cathode load resistor 1563 that is connected to the source of negative potential and a series of three diode rectifiers connected thereto 1564, 1565 and 1566. The and gate 1562 comprises a load resistor 1567 and a plurality of three diode rectifiers connected thereto 1568, 1569 and 1570. The plate transfer complete signal is supplied to the diode rectifier 1564 in and gate 1560 and to the diode rectifier 1568 in and gate 1562. A plate position address complete is likewise supplied to both the diode rectifier 1565 of and gate 1560 and to the diode rectifier 1569 of and gate 1562. Accordingly, the plate transfer complete potential and the plate position address complete potential are applied to both and gates. The diode rectifier 1566 of and gate 1560 has a read signal start potential supplied thereto from the plate position servo, shown in FIGURE 23, and the diode rectifier 1570 of and gate 1562 has a write signal start supplied thereto from the same plate position address servo. Accordingly, *depending on* whether the computer desires the controller to either write or read, either one of the and gates 1560 or 1562 will be selectively opened upon the application of all three of these energizing potentials thereto.

Assuming it is desired that the equipment read information, a read start signal will be applied to the diode rectifier 1566 of and gate 1560 in connection with the two energizing potentials from the plate transfer and the plate position address, which results in opening and gate 1560 and providing an enabling potential to bistable flip flop amplifier 1572. The bistable flip flop amplier 1572 is identical in construction to the bistable flip flop ampifier 1336 shown in the block edge recognition circuits on sheet 14 of the drawings, and accordingly, application of a set signal thereto will provide a negative polarity enabling potential at its normal output terminal which is supplied to a diode rectifier 1573 of an or gate 1574. The or gate 1574 further includes a load resistor 1575 and diode rectifier 1576 and has its output connected to a triode electron discharge tube 1577. Triode 1577 has its anode connected through a solenoid winding 1578 of the sensitive relay whose movable contact 1579 is connected in the energization circuit of the position servo system. Application of the negative enabling potential to diode 1573 of the or gate 1574 renders the diode conductive and produces a negative polarity grid bias potential that is applied to electron tube 1577 causing it to stop conducting and allow the relay contacts 1579 to close. This results in providing energization potential to the position servo, and upon the position servo completing positioning of the plate element to be read out of the read out device, a position servo finished reset pulse is applied to flip flop amplifier 1572. This results in resetting flip flop amplifier 1572 and providing a negative trigger pulse to flip flop amplifier 1581 that is identical in construction to flip flop amplifier 1572. Upon flip flop amplifier 1581 being set, it provides a negative polarity triggering potential on its inverse output terminal which is coupled to a one shot multivibrator 1582. The one shot multivibrator 1582 comprises a pair of electron discharge tubes 1583 and 1584 which have the cathodes thereof connected to a source of negative potential through a common cathode resistor 1585. The anodes of each of the electron tubes 1583 and 1584 are connected to ground through suitable plate load resistors, and the anode of 1583 is connected through a coupling capacitor 1586 to the control electrode of electron tube 1584. Grid biasing potential is supplied to the control electrode of tube 1584 through a grid biasing resistor 1587 connected to ground and to the control electrode, and grid biasing potential is applied to the control electrode of triode 1583 through a voltage dividing resistance network 1588 connected between ground and a source of negative potential. The circuit parameters are adjusted such that the electron tube 1583 is normally cut off, but electron tube 1584 is normally conducting and the anode of electron tube 1583 is at approximately ground potential and, therefore, keeps the grid of cathode follower amplifier 1589 at ground potential. The application of the positive going pulse from flip flop amplifier 1581 to control grid of electron tube 1583 drives 1583 into conduction and cuts off electron tube 1584. Upon this occurrence, the negative going wave pulse will appear on the anode electrode of electron tube 1583, which is coupled through the cathode follower 1589 and supplied to the read circuit input terminal 1305. The length of this pulse will be determined by the setting of the grid bias applied from the resistor 1588 to the control grid of electron tube 1583 and by the time constants of the resistance-capacitance network 1586 and 1587. After a small period of time, the charge on capacitor 1586 will leak off through resistor 1587, allowing tube 1584 to again become conductive and cutting off electron tube 1583, thereby terminating the negative going pulse. It is anticipated that the parameters of the circuit are adjusted so that this negative going pulse is of extremely short time duration. Upon completion of the reading out operation, the read finish signal pulse will appear across the conductor 1591 and will be applied to the flip flop amplifier 1581 and will reset that flip flop amplifier, thereby completing the reading out operation.

Prior to the reading or writing, the controller actuates the plate storage servo through and gate 1561, which has enabling potentials applied thereto from the plate transfer complete output signal connected to diode rectifier 1563 of and gate 1561 and from an enabling potential supplied from the plate carriage address complete indication to the diode rectifier 1567 of and gate 1561. Upon both of these enabling potentials being present, and gate 1561 opens and applies a set pulse to flip flop amplifier 1571. Flip flop amplifier 1571 in the set condition provides a negative polarity trigger potential to flip flop amplifier 825 of the plate carriage servo system which then drives the plate servo to the position selected by the address, whereupon a reset pulse is provided to output of the flip flop amplifier 816 which resets flip flop amplifier 1571 to its reset condition.

In the event that it is desired to write with the equipment, then the controller will receive enabling potential on three diode rectifiers 1568, 1569 and 1570 from the plate transfer complete signal pulse, from the plate position address complete supplied from the computer upon the complete address of the desired data having been supplied to the plate transfer mechanism, and from the write signal from the plate position address complete supplied from the plate transfer servo after receiving the complete address, respectively. This results in opening and gate 1562 and applying a negative polarity setting pulse to flip flop amplifier 1592. Flip flop amplifier 1592 is identical in construction and operation to the flip flop 1572 and, accordingly, in the set condition, will provide a negative polarity enabling potential to the diode rectifier 1576 of or gate 1574. This enabling potential is also applied to a diode 1593 of an or gate 1594 which further includes a diode rectifier 1595 and a load resistor connected directly to ground. The enabling potential applied to diode 1576 of or gate 1574 turns off the electron tube 1577 and results in closing the relay contact 1579 to thereby drive the position servo to the position set by the address. When the position servo has reached the proper position, a position servo finished reset pulse will be applied to flip flop amplifier 1592 and will reset it. The resulting positive going enabling potential appearing at the normal output of flip flop amplifier 1592 is applied to diode rectifier 1593 of or gate 1594 and therethrough to one shot multivibrator 1596. This positive trigger pulse causes one shot multivibrator 1596 to operate and supply a negative going pulse to actuate the heater circuit for a short time depending upon the pulse time duration of the energizing signal pulse developed by one shot multivibrator 1596. Upon being reset, flip flop amplifier 1592 will also provide a negative polarity enabling pulse signal potential that is applied through a delay gate 1597 to the control electrode of a cathode follower amplifier 1598. The cathode follower amplifier 1598 has its cathode load resistor connected to the input terminal of a bistable flip flop amplifier 1599 that is identical in construction to the flip flops 1572 and 1592. Upon flip flop amplifier 1599 receiving a set energizing potential from the cathode follower amplifier 1598, it develops a positive going enabling pulse in its inverse output terminal which is supplied to the one shot multivibrator 1601 that is identical in construction and operation to the one shot multivibrator 1582. One shot multivibrator 1601 has its output terminal connected to the control electrode of a cathode follower amplifier 1602, which in turn has its cathode load resistor connected to the write circuit flip flop amplifiers 1020 and 1021, respectively. The negative going trigger pulse appearing at the cathode follower amplifier 1602 load resistor then will serve to initiate operation of the write circuits. Upon completion of the writing operation, a write finished trigger pulse is applied back to the flip flop amplifier 1599 and serves to reset flip flop 1599. Upon being reset, flip flop 1599 produces a positive polarity potential pulse in its inverse output circuit which is coupled through diode rectifier 1595 and results in triggering the one shot multivibrator 1596 to again actuate the radio frequency heater element 624 to thereby cure the data that has been written thereon by the write circuits.

From the foregoing description, it can be appreciated that the present invention makes available to the industry an entirely new and improved data storage equipment that is capable of storing relatively large quantities of data in a comparatively small space. This is achieved without any sacrifice in the access time required to locate any particular data and read it out, or in the time required to store data in the storage equipment. Further, because equipment made available by the invention is capable of reading out and recording data bits in characteristic colors that are readily recognizable and easily recorded, the noise elimination characteristics of the equipment are excellent, and hence the equipment is highly reliable in operation.

Obviously, many modifications and variations of the present invention are possible in the light of the above teachings. It is, therefore, to be understood that changes may be made in the particular embodiments of the invention described herein which are within the full intended scope of the invention as defined by the appended claims.

What we claim as new and desire to secure by Letters Patent of the United States is:

1. In a data storage device, the combination of an impressionable solid thermoplastic film recording medium, an electron writing apparatus for impressing electrons on said impressionable solid thermoplastic recording medium in desired patterns to form permanent light modifying gratings thereon, readout means for inspecting said impressionable recording medium having light modifying gratings formed thereon in intelligence conveying patterns by electron writing for deriving an output electric signal indicative of such intelligence, said readout means comprising an optical assembly for projecting an optical image of the intelligence patterns formed on the impressionable medium, color separating means, and electron optical means positioned to view such projected optical image through said color separating means for deriving output electric signals representative of the intelligence formed in said patterns, automatic positioning means for moving said impressionable medium in two transverse directions in response to a control signal to position said medium in any desired location with respect to said electron beam writing apparatus and said readout means, and position control means for accurately controlling the operation of said positioning means.

2. The combination set forth in claim 1 wherein said readout means comprises a flying spot scanner for scanning the impressionable medium, an optical assembly for viewing the field of scan of said flying spot scanner and projecting an optical image indicative of the intelligence formed in the patterns, color separating means, and a pair of photoelectric devices positioned to view the optical image through said color separating means for deriving output electric signals representative of the intelligence formed in said patterns.

3. In a data storage device, the combinaion of an impressionable solid thermoplastic recording medium having permanent light modifying gratings formed thereon in intelligence conveying patterns by electron writing, readout means for inspecting said recording medium and deriving an output electrical signal indicative of such intelligence, said readout means comprising an optical assembly for projecting an optical image of the intelligence patterns formed on the impressionable recording medium, color separating means, and electron optical means positioned to view said projected optical image through said color separating means for deriving output electrical signals representative of the intelligence formed in said patterns, automatic positioning means for moving said impressionable recording medium in two transverse directions in response to a control signal to accurately position said impressionable recording medium in any desired location with respect to said readout means, and position control means for accurately controlling the operation of said automatic positioning means.

4. The combination set forth in claim 3 wherein said readout means comprises a flying spot scanner for scanning the impressionable recording medium, an optical assembly for viewing the field of scan of the flying spot scanner and projecting an optical image indicative of the intelligence formed in the patterns, color separating means, and a pair of photoelectric devices positioned to view the projected optical image through said color separating means.

5. In a data storage device, the combination of an impressionable solid thermoplastic recording medium, an electron writing apparatus for impressing electrons on said impressionable medium to form permanent light modifying gratings thereon in desired intelligence conveying patterns, readout means for inspecting said impressionable recording medium and deriving an electrical output signal indicative of such intelligence, said readout means comprising an optical assembly for projecting an optical image of the intelligence patterns formed on the impressionable medium, color separating filter means, and electron optical means positioned to view said projected optical image through said color separating filter means for deriving output electric signals representative of the intelligence formed in said patterns, automatic random access positioning means for moving said impressionable medium in two transverse directions in response to a control signal to position said plastic film storage medium in any desired location with respect to said electron writing apparatus and said readout means, and position control means comprising a first selsyn system for automatically and accurately controlling the operation of the positioning means to position the impressionable medium in a first dimension, and a second selsyn system for automatically and accurately controlling the operation of the positioning means to position the impressionable medium in a second dimension.

6. The combination set forth in claim 5 wherein said readout means comprises a flying spot scanner for scanning the impressionable recording medium, an optical assembly for viewing the field of scan of the flying spot scanner and projecting an optical image indicative of the intelligence formed in the patterns, color separating filter means, and a pair of photoelectric devices positioned to view the projected optical image through said color separating filter means.

7. In a data storage device, the combination of an impressionable solid thermoplastic recording medium having permanent light modifying gratings formed thereon in intelligence conveying patterns by electron writing, readout means for inspecting the impressionable recording medium for deriving an output electrical signal indicative of such intelligence, said readout means comprising a flying spot scanner for scanning the impressionable recording medium, an optical assembly positioned to view the field of scan of said flying spot scanner and for projecting an optical image indicative of the intelligence formed in the patterns, color separating filter means, and a pair of photoelectric devices positioned to view the projected optical image through said color separating filter means, automatic random access positioning means for moving said impressionable recording medium in two transverse directions in response to a control signal to position said impressionable recording medium in a desired location with respect to said readout means, and position control means comprising a first selsyn system for accurately controlling the operation of the positioning means to position the impressionable recording medium in a first dimension, and a second selsyn system for accurately controlling the operation of the positioning means to position the impressionable recording medium in a second dimension.

8. In a digital data storage device the combination of an impressionable solid thermoplastic recording medium, an electron writing apparatus for impressing electrons on said thermoplastic recording medium in desired intelligence conveying patterns, means for heating the surface of said thermoplastic recording medium to a substantially liquid state to cause deformation of said surface in accordance with the electron patterns, means for subsequently restoring the surface of the thermoplastic film recording medium to a solid state by cooling to a lower temperature to thereby permanently preserve the deformations formed therein, random access positioning means for moving said thermoplastic film recording medium to position said recording medium in any desired location with respect to said electron beam writing apparatus and said heating means, position control means for accurately controlling the operation of the positioning means, a digital-to-analog converter for controlling said position control means in response to digital type control signals supplied thereto, and program control means for selectively controlling the operation of said position control means and the electron writing apparatus.

9. In a digital data storage device, the combination of an impressionable solid thermoplastic recording medium having permanent light modifying deformations formed thereon in intelligence conveying patterns, readout means for inspecting the thermoplastic recording medium for deriving an output electrical signal indicative of said intelligence, random access positioning means for moving said thermoplastic recording medium to position said thermoplastic recording medium in any desired location with respect to said readout means, position control means for controlling the operation of the positioning means, a digital-to-analog converter for controlling said position control means in response to digital type control signals, and program control means for selectively controlling the operation of said position control means and the readout means.

10. The combination set forth in claim 9 wherein said readout means comprises an optical assembly for projecting an optical image of the intelligence patterns formed on the impressionable recording medium, and electron optical means viewing such projected optical image for deriving output electric signals representative of the intelligence formed in said patterns.

11. The combination set forth in claim 9 wherein said readout means comprises a flying spot scanner for scanning the impressionable recording medium, an optical assembly positioned to view the field of scan of said flying spot scanner and to project an optical image indicative of the intelligence formed in the patterns thereon, and a pair of photoelectric devices positioned to view the projected optical image for deriving output electric signals representative of the intelligence formed in said patterns.

12. The combination set forth in claim 9 wherein said readout means comprises an optical assembly for projecting an optical image of the intelligence patterns formed on the impressionable recording medium, color separating means, and electron optical means viewing such projected optical image through said color separating means for deriving output electric signals representative of the intelligence formed in said patterns.

13. The combination set forth in claim 9 wherein said readout means comprises a flying spot scanner for scanning the impressionable recording medium, an optical assembly positioned to view the field of scan of said flying spot scanner and to project an optical image indicative of the intelligence formed in said patterns, color separating means, and a pair of photoelectric devices positioned to view the projected optical image through said color separating means for deriving output electric signals representative of the intelligence formed in said patterns.

14. In a data storage device, the combination of a deformable solid thermoplastic recording medium, an electron gun writing apparatus for impressing a writing beam of electrons on said deformable solid thermoplastic recording medium in desired patterns, heating means for heating said thermoplastic film recording medium surface to a liquid state to cause deformation of said surface in accordance with the charge pattern, means for subsequently cooling the liquid surface of the thermoplastic film recording medium to a substantially solid state to thereby permanently set the patterns, readout means for inspecting the deformable recording medium for the intelligence stored thereon and deriving an output electric signal indicative of such intelligence, automatic positioning means for moving said deformable medium in two transverse directions in response to a controlled signal to accurately position said deformable recording medium in any desired location with respect to said electron writing apparatus, said heating means and said readout means, and position control means for accurately controlling the operation of said automatic positioning means.

15. In a data storage device, the combination of an impressionable solid thermoplastic film recording medium, an electron writing apparatus for impressing charges on said thermoplastic film recording medium in desired intelligence conveying patterns, heating means for heating the surface of said thermoplastic film recording medium to a liquid state to cause deformation of said surface in accordance with said charge pattern, means for cooling the liquid surface of the thermoplastic film recording medium to a substantially solid state to thereby permanently set the deformations formed therein, readout means for inspecting the permanent light modifying deformations formed in the surface of said thermoplastic film recording medium for deriving an output electrical signal indicative of such intelligence, random access positioning means for positioning said thermoplastic film recording medium in any desired location with respect to said electron writing apparatus, said heating means and said readout means, position control means for accurately controlling the operation of said positioning means, said readout means comprising an optical assembly for projecting an optical image of the intelligence patterns formed on the thermoplastic film recording medium, and electron optical means for viewing such projected optical image, and for deriving output electric signals representative of the intelligence formed in said patterns.

16. The combination set forth in claim 15 wherein said readout means comprises a flying spot scanner for scanning the thermoplastic film recording medium, the optical assembly is positioned for viewing the field of scan of said flying spot scanner and projecting an optical image indicative of the intelligence formed thereon, and the electron optical means comprises a pair of photoelectric devices positioned to view the projected optical image for deriving output electric signals representative of the intelligence formed in said patterns.

17. The combination set forth in claim 15 wherein said readout means is further characterized by color separating means positioned between said optical assembly and said electron optical means for projecting a colored optical image of the intelligence patterns formed on the thermoplastic film recording medium, and the electron optical means views such projected colored optical image to derive output electrical signals representative of the intelligence formed in said patterns.

18. The combination set forth in claim 15 wherein said readout means further comprises a flying spot scanner for scanning the thermoplastic film recording medium, the optical assembly is positioned to view the field of scan of said flying spot scanner and project an optical image indicative of the intelligence formed in the patterns, color separating means, and the electron optical means comprises a pair of photoelectric devices positioned to view the projected optical image through the color separating means for deriving output electric signals representative of the intelligence formed in said patterns.

19. In a data storage device, the combination of an impressionable solid thermoplastic film recording medium, an electron writing apparatus for impressing charges on said thermoplastic film recording medium in desired intelligence conveying patterns, heating means for heating the surface of said thermoplastic film recording medium to a liquid state to cause deformation of said surface in accordance with said charge pattern, means for cooling the liquid surface of the thermoplastic film recording medium to a substantially solid state to thereby permanently set the deformation formed therein, readout means for inspecting the permanent light modifying deformations formed in the surface of said thermoplastic film recording medium for deriving an output electrical signal indicative of such intelligence, random access positioning means for positioning said thermoplastic film recording medium in any desired location with respect to said electron writing apparatus, said heating means and said readout means, position control means for accurately controlling the operation of said positioning means, a digital-to-analog converter for controlling said position control means in response to a digital type control signal, and program control means for selectively controlling the operation of said electron writing means, the heating means, the readout means, and said position control means.

20. The combination set forth in claim 19 wherein said readout means comprises an optical assembly for projecting an optical image of the intelligence patterns formed on the thermoplastic film recording medium, and electron optical means for viewing such projected optical image and for deriving output electrical signals representative of the intelligence formed in said patterns.

21. The combination set forth in claim 19 wherein said readout means comprises a flying spot scanner for scanning the thermoplastic film recording medium, an optical assembly positioned to view the field of scan of said flying spot scanner for projecting an optical image indicative of the intelligence formed in the patterns, and a pair of photoelectric devices positioned to view the projected optical image for deriving output electric signals representative of the intelligence formed in said patterns.

22. The combination set forth in claim 19 wherein said readout means comprises an optical assembly for projecting an optical image of the intelligence patterns formed on the thermoplastic film recording medium, color separating means, and electron optical means for viewing such projected optical image through said color separating means for deriving output electric signals representative of the intelligence formed in said patterns.

23. The combination set forth in claim 19 wherein said readout means comprises a flying spot scanner for scanning the thermoplastic film recording medium, an optical assembly positioned to view the field of scan of said flying spot scanner for projecting an optical image indicative of the intelligence formed in the patterns, color separating means, and a pair of photoelectric devices positioned to view the projected optical image through said color separating means for deriving output electric signals representative of the intelligence formed in said patterns.

24. In a data storage device, the combination of an impressionable solid thermoplastic film recording medium having permanent light modifying deformations formed thereon in intelligence conveying patterns, readout means for inspecting said impressionable solid thermoplastic recording medium for deriving an output electrical signal indicative of such intelligence, automatic positioning means for moving said impressionable recording medium in response to a control signal to accurately position said impressionable recording medium in any desired location with respect to said readout means, and position control means for accurately controlling the operation of said automatic positioning means, said readout means comprising a flying spot scanner for scanning the impressionable recording medium, an optical assembly positioned to view the field of scan of said flying spot scanner, and to project an optical image indicative of the intelligence formed in said patterns, and a pair of photoelectric devices positioned to view the projected optical image for deriving output electric signals representative of the intelligence formed in said patterns.

25. In a data storage device, the combination of an impressionable solid thermoplastic film recording medium having permanent light modifying deformations formed thereon in intelligence conveying patterns, readout means for inspecting said impressionable solid thermoplastic recording medium for deriving an output electrical signal indicative of such intelligence, automatic positioning means for moving said impressionable recording medium in response to a control signal to accurately position said impressionable recording medium in any desired location with respect to said readout means, and position control means for accurately controlling the operation of said automatic positioning means, said readout means comprising an optical assembly for projecting an optical image of the intelligence patterns, formed on the impressionable recording medium, electron optical means viewing such projected optical image for deriving output electric signals representative of the intelligence formed in said patterns, and color separating means interposed between the optical projecting assembly and the electron optical means whereby the electron optical means views the image projected by the optical assembly through said color separating means for deriving output electric signals representative of the intelligence formed in said patterns.

26. In a data storage device, the combination of an impressionable solid thermoplastic film recording medium having permanent light modifying deformations formed thereon in intelligence conveying patterns, readout means for inspecting said impressionable solid thermoplastic recording medium for deriving an output electrical signal indicative of such intelligence, automatic positioning means for moving said impressionable recording medium in response to a control signal to accurately position said impressionable recording medium in any desired location with respect to said readout means, and position control means for accurately controlling the operation of said automatic positioning means, said readout means comprising a flying spot scanner for scanning the impressionable recording medium, an optical assembly positioned to view the field of scan of said flying spot scanner and to project an optical image of the scanned information produced by said line spot scanner, color separating means, and electron-optical means comprising a pair of photoelectric devices positioned to view the projected optical image through said color separating means for deriving output electric signals representative of the intelligence formed in said patterns.

References Cited by the Examiner

UNITED STATES PATENTS

| | | | |
|---|---|---|---|
| 1,891,780 | 12/1932 | Rutherford | 340—173 |
| 2,391,451 | 12/1945 | Fischer | 340—173 |
| 2,630,484 | 3/1953 | Groak | 178—5.2 |
| 2,674,728 | 4/1954 | Potter | 340—174.1 |

OTHER REFERENCES

Thomas et al.: "Heat Developed and Powder Lichtenberg Figures Produced by Electrical Impulses," British Journal of Applied Physics (publication), April 1951, pp. 98–109.

IRVING L. SRAGOW, *Primary Examiner.*

T. W. FEARS, *Assistant Examiner.*